(12) United States Patent
Chiluvuri

(10) Patent No.: US 11,275,567 B1
(45) Date of Patent: *Mar. 15, 2022

(54) MAKING COMMUNICATION INTERFACES PLUGGABLE BY USING MECHANISMS COMPRISING OF EXCHANGE/BROKER FOR COMMUNICATION INTERFACES

(71) Applicant: Raju Chiluvuri, Hyderabad (IN)

(72) Inventor: Raju Chiluvuri, Hyderabad (IN)

(73) Assignee: Raju Chiluvuri, Bothell, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/148,575

(22) Filed: Jan. 14, 2021

Related U.S. Application Data

(63) Continuation-in-part of application No. 16/271,886, filed on Feb. 11, 2019, now Pat. No. 10,949,171.

(60) Provisional application No. 62/647,829, filed on Mar. 26, 2018.

(51) Int. Cl.
  *G06F 8/36* (2018.01)
  *G06F 8/73* (2018.01)
  *G06F 11/36* (2006.01)

(52) U.S. Cl.
  CPC .............. *G06F 8/36* (2013.01); *G06F 8/73* (2013.01); *G06F 11/362* (2013.01)

(58) Field of Classification Search
  None
  See application file for complete search history.

(56) References Cited

U.S. PATENT DOCUMENTS

| | | | |
|---|---|---|---|
| 6,742,015 B1* | 5/2004 | Bowman-Amuah | G06F 8/20 709/223 |
| 10,949,171 B1* | 3/2021 | Chiluvuri | G06F 8/73 |
| 2014/0337816 A1* | 11/2014 | Chiluvuri | G06F 8/36 717/107 |

* cited by examiner

*Primary Examiner* — Marina Lee

(57) ABSTRACT

A large software application comprises of multiple modules that communicate or exchange data with each other. To facilitate communication between modules, each module implements interfaces, and it is required to create communication code to allow communication and collaboration between these interfaces. To allow collaboration between modules today, the necessary communication code (that facilitates communication between any two interfaces) is created and managed manually. It is desirable to invent tools, methods, and mechanisms to automate various tasks and activities necessary to create and manage the communication code. Current invention discloses such novel tools, methods, and mechanisms to facilitate communication between modules, by allowing communication between modules through their interfaces. To facilitate communication between the interfaces, the interfaces also include and provide the necessary information (e.g. look-up keys) to the novel tools to look up and find each pair of interfaces (i.e. two interfaces) that need to communicate with each other and to facilitate the necessary communication between the two interfaces.

33 Claims, 34 Drawing Sheets

| A sample pseudo code for including and coupling two Modules |
|---|
| 1. // Code for instantiating and including an object for Module-1 |
| 2. PulggableModule Mod1 = new Mod_Buy_Tickets (ACi, 94089); |
| 3. ApplicationWindow.AddChild (Mod1, x_loc1, y_loc1, null); |
| 1. // Code for instantiating and including an object for Module-2 |
| 2. PulggableModule Mod2 =new Mod_Diapley_Theaters (ACi, 94089); |
| 3. ApplicationWindow.AddChild (Mod2, x_loc2, y_loc2, null); |
| 1. // Part of communication code created by an intelligent SRO/DoS |
| 2. // Linking Mod1 & Mod2 to allowing communication between them |
| 3. Mod2.BuyTickets (Mod1.DisplayAvailableTheaterSeats); |

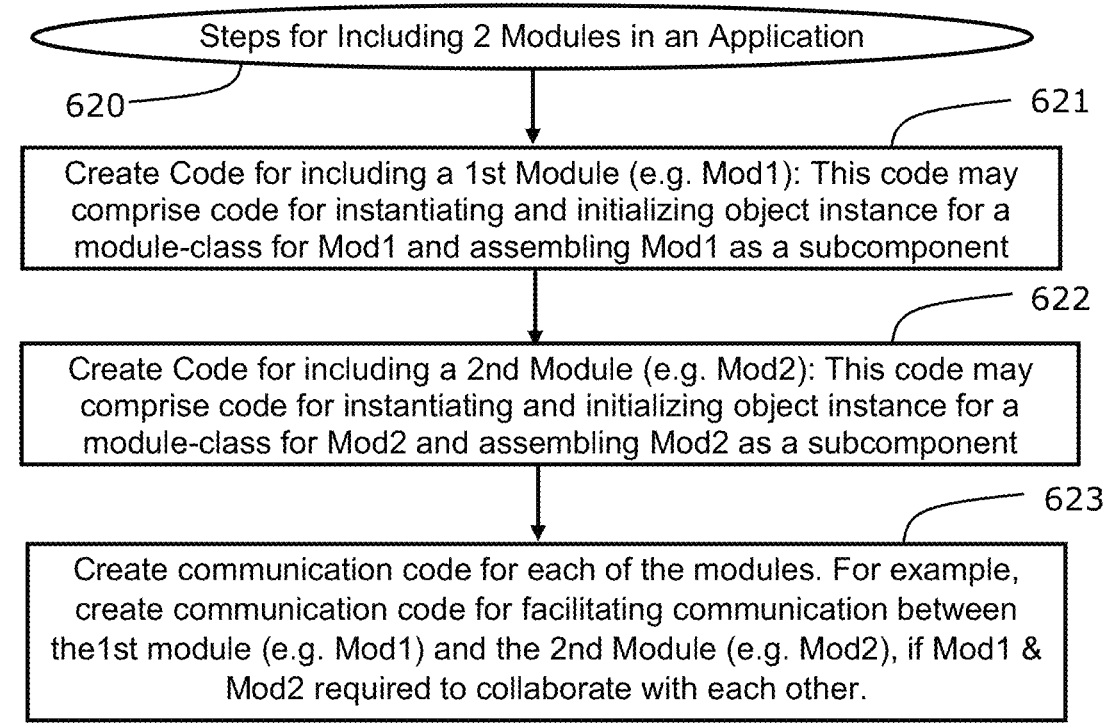

FIG. 6b

Sample Communication Interface or Link Between 2 Modules

Code for Module-1: Listener-Module Or Service-Provider Module

1. // The code for a service provide module implements a function
2. // for each of the service provided by the service provider module
3. Function NameOfServiceFunction (Parameters, ...) {//Code ... };

1. // Registering eachService method implemented in module-1
2. // by using a unique Lookup Key, e.g: "Service-X of Module1",
3. SRO.registerService (Module1->NameOfServiceFunction,
4.         "Service-X of Module1",Version, InterfaceDescription);

710  712  711
723  721  720  722

1. // Variable in Module-2 for storing reference for Service Method
2. VAR RefForModule1Service = null;

1. // Find and Store reference for Service Method by using look-up-key
2. RefForModule1Service = SRO.getService ("Service of Module1",
3.         Version, InterfaceDescription);
4. If (RefForModule1Service == null) ServiceNotAvalableException();

1. // This reference saved in RefForModule1Servicecan be used
2. // anywhere in the code of module-2 for requesting the Service
3. RefForModule1Service (Parameters, ..., ...);

Code for Module-2: Caller-Module Or Service-Consumer Module

FIG. 7

Two Functions for Communication Code in Each Module for Registering/Looking-up Services

The code for each module-class comprises of a function that implements code for registering each of the services provided by the module (using a lookup-key), with the global SRO. An example embodiment, if the Module offers three services:

1. public int register_all_services_provided (SRO_Class SRO)
2. {// If this SCC offers 3-services, it registers each of the 3-services using a pre-defined Lookup-name
3.    SRO.RegisterService (SCC_ID,Interface1a,ServiceName1, ServiceMethod1);
4.    SRO.RegisterService (SCC_ID,Interface2a,ServiceName2, ServiceMethod2);
5.    SRO.RegisterService (SCC_ID,Interface3a,ServiceName3, ServiceMethod3);
6. } // "Interface1a" may be a version object/string (e.g. 02.07.09) of the interface of ServiceMethod1

— 912
— 920
— 910

The code for each module-class comprises of a function that implements code for lookup with SRO object for each of the services required by using respective lookup-key. An example embodiment, if the Module requires two services:

1. public int lookup_all_services_required (SRO_Class SRO)
2. {// If SCC needs 2-services, it looks-up for the 2-service-fucntions and saves them in local variables.
3.    Reference1=SRO.Service_LookUp (SCC_ID,Interface1, NameOfRequiredService1);
4.    Reference2=SRO.Service_LookUp (SCC_ID,Interface2, NameOfRequiredService2);
5. } //SCC is designed to use pre-defined/agreed and published interfaces of other SCCs.

Pseudo Code for Building an Application by Including Pluggable Modules

```
1.  Void GIS_Display(ACi, Canvas) {   // This assembles Pluggable Modules
2.  // ACi is an Object that comprises SRO & Application Context data
3.
4.  // Include pluggable module created by developer "A"                    ⎫
5.  PluggableModule CityMap = new CityMap_Module (ACi,ZipCode);             ⎬ 1511
6.  Canvas.AddChild (CityMap, 0, 0, null);                                  ⎭
7.
8.  /* Include pluggable module created by developer "D"                    ⎫
9.  //PluggableModule LandMarks=new CityLandmarks_Module(ACi, ZipCode)      ⎬ 1512
10. //Canvas.AddChild (LandMarks, 0, 0, null);  */                          ⎭
11.
12. // Include pluggable module created by developer "B"                    ⎫
13. PluggableModule Ambulances = new CityER_Module(ACi, ZipCode);           ⎬ 1513
14. this.canvas.AddChild(Ambulences,0,0, null); //Emergency Response        ⎭
15.
16. // Include pluggable module created by developer "C"                    ⎫
17. PluggableModule AirTraffic= new CityATC_Module(ACi, AirportCode);       ⎬ 1514
18. Canvas.AddChild (AirTraffic, 0, 0, null);                               ⎭
19.
20. Canvas.Dispaly(Parameters); // Display the GIS for City
21. }
```

Pseudo Code for Wrapper Class to make a legacy-class into pluggable module

1. Class WrapperModule extends PluggableModule {
2.    LegacyClass legObj = null;
3.    InterfaceClass InterfaceObj;
4.    public WrapperModule() {legObj = new LegacyClass();}

1. public int register_all_services_provided (SRO_Class SRO)
2. { // If it offers 3-services, it registers each of the services using a pre-defined Lookup-name
3.    SRO.RegisterService (MOD_ID,Interface1a,ServiceName1, legObj.ServiceMethod1);
4.    SRO.RegisterService(MOD_ID,Interface2a,ServiceName2, legObj.ServiceMethod2);
5. } // "Interface1a" may be a version object/string of the interface of ServiceMethod1

1. public int lookup_all_services_required (SRO_Class SRO)
2. { //If it needs a service, it looks-up for each service and creates necessary communication code
3.    InterfaceObj =SRO.Service_LookUp(SCC_ID, Interface1, NameOfRequiredService1);
4.    legObj.setCallBack(InterfaceObj);
5. }//Module is designed to use pre-defined/agreed and published interfaces
6. } // End of Class

FIG.18

Sample Communication Interface or Link Between 2 Modules

Code for Module-1: Listener/Service-Provider Module

1. // The code for a service provide module implements a function
2. // for each of the service provided by the service provider module
3. Function Module1FunctionForServiceX (Parameters, ...) {//Code ... };

1. // Registering eachService method implemented in module-1
2. // by using a unique Lookup Key, e.g: "Service-X of Module1",
3. SRO.registerService (Module1-> Module1FunctionForServiceX,
4.    "Service-X of Module1",Version, InterfaceDescription);

2322　2321　2320　　2310　2312　2311
　　　　　　　　　　　　　　　　　2323

1. // Variable in Module-2 for storing the reference for Service Method
2. VAR RefForModule1ServiceX = null;
3. // Find and Store reference for Service Method by using look-up-key
4. RefForMod1ServiceX = SRO.getService ("Service-X of Module1", ...);

1. Function InterfaceForExternalService1 (Params1, ...) {
2. // Necessary *adopter* code for bridging gaps in *artificial dependencies*
3. RefForMod1ServiceX (Params2, ..., ...);　　}

1. // This InterfaceForExternalService1 can be used anywhere in the
2. // code of module-2, which in turn requests service of module-1
3. InterfaceForExternalService1 (Parameters, ..., ...);

Code for Module-2: Caller/Service-Consumer Module

FIG. 23

Arjun mechanism for extracting information for available/required services

Information Included in a Module to Publish/Subscribe a Service

Listing-1: A First Module Publishing it's Service ---2610

```
1.   // Providing Necessary Description for an Interface for exporting a service
2.   #ExportArjunInterface: $[%
3.   <Interface Name='UniqLookupKey' Package='MyPackage' Version='1.4.4'>
4.        <Reference> NameOfTheServiceFunction</ Reference>
5.        <Parameters Count=6>
6.             <Type Index=1 Data='Height'> Integer </Type>
7.             <Type Index=2 Data='Weight'> Integer </Type>
8.             <Type Index=3> float </Type>
9.             <Type Index=4> String</Type>
10.            <Type Index=5> PS_CanvasClass </Type>
11.            <Type Index=6 optional='Yes'> CallBackClass </Type>
12.       < Parameters/>
13.       <Returns> Integer </Returns>
14.       < Node Path='Root/Node/SubNode' > NodeName </Node>
15. </Interface> %]$
```

Listing-2: A Second Module Subscribing a Required Service ---2620

```
1.   // Providing Necessary Description for the Interface to find required service
2.   Var ReferenceToMyService1 = #ImportArjunInterface: $[%
3.   <Interface Name='UniqLookupKey' Package='MyPackage' Version='1.4.4'>
4.        < Node Path='Root/Node/SubNode' > NodeName </Node>
5.        <Parameters Count=6>
6.             <Type Index=1 Data='Height'> Integer </Type>
7.             <Type Index=2 Data='Weight'> Integer </Type>
8.             <Type Index=3> float </Type>
9.             <Type Index=4> String</Type>
10.            <Type Index=5> PS_CanvasClass </Type>
11.            <Type Index=5 optional='Yes'> RefToCallBackFunction </Type>
12.       < Parameters/>
13.       <Returns> Integer </Returns>
14. </Interface> %]$
```

FIG. 26

Monolithic Application Code Comprising of Multiple Parts or Sections that Implement multiple (i) Listener Interfaces and (ii) Caller Interfaces — 3300

3310

3320

BCI/ECI mechanism gets information for Listener Interfaces and Caller Interfaces from the code of the application for allowing collaboration between caller interfaces & respective listener interfaces, by using a look-up key (e.g. combination of look up ids) for finding match for each caller interface with an appropriate listener interface (e.g. by finding match for two interfaces having symbiotic relationship).

➢ Pentagon shape represents Caller Interface
➢ Plaque shape represents Listener Interface

3305

3301

MAKING COMMUNICATION INTERFACES PLUGGABLE BY USING MECHANISMS COMPRISING OF EXCHANGE/BROKER FOR COMMUNICATION INTERFACES

CROSS-REFERENCE TO RELATED APPLICATIONS

This application is a continuation-in-part application of Ser. No. 16/271,886, that was filed on Feb. 11, 2019, now pending, and also claims priority from Provisional Patent Application Ser. No. 62/647,829, that was filed on Mar. 26, 2018; the entire contents of which are hereby incorporated herein by reference.

COPYRIGHT NOTICE AND USE PERMISSION

A portion of the disclosure of this patent document contains material that is subject to copyright protection. The copyright owner has no objection to the facsimile reproduction of the patent document or the patent disclosure by anyone, as it appears in the U.S. Patent and Trademark Office patent file or records, but otherwise reserves all copyright rights, nevertheless. The following notice applies to the software and data, as described below and in the drawings, hereto: (C) Copyright 2020, Raju Chiluvuri, All Rights Reserved.

FIELD OF THE INVENTION

One of the most prominent problems in software engineering has been the question of how to program large and complex software comprising numerous modules/parts and creating, documenting, and managing communication links/code between the parts/modules, where each communication link/code is implemented (manually today) to allow communication between any two parts or modules in the large software application. Many large projects involve several dozens of programmers working on large codebase comprising of millions of lines of code. In this kind of environment, it is difficult to keep track of what a given part of code does and particularly to keep track or comprehend dependencies (e.g. such as communication links and interfaces between two parts that communicate with each other) between various disparate parts spread across the codebase. For example, it is nearly impossible to know what sort of effect a small change to one part could have on other parts (and therefore requires extensive testing). These communication links crisscross across the codebase, and this is the major cause for error-prone and notorious spaghetti code.

To avoid such poorly planned scenarios (that is hard to document and hard to keep the documentation up to date with code that needs to be changed frequently to satisfy evolving needs), computer scientists and software engineers began to organize around the concept of "modularization," which is the practice of breaking up the codebase of a large application into modules and organizing code based on the functionality or task it implements. In this way, code becomes reusable and easier to debug, document, and manage. Modularization organizes code into modules. For example, organizing code based on tasks involves organizing the codebase into modules based on what each module does, where each module would have an exclusive codebase that can be developed and tested individually. However, all these modules or parts in a large software application need to communicate and collaborate with each other, which requires creating communication code/links to allow collaboration between any two parts or modules.

This invention relates to software development using a new kind of tool and mechanism comprising of communication interface Exchange/Broker to automate various tasks and activities associated with creating and managing communication code/links to allow collaboration between any two modules (e.g. components, objects, sections, and other kinds of parts that include but are not limited to APIs, Libraries, and Packages), where "API" is short for "Application Programming Interface".

This invention relates to software development using a new kind of module (e.g. components, objects, and other kinds of parts that include but are not limited to APIs, Libraries, and Packages) that is designed to be plugged in (or pluggable). Where "API" is short for "Application Programming Interface". Particularly concerning the development process for designing and developing software applications by employing tools and mechanisms such as a software motherboard (figuratively speaking) having virtual sockets. For example, pluggable electric appliances such as TV, table lamp, and fan require electric sockets. The components for computers such as CPU, DRAM, Power Supply, CD Player, Network Card, and Hard Disk are plugged into appropriate (or respective) sockets provided in a PCB (Printed Circuit Board) such as the system-board or motherboard of the computer. Also, such PCBs may be used as cards to build container components such as network card, by plugging in computer chips.

Likewise, "pluggable modules" for software programs (e.g. applications or products) require virtual system-board or motherboard having the necessary mechanisms to plug in said "pluggable modules". For example, by automating various tasks or activities (being performed manually today) such as the creation of communication code to allow collaboration between software modules (e.g. parts, objects, or components that include reusable or custom-designed software objects, software modules, or parts that include but are not limited to APIs, Libraries, or Packages) in each application and the process of managing communication interfaces and code between modules, like when any module is redesigned or replaced by a newer module (e.g. during maintenance and/or release of newer versions of the application) for example.

The idea that software should be componentized (or modularized)—built from prefabricated components (e.g. modules or other kinds of parts such as libraries, APIs, or APIs for microservices)—first became prominent with Douglas McIlroy's address at the NATO conference on software engineering in Garmisch, Germany, 1968, titled "Mass-Produced Software Components". The conference set out to counter the software crisis by focusing on reuse (e.g. of components, modules, or APIs for various kinds of parts). But in the context of countless physical products (e.g. cars, computers, cell-phones, TVs, airplanes, printers, machines, and factory machinery) we use every day, components are parts that can be assembled (or plugged in) and disassembled (or unplugged). It is pertinent to notice that core components are custom designed to fit perfectly and perform optimally in just one product model (e.g. Camry, Corolla, or Accord). Although a few non-core components for automobiles such as battery and DVD-player are reusable, it is an exception (not a rule).

Today, the software community uses the term "software components" in two completely different contexts to mean two completely different things (or kinds): (i) using components or other kinds of parts as parts to build a single executable (e.g. a single file comprising machine code); for example, by employing methods such as modular programming, or (ii) each executable (e.g. a single file comprising machine code) is referred to as a component in a distributed environment, where each of the executables running on different computers collaborate with each other using internet or intranet communication protocols for IPC (Inter Process Communications); for example, employing methods such as SoA (Service Oriented Architecture) or CORBA to facilitate communication between the components. The latter type (that uses IPC) is completely different from the former type (that does not use IPC), where the modules are part of a single compiled executable (so each module can directly call functions or methods of other modules, without any need to use IPC).

The main striking difference between the 2 different kinds of software components is: (1) components that use any mechanism and/or protocol (e.g. TCP/IP or sockets) for IPC, and (2) components that do not use any kind of IPC. This present disclosure and invention is only limited to the second kind (that do not use IPC), such as using modules, components, and other kinds of parts for modular programming (all of which are part of the executable and run on a computer) to build a single executable (e.g. using many objects as modules to build an application in OOP—"Object Oriented Programming"). The term "modular programming" has many similar descriptions, which vary slightly or moderately (or even considerably based on given context or the perception of few discriminating connoisseurs of software engineering) from each other. Some of the popular descriptions are provided as Appendices/URLs to this disclosure. The Appendices/URLs are provided only as exemplary references and as background information for this disclosure. In this disclosure, the term module is used to refer to various kinds of software parts such as software components, objects, and other kinds of parts that include but are not limited to APIs, Libraries, or Packages, which are used in the building of every software application (i.e. software executable).

One of the descriptions says: Modular programming is a software design technique that emphasizes separating the functionality of a program into independent, interchangeable modules, such that each contains everything necessary to execute only one aspect of the desired functionality. A module interface expresses the elements that are provided and required by the module. The elements defined in the interface are detectable by other modules. The implementation contains the working code that corresponds to the elements declared in the interface. Modular programming is closely related to structured programming and object-oriented programming, all having the same goal of facilitating construction of large software programs and systems by decomposition into smaller pieces (i.e. modules), and all originating around the 1960s and early 1970s.

While the usage of these terms has been historically inconsistent, "modular programming" today refers to high-level decomposition of the code of an entire program into pieces (i.e. modules), structured programming to the low-level code use of structured control flow, and object-oriented programming to the data use of objects (a kind of data structure). In Object-Oriented Programming (or "OOP"), the use of interfaces as an architectural pattern to construct modules is known as interface-based programming.

Each software application uses many reusable parts or components (e.g. API or class library for GUI-components) as well as custom-designed components such as object instances of classes or modules etc. The developers of applications compose and/or assemble various kinds of such components to build each application. If these modules in an application need to collaborate with each other, it is essential to create communication code to allow such collaboration. This invention discloses a novel kind of module (e.g. that can be plugged in) and the tools and mechanisms necessary for plugging in the modules, where the tools and mechanisms automate various tasks and activities of creating and managing the necessary communication code that can facilitate necessary collaboration between the modules.

There are two proven ways of increasing the productivity of software engineers. The first way is increasing "reuse"—increasing the degree of reuse reduces the cost and complexity by reducing the amount of development (or implementation) of custom application code required to create each software application and maintenance of the custom application code. The complexity of designing and developing any product (that includes software products) can be decreased by decreasing the parts (or code) that must be custom designed and developed (e.g. or implemented).

This can be accomplished by using pre-built reusable parts or components (e.g. Libraries or APIs for microservices), which are pre-built and tested by the vendors or suppliers of respective parts or components. Makers of almost every physical product (e.g. cars, computers, or factory machinery or machines) use reusable parts or pre-fabricated materials such as steel, plastic, metals, alloys, specialized materials such as silicon wafers to make computer chips, and nickel-cadmium or lead-acid to make batteries etc. In fact, every component such as a computer chip (e.g. CPU or DRAM), auto-engine, or auto battery is built by using such reusable parts. But the components such as CPU, DRAM, and auto-battery can also be plugged in or assembled.

Software engineering researchers have been doing research for maximizing reuse for the past 50 years. Software researchers have made substantial progress in reuse during the past 50 years. Even after leveraging all the available technologies and mechanisms for maximizing reuse, developers of many software applications today are required to implement tens of thousands, to hundreds of thousands, to even millions of lines of custom application code. This custom code is infested by infamous spaghetti code and design. It is desirable to reduce spaghetti code and design. One of the main causes for spaghetti code is manually implementing communication code between various parts, components, or modules in each of the applications to allow collaboration between the modules or components.

The other proven way of addressing the complexity of implementation (or development) and maintenance of this custom code is "modularization"—increasing the degree of modularization reduces the cost and complexity of design, development, and maintenance (e.g. redesign to add more features while releasing upgrades or to keep up with evolving needs) of the custom code by reducing the infamous spaghetti code from the custom code that must be implemented to create most of the large applications. This invention targets at increasing the degree of modularization by automating various tasks of creating and managing communication code when assembling or composing various kinds of modules or components for building the application.

The internal code implemented within each module or component should not be affected by other code implemented for the application if the component is disassembled to be redesigned or refined individually and be tested outside of the product, free from spaghetti code implemented for other parts of the application. The product can be free from spaghetti code or design if the product can be built by plugging in such components, where each component is free from spaghetti code. For example, about 50% of the application code can be free from spaghetti code if over 50% of the code for features and functionality of an application is implemented in modules or components that are of optimal size or complexity and are designed to be assembled (or plugged in) and disassembled (or unplugged).

A proven way of reducing this kind of complexity due to spaghetti code is increasing the degree of modularization. Today, there is no known invention that is better than components for maximizing modularization in the context of physical products such as cars, computers, or factory machinery, where components are special kind of parts that can be composed or combined by employing a process or method known as assembling, and where each component can be separated by employing a process or method known as disassembling. In the context of such physical products, no part can be a component if the part is not conducive to be assembled and disassembled. In the context of software, the term component does not imply a part that can be assembled and disassembled.

In the context of countless physical products (e.g. cars, computers, cell-phones, TVs, ACs, airplanes, office equipment such as printers, machines, or machinery for factory) we use every day, only the kinds of physical parts that can be disassembled and re-assembled are considered components. Any part that cannot be disassembled and re-assembled is not considered a component, in the context of such physical products. Components are a very special kind of part that can be assembled and disassembled. There may be a small portion of parts or components that could be an exception to this general rule. To give an analogy, the class of birds is a very special class of animals having wings that can fly using their wings. There could be a few obvious exceptions to this general rule such as ostrich or penguin, but such species of birds (that cannot fly using their wings) are less than 1% of the total species of birds. In general, any animal not having wings that are conducive for flying is not a bird. Likewise, any larger part that is not conducive for assembling is not a component.

In other words, the basic and striking difference between (i) specific kind of parts that are certainly components and (ii) the other kinds of parts that are certainly not components, in the context of the engineering paradigm for designing and building countless large products we know (such as cars, computers, cell-phones, TVs, ACs, printers, airplanes, machines, and factory machinery, to name a few) is that: Components are the only kind of parts that are composed into the product by a process (or method) known as "assembling". None of the other kinds of parts are either designed or conducive to be "assembled". The ideal form of assembly for a component is making the component easily pluggable. So, it is desirable to invent mechanisms for plugging in modules or components.

Unfortunately, in the context of engineering paradigm for software products, software researchers defined many kinds of software components where each kind of software component is defined as software parts either having a given set of useful properties (e.g. reusable or standardized to be conducive to reusability) or conforming to a so-called component model. No known kind of components for software exist today that are designed (or conducive) to be assembled or plugged in (so none of them can be a component).

The objective of this invention is to increase the degree of modularization by employing innovative tools, processes, and mechanisms, to compose each module by employing a method equivalent or simpler compared to assembly for example. Earlier inventions of the applicant disclosed a special kind of components, but there is a need to bridge the gap that is created between existing kind of software components (or modules) and a special kind of components that are equivalent to physical components (by conforming to the nature and properties uniquely and universally shared by physical components), where this nature and properties are disclosed in the earlier patents U.S. Pat. Nos. 8,392,877, 8,578,329, and 9,058,177 of the applicant of this patent disclosure.

Any large software application comprises of numerous modules (e.g. any kind of parts, APIs, and so-called components), and each module communicates or collaborates with other modules in the application. Today, it is required to manually implement communication code (e.g. by creating communication links such as 1331, 1332, 1351, and 1379 between modules in FIG. 13) for each module to allow or facilitate communication between the module and one or more other modules or parts (or code sections) of the application. Applicant discovered that this kind of communication code (see communication links such as 1331 and 1332 between modules in FIG. 13) is one of the largest contributors to the notorious spaghetti code (that is the largest contributor of complexity and the infamous software crisis).

The infamous software crisis and poor code quality due to error-prone spaghetti code that links thousands of modules and tens (or even hundreds) of thousands of communication links (e.g. 1331, 1332, 1351, and 1379) crisscrossing in each large software is a long-felt unsolved problem. Furthermore, it is often required to redesign most of these communication links, since over 80% of software engineering is modifying existing code. No one else anticipated a solution for the problem of creating, documenting, and managing communication links between various kinds of modules in software applications.

Software professionals know that spaghetti code is a huge problem, but the applicant discovered that the communication links is a major contributor to complexity and spaghetti code. It is desirable to invent tools or products to address this long-felt unsolved problem, by automating various tasks or activities for the creation, documentation, and management of the communication links for example.

BACKGROUND OF THE INVENTION

Dr. Douglas McIlroy's speech at the '1968 NATO Software Engineering Conference' on "Mass-produced Software Components" is widely credited with launching today's 'Software Engineering' research for CBD/CBE (Component-Based Design, Engineering, and Development) for software (or 'CBSE'). Since then, most software engineering research has been primarily focused on reusable components (e.g. API, Libraries, or packages) to increase reuse of code (e.g. provided as pre-built libraries or packages comprising of modules or components). The ultimate dream is to build new/custom applications by assembling pre-built COTS (Commercial Off-The-Shelf) components (e.g. modules or parts) such as Libraries, APIs (Application Programming Interfaces), or Packages. The main focus of the research has been to invent components or modules having desirable properties such that they are non-context-specific, standardized, generic, highly flexible, and configurable, for example (i) to be reusable in diverse kinds of applications and/or (ii) to make the component easy to reuse by being flexible enough to configure for each application.

The primary purpose or essential benefit of reusable parts is 'reuse'. But it is also possible to invent new kinds of parts having useful benefits other than and/or in addition to 'reuse'. In other words, new kinds of parts can be invented which can be used for not only creating a large application but also maintaining the applications at lower cost and complexity. New kind of components can be designed to serve a different but useful purpose by offering novel benefits. So, the new kind of components or modules addresses problems that are not addressed by any other kind of software components/modules known today.

Summary for engineering paradigm to design and build physical products (such as cars, computers, cell-phones, airplanes, TVs, ACs, printers, machines, and factory machinery, to name a few) in brief: Any large product (e.g. FIG. 28a) is partitioned or divided into multiple modules (e.g. FIG. 28b). Each of these modules is designed, created, and tested individually. Once all the modules are created and tested individually, the product is built by employing a process (or method) known as assembly (to compose or combine the modules). In order to compose or combine the modules by employing a method known as assembly, each module must be conducive to be assembled (or plugged in, since plugging in a module is a simpler way of assembling the component).

Each such module that can be assembled (or plugged in) is known as a component. In other words, components are a very specific kind of parts or modules that can be assembled in the context of physical products. It is desirable to invent equivalent engineering paradigm to design and build software products (or applications). This requires inventing mechanisms, tools, and processes to compose multiple modules and build each software product by employing a method that is equivalent to assembling. This also requires inventing modules equivalent to components that can be composed by employing a method (i.e. each module must be designed to be composed by employing the method that is equivalent to assembling).

In the context of countless products we know such as cars, computers, cell-phones, TVs, bikes, ACs, printers, airplanes, medical equipment such as MRI machines or CT-scan, machines, and factory machinery to name a few, the CBD/CBE (Component Based Design and/or Engineering) of each large or complex product is comprised of the following 3 steps: (i) the product is partitioned into self-contained parts known as components, (ii) each component is designed, built, and tested individually, and (iii) the product is built by composing all the components by employing a very simple and elegant method known as assembling, once all the components or modules are built and tested individually. In case of electronic products such as computers or cell-phones, each electronic module is assembled by plugging in the module into a PCB-board such as a motherboard or system-board etc.

Another perspective for Component-Based Design (CBD) and Component-Based Engineering (CBE) in the context of the engineering paradigm for physical products: Physical CBD-products (e.g. automobiles, cell-phones, and computers) are built using various kinds of parts like (i) component-parts such as CPU, DRAM-card, car-engine, gearbox, and CD-player etc., and (ii) ingredient-parts or materials such as silicon, steel, cement, plastic, metals, and alloys, etc., where CBD/CBE products are products that are created by assembling the component-parts. The parts belonging to each of the two kinds have a different set of unique characteristics and primary purposes to serve different benefits. Some parts (e.g. most of the 'ingredient-parts') are ideally suited for 'reuse', while other parts such as components are designed to serve other useful purposes such as superior modularization.

In the context of physical products, component-parts are not a replacement or substitute for ingredient-parts, because each component-part is created by using ingredient-parts (i.e. materials such as silicon, steel, cement, plastic, metals, and alloys). That is, using components/CBD or not using components/CBD might not have any effect on the mass and quantity of the materials used in physical products. For example, there would be no difference in the material used between (i) a small physical product partitioned into three components and (ii) the same product built without any partitioning. Likewise, transforming a few modules in an application into pluggable modules might not reduce the number of lines of code required to implement the application. For example, buildings today are generally not built by assembling components, but it would not reduce the net quantity of material used even if the building can be built by building each of its components individually and constructing the building by assembling the components. The same amount of material is required in building all the components for the building.

Total cost and complexity of a product comprises of (i) cost of all the parts used to build the product and (ii) cost and complexity of composing all the parts to build the product. The purpose of pluggable modules (or components) is to increase the degree of modularization (or loose coupling) and reducing cost of composition. For example, every physical product (e.g. cars, computers, machinery, and airplanes) is modularized by partitioning into component-parts, where each basic component-part is built from ingredient-parts. Every large physical product comprises of many kinds of parts, where certain kinds of parts are composed, and other kinds of parts are assembled or plugged in to build the product. Assembling a part is possibly the simplest form of composing the part, and possibly the simplest form of assembling each part is to plug in the part.

Although desirable it is not necessary for physical component-parts to be reusable, but some of the benefits of component-parts include, for example, their ease of replacement at any time in the future and (ii) the possibility to disassemble (or unplug) even a large component (e.g. jet-engine) having many sub-components as a unit to fix any problems and then reassemble the large component (after testing it individually outside of the product). In other words, physical components are offering benefits (other than reuse) such as the ability for each component to be easily assembled to build the CBE-product. Also, components can be easily disassembled as a unit for maintenance (e.g. redesigning or fixing any shortcomings) or for replacement by a better component. This ability to easily replace a part (e.g. CPU, DRAM, or Hard Drive) is useful in extending the life of a product at lower cost.

For example, if a one-of-a-kind experimental spacecraft or jet fighter is built by assembling custom-designed components, it is likely that most of the large core components and coupling interfaces of the components are custom-designed. Even if the large core components are not reusable, each component is assembled such that they have simple, predefined, loosely coupled, custom interfaces, so that the component can be replaceable (i.e. easy to disassemble and reassemble as a unit). This property (i.e. ability to be easily disassembled and reassembled) in physical components is desirable, because each component can be disassembled for redesign and testing outside of the product at any time in the future (e.g. to repair or to improve).

One of the ideal ways of assembling physical components is to be able to plug in (and unplug) each of the components, into sockets of a PCB (Printed Circuit Board) for example. Case in point, components of computers such as CPU, DRAM, Power Supply, CD-Player, Network Card, and Hard Disk are plugged into appropriate (or respective) sockets provided in the motherboard or system-board of the computer. Hence, it is desirable to make software modules (e.g. components or parts) having virtual interfaces of plugs/pins that are pluggable by inventing mechanisms and tools (e.g. software motherboard having virtual sockets) that are the virtual equivalent to computer motherboards and their physical sockets.

The earlier patents of the applicant U.S. Pat. Nos. 7,827,527 and 7,840,937 disclosed methods for creating reusable GUI classes (for a GUI API) which are capable of encapsulating large GUI components (that is using many reusable GUI classes to include GUI subcomponents) in a replaceable class. It is possible to invent a new kind of software components which are not necessarily 'reusable' but can serve other useful purposes or offer benefits that are not offered by any other known kind of software components. One of the essential benefits of physical component-parts is that they either directly increase or indirectly allow the increase of the degree of these useful factors: (i) division-of-labor, (ii) specialization, and (iii) mechanization (i.e. automation in case of software development). These factors are hereafter referred to as the 3-CBE-factors.

The patents of the applicant U.S. Pat. Nos. 8,527,943, 8,392,877, 8,578,329, and 9,058,177 disclosed methods for partitioning (or identifying), creating, and using Custom Designed RSCCs (Replaceable Self-Contained Components) for software applications, where RSCCs are equivalent to functional components in physical products such as cars, computers, airplanes, ACs, printers, machines, and factory machinery. That is, each RSCC for software shares the unique characteristics (e.g. being Replaceable and Self-Contained) universally shared by functional components for physical products. Those patents of the applicant hence provide the background and are incorporated as references here in this disclosure. While the components for physical products are constrained by laws of nature, the applicant discovered that software offers a lot more flexibility for inventing pluggable modules that fall between ingredient-parts (that are perfect for reuse) and component-parts (that can be assembled and disassembled). Hence, it is not necessary for the modules disclosed in this application to be self-contained.

The development process of every software application (or software product) involves various activities or tasks such as (i) partitioning application into various modules, (ii) designing and developing each of these modules, and (iii) including each of these custom-developed or reusable modules in the application by implementing necessary communication code for the module (to allow collaboration between the module and other parts of the application). The earlier patents of the applicant focused on modularization of each software application; for example, by disclosing methods for identifying self-contained modules having minimum number of communication dependencies and encapsulating each such module in a replaceable container. The communication code for each module can be minimized by minimizing the coupling dependencies of the module.

This application discloses a completely different activity, namely to create and manage communication code between various kinds of modules or parts in the application. The development process of every software application (or software product) comprises of steps such as including (or adding) each of the modules in the software application and creating communication code for each module to facilitate necessary collaboration or communication with other modules or parts in that application. The maintenance of each software application (or software product) comprises of steps to change or redesign one or more modules in the software application and maintain the communication code for each module to accommodate changes made to various modules or other parts of the application. It is widely accepted that 80% of software engineering is activities such as maintenance, for example to meet evolving needs, technologies, or experience based on use-cases etc.

The useful aspects for increasing productivity when designing, engineering, and developing or building each software application include (i) Modularization: Identifying better cohesive modules of optimal size having simpler and minimal number of dependencies, and (ii) Automation: Automating the creation and management (e.g. during maintenance) of the dependencies (i.e. communication code necessary to allow collaboration) between each module and other modules or parts in the application. The earlier patents of the applicant focused on identifying better cohesive modules in every application, where the modules are self-contained to minimize dependencies. Such better modularization of an application reduces and/or simplifies communication dependencies (i.e. communication code or links that are necessary to allow collaboration) between the modules in the application.

However, applications often use non self-contained modules. For example, most reusable modules (e.g. from third party sources) are likely neither self-contained nor cohesive. As another example, applications may create and use custom modules, which are neither self-contained nor cohesive. This patent application focuses on automating various activities or tasks necessary for the creation, documentation, tracking, and management of communication dependencies (or dependencies or links in short) between the modules in the application, where the dependencies (e.g. necessary communication code) allow collaboration between each module and other parts or modules in the application. The cost and complexity of creation and management of dependencies in an application can be reduced by automating various activities or tasks necessary for creation and management of communication dependencies.

According to some software research papers, up to 80% of software engineering effort is on dealing with maintaining or changing existing software; for example, to build a better/newer version or to support new requirements based on changing business needs or government regulations. This is especially true in the case of successful software and its need to be maintained or updated for many years of use. Hence, many software experts observe that large software components (or modules) that can be easily adaptable to changing or evolving requirements (e.g. business needs) are as useful as reusable components/modules. So, it is desirable to invent a new kind of components/modules and mechanisms which can be easily adaptable by redesigning its source code to satisfy evolving needs of its application.

Software engineering and design of software applications can benefit from experiences gained in the mature field or paradigm of industrial engineering for physical products. For example, many automobile designers are concerned with giving easy service-access to the parts that need frequent servicing or maintenance, to minimize the overall cost of ownership and to maximize satisfaction. For example, in the case of automobiles, it is desirable to easily replace parts that are prone to wear-and-tear (e.g. brake-pads or oil-filter). Likewise, in case of computers, parts (e.g. DRAM, CPU, or Hard Drive etc.) that can be upgraded to extend the usefulness or life of the computer. If a component requires little or no effort to detach (e.g. by a method known as disassembly or unplugging) or re-attach (or reassembly), such component is said to have the highest degree of service-access. It is desirable to have a high degree of 'service access' (or 'replaceability') to each part that requires frequent maintenance or is likely to be upgraded (e.g. DRAM, Hard Drive, CD-player, or CPU) to satisfy the owner's evolving and expanding needs (e.g. for new features or functionality).

The components having a high degree of autonomy (e.g. that can be unplugged and replugged in) offer certain benefits which are proven to be very useful in design, development, and long-term maintenance from the experiences of industrial engineering. For example, by reducing total cost of ownership or higher return on investment by extending life. The benefits are: Increasing the degree of autonomy of a part increases (or indirectly allows the increase of) the degree of (i) division-of-labor, (ii) specialization, and (iii) mechanization or automation. Today, every software application comprises of many kinds of modules or parts. It is required to manually implement communication code for all these modules to allow communication between each module and other modules or parts in the application. It is desirable to automate various tasks and activities of creating and managing this communication code.

When designing a new software application, most users do not know or cannot articulate what they really want (particularly with certainty), but users (i.e. we all as human beings) are good at articulating what they like and what they do not like (when a solution is put into their hands and when they start using it). Also, certain professional users (e.g. thought leaders) are good at suggesting new features or improvements to the application they have been using. Also, engineering of any new product is constant improvements that often involve little-by-little refinement to overcome shortcomings.

The famous historian of engineering, Henry Petroski, suggested in his famous 1992 book "The Evolution of Useful Things" that: (1) Continual refinement is the usual rule (e.g. to get closer and closer to perfection), and (2) Engineers constantly find shortcomings in their designs and fix them little by little (e.g. to get closer and closer to perfection). It is desirable to minimize the cost of changing (e.g. redesigning) each component, part, or module in large software applications so that the software can be enhanced easily for to get closer and closer to perfection. Minimizing the cost of fixing mistakes or shortcomings stimulates experimentation and innovation. These kinds of changes often involve changing communication code between modules.

For example, every large physical product (e.g. cars, computers, and cellphones) is evolved by evolving each of its components individually, where a component is a special kind of part that can be assembled and disassembled. Usually, a part (e.g. steel, cement, alloys, paint, and metals used to make components) that cannot be assembled and disassembled is not referred to as a component in the context of such large physical products (e.g. cars, airplanes, machines, machinery, computers etc.). In this context, modules (or components) being pluggable reduces the complexity, cost, and time required to redesign each of these modules (or components).

Hence, it is desirable to build every large software application by using software modules that can be unplugged (e.g. to redesign each module individually) and plugged in after testing the module individually outside of the product. Components having a high degree of autonomy are also very useful for building and maintaining software applications, since each of the (sub)components can be refined more autonomously to satisfy evolving needs, new technologies, and know-how (e.g. expertise and wisdom gained during/from creating previous versions and use cases in the field by end users).

Today's state-of-the-art design of every large physical product (e.g. car or PC) is a result of many decades of evolution by improving each of its components 'little by little' autonomously. For example, designers of most physical components (e.g. car-engine, Hard Drive, CPU, or DRAM) have been refining them little by little for decades, autonomously outside of or away from their respective physical products. The cost and complexity of redesigning and testing a module (or any part) can be reduced if the module can be transformed into a pluggable module (e.g. to reduce the cost and complexity of coupling interfaces needed for disassembling and reassembling purposes). To that effect, this invention discloses mechanisms, methods, and enabling tools for transforming modules into pluggable modules, according to an embodiment.

In brief, modular programming of a software application includes using many kinds of modules such as reusable modules and custom-built modules to build a software application. For example, many reusable modules from third-party sources could be identified by the designer of the application for use in building the application. Many applications require implementing tens of thousands to hundreds of thousands of lines of custom code for each application, even after maximizing reuse in the application. Increasing the reuse (e.g. by finding more and more reusable modules from various sources or providers) reduces the custom code which must be implemented to build the application. It is also desirable to increase modularization by transforming modules into pluggable modules by employing novel mechanisms, processes, and tools.

The designers of an application partition the custom software application code by identifying multiple modules and other parts, according to an embodiment. Where each module is custom engineered (e.g. designed, developed, and tested) individually to satisfy the unique needs of the application, according to an embodiment. Many custom modules are built by using reusable modules and parts. Once sufficient number of modules are custom designed, developed, and tested individually, development steps or processes of applications today include manually composing each of these modules into the applications (e.g. by implementing communication code for each module manually).

Today, the steps of manually composing each module include manually implementing many lines of error-prone communication code to allow collaboration between the module and other parts or modules in the application, where the communication code results in hard-to-maintain or error-prone tight coupling (e.g. dependencies or spaghetti code) between each module and other parts of the application. This communication code implemented for each module makes it harder to redesign the module, and so transforming the modules in an application into pluggable modules reduces the cost and complexity of each of the modules.

It is desirable to make each module loosely coupled or pluggable by automating various tasks or activities of not only creation but also maintenance (or management) and also tracking all of this communication code (essential to allow collaboration between each module and other parts of the application), in order to avoid communication code that creates error-prone dependencies for each module and tight couplings (e.g. hard-to-track dependencies or spaghetti code) in the code of the application.

A module (broadly defined as any kind of component, object, or other kind of part from library/APIs) included in an application is said to be an ideal pluggable module if the module is added to the application without manually implementing any communication code in the code for the application (by employing mechanisms and tools to allow communication between the module and other modules and parts in the application), according to an embodiment. According to another embodiment, specific tools, protocols, methods, and mechanisms are employed to automate various tasks of (a) creating and including the communication code in the code of the application and (b) managing or maintaining the communication code and interfaces of the modules.

The Wikipedia page for software architecture says: "Software architecture refers to the fundamental structures of a software system and the discipline of creating such structures and systems. Each structure comprises software elements, relations among them, and properties of both elements and relations. The architecture of a software system is a metaphor, analogous to the architecture of a building. Software architecture is about making fundamental structural choices that are costly to change once implemented." However, every large software application (or system) requires frequent changes (or redesigns); for example, to leverage evolving new technologies and to satisfy changing needs of the users, to name a few.

The existing software engineering paradigm uses a metaphor, analogous to Civil Engineering paradigm for the design and construction of a building (using reusable parts). The patent disclosures (by the applicant) use engineering paradigms for designing and building large physical products (e.g. cars, airplanes, computers, machinery, and equipment) as a metaphor or analogy, where these engineering paradigms design and build every physical product by "assembling" multiple components (or modules) that can be designed, built, and tested individually. Any module that can be disassembled and reassembled can be redesigned individually to make changes to the software system (or application).

SUMMARY OF THE INVENTION

Today, there exist three major mature engineering paradigms, which are: (1) Civil Engineering paradigm for designing and constructing structures such as buildings, dams, and large bridges etc., which uses reusable parts such as cement, steel, wood and mechanical parts for plumbing, doors etc. (2) Mechanical Engineering paradigm for designing and building products such as cars, locomotives, factory equipment, airplanes etc., which partitions every product into components to design and build each component individually and the product is built by assembling all the components, once all the mechanical components are built and tested individually. (3) Electronic or Computing Engineering paradigm for designing and building products such as computers, cell phones, LED-TVs etc., which partitions every product into electronic components to design and build each component individually and the product is built by plugging in the electronic components into a motherboard (e.g. a PCB—Printed Circuit Board), once all the components are built and tested individually.

About 80% of Software Engineering is changing existing software, for example by redesigning each of the modules or components already created to build each software system. Any product built by employing civil engineering paradigm is hard to redesign, compared to a product built by employing electronic engineering for example. Existing software engineering paradigm is close to the civil engineering paradigm (as per Wikipedia page for "Software architecture" at the URL: https://en.wikipedia.org/wiki/Software_architecture), which uses reusable parts (but does not use the kind of parts that can be assembled, where such kind of parts are known as components). The electronic engineering paradigm is one of the simplest model or paradigms for replacing or redesigning components (or modules).

Mechanical or aerospace engineering paradigm builds each product by assembling components, while computer or electronics engineering paradigm plugs in components to build each product. The electronic components communicate or collaborate with each other by exchanging data in the form of electric signals, where the electronic components are comparable (or analogous) to software components (or modules), since software components (or modules) communicate or collaborate with each other by exchanging data by calling each other's methods or functions. Inventing a new engineering paradigm for software that is equivalent (or analogous) to the electronic engineering paradigm requires inventing a software motherboard that is equivalent (or analogous) to the electronic system board or motherboard (i.e. PCB—Printed Circuit Board) to facilitate collaboration between components (or modules).

Applicant's disclosures for earlier patents (U.S. Pat. Nos. 8,392,877, 8,578,329, and 9,058,177) disclosed specific kind of components referred to as SCC (Self-Contained Components) and RSCC (Replaceable Self-Contained Components), where each RSCC/SCC is functionally equivalent and/or analogous to mechanical, electronic, or electro-mechanical component. Those inventions disclose methods for positively identifying SCC to partition every software system into multiple RSCCs. It is desirable to make other kinds of modules (that might not be RSCC/SCC) such as modules that are being used today in software to be pluggable, by inventing necessary tools, methods, and mechanisms. This application discloses inventions for software motherboard for plugging in software components (or modules) to build an application, where the software motherboard provides functionality equivalent (or analogous) to electronic motherboard/PCB (e.g. to facilitate communication and/or collaboration between modules or components in an application).

Any large software application likely comprises of multiple modules (e.g. components, objects, and other kinds of parts that include but are not limited to APIs, Libraries, or Packages), where some of the modules are custom designed, while other modules are reusable modules from third party sources such as component vendors (e.g. COTS—Commercial Off The Shelf) or open-source community etc. For example, consider an application having many modules, where each of these modules collaborates or communicates with one or more other modules or parts of the application. If a module needs to communicate or collaborate with one or more other modules to perform various tasks, the module must connect and communicate with appropriate modules or parts and interact with the modules by requesting necessary services (e.g. by calling the correct interface function or method implemented in each of the other modules) to fulfill each of its tasks. Today, this task of one module in an application to connect and communicate with another module in the application is facilitated by manually including (i.e. implementing) communication code in the code for the application.

Today, in prior art, such communication or collaboration between any module and one or more other parts or modules of the application is facilitated by manually implementing code (henceforth referred to as "communication code" or "communication link"). In other words, the process of adding each module to an application comprises of two parts (i) implementing code to add or include the module in the code for the application, and (ii) manually implementing necessary communication code (in the code of the application) to facilitate necessary communication and collaboration between this module and other parts in the application. Hence, to effectively remove (or replace) the module also requires removing (or changing) these two kinds or sections of code (that includes communication code) implemented in the code for the application.

The implementation of communication code (manually implemented to facilitate collaboration between each of the modules and other parts of the application) is often error-prone and it is difficult to maintain such communication dependencies between one module and other parts of the application. Hence, it is desirable to minimize the cost and complexity of adding each module to an application by minimizing communication code or even eliminating the need to manually implement communication code. This patent application discloses tools, processes, and mechanisms to eliminate the need for manual implementation of communication code. It is desirable to automate as many error-prone tasks as possible in creating and maintaining such communication code and inter-dependencies created by this communication code to allow collaboration between the modules or parts in the application.

One of the preferred embodiments employs a reusable global module (e.g. an Object in the case of an Object Oriented Program) named ECI/BCI (Exchange for Coupling or Communications Interfaces and/or Broker for Communication Interfaces) that adapts functionality, similar (with necessary alterations) to SRO/DoS (Service Registration Object)/(Directory of Services) in SOA (Service Oriented Architecture), and also functions like a telecommunication switch and directory of services. In case of SOA, each module that provides a service registers its service (e.g. reference of a function or method that can be called to get the service) along with a unique key to look up and find the service with SRO/DoS. Likewise, any other module that needs the service uses the look-up key to find the required service from the SRO/DoS and requests or accesses the service.

This mechanism has three parts (i) a global module (e.g. ECI/BCI or DoS) that functions like a telecom switch (and directory of services) for each module to connect and collaborate with other modules or parts in the application, (ii) each module implements parts of the communication code to register each of its listener-interfaces (or service-provider interfaces) with the ECI/BCI (if the module provides one or more services for other parts in the application) and (iii) each module implements parts of the communication code to find the interface for services (or listener-interface) it requires from the ECI/BCI (if the module requires to use one or more services, which are provided by other parts in the application). This mechanism eliminates the need to implement communication code for such components that use ECI/BCI (which is a modified implementation of SRO/DoS) mechanism to communicate with each other.

In one of the preferred embodiments, the ECI/BCI maintains (i) a set of available listener-interfaces registered (in a list or hash-table to search) by each of the modules that implement listener-interfaces (along with relevant or necessary information for each listener-interface provided or available) and (ii) another set (in a list or hash-table) of caller-interfaces requested by each of the modules that looks up the required listener-interfaces and uses the listener-interfaces (along with relevant or necessary information for each caller-interface). To help the ECI/BCI build these lists, (i) each module in the application that implements one or more listener-interfaces registers each of its listener-interfaces (along with relevant or necessary information for each listener-interface provided and available) and (ii) each module in the application that requires one or more listener-interfaces registers each of its caller-interfaces to call the required listener-interfaces (by providing additional relevant or necessary information for each required caller-interface).

The ECI/BCI creates (i) a first set of nodes comprising all the available listener-interfaces registered by modules that implement one or more services (or necessary functionality), and (ii) a second set of nodes implements code for caller-interfaces registered by modules that require one or more services (or necessary functionality). Each node in the first set comprises information such as a look-up key and reference to a listener-interface function. Using these nodes in the sets along with the information provided for each of the required and available communication interfaces (e.g. for services or functionality), it is possible to perform various tasks such as error checking, detecting unused listener-interfaces from the list (or first set) of available services, and detecting unavailable (or missing) services that are required from the list (or second set) of caller-interfaces.

In another preferred embodiment, every module in the application (i) registers the signature or format for each of its services (or listener-interfaces) provided by the module along with additional information such as description of the service provider or listener-interface to be used for requesting the service and (ii) registers the signature or format for each caller-interface for services required by the module with additional information such as description of the service-consumer interface that is used to request the service. The term "service interface" or "service-provider interface" is used to also include "listener-interface". Likewise, the term "interface for requesting service" is used to also include "caller-interface". Henceforth, "service interface" or "service-provider interface" imply "listener-interface" also. Likewise, the term "interface for requesting service" implies "caller-interface" also.

For example, if a service-provider module provides a service function (or method) to request the service, the description for the listener-interface to request or access the service includes the number of parameters required to be passed to call the service function (or method) and the type of each of the parameters. This kind of information for signature of the interface can be used to detect any broken or incompatible communication link (or interface) between any two modules. For example, module-A provides a service function-A that requires passing 5 parameters, where parameters 1 and 2 are type Integers, parameters 3 and 4 are type Floats, and parameter 5 is type String. If a dozen other modules or parts in the application require the service provided by function-A, each must implement code to call the service function-A to access the service by passing the 5 parameters of their respective types.

If module-A and service provided by function-A is needs to be redesigned to satisfy an evolving need in the future, it might require adding or inserting another parameter of type String at position 6. It is desirable to automate error-prone tasks such as finding each of the dozen modules or parts in the application calling this service function-A and modifying the service consumer or caller interfaces implemented to call the service function in each module accordingly by passing 6 parameters. It is desirable to automate such tasks to maintain the communication link or dependencies between as many modules as possible by providing the required information for each communication link (or interface), such as for each module to register each of its (provided or required) services for example.

It is desirable to make the global ECI/BCI intelligent (e.g. designed to be more intelligent) to perform various tasks such as making various checks to detect possible software bugs, like incompatible interfaces. An example for incompatible interfaces between two modules is when parameters passed while requesting a service by calling the service function (i.e. in the code of the module that requires the service) do not match the parameters required by the service function (implemented in the module that provides the service). This kind of error checking and detecting is necessary only a few times during development (e.g. whenever the code of an application is being redesigned or changed) and testing phases. Such error checking is not necessary once the code change is made and testing of an application is completed, and no more changes are required to release the application version. If there are changes to the code, there is no possibility of injecting such errors once testing is completed and all the communication bugs are fixed. In one of the preferred embodiments, a flag is set in the ECI/BCI (a variant of SRO/DoS mechanism) to turn off such time-consuming checks to detect possible errors (or software bugs).

Today, communication code is manually implemented to allow collaboration between any two modules or parts in an application. For example, assume that module-Z in an application requires calling function-X of module-X to request service-X and requires calling another function-Y of module-Y to request service-Y. Today, this kind of communication code is manually implemented in the code of the application to facilitate such collaboration between module-Z and module-X to access service-X, and between module-Z and module-Y to access service-Y. This kind of communication code injects dependencies that are hard to trace (or document) between the modules or parts collaborating or communicating with each other. It is desirable to automate various tasks and activities performed to create and manage such communication code, interfaces, and dependencies between various modules in an application.

In another preferred embodiment, the extended ECI/BCI (a variant of SRO/DoS mechanism) generates necessary communication code in one or more files, where the communication code (or instructions) can allow collaboration or interaction between one module and other parts of the application. These files (that comprise of the generated communication code) can be made part of the application code and compiled with other files containing application code for the module. For example, module-Z requires services service-X of module-X and service-Y of module-Y, and then upon request, the ECI/BCI generates communication code that can allow collaboration between module-Z and module-X to request service-X, as well as communication code to allow collaboration between module-Z and module-Y to request service-Y. This communication code (i.e. created by the ECI/BCI) is included properly to make it part of the code of the application, according to an embodiment.

In an alternative embodiment, the code for every module comprises of information for each required service and each service provided. That is, if a module provides one or more services, the code of the module comprises of detailed information for each provided service in a clearly delimited or marked block of code (or instructions), according to the embodiment. Likewise, if a module requires one or more services, the code of the module comprises of detailed information (e.g. for signature or format) for each required service in a clearly delimited or marked block of code (or instructions), according to the embodiment.

In an alternative embodiment, a system or mechanism (referred to by a given name Arjun) is implemented within the compiler (used for compiling the application code) or preprocessor (that is designed to read parts of the source code of the application before or during compilation of the source code) to get information directly or indirectly for the services (listener-interfaces and caller-interfaces). The system or mechanism (i.e. referred to by a given name Arjun) uses the information included in the source code (e.g. using pre-defined protocol and delimiters to make few instructions or information) about the services to create and/or include communication instructions (e.g. machine code) within the compiled code for the application, according to the embodiment. According to another embodiment, the preprocessor mechanism (i.e. referred to by a given name Arjun) uses the information about the services (listener-interfaces and caller-interfaces) to generate communication code (e.g. source code), where the communication code can facilitate communication between the modules when properly included in the source code of the application and compiled to build the executable for the application.

The preprocessor mechanism (i.e. that is named Arjun) can be implemented as part of the compiler for programming languages such as Java, C#, or C/C++ etc. The software application source code for each module/component comprises of necessary information for (i) each of the services required by this module from other modules or parts, and (ii) each of the services provided by this module for other modules or parts. In this kind of alternative embodiment, the compiler or preprocessor that may be implemented as part of the compiler uses this information from each of the modules to create two lists for two sets: (1) a list of all the available services and (2) a list of all the required services, and uses the information in the two lists to create (or generate) and include necessary communication code or instructions, which can facilitate collaboration between the modules in the software application.

In a brief overview of an embodiment, (1) if a module in an application provides one or more services for other modules/parts in the application, said module comprises instructions or code to publish each of its services along with relevant or necessary information (e.g. including information about communication interface and look-up keys), and (2) if a module in an application requires one or more services provided by other modules in the application, it comprises information, instructions, or code to look up and subscribe to each of the required services (e.g. including implementation of code for caller interface). A mechanism and/or means is employed to gather the information from each module to create two sets, for example as two lists: (1) a list of all the available services from all such modules and (2) a list of all the required services by all such modules, and using the information in the lists to either (1) allow collaboration between the modules or (2) create communication code or instructions, which can be included in the code of the application, to allow collaboration between the modules.

The main difference from prior art may be summarized as: Today, if a module is included in an application, this kind of communication code is manually implemented in the code of the application (i.e. to allow communication between the module and other parts). In an embodiment of this invention, this kind of communication code is generated by employing certain system or mechanisms and processes (e.g. referred to by a given name Arjun) for example, after making all possible checks to detect as many kinds of errors as possible (e.g. based on the available information about each interface). In another embodiment, Arjun employs various processes or tools to generate efficient or optimal communication code to optimize collaboration between the modules.

The applicant obtained patents U.S. Pat. Nos. 8,392,877, 8,578,329, and 9,058,177 for creating and using highly cohesive self-contained modules referred to as RSCC (Replaceable Self-Contained Components), where each RSCC is designed to minimize communication code required for the RSCC to collaborate or communicate with other parts in the application. These earlier granted patents are for a specific kind of modularization that uses only RSCCs.

On the other hand, the focus of the present application is inventing tools and mechanisms to automate various activities and tasks associated with creating and maintaining communication code between all kinds of parts or components, not just limited to RSCC. The instant application claims various tools and mechanisms to create and maintain communication code. The present invention is focused on automating various aspects and/or activities related to creating and managing communication code to allow communication between interfaces, which allows for collaboration between various parts (that comprising the interfaces) in the application.

Any large software application comprises of numerous modules (e.g. any kind of parts, APIs, code-sections, and so-called components), and each module communicates or collaborates with one or more other modules in the application. Today, it is required to manually implement communication code (e.g. by creating communication links such as 1331, 1332, 1351, and 1379 between modules in FIG. 13 of present application) for each module to allow or facilitate communication between the module and one or more other modules or parts (or code sections) of the application. Applicant realized that this kind of manual communication code is one of the largest contributors to the notorious spaghetti code, which is the largest contributor to complexity and the infamous software crisis.

The "NATO Software Engineering Conferences" in 1968 and 1969 coined the term "Software Crisis". Many researchers that struggled to alleviate the "Software Crisis" agreed and/or reached the consensus that there is "No Silver Bullet". The infamous software crisis and poor quality due to error prone spaghetti code that links thousands of modules and tens (or even hundreds) of thousands of communication links (e.g. 1331, 1332, 1351, and 1379 in FIG. 13) crisscrossing in each large software is long-felt unsolved problem. Furthermore, it is often required to redesign most of these communication links, since over 80% of software engineering is changing already existing code.

It is desirable to invent tools, mechanisms, or products to address this long-felt unsolved problem by, for example, automating various tasks or activities associated with the creation, documentation, and management of the communication or coupling links. For example, whenever one or more modules are redesigned, it is often required to update each of the coupling links for the modules. Software professionals know that spaghetti code is a huge problem, but Applicant discovered that the communication links are a major contributor to complexity and spaghetti code.

Various kinds of SOA (Service Oriented Architecture) that employ various kinds of SRO (Service Registration Object) and/or DoS (Directory of Services) mechanisms have been in use in many forms in various circumstances or conditions for decades to facilitate communication between a kind of components in a distributed environment, where each component is an independent executable often running on different computing devices. The distributed components communicate with each other over a network using the Internet or other such network protocols. Earlier patents of the Applicant used an implementation that emulates the SOA/DoS to facilitate communication between a very specific kind of novel components referred to as RSCC, where all the RSCC are part of a single executable and communicate with each other by calling functions (or methods) implemented in respective objects of the RSCCs.

According to one of the embodiments of this application, the code for each module in the application includes information about each of its communication or coupling interface. The information for each interface comprises of a look-up key (i.e. a combination of IDs or keys). The look-up key for a coupling interface of a first module is used to find another interface in a second module (based on the look-up key for the interfaces included in the code for the second module) and creates the necessary coupling for the module to collaborate with a second module.

The novel step in the application includes extracting information for interfaces (or services) from the source code of the modules in an application (by a pre-processor before compile-time, or by a compiler/pre-processor during compile-time) and using the information about the interfaces to automatically generate parts of the communication code (such as code in 1150 of FIG. 11 in the disclosure), which can allow collaboration between various modules or parts. In this method, the application does not use SRO/DoS at run-time, but only uses communication code that was generated during compile-time (or generated by pre-compiler) which employs a mechanism comprising of SRO/DoS.

The objective of the instant application is to automate various error-prone activities of creating and managing the coupling or communication code to allow collaboration between multiple modules of each application by automatically generating the communication code and using the communication code to allow collaboration between the modules. For example, in the instant application, a mechanism comprising of SRO/DoS is used to generate parts of the communication code (e.g. 1150 of FIG. 11 represents the generated code). This mechanism to automatically create communication code also comprises of intelligence to find software bugs due to incompatible interfaces or wrong parameters, etc. in addition to generating the code to plug security vulnerabilities in the communication code.

Another method to allow collaboration between modules in any application requires implementing code to register information for each communication interface of each module with ECI/BCI (that is a specific kind of implementation of SRO/DoS). ECI/BCI facilitates collaboration between modules by connecting any two modules that need to communicate or collaborate with each other. The facilitation of communication between any two modules (that need to collaborate with each other) requires connecting the interfaces implemented in each of the two modules with each other, by designating one interface as a listener interface and the other interface as a caller interface. This designation of listener interface is often made at the time of the design or implementation of the modules for the application. But, in some cases, the ECI/BCI can be designed to base this designation of listener interface on the information provided for each interface and on the context at run-time of the ECI/BCI.

The desired outcome for engineering research is producing useful solutions for effectively addressing each target problem by creating inventions or making things work, by combining various parts or things to solve the targeted problem for example. It is submitted that modularization and communication-links are two of the largest problems in software engineering. Each such large engineering invention requires years of work to acquire not only first-hand experience but also new knowledge and insights. An invention requires a practical and/or pragmatic solution if a solution is desirable for a target problem. The target problem for the applicant's earlier granted patents was modularization of each software application, which is mainly methodology. The target problem for the current invention is to automate various tasks and activities to create, track, document, and manage communication links between various kinds of modules in each software application, which mainly requires implementing tools such as BCI/ECI.

The applicant is the first and only researcher in the world trying to alleviate the notorious spaghetti code (that is root cause for the infamous software crisis) by making a series of inventions, such as inventing real software components (that are equivalent to physical components) to achieve real CBD/CBE (Component-Based Design and Engineering) paradigm in Software Engineering that is equivalent to the CBD/CBE for engineering paradigms such as Aerospace, Mechanical, and Electronic Engineering disciplines by acquiring scientific knowledge comprising of facts, evidence, theories, and concepts to understand realities such as the essential nature and properties of physical components and the anatomy of CBD/CBE.

References that provide substantial information about the new paradigm being created by the applicant are provided along with the application. Applicant provides information about heretical facts in SubAppendix-C1 in pages 38 and 39 of Appendix-C as samples for unknown facts of the applicant's new paradigm, which are in clear contradiction to the existing definitions for software components and CBD/CBE for software. Valid scientific knowledge and facts are essential for engineering research, since each technological invention is often a tangible form and implementation of scientific knowledge.

In summary, each module in an application (i) implements parts of the communication code to connect with the ECI/BCI (a modified SRO/DoS) to register each of its services with the ECI/BCI and/or (ii) implements parts of the communication code to connect with the ECI/BCI to look up or find each service it requires. In an embodiment, the ECI/BCI uses this kind of information provided (for services by the modules) to create and manage dependencies or communication interfaces between the modules, where these communication interfaces between modules are essential to facilitate communication and/or collaboration between the modules. This disclosure uses pseudo-code to illustrate general steps such as (i) registering each service with the ECI/BCI, (ii) finding or requesting each service with the ECI/BCI, or (iii) creating communication code or instructions (e.g. by the ECI/BCI or Arjun/Preprocessor) to allow communication between any two modules. The precise implementation of these mechanisms and methods (or tools) vary from one language to the other such as Java, C#, VB, JavaScript, Python, and C/C++ etc.

Therefore, it is desirable to invent methods, tools, and mechanisms to create and manage communication code between various modules and parts in an application, to not only reduce the development complexity/cost of the communication code, for example, but also maintain the communication code more efficiently and effectively by automating many tasks and activities. Also, various mechanisms and tools may be used to create obvious variations or different versions for certain contexts to increase certain kinds of benefits (e.g. based on context, business domain knowledge, and specific needs) or to satisfy certain individual preferences.

Additional features and advantages of the invention will be apparent by reading the following detailed description of the invention and the accompanying drawings.

BRIEF DESCRIPTION OF THE DRAWINGS

Various embodiments are described herein with reference to the drawings, wherein:

FIG. 6*a* shows including 2 modules and communication code for coupling the modules for collaborating with each other and FIG. 6*b* shows a simple flow chart for including two modules in a application, according to an embodiment;

FIG. 7 illustrates a communication link (or communication code) between two modules within a software application, according to one embodiment;

FIG. 9 shows pseudo-code implementation for two functions in a module where (i) the pseudo-code of first function illustrates registration of all the services of the module and (ii) the pseudo-code of second illustrates looking up of the reference of functions to call for required services of the module, according to an embodiment;

FIG. 15 shows pseudo-code for assembling three components (or modules) such as ATC (Air Traffic Control System) for a city, monitoring of Ambulances of ER (Emergency Response) for a city, and a map for the city, according to one embodiment;

FIG. 18 shows pseudo-code for a wrapper class for a reusable legacy class or stub for a remote component, according to one embodiment;

FIG. 23 show sample code for implementing an interface function for getting a required service, according to one embodiment;

FIG. 26 shows two code blocks, where the first code block 2610 comprises pseudo-code listing for publishing a service by a module that provides the service and the second code block 2620 comprises pseudo-code listing for subscribing a service by module that requires the service, according to an embodiment;

FIG. 28b shows another product that is partitioned into pluggable modules, according to an embodiment;

FIG. 33 shows an application comprising of multiple interfaces, code and information to publish each listener interface, code and information to publish each caller interface (or service), and a mechanism to use the interface information to automate the task of creating or generating communication code that can facilitate collaboration between a pair of symbiotic or complementary interfaces (e.g. a listener interface and a caller interface), according to an embodiment;

Figure 1:
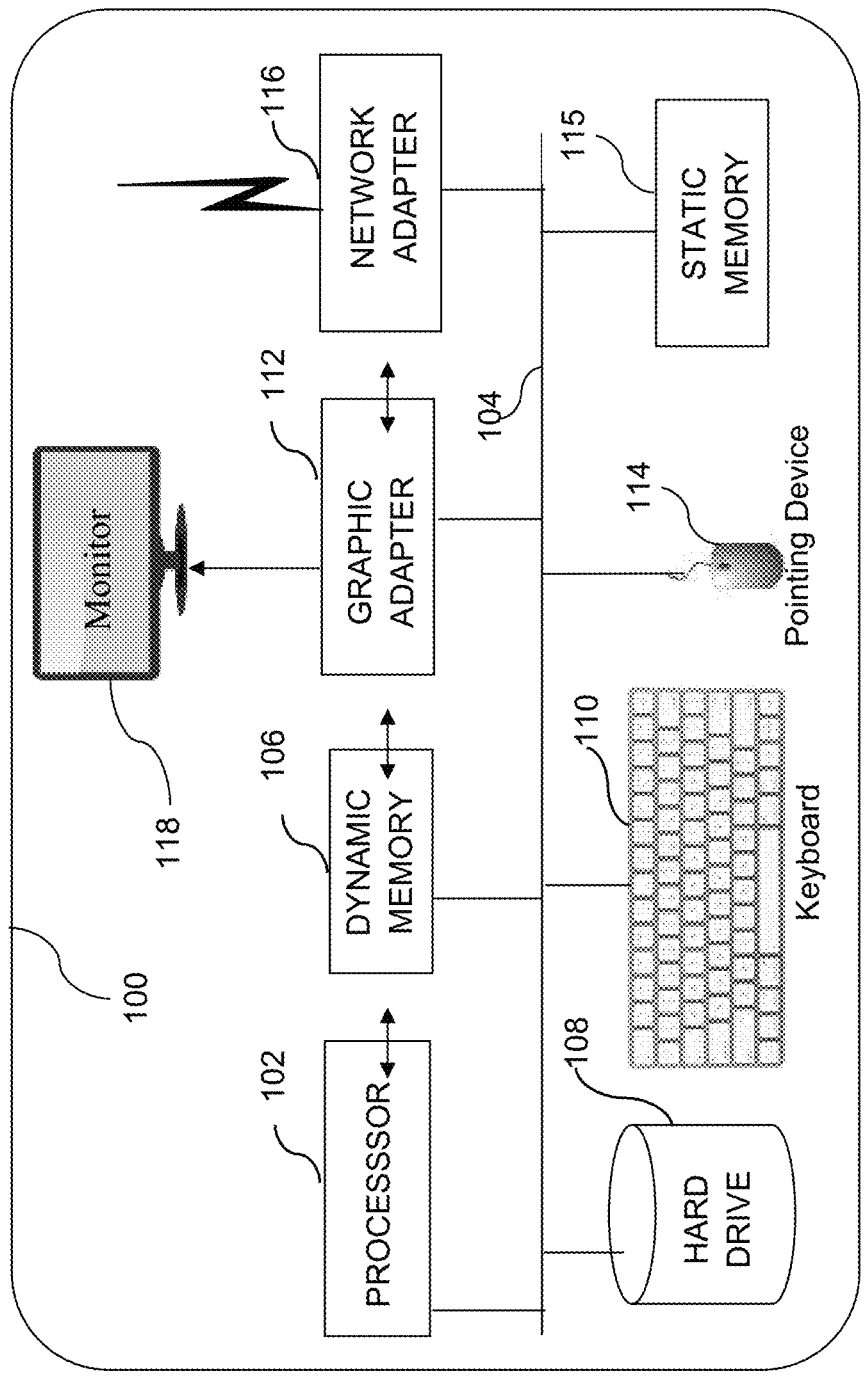
FIG. 1 shows an exemplary computing system or hardware for implementing the method of software development according to the present invention, according to one embodiment.

The drawings described herein are for illustration purposes only and are not intended to limit the scope of the present disclosure in any way;

DETAILED DESCRIPTION OF THE INVENTION

Section-A: Definitions for Terminology in the Context of this Disclosure

Following definitions are applied in the construction of the disclosure and attendant claims.

A software "application" or "product" is a software program or set of cooperating programs that enables a user of a computer system to accomplish some task or set of tasks. It includes applications run on a platform such as a computer, computing device (e.g. cell phone or server), browser, activeX viewer, Adobe Flash Player or virtual machine (e.g., Java Virtual Machine). It means the entire document and referenced files are sent to the platform where the application is executed.

"Extensible Markup Language" (XML) is a specification for designing formats for text data that allows for text objects to be organized into hierarchies (i.e., XML documents). XML allows web developers to create customized tags that offer flexibility in organizing and presenting information.

A "browser" means any HTML-rendering application. It can be a part of the computer operating system if it is integrated with the operating system (OS). A "viewer" means a platform that runs applications written in an appropriate language such as Scalable Vector Graphics, XAML, or Flash. Viewer can be part of the browser if it is integrated with the browser. It can be part of the computer OS if it is integrated with the OS.

A "network connection" means any kind of IP network or equivalents, including Internet, Intranet, private network, LAN, WAN, and wireless network and any combinations thereof that allow two connected computers or computing devices (e.g., cellular phones or palm-tops) to exchange data according to an IP protocol or equivalent. It also includes the loop-back of a computer when a server and a client reside in the same computer.

A "Module" or "Component" in a software application is an instance such as an Object in Object Oriented Programming, an independent "Part" or "Component" in an API, Library or Package (that comprises a set of modules). A "Module", in programming languages such as Modula-2, contains all the business logic to support a specific set of related functions and/or features of the application. Many applications use Object instances of graphical components to simulate or model real system and interactions of real objects. In this patent disclosure, "module" broadly refers to a unit of software code (implementing one or more source code files) being cohesive to a higher degree and comprising implementation of many functions (or methods) and necessary data in variables for providing a certain predefined set of features and/or a set of predefined functionalities having higher degree of synergy. The software code for a "module" is implemented in one or more source code files, where the source code files comprise of code for no other modules. The source code for a module also comprises implementation of "Interfaces" (described below), where the interfaces are useful for creating couplings (or connecting) with other modules or parts, where each coupling allows the module to interact, collaborate, or communicate with another module or parts.

"Communication code" or "Coupling code" between a module and another module or parts, is few lines of application code or instructions to allow collaboration or data exchange between the module and the other module or parts. Usually one of the modules in the application initiates the communication upon an event such as mouse clicks, keyboard or touch screen events, arrival of data, function call from another module, timer trigger, and change of state or data. The responsive actions in the other module or part include change of state, display or return data, return response, or initiate a communication with another module. These lists of events and responsive actions are not exhaustive. While the communication (e.g. using a communication interface) may pass data from one module to another module or part, the passing of data may not be required in rare cases. In an embodiment, communication code for a module is implemented in the application for allowing interaction or collaboration between this module and other parts or modules in the application. For example, Communication code includes any code or instructions in an application by which an event in one module causes a response or reaction from a second module.

An "Interface", "Coupling Interface", or "Communication Interface" of a software module or component: An interface is a pre-agreed protocol or pre-defined mechanism implemented in a module, which is useful for other parts to connect with the module for communicating or collaborating with the module. In another perspective, an interface of a module is a "port", through which other parts or modules connect and communicate with said module. For example, a "port" (e.g. interface) of a module is a gateway for entry-point and/or exit-point for data (e.g. information, notifications or signals etc.), so other modules or parts can exchange data thorough the port (or interface). Alternatively, two modules, each having an interface, can be coupled (or connected) by implementing communication code to connect the interfaces (or "ports") for allowing communication or collaboration between the modules through respective interfaces (or "ports").

A module can have multiple interfaces, where each interface is provided to serve a given purpose and different interfaces are implemented for serving different purposes. For example, if two different modules (e.g. things or entities) are required to collaborate or communicate with each other, the two modules can be coupled by using appropriate interfaces implemented in respective modules for allowing collaboration between them, such as communicating with each other by exchanging data or interacting with each other by exchanging notifications of signals. In the specific context of this disclosure, a "Coupling Interface" or "Communication Interface" of a module includes a function or an object, where the function (or object) can be called for communicating with the module. That is, other modules or parts can communicate, interact or collaborate with the module by calling the function (or using the object) by properly passing information through parameters of the function.

In the context of a software application comprising a set of modules that communicate with each other: For example, in an embodiment, an interface between a first module and a second module is a function (or method), where the first module implements a function (or method) and the second module calls the function (or method) to interact, communicate (e.g. to send data, to request data, or to exchange data) or collaborate with the first module. The definition of such a function includes definitions of parameters for the function, where the parameters are used, for example, for sending data, for getting data, and/or for exchanging data. Each such interface function is designed to have multiple parameters, where each parameter is of a given type (e.g. Integer, String, Float or Object). It is not necessary that such a function must have parameters. Also such a function may return an Object, which contains necessary data. The two modules use the parameters to pass data, to get data, or exchange data etc.

In another embodiment, an interface between first module and second module is an object instance of a class definition, where the first module implements the class (and uses object instance of the class) and the second module gets a reference of the object and uses the object instance to interact, communicate, or collaborate with the first module. In an embodiment, the second module is designed to use the interface implemented by the first module. That is, in case a function is used for a communication link, then the second module must call the function by passing the correct number of parameters and the type of each parameter must match. For example, if the first parameter type of a service function is String, then the caller module must call the service function by passing a String type variable as the first parameter, and so on.

An "Interface" is generally summarized as (i) a point where two things (e.g. systems, objects, modules or organizations, etc.) meet/connect for interacting with each other. An "Interface of a Thing" is generally summarized as a port (e.g. dock for attaching or socket for plugging in) for other things to connect for interacting with the thing. For example, an "Interface of a Module" is a function (or method) for other modules or parts to connect with for interacting with the module, according to one embodiment. In yet another embodiment, an "Interface of a Module" is an object (i.e. an instance of Class definition) for other modules or parts to connect with for interacting with the module.

Examples for kinds of "Interface" or "Communication Interface" include (i) "Service provider interface" of a module—A function, method, or object implemented in a module for providing a service, where the function (or object) can be used for requesting or accessing the service of the module, (ii) Listener interface—A function, method, or object implemented in a module to provide for interacting or collaborating with the module, where the function (or object) can be used for interacting or collaborating with the module, or (iii) Interface for other kinds of things such as registering a Callback—A function (or object) is provided for registering an external Callback function (or object) and optionally one or more kinds of events, where the Callback function (or object) is called up on a given kind of events.

If the Callback function (or object) is implemented in another module, then the two modules interact with each other by using the Callback function. This disclosure refers to each of such kinds of interfaces of a module loosely refer to as "Service provider interface".

A "Service consumer interface" of a first module is a function (or object) implemented in the first module (or service consumer module) for requesting and/or getting a service (provided by another module), where the function (or object) is designed to directly or indirectly call a service-function (or use a service-object) implemented in a second module for requesting (or getting) the service, where the second module (or service provider module) can provide the service and the service-function (or service-object) which is implemented in the second module (or service provider module) for providing the service. Likewise, "Caller interface"—A function, method or object implemented in a first module for interacting or collaborating with a second module, where the function (or object) can be used for allowing interaction or collaboration between the first module and the second module. The interface function (or object) in the first module is implemented to interact with the second module by directly or indirectly calling a service-function or listener-function implemented in the second module.

Each "Service consumer interface" or "Caller interface" is in general or often (but not necessarily always) designed to use a given, existing, known or pre-defined "service provider interface" or "listener interface"; for example, to couple a "Service consumer interface" with "service provider interface" by implementing communication code. So coupling of any two modules usually means including communication code for facilitating collaboration between the two modules. However, alternatively, "Service provider interface" or "Listener interface" are sometimes designed to match a given, existing, known or pre-defined "service consumer interface" or "caller interface"; for example, to couple a newly implemented "Service provider interface" with "service consumer interface" by implementing communication code. The interfaces used in each of the modules for coupling the modules are referred to as coupling interfaces.

A "Coupling Interface", "Communication Interface", or "Interface" of a first module is the mechanism (e.g. a port) useful for allowing connection of a second module with the first module for communication or collaboration between said first module and the second module, where the communication includes passing information, exchanging information, or notifying events. Each module (i) if the module requires one or more services provide by other modules, the module implements an interface for requesting (e.g. inward or input) each of the required services, and (ii) if the module provides one or more services for other modules, the module implements an interface to access (e.g. outward or output) each service by other modules. It is required to implement coupling or communication code for connecting two components/modules for allowing the two components to collaborate with each other, where one component implements interface for providing a service and the other component usually (but not always) implements complementary or compatible interface for consuming the service. If the interfaces are slightly incompatible, sometimes it is possible to implement the communication code to bridge the gaps between the interfaces.

Creating "Communication Code (or Instructions)" for coupling a first module and a second module for allowing collaboration or interaction/communication between the first and second modules include (i) Creating few instructions (or code) for connecting the first module with an interface of second module, or (ii) Creating few instructions (or code) for connecting the interface of first module with the interface of the second module.

A basic "Service Registration Object" (or SRO) or "Directory of Services" (or DoS) is a software module (or mechanism implemented in software) that can be included in an application comprising multiple modules, wherein each module in a first set of the modules provides one or more services for a second set of modules that require service, and each module in the second set of modules consumes one or more services provided by the first set of modules. Each module that provides one or more services can register each of the services with the SRO/DoS, where registering a service with SRO/DoS includes (or comprises of) inputting the reference of a service-function (or service-object) along with a unique lookup key (e.g. by using a service-registration function implemented in SRO/DoS). Each of the services is registered with the SRO/DoS by providing (i) a unique lookup key (or combination of lookup keys) and (ii) a reference to the function or object that can be called/used for requesting the service. The reference along with its unique lookup key (or combination of lookup keys) to a list (or hash table), according to an embodiment. According to this embodiment, the SRO/DoS also provide service-lookup function for allowing other modules to find the reference to the service function or object by passing its unique lookup key to service-lookup function. Any other module or part in the application can find a service registered with the SRO/DoS by using the unique lookup key (or combination of lookup keys) associated with the service.

A basic "Exchange for Communication Interface" (or ECI) or "Broker for Communication Interface" (or BCI) is a software module (or mechanism implemented in software) that can be included in an application comprising multiple parts, wherein each part in a first set of the modules provides one or more listener interfaces for a second set of parts that implement caller interfaces, and each part in the second set of parts communicate with one or more listener-interfaces provided by the first set of modules. The ECI/BCI are a kind of SRO/DoS but designed to work at fine grained interface level. The SRO/DoS are limited to services, while ECI/BCI is designed to facilitate communications between any kind of communication interfaces. For example, the SRO/DoS uses only lookup-keys to find match between a service consumer and service provider to facilitate communications. But, ECI/BCI can use any other means, for example, such as giving unique-IDs for each interface and by using matching tables for finding a match a between a caller-interface and a listener-interface to facilitate communications. Also, the ECI/BCI can be designed to support many kinds of interfaces such as gateway interfaces and notification interfaces.

"Arjun" or Preprocessor (e.g. to a compiler) for creating communication code for modules in an application: A set of pre-defined steps or processes, Mechanisms employed for publishing and subscription of Coupling Interfaces (e.g. necessary information and code/instructions for each interface for each available or required service) of each of the modules and Software Implemented Tools for using the information for Creation, Validation, and/or Administration of communication code for coupling the modules in an application (e.g. to facilitate collaboration between the modules in the application). All such activities and tools are henceforth loosely referred to by given name 'Arjun'. That is, Arjun is a name given to all the tasks or activities for creating and maintaining communication code for allowing communication between modules. If any two different modules in an application require to collaborate or communicate with each other, then it is required to include few lines of communication code (or instructions) in the application to allow collaboration or communication between the two modules by using the interfaces implemented in each of the modules, in an embodiment. This kind of communication code to allow collaboration or communication between any two modules creates a coupling and dependency between the two modules. If an application comprises multiple modules and the modules collaborate with each other, it is required to implement communication code to allow the modules to collaborate with each other. Arjun comprises of ECI/BCI or SRO/DoS to findi match between two interfaces that need to communicate with each other. The goal of Arjun/Preprocessor is to automate various tasks and activities for creating and maintaining said communication code.

A "Lookup Key" (or "a combination of one or more lookup keys") is used for registering/finding an available/required service: Each available service (e.g. provided by a module) is registered with SRO/Arjun by using a lookup key (or a combination of one or more lookup keys), for example, for finding the service (e.g. by another module that requires the service) using the lookup key. Often each lookup key is a unique name, string, number or ID. But a lookup key can also be a combination of one or more names, strings, number or ids, which together uniquely identify a specific service, or a service provided by a specific instance of a class-implementation of a module (or component). For example, multiple instances for a module that provides a service, may be included in multiple sub-systems, where an additional key may be used for identifying specific instance of the module in respective sub-system. Hence a combination of one or more lookup keys (e.g. names, strings, numbers or IDs) may be used for finding a service provided by a module instance in a given sub-system. Hence, lookup keys for finding a service can be a combination of one or more lookup keys comprising names, strings. Numbers or IDs, for example to find a service provided by an instance in a given sub-system.

Each "Lookup Key" (or combination of one or more lookup keys) is used for finding a required service from available services (e.g. by comparing for matching lookup-key for a required service with the lookup-key for each available service). Each available service is registered (e.g. by a module that provides the service) with the SRO/Arjun using a combination of one or more lookup keys. Each required service (e.g. by a module that requires the service) is found from the SRO/Arjun using a combination of one or more lookup keys. If a module provides a service, the module registers or publishes the service with SRO/Arjun using a combination of one or more lookup keys. Another module requiring the service can find the service from SRO/Arjun by using the combination of one or more lookup keys.

The lookup keys are used only to facilitate communication between two different parts or modules, where one part/module provides a service and another part/module requires the service (e.g. by comparing for matching the lookup key for a required service and the lookup key for an available service). For example, if a module requires a service, the module looks up for the required service from the mechanism comprising SRO/DoS using a combination of one or more lookup keys. The SRO/Arjun can't find a required service using a combination of one or more lookup keys, if no service is registered using the combination of one or more lookup keys (e.g. by another module that provides the service). The lookup keys are useful for connecting (or facilitating communication between) each module that requires a service with another module that provides the required service, for example, by matching a lookup-key used for registering an available service and lookup-key used for finding a required service. The mechanism comprising SRO/Arjun can't find a required service using a lookup key, if no service is registered using the lookup key (e.g. by another module that provides the service).

Definition for the term "Symbiotic Relationship" between any two interfaces in the context of current patent application: The term "Symbiotic Relationship" between any two interfaces is defined as a cooperative and/or interdependent relationship between the two interfaces. For example, if two interfaces in an application need to be connected to communicate or exchange data with each other, then there exists a "Symbiotic Relationship" between the interfaces. Likewise, if an interface needs to be connected to request service or data from another interface, then there exists a "Symbiotic Relationship" between the two interfaces. There is said to exist a "Symbiotic Relationship" between any two interfaces in an application if the two interfaces need to be connected or coupled to allow communication or exchange of data between the interfaces during the course of execution of the application.

For example, there is said to be a "Symbiotic Relationship" between a caller interface and a listener interface if it is required to create coupling code to link or connect the interfaces to allow communication between the caller interface and the listener interface. Likewise, there is said to be a "Symbiotic Relationship" between an interface that provides a service and another interface that requires the service if it is required to create a coupling link (or code) to allow communication between the interface that provides a service and the interface that requests the service. In the context of this current patent application, there is said to be a symbiotic relationship between a second interface that requires a service and a first interface that provides the service required by the second interface (i.e. the second interface depends on the first interface, but the first interface does not depend on the second interface). In the strict sense of the term "Symbiotic Relationship", both parties benefit from each other. The meaning of the term "Symbiotic Relationship" is slightly altered (in the context of current patent application) to define the relationship between a pair of interfaces, even in case only one interface benefits from the other (e.g. to fulfil a feature or functionality of the application that comprises of the interfaces).

A "Pluggable Module" and/or "Ideal Pluggable Module" is a module that is capable of or suitable for being plugged in (and can be unplugged easily). In other words, a pluggable module implies a module that can be plugged in (and can be unplugged easily). Likewise, assemblable module implies a module that can be assembled (and can be disassembled easily). For an exemplary embodiment: If code for an ideal pluggable module of an application is implemented in a Class definition, in OOP (Object Oriented Programming), the pluggable module can be included in the application by including an object instance of the Class-definition. If this module needs to collaborate with other parts of the application, there is no need to manually implement additional communication code for allowing said collaboration. In the context of the claims of this invention, any module that uses SRO/DoS or Arjun for facilitating collaboration between said module and other parts (including other modules) of the application is a pluggable module even in case communication code is implemented manually for creating a few couplings for this module. For example, if a module module-X uses SRO/Arjun for creating a few couplings (where each coupling allows communication between module-X and another part or module) and communication code is implemented manually for creating other couplings (where each coupling allows communication between module-X and another part or module), then module-X is a pluggable module, but not an ideal pluggable module.

An ideal pluggable software module means a software module that doesn't require implementing any communication code manually when the module is included in a software application. That is, when an ideal pluggable module is included in an application, there is no need for implementing any more communication in the code of the application. According to an embodiment, the code for a pluggable module or component comprises of necessary information for its interfaces and dependencies (e.g. required services) and employs a process (or recipe), mechanisms, and automation tools such as SRO/DoS either for creating necessary communication code or for accessing necessary services. Hence, it is possible to eliminate the requirement for implementing any additional communication code for such ideal pluggable modules when a module is added to an application. Likewise, if the pluggable module provides one or more services for other modules or parts, the code for pluggable module comprises of necessary information about the services and employs a process (or recipe), mechanisms, and automation tools such as the SRO/DoS either for creating necessary communication code or for accessing each of the services.

Making a "Coupling Interface" into a "Pluggable Interface": Coupling interface of a first module is the mechanism (e.g. a port) useful for allowing connection of a second module with the first module for communication or collaboration between said first module and the second module, where the communication includes passing data, exchanging data, notifying events or requesting and/or getting data. Each coupling interface can be made pluggable interface by employing mechanisms that use ECI/BCI to connect the interface with another interface to facilitate communication between the two interfaces. The pluggable interfaces are broadly categorized into to two super classes (i) Listener interface class and (ii) Caller interface class, where each Listener interface implements a listener function (or object) and publishes the interface by providing information comprising of lookup-keys or Unique-ID to find and call the listener function (or object), and (ii) each Caller interface implements code to call a listener function (or object) by providing information comprising of lookup-keys or Unique-ID to find and call the listener function (or object).

"Exclusive files" of a module (or component) used in an application: A file is considered an exclusive file of a module (or component), if the file contains only the code implemented for the module (or component), which includes interfaces or part of the communication that is implemented for the module. An exclusive file of a module (or component) must not contain any other code, for any other module or part of the application for example. If one or more files are implemented for a utility class/module and the utility class/module is created and used exclusively by the module (or component), then all the files implemented for the utility are also exclusive files of the module (or component). Likewise, files containing other resources (e.g. image, scripts, style-sheets or configuration files) are also 'exclusive files' of the module (or component), if the resources are exclusively used by the module (or component). The set of files comprising an 'exclusive file' of the module (or component) is considered 'exclusive code base' (or 'code base') of the module (or component).

"Non-exclusive files": A file is considered a non-exclusive file for a Module if the file contains code for the Module and as well as code for other parts or modules of the application. For example, a file is not an exclusive file for any module if the file contains code for more than one module. If one or more files are implemented for a utility class/module and the utility class/module is used non-exclusively by the Module, then all the files for the utility are also non-exclusive files of the Module. Likewise, files containing other resources (e.g. image, scripts, style-sheets, or configuration files) are also 'non-exclusive files' of the Module if the resources are non-exclusively used by the Module (i.e. if other parts of application are also using the utility class/module or resources).

The "Coupling Adapter" of "Communication Adapter" for connecting incompatible interfaces: If there is an incompatibility (e.g. in voltage or pin configuration) between electric socket (service provider) in a foreign country and plug (service consumer) of an electric appliance (e.g. laptop or cell-phone), an electric adapter can be used to bridge the gaps. The need for power is a real dependency but the 115V-AC and flat/round pins of the plug are artificial dependencies. The adapters can be used to bridge or fill the gaps in the artificial dependencies. Likewise, if there is a gap between service-provider interface of a first module that provides a service and service-consumer interface of a service-consumer module that needs said service, it is desirable to generate communication code to bridge the gaps (i.e. in artificial dependencies) to connect or couple such incompatible interfaces, according to an embodiment. If the 2 modules (i.e. first module and second module) are created by two different component vendors, and each module defines a different interface, it is desirable for the SRO/Arjun-mechanism to facilitate creation of communication code that can bridge the gaps in the interfaces (if it is possible or practical to bridge the gaps).

According to webpage of Wikipedia.org, in the context of computer programming, the term "Cohesion (Computer Science)" refers to the degree to which the elements inside a module belong together. In one sense, it is a measure of the strength of relationship between the methods and data of a class and some unifying purpose or concept served by that class. In another sense, it is a measure of the strength of relationship between the class's methods and the data itself. Cohesion is an ordinal type of measurement and is usually described as "high cohesion" or "low cohesion". Modules with high cohesion tend to be preferable, because high cohesion is associated with several desirable traits of software including robustness, reliability, reusability, and understandability. In contrast, low cohesion is associated with undesirable traits such as being difficult to maintain, test, reuse, or even to understand. "Cohesion" is often contrasted with "coupling", which is a different concept. High cohesion often correlates with low coupling, and vice versa. In other words, for example, increasing the degree of cohesion of a module likely reduces the degree of coupling (e.g. by simplifying the communication code required for the module).

In the context of the modules (or components), "Optimal Size" (e.g. number of lines of code) or "Optimal Complexity" stands for the complexity not being too high (for redesigning the module, for example) and the size (or lines of code) not being too low. According to an exemplary embodiment, a team of software designers or architects may define optimal complexity of a module to imply that the module can be understood, redesigned, and tested individually by an ordinary, skilled new programmer in about a week's time and have at least 1500 lines of code. Here, a new programmer implies an experienced programmer that has not made any earlier contribution to the module and/or has not seen the code of the module earlier). Often, "Optimal Size" and "Optimal Complexity" are used interchangeable to mean same thing. The meaning of "Optimal Size" and "Optimal Complexity" are subjective and can be defined to suit skills, talent of experience of a given team and/or circumstances.

Some of the desirable traits for each of the modules or components include optimal complexity and higher degree of Cohesion. For example, it is desirable to partition any large software application into modules that are closer to optimal size and optimal complexity, while having a higher degree of Cohesion, according to an embodiment. This disclosure is not recommending any pre-defined values for optimal size (e.g. in lines of code) or optimal complexity (i.e. number of days) of a module but, according to a preferred embodiment, encourages every team that is designing and building a large application to define such values based on relevant factors such as skills of the programmers and/or to suit the software being designed and developed.

Section-B: Object-Oriented Programming & Modular Programming

Computer programming of a software product or application is a process that leads from an original formulation of a computing problem to "executable computer programs" (i.e. machine code that runs on computing platform). Programming involves activities such as analysis, design, development by understanding, generating algorithms, verification of requirements of algorithms including their correctness and resources consumption (e.g. for designs such as Modular design or Object-Oriented Design), and implementation (commonly referred to as coding) of modules and other parts in a target programming language. Source code is written in one or more programming languages. In an embodiment, the source code is compiled for creating machine code (i.e. executable). The process of programming thus often requires expertise in many different subjects, including knowledge of the application domain, specialized algorithms, and formal logic. Related activities include software development tasks such as testing, debugging, maintaining the source code, implementation of the build system, and management of derived artifacts such as machine code (i.e. executable that is run on computing platform) of computer programs.

Object-Oriented Programming (OOP) languages (e.g. Java, C# or C++ etc.), support a concept called classes. A class is a module of code implemented in one or more files that generally contains (1) a set of data variables to store data and references to other objects, (2) a set of methods or functions to operate on the data, (3) methods for providing access to the services defined in classes, (4) methods for setting and changing the objects' data (popularly known as set methods), and (5) methods for reading objects' data (popularly known as get methods). This list is not exhaustive.

Object-oriented programming techniques involve the definition, creation, use, and destruction of "objects". These objects are entities comprising data elements or attributes and methods or functions which manipulate the data elements. Objects can be created, used, and deleted as if they were a single item. The attributes and methods enable objects to model virtually any real-world entity in terms of its characteristics, which can be represented by the data elements, and its behavior, which can be represented by its data manipulation functions. Objects are defined by "classes", which act as templates that instruct the compiler how to construct the actual objects. A class may, for example, specify the number and type of data variables and the way of manipulating the data. When an object-oriented program is compiled, the class code is compiled into the program, but no objects exist. An object instance is created by the program at runtime by calling a special function called a constructor, which uses the corresponding class definition and additional information, such as arguments provided during object creation, to construct the object. Object creation is also referred to as object instantiation. When an object is created at runtime, memory is allotted and data structures are created. The objects may be used by using their data and invoking their functions and are destroyed by calling a special function called destructor.

Class may support a rich set of methods to initialize the data variables and also to read the variables. Also, it supports methods, which can be used to request (or access) the services of the object, which is an instance of the class. For example, a sample drawing-class for a pie chart, which draws a pie chart, may contain variables: an array of floats, an array of strings, and a title string. The class may support methods to initialize these variables and a service method that draws the pie chart using the data. Users can instantiate a pie chart object and initialize the data using the supported methods; and then use the service method to draw the pie chart. Also, the class may support other methods such as service methods to register callbacks. If any external component interested in the user selection/clicks on the chart, they could use appropriate service method to register a callback to be notified on the event.

The major benefits of object-oriented programming techniques arise out of three basic principles; encapsulation, polymorphism, and inheritance. More specifically, objects can be designed to hide, or encapsulate, all, or a portion of, the internal data structure and the internal functions. A program developer can define objects in which all or some of the attributes and all or some of the related functions are considered "private" or for use only by the object itself. Other data or functions can be declared "public" or available for use by other objects. Access to private variables inside an object by other objects can be controlled by defining its public functions for accessing the object's private data. The public functions form a controlled and consistent interface between the private data and the "outside" world. Any attempt to write program code that directly accesses the private variables causes the compiler to generate an error during program compilation, where the error stops the compilation process and prevents the program from being run.

Inheritance allows software developers to easily reuse preexisting program source code and to avoid creating software from scratch. It allows a software developer to declare classes and their instantiated objects as related to each other. When a class is designated as a subclass of the base class, the subclass "inherits" and has access to all of the public functions of its base class just as if the functions were declared in the subclass. Alternatively, a subclass can override some or all of its inherited functions or modify some or all of its inherited functions merely by defining a new function with the same form. Overriding or modification of a function in the subclass does not alter the function in the base class. The creation of a new class by selectively modifying the functions of another class allows the software developers to easily customize existing code to meet their particular needs.

Moreover, many components are essentially objects that conform to an object model such as Microsoft's Component Object Model. An object module is a unifying set of rules that describe object structure, object life cycle, and inter-object communication. Object structure relates to the physical layout of objects in memory, while object life cycle refers to how applications create and destroy objects. Inter-object communication refers to protocols by which objects communicate with one another. Object modules are useful in contexts where all objects in a given system need to conform to a given protocol governing these parameters. Most of the object-oriented languages, including the C++ programming language, do not specify true object modules, but merely specify syntax and semantics of a basic object implementation without specifying the rules that unify object systems.

The following is taken from wikipedia.org for modular programming by making a few changes to reflect the context of this disclosure: Modular programming is a software design technique that emphasizes separating the functionality of a program into independent, interchangeable modules, such that each contains everything necessary to execute only one aspect (e.g. smaller features or functionality) of the desired functionality. A module interface expresses the elements that are (a) provided by the module for other modules (or parts) and (b) required by the module from other modules (or parts). The elements defined in the interface are detectable and coupled to other modules by creating communication code. The code implemented in the modules comprises of the working code (e.g. referred to as application or business logic; and presentation logic in case of GUI components) that corresponds to the elements declared in the interface (e.g. for providing services and requesting services).

Modular programming is closely related to structured programming and object-oriented programming, all having the same goal of facilitating construction of large software programs (e.g. applications or products) and systems by decomposition into smaller pieces, where the small pieces are referred to as modules. While, historically, usage of these terms has been inconsistent, today "modular programming" refers to high-level decomposition of the code of an entire program into pieces (e.g. preferably having higher degree of cohesion): structured programming to the low-level code use of structured control flow, and object-oriented programming to the data use of objects, a kind of data structure. In object-oriented programming, the use of interfaces as an architectural pattern to construct modules is known as interface-based programming.

The term assembly (as in .NET languages like C#, F# or Visual Basic .NET) or package (as in Dart, Go or Java) is sometimes used instead of module. In other implementations, this is a distinct concept; in Python a package is a collection of modules, while in the upcoming Java 9 the introduction of the new module concept (a collection of packages with enhanced access control) is planned. A component is a similar concept, but typically refers to a higher level; a component is a piece of a whole system, while a module is a piece of an individual program.

Section-C: The System for Application Development

FIG. 1 shows a computing device 100 that runs an application comprising of an embodiment of the invention being disclosed in this application, where the computing device or hardware platform includes a processor (CPU) 102, a persistent storage (e.g. hard-drive or flash memory) 108 and/or static memory 115, dynamic memory (volatile storage) 106, one or more input device such as a keyboard 110 and a pointing device (mouse) 114 (or a touch screen not shown), output device such as monitor 118 connected to a graphic adapter 112, and a network adapter 116. All are connected through a printed circuit board (e.g. system-board) 104. The printed circuit board 104 includes a path (e.g. wires) that permits communication among the components of the computing device 100. The keyboard 110 and the pointing device 114 are used to provide inputs. The graphics adapter 112 generates display signals (e.g., in RGB format) to monitor 118 based on data/instructions received from processor (CPU) 102. The network adapter 116 provides connectivity to a network (e.g., using Internet Protocol), and is used to communicate with other systems connected to the network. A specific example of a suitable hardware platform includes (but is not limited to) PC/Laptop/Tablet running Microsoft Windows 10, Server running Linux, Apple iPhone running iOS 8, or Samsung Galaxy S5 running Android. But it is to be understood that the teachings herein can be modified for other presently known or future hardware platforms or commuting devices. In an embodiment, the software described below is "stored in the persistent storage 108 or static memory 115 and runs on the CPU 102 at runtime, making use of the dynamic memory (volatile storage) 106 as needed.

The system (FIG. 3) for web application development in accordance with the present invention comprises of a client computer 300 running an operating system (not shown) and a web browser 305, a server computer 310, and a network connection 315 between the client computer 300 and the server computer 310 so that the client computer 300 and the server computer 310 can exchange data according to an Internet communication protocol such as Hypertext Transfer Protocol (HTTP), TCP/IP or File Transfer Protocol (FTP). The network connection 315 includes, but is not limited to, an Ethernet, a wireless local area network (WLAN), or a wide area network (WAN), a WIFI communication network e.g., the wireless high-speed internet, or a combination of networks, a cellular service such as a 4G (e.g., LTE, mobile WiMAX) or 5G cellular data service. The network connection 315 provides a web interface employing transmission control protocol, hypertext transfer protocol, simple object access protocol or any other internet communication protocol. The server computer 310 hosts a web application server 320, which runs Servlet or JSP and/or has a Common Gateway Interface (CGI) 323. The server computer 310 may optionally run a database server or similar database application having access to data sources 325. The database server provides database services to the web application server 320 via the common Gateway Interface (CGI) 323. The web browser 305 uses a URL (the virtual address of the server) to locate the web application server 320 and to request a web page. If the URL points to a static web page, the server computer 310 returns the page in appropriate code. If the URL points to an executable such as CGI or JSP/ASP program, the request will cause the server computer 310 to run the executable, which creates a web page dynamically. The web application server 320 is used for dispatching static HTML files 322.

The client computer 300 (as well as server computer 310) includes a central processing unit (CPU), a random-access memory (RAM) for temporary storage of information, and a read-only memory (ROM) for permanent storage of information. A bus, which is controlled by a bus controller, interconnects the components of the computer system. Secondary storage may be provided by diskette, CD ROM, hard drive, flash memory cards (by serial or USB or other connections), and tape drive. The diskette drive, CD ROM, and hard disk are connected to the bus by respective controllers, and the RAM is controlled by a memory controller. An interrupt controller is used for receiving and processing various interruption signals from any of the system components. The client computer 300 also includes a communication adapter that allows the system to be interconnected to a local area network (LAN) or a wide area network (WAN) schematically illustrated by the bus and network connection.

Operation of both the client computer 300 and the server computer 310 is generally controlled and coordinated by operating system software, such as the Microsoft Windows 95, 98, 2000, ME, XP and NT from Microsoft Corp., Redmond, Wash., Sun OS/2, and Apple OS 10 from Apple Computer Systems, Inc. Cupertino, Calif., and Linux from RedHat Inc, Durham, N.C. The operating system controls allocation of system resources and performs tasks of processing, scheduling, memory management, networking, and input/output services. The operating system resident in system memory and running on CPU coordinates the operation of the other elements of the computer. The present invention can be implemented with any of the commercially available operating systems including OS/2, UNIX, Windows 95, 98, 2000, ME, XP, Vista, NT, and DOS.

The server computer 310, as is well known in the art, is a computer that is connected to the client computer 300 through Intranet, local network, WAN, or wireless in accordance to an Internet Protocol (IP). The server computer 310 generally has similar components of the client computer 300 even though some of the components such as floppy disk, CD ROM drive and display may be dispensed with. The server computer 310 is capable of sending web applications to the client computer 300 in HTML format. HTML is a markup system used to create web pages that are portable from platform to platform. To send a web page, the two computers use the Internet HTTP, which specifies how information is exchanged between the client and the server. HTTP is an application that is designed to conform to International Standard ISO 8879—Standard Generalized Markup Language. HTML and HTTP standards are maintained by an Industry Consortium; the World Wide Web Consortium (W3C) jointly hosted by the Massachusetts Institute of Technology Laboratory for Computer Science (MIT/LCS) in the United States, the Institut National de Recherche en Informatique (INRIA) in Europe, and the Keio University Shonan Fujisawa Campus in Asia.

The system described above is just one exemplary embodiment of a suitable software development environment and is not intended to suggest any limitation as to the scope of use or functionality of the invention. Neither should the client computer 300 and the server computer 310 be interpreted as having any dependency or requirement relating to any one or a combination of components used in the present invention. The invention may be practiced on cell phones and palm devices that run browser-like application such as Web Browsers, SVG viewer, or Adobe's flash players. Since the platform supports Application Peripherals Interface, the invention can be used to control other hardware devices.

In software development environment, the server computer 310 and the client computer 300 may reside in the same computer unit. This is especially straightforward in systems running operating systems such as Windows NT, Windows XP, Unix, and Linux. In such a system, a web server application can be launched for hosting websites. At the same time, a web client can also be launched so that the client can access the web server through loopback. In this situation, the ordinary network connection is unnecessary. This system is ideal for software development using the technique of the present invention.

Figure 2:
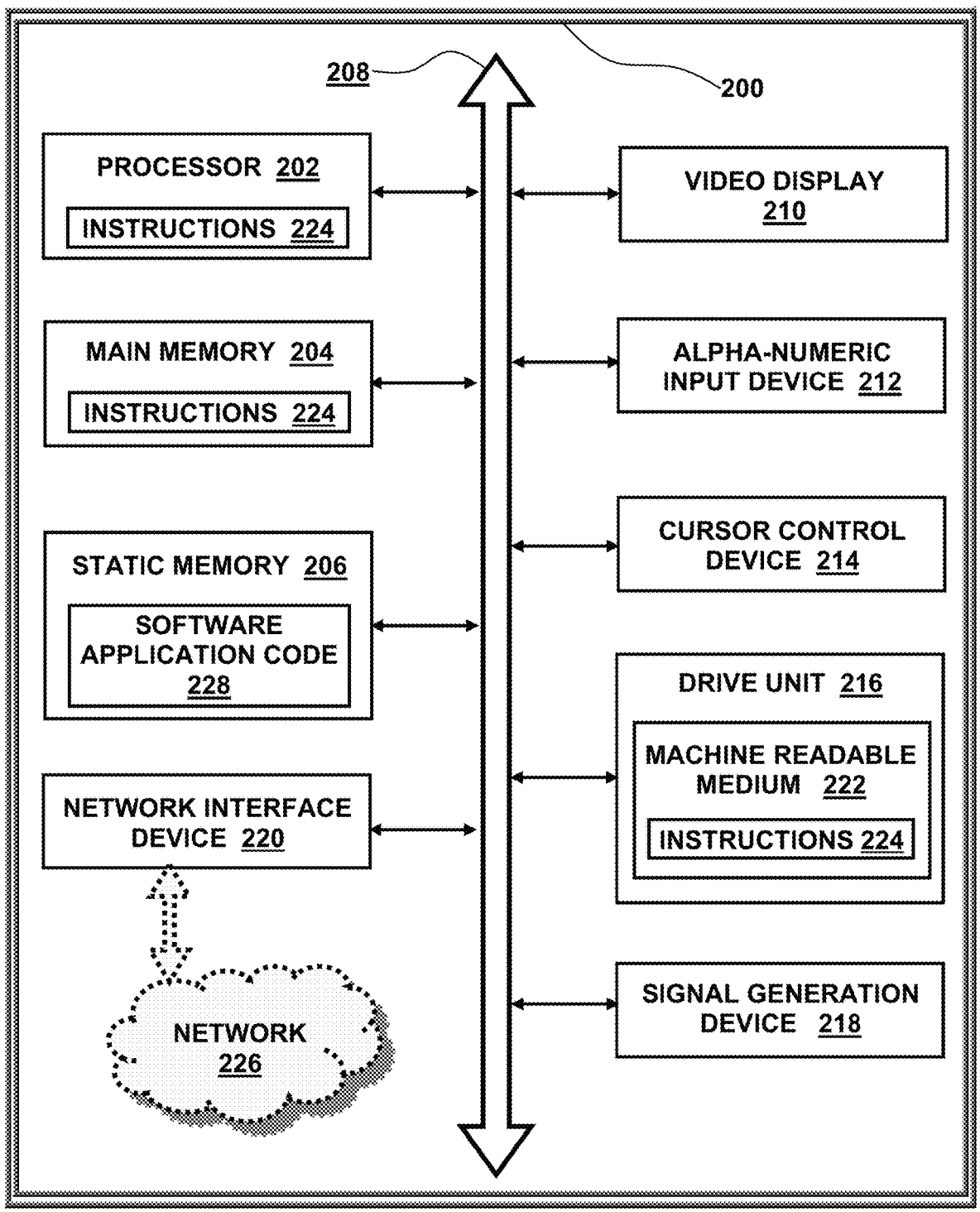
FIG. 2 shows an exemplary computing device for implementing the method of software development using new kinds of modules and mechanisms for creating and managing communication code according to the present invention, according to one embodiment.

Moreover, if the web browser 305 is merged into the operating system, the system might be reduced to one single standalone computer even though the details in operating such a system depend on how the system is implemented. Therefore, the system for application development is intended to cover both a single computer with a browser and a single computer without an independent browser. In this situation, the client computer 300 or server computer 310 should be construed as a logical computer as illustrated in FIG. 1 or FIG. 2. In the system where a browser is merged into the operating system, browser shall mean the part of the component of the operating system that performs browser's functions. A computer-readable storage medium having code for a software application (or product) comprising of instructions thereon which, when executed by a computing platform (e.g. FIG. 1, FIG. 2 or FIG. 3), results in execution of methods, mechanisms, and/or tools described in this patent application.

One of the sample contexts for using or practicing mechanisms, tools, and methods disclosed in this patent application: Any large software application or product comprises of a large set of features and functionalities. According to an embodiment, the designers or architects of a large software application (or product) partition the application into modules; for example, by identifying multiple modules where each of the modules comprises of one or more features having a certain degree of cohesion. For example, one of the preferred embodiments requires identifying modules having a higher degree of cohesion and of optimal size or complexity. The steps for building the application include (a) finding multiple reusable modules (or other kind of reusable parts such as APIs or libraries) that implemented required features and functionality, (b) implementing remaining features and functionality in multiple modules (or other kinds of parts implemented in the code of the application), (c) implement necessary code in the code being implemented for the application for properly including each of the modules (where modules are also referred to as components), and (d) creating or implementing necessary communication code for the modules in the code being implemented for the application, where the communication code is designed to facilitate necessary collaboration and/or interactions between each of the modules and other modules or parts of the application.

Section-D: Communication and Collaboration Between 2 Modules in an Application

In any software application (or product) comprising of multiple parts, modules, or components, it is essential for a large subset of the components (or modules) in the application to collaborate and communicate with each other. In other words, each module in an application collaborates and communicates with one or more other parts or components in the application. Any two components or modules in an application communicate and collaborate with each other by calling each other's functions (or by calling methods of an object, if an object is used for communication interface). In other words, a first module in an application communicates with a second module in the application by calling a function implemented in the second module. It is required to create communication code to allow such communication and collaboration between any two components in the application.

Today, the only known way to allow such collaboration between any two components in an application is by implementing the necessary communication code manually in the code of the application (i.e. outside of the code for the modules), where the communication code creates hard-to-comprehend dependencies for each of the modules. It is desirable to eliminate the need to manually implement and maintain the communication code for each component (or module) in the code of the application (i.e. outside of the code for the modules) where the communication code is essential to allow each module to collaborate with other parts or components in the application.

Is it possible to automate the various tasks of implementing and maintaining communication code in the code of the application (i.e. outside of the code for the components)? To answer this question, it is imperative to understand how any part (e.g. modules or components) communicates with other parts. A first part (e.g. a first module or component) initiates communication with each of the other parts (e.g. a second module or component) by implementing necessary communication code to call a function implemented in the second component or module. Other modules in an application initiate communication with the first part in the application by implementing communication code to call a function implemented in the first module.

It is required to implement necessary communication code in the code of the application to allow collaboration (e.g. to call each other's functions) between a first component (or module) and a second component (or module) after implementing necessary parts of communication code that are included in the first component and the second component in the application. In other words, the source code for the application comprises of code to include and use the components (or modules) as well as communication code (e.g. code to call each other's functions) to allow collaboration between the components (or modules).

The need for manually implementing communication code in the code of the application for each component can be eliminated, for example, by (i) implementing within the code for each component the instructions to publish functions that are implemented within the component and required by other parts and (ii) implementing within the code for each component the instructions to find or subscribe to functions that are implemented in other components and required by the component. The functions implemented in a component that are used (e.g. by calling the functions) by other parts of the application (such as components or modules) are generally, or loosely, referred to as listener functions (or service functions) in this disclosure.

It is desirable to automate the tasks of creating and maintaining communication code to allow collaboration between the components included in an application by inventing mechanisms and tools, for example, to automatically create communication code. For example, one kind of mechanism includes: (i) If a component provides one or more service functions for other components, the component comprises of a mechanism to publish each of its service functions by using a unique look-up key, and (ii) If a component requires one or more service functions that are implemented in other components, the component comprises of a mechanism to subscribe to or find each of the required service functions by using a unique look-up key. Then, a tool is implemented to allow communication between the components by coupling (a) each function that is subscribed to (e.g. by using a look-up key) by a first part (e.g. a module), and (b) the function (e.g. by using the look-up key) that is published by a second part (e.g. a module).

The code implemented in a module as a communication "port" to connect or couple with a communication port in another module to allow communication is referred to as a communication interface or "interface". Any application comprises of multiple communication interfaces (or ports) and if an interface needs to communicate with one or more other interfaces, it is required to create communication code to couple the interface with each of the other interfaces. That is, if interface CI-A needs to communicate with interfaces CI-B and CI-C, it is required to create communication code to couple the two interfaces (CI-A and CI-B) and communication code to couple the two interfaces (CI-A and CI-C).

It is desirable to create communication interfaces conducive to automating various tasks and activities such as creation of communication code between interfaces (e.g. by coupling any two interfaces in an application, if the two interfaces need to communicate with each other), testing (e.g. compatibility between any two interfaces that need to be coupled), and maintenance (e.g. by redesigning) of the interfaces throughout the product release lifecycles (such as releases of upgraded versions).

The general idea behind the current invention is to implement interfaces in a manner that accommodates such inventions of tools, methods, and mechanisms to not only facilitate communication between the interfaces, but also provide features such as the testing of compatibility between interfaces that communicate with each other by managing and documenting dependencies between interfaces. The current invention includes (i) implementing communication interfaces that also provide the necessary information for each interface and (ii) employing novel tools, methods, and mechanisms that can use the information (provided by the interfaces) to allow collaboration between any two interfaces that need to collaborate with each other.

According to an embodiment, necessary information is included in the code for each interface to accommodate inventions such as mechanisms and tools like ECI/BCI or SRO/DoS to automate various tasks and activities to create, test, and manage communication code, where the tasks and activities are being performed manually today. It is desirable to invent better tools and mechanisms (by including necessary information in each interface to accommodate needs of the tools) and constantly improve them to increase automation of various tasks and activities required to allow communication between each pair of interfaces (i.e. two interfaces that need to be coupled to exchange data with each other) in an application.

Section-E: Using a SRO or DoS for Allowing Collaboration Between any Two Modules The figures (FIG. 4 and FIG. 5) illustrate how a global 'Service Registration Object' (or 'SRO') or Directory of Service (DoS) is used for allowing collaboration between any two modules in an application comprising of multiple modules (e.g. modules that provide service 401, 402, 403, and modules that consume service 405, 406, 407), according to an embodiment that uses Object Oriented Programming (or OOP). The application includes an SRO 414 as a global and/or shared object, where the names of the object and service-functions (i) for registering services and (ii) for looking up services, are defined and published in advance for usage in the code of the modules (e.g. 401 to 407). If a module provides a service, the module registers the service with the SRO using the service method of SRO for registering a service. If a module requires a service, the module finds the service from the SRO using the service method of SRO for finding a service. The code in each of the modules is designed and implemented to use the respective functions of the SRO in order to facilitate communication between modules with each other. Any part or module may access the SRO in the application either (i) for registering a service along with a lookup key assigned to (or pre-defined to associate with) the service in order for other modules or parts to lookup and request the service, or (ii) for looking up a required service (e.g. by each of the modules) using the pre-defined lookup name of the service provided by other modules or parts.

Figure 4:
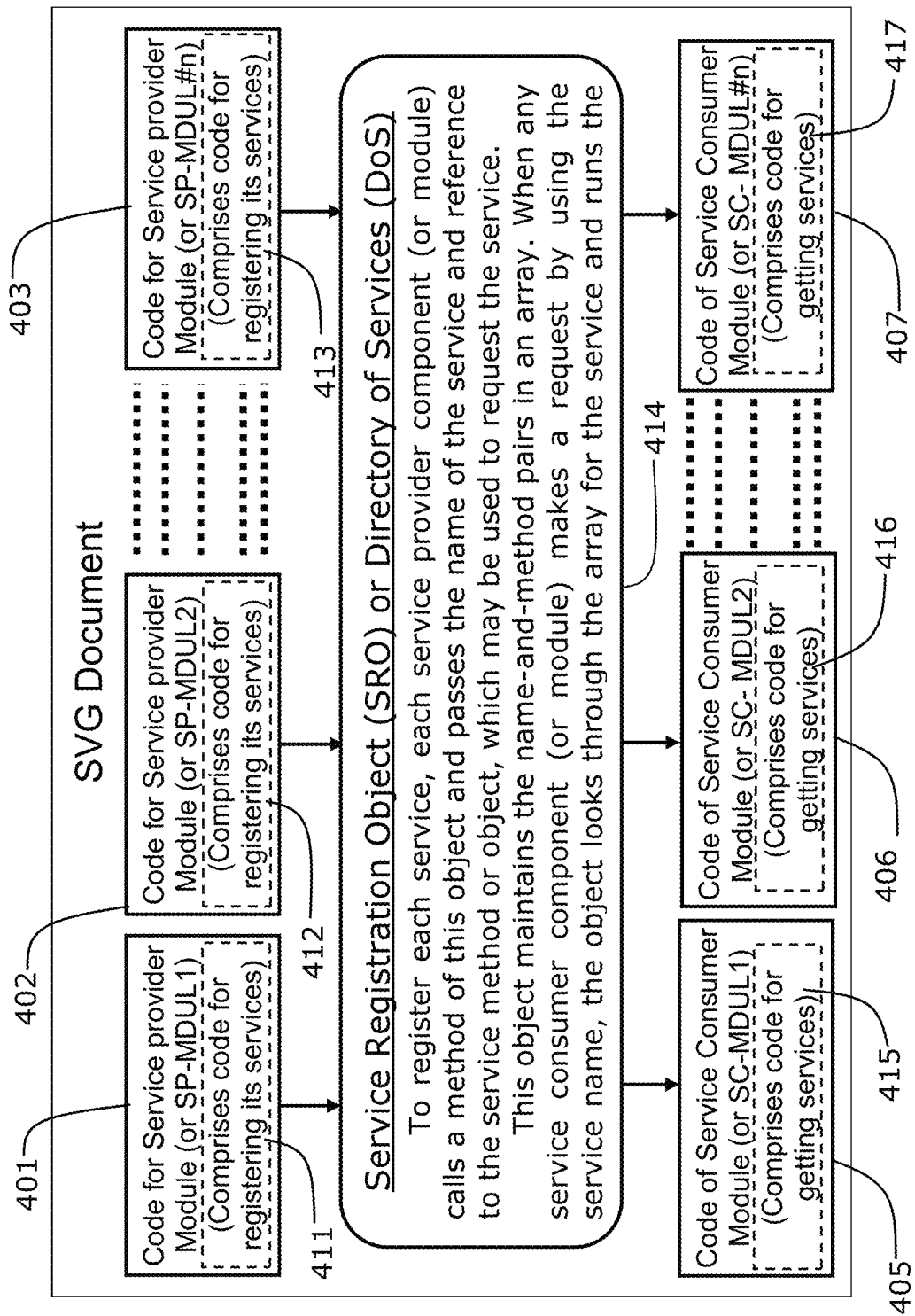
FIG. 4 shows a simple depiction of modules in an application for registering service names (i.e. a lookup key or a set of lookup keys) and services with a global Service Registration Object ('SRO') or Directory of Services (DoS') in an application; and service-consuming components lookup for the services from the registration object and access the services, according to one embodiment.
Figure 5:
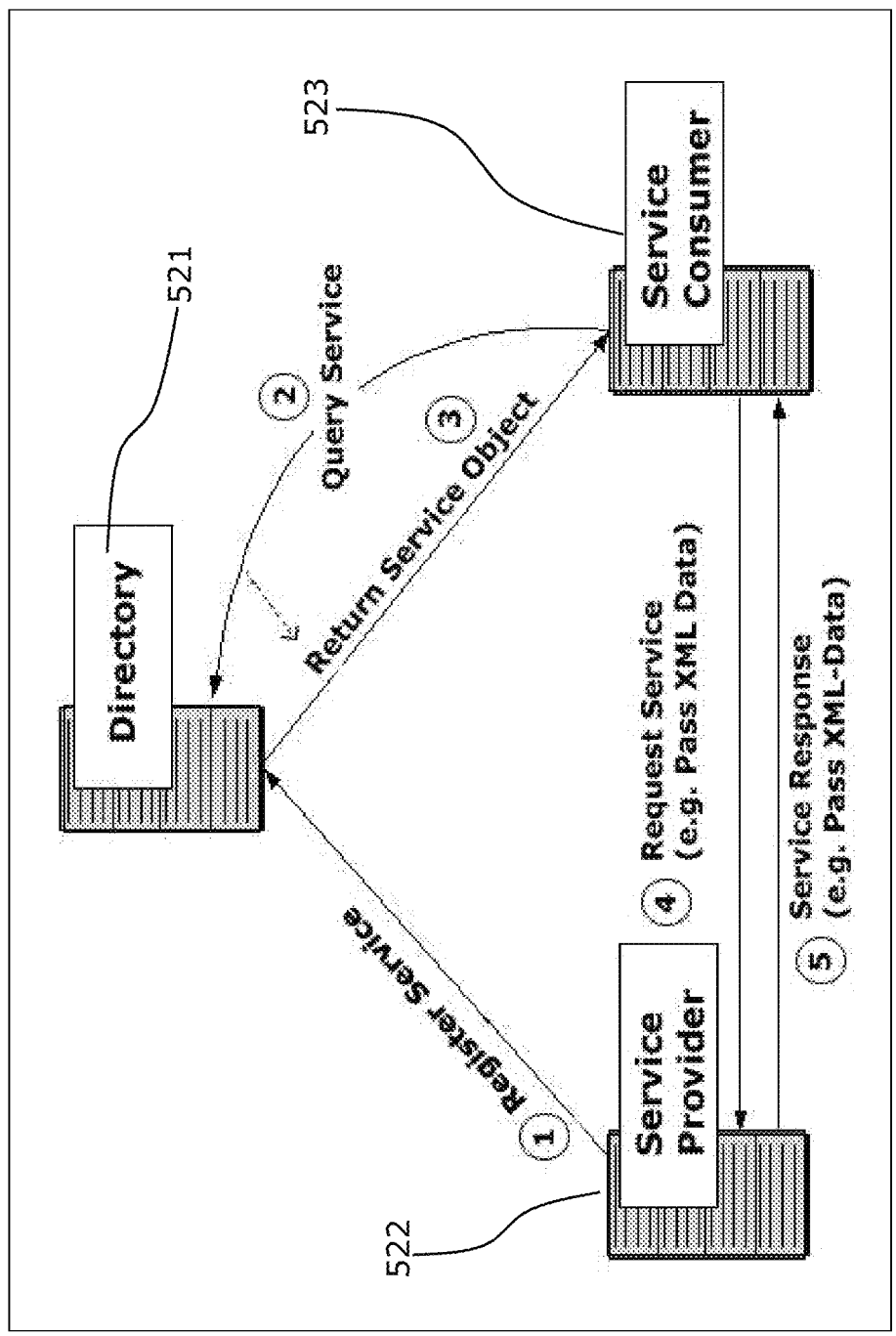
FIG. 5 shows steps for registering a service with a directory-of-services object (or Service Registration Object) and for looking up a service from the directory-of-services object (or 'DoS') and accessing the service, according to one embodiment.

In one of the embodiments, each application instantiates and initializes a shared global object of SRO 414 and makes it available globally, so that each of the modules in the application can access the SRO (i) for registering each of its services along with a lookup key associated with the service and/or (ii) to lookup each of the services it requires by using the associated lookup key. The method illustrated in FIG. 4 and FIG. 5 is a publish-and-subscribe method for directory of services. Registering each of the services implies registering a reference to a function/method (or object), where the reference can be used to call the function (or use the object) for getting the service. Each variable or function has an address in memory and an address is use for using the variables of functions. A variable can point to the address of a function, where the variable is referred to as a reference to the function and the function can be called by using the reference stored in the variable.

According to one embodiment FIG. 4 shows the code structure of an application where plural modules ((401, 402, 403) and (405, 406, 407)) are coupled through a global SRO ("Service Registration Object") 414. Each of the modules that provides one or more services 401, 402, and 403 for other modules comprises of the code (e.g. 411, 412, and 413 respectively) for registering each of its services by calling the SRO's function for registering services and passing a pre-assigned lookup key of the service and a reference to the service function/method (e.g. a pair comprising of lookup-key-of-service and service-function/method). The SRO saves the pair in a list (e.g. an array or hash-table) in the registration object 414. Each of the service-consuming modules 405, 406, and 407 comprises of the code (e.g. 415, 416, and 417 respectively) for looking up each of the registered services from the service registration object 414 by calling the service lookup function of the SRO 414 and also comprises of necessary code for getting the service.

To be specific, each module (e.g. 401) that provides a service comprises of necessary code (e.g. 411) to register the service. If the module (e.g. 402) provides one or more services, the module comprises of necessary code (e.g. 412) to register each of the services using a lookup key. Likewise, each module (e.g. 405) that consumes a service comprises of necessary code (e.g. 415) for looking up the service using the lookup key associated with the service. If a module (e.g. 406) requires one or more services, the module comprises of necessary code (e.g. 416) for looking up each service using the lookup key associated with the service and the code for getting the service. Each module (e.g. 403) that provides a service comprises of necessary code (e.g. 413) to register the service. If the module (e.g. 413) provides one or more services, the module 413 comprises of necessary code (e.g. 413) to register each of the services using a lookup key.

Likewise, each module (e.g. 407) that consumes a service comprises of necessary code (e.g. 417) for looking up the service using the lookup key associated with the service. If a module (e.g. 417) requires one or more services, the module comprises of necessary code (e.g. 417) for looking up each service using the lookup key associated with the service and the code for getting the service.

Although it is not shown in FIG. 4, it is not uncommon for a module to provide one or more services for other modules and also consume one or more services provided by other modules. If a module provides one or more services for other modules and consumes one or more services of other modules, then the module comprises of necessary code to register its services and lookup required services. After a service of a service-providing-module is registered with the SRO 414, any service-consuming module can lookup the service by calling the lookup function of SRO 414 using respective pre-assigned or associated lookup key.

FIG. 5 is a block diagram for illustrating the publishing-and-subscribing method or mechanism to couple any two modules in an application for facilitating communication between the two modules. The service-provider 522 (e.g. a module or component) registers (or publishes) a lookup key (e.g. a name) for service and a reference of the service function (or object) with the SRO (Service Registration Object), which acts as 521 Directory of Services (or DoS) by saving a reference of the service-function and associated lookup key. The service-consumer module 523 queries the SRO/DoS 521 for the service-function (or object) using the lookup key associated with the service. The SRO/DoS 521 returns a reference to the service-function (or object, if object is used for providing a service). The service-consumer 523 (e.g. a module or component) uses the reference to the service-function/object to request the service of service-provider 522, which processes the service request and sends a response. For example, SRO/DoS 521 creates a list of nodes, where each node (e.g. data record or structure having variable, where each variable can store data or information) stores or comprises of information related to a service such as lookup key for the service and reference to service function (or method), according to an embodiment. The node for each service may comprise of additional information such as communication interface and interface version etc.

According to an embodiment in OOP (Object Oriented Programming), a class 'service_register_class' is implemented so that it supports (i) at least one method to register each of the services and (ii) at least one method for lookup to get a service, if the service associated with the lookup key has already been registered. Using this simple mechanism, any component or module can register each of its service by using a pre-defined lookup key. If any other component or module needs the service, the component looks up the service using the pre-defined lookup key.

According to an embodiment, this name of the global service registration object can be agreed upon at the beginning of the design phase of the application and reserved so that the component code of plural subcomponents are implemented to register their services (e.g. using the global object for the SRO/DoS). For example, the following one-line pseudo-code illustrates including an object instance of class definition for SRO/DoS.

var MyApp_SRO=new service_register_class( );

According to another embodiment, a global or shared object ACi is created and shared with each of the modules, where ACi is an object that stores Application Context Information. The object for MyApp_SRO may be a stored global/shared object such as an ACi, where ACi is a global object that is passed and shared by each module. This ACi object is used to share data related to the application context and various global resources such as global objects, resource-files or DB-connections etc. For example, the following one-line pseudo-code illustrates saving an object instance of class definition for SRO/DoS in ACi.

Figure 17:
FIG. 17 shows a shopping cart application, where multiple modules (i.e. shopping items) communicate by calling service method of an Invoice table (of Shopping Cart module) in an application, according to one embodiment.

10. ACi. MyApp_SRO=new service_register_class( );

The module contains required communication code for registering each service with the 'SRO' with the pre-assigned name (i.e. given lookup key) of the service. For example, the following statement is used to register a service:

20. ACi. MyApp_SRO.add_service ("Shopping Cart", shopping_cart_service);

"Shopping Cart" is a lookup key and shopping_cart_service is a reference to a shopping cart service function (or object). Any module that needs this service must know the lookup name (e.g. "Shopping Cart"), and must implement the following to find or request the service:

1. Var add_to_invoice=ACi.MyApp_SRO.find_service ("Shopping Cart");
2. If (add_to_invoice !=null)
3. add_to_invoice (xml_data, callback_function);

The line-1 above calls a function, which looks through the DoS (e.g., for lookup key "Shopping Cart"), and registration object returns reference to the service, shopping_cart_service, if the lookup key is found. Line-3 calls the function by passing the xml_data (i.e. data encoded in XML format) and callback_function as parameters to the function. The service-providing component uses data in xml_data to process the request (i.e., add the item to the cart/invoice). The shopping cart component saves the reference to the function "callback_function" and notifies the service requester (i.e., the subcomponent for shopping item) by calling the callback function if the shopping item is deleted from the shopping cart later. FIG. 17 (described later) illustrates a sample shopping-cart application.

In one of the example embodiments, developers of both service-provider module and service-consumer module agree to a lookup key or name (e.g., "Shopping Cart") for each service in advance. To accomplish more complex and multi-faceted inter-component communication, the application code of service-provider module, can register a service-object (instead of a service-function) containing plural methods and variables. In response to a request, the lookup service returns reference of the service-object, which contains service methods (or functions) and variables. The requesting component then gets the service methods or callback functions, the values in the variables, and invokes appropriate actions of the services of the servicing component.

Section-F: Creating Communication Between Modules and Other Parts of an Application In a preferred embodiment of this invention for OOP (Object Oriented Programming), the process or steps include identifying multiple modules in an application where each module (i) provides one or more services for other modules or parts of the application and (ii) consumes one or more services provided by other modules or parts of the application. In method-1 or mechanism-1 according to an embodiment, each module is designed to use a 'Service Registration Object' or SRO to allow communication between the module and external parts or other modules in the application. In this mechanism, the code for the module comprises of (i)

implementing part of the communication code for registering a service-function and lookup key of the service for finding the service from the SRO for each of the services offered by the module and (ii) implementing parts of the communication code to lookup using a service name and request each of the services required by the module.

In the above method (or mechanism) for coupling modules, an application or container component instantiates and initializes object instances of multiple modules (i.e. each module is implemented by a class where its object instance is a module) for including multiple modules in the application. However, it is not necessary for the application to implement any more communication code for the modules (i.e. to allow collaboration between the modules), since each module already comprises of part of the communication code to publish or lookup services with SRO. Hence, removing a module doesn't require removing any communication code.

A module is referred to as an ideal pluggable module if the module requires manually implementing no communication code in the application. Of course, each module comprises of parts of the communication code. The communication code employs a mechanism to use SRO/DoS for allowing communication between the modules in the application. In this mechanism, according to an embodiment, each module implements a service-interface for providing its service or requesting a service of another module, where the service-interface can be a service-function or service-object.

For example, to access or request a given service of a module-X by another module-Y, module-Y requires calling the service-function of module-X by passing proper data and parameters to the service-function. If a service-object is used for the service-interface in module-X, module-Y requires using the service-object properly for requesting the service. Module-Y requires implementing code to get the reference for the service function of module-X from SRO/DoS and implement the code to call the service function by properly passing data through the parameters.

Properly plugging in each module in an application (or container component) mainly comprises of two parts (1) Instantiating and initializing an object instance of the module-class for including and using the respective module in the application (or container component), where the initialized object instance is the module, and (2) properly coupling the module with other parts of the application (in order to collaborate with other modules and parts in the application) for the module to perform its operations, where the operations include, for example, (i) the module offering any services that are required by the other parts and/or (ii) the module requiring any services offered by the other parts in order to properly perform its operations in the application.

According an embodiment, two components in an application collaborate with each other through a communication mechanism implemented for coupling interfaces of the two components. For example, when one component provides a service and the other component requires the service (or consumes the service). The component that provides a service implements an interface for providing the service, which is referred to as a "provider interface". The component that consumes the service uses the interface to consume the required service, which is referred to as a "consumer interface". It is also required for the application to comprise of a mechanism to allow collaboration between the components. For example, by implementing parts of communication code for coupling the 'provider interface' and 'consumer interface' to allow collaboration between the components.

There can be other kinds of interfaces. For example, two components in an application collaborate with each other through a communication interface where a first component sends some data or a notification of an event and a second component processes the data or event (and may return results or responses to the first component through the interface). The first component that provides data or events implements an interface for providing the data or event. The second component that processes the data or event implements an interface.

To make it fit the general model, one interface may be referred to as a 'listener interface' (or 'provider interface') and the other interface may be referred to as a 'caller interface' (or 'consumer interface'). In this context, 'provider interface' might not provide a service and 'consumer interface' might not consume a service. The two interfaces in the first and second component respectively can be designed to properly complement each other to allow proper collaboration between the two coupled components, by exchanging events or data (e.g. results or response), for example. To speak in broader terms, a first module-X provides a function-X for other modules to communicate with module-X. Another module-Y can communicate or collaborate with module-X by properly passing parameters for function-X and calling function-X. In this disclosure, function-X is generally referred to as service function of module-X. In general, function-X may be facilitating collaboration between module-X and module-Y.

Therefore, if two components (or modules) in an application are required to collaborate with each other, each component must implement an interface where the two interfaces in the two components can be designed to properly complement each other (for coupling by implementing communication code) to allow proper collaboration between the components, according to an embodiment. It is also required for the application to comprise of a mechanism to allow collaboration between the components, by implementing communication code to couple the two interfaces of the two components to allow collaboration between the components, for example. According to an embodiment, a method for allowing collaboration between two modules in an application requires (1) a first module-X implementing a provider-interface (e.g. a part for communication code) by implementing a service function, and the code to register the service function with SRO/DoS and (2) a second module-Y to implement code to obtain a reference of the service function and consumer-interface (e.g. other part for communication code) to call the service function (e.g. using its reference stored in a local variable) by passing data properly in the parameters of the service function.

FIG. 6a and FIG. 6b illustrate steps 600 and 620 for including 2 modules in an application in OOP (Object Oriented Programming) without using SRO/DoS mechanism, according to an embodiment. The first step for including each module in an application comprises of including an instance of an object by using a class designed and implemented for providing functionality or features of the module. The second step comprises of creating communication code for the module for allowing collaboration between the module and other parts of the application. Step 601/621 of FIG. 6a/6b includes a module Mod1 and assembles the module as sub-component to a container component. Another step 602/622 of FIG. 6a/6b includes a module Mod2 and assembles the module as sub-component to a container component. Final step 603/623 of FIG. 6a/6b implements communication code for the modules to allow collaboration between the modules and other parts/modules in the application. For example, necessary communication code 603 is implemented if Mod1 and Mod2 are required to collaborate with each other.

FIG. 7 illustrates a simple mechanism for allowing collaboration between two modules (e.g. a first module Module-1 710 and a second module Module-2 720) by using SRO/DoS mechanism, according to an embodiment. The code implemented for first module (i.e. Module-1) 710 comprises implementation for a service-function 711 for each of the services provided by the module. Any other module that requires this service is required to call this service-function 711 by passing parameters properly, where the parameters comprise of information for exchanging data between the modules. This first module Module-1 710 also comprises of code 712 for registering the service function (e.g. Module1→Module1ServiceFunction) with the SRO/DoS by using a unique pre-defined lookup key (e.g. "Service-X of Module1"). The code implemented for second module (i.e. Module-2) 720 defines a variable 721 RefForModule1Service to store the reference of a service function to request a service required by the Module-2 720. The code implemented for second module (i.e. Module-2) 720 also comprises of code-block 722 for finding the reference for the service-function (at line 2 of code block 722) by using SRO/DoS and stores the reference in the variable (declared in 721). The code-block 723 for module-2 calls the service-function (by using the variable 721 that has reference for the service-function 711) for requesting the service.

A communication interface between a first service-provider module (e.g. module-1 710 in FIG. 7) and a second service-consumer module (e.g. module-2 720 in FIG. 7) has two parts. For example, if a service-provider module-1 implements a service function 711 Module1ServiceFunction, and if the function 711 requires 3 parameters of types String, Integer, and Integer respectively, where this part of interface is referred to as "service-provider interface" (i.e. a part of the interface implemented in the service-provider). Any module 720 (e.g. module-2) that requires this service must call this function Module1ServiceFunction by passing the 3 parameters. According to an embodiment, this service function is called in 720 module-2 (that requires the service) by using a reference stored in a variable 721 RefForModule1Service and using the reference 723 for requesting the service by passing three parameters of types String, Integer, and Integer respectively, where this part of interface is referred to as "service-consumer interface". Here, the "service-provider interface" and "service-consumer interfaces" are complimentary part of the interfaces for coupling the two modules so they can collaborate with each other. A communication coupling (or coupling/link in short) between any two modules requires two complementary interface parts "service-provider interface" (a first part) and "service-consumer interfaces" (and a second part), according to an embodiment.

The main difference between prior-art and the invention disclosed in this patent is illustrated by FIG. 6a and FIG. 7, according to an embodiment: In prior-art, communication code 603 to allow collaboration between any two modules is manually implemented outside of the modules. According to one embodiment of this invention, parts of the communication code (e.g. 712, 721 and 722) are implemented within the code for each of the modules by using a mechanism such as SRO/DoS 414 or 800 in FIG. 8. Hence, there is no need for implementing any communication code for each of the modules in the code of the application (outside of the modules) if the module is a pluggable module (e.g. 601 or 602).

Figure 8:
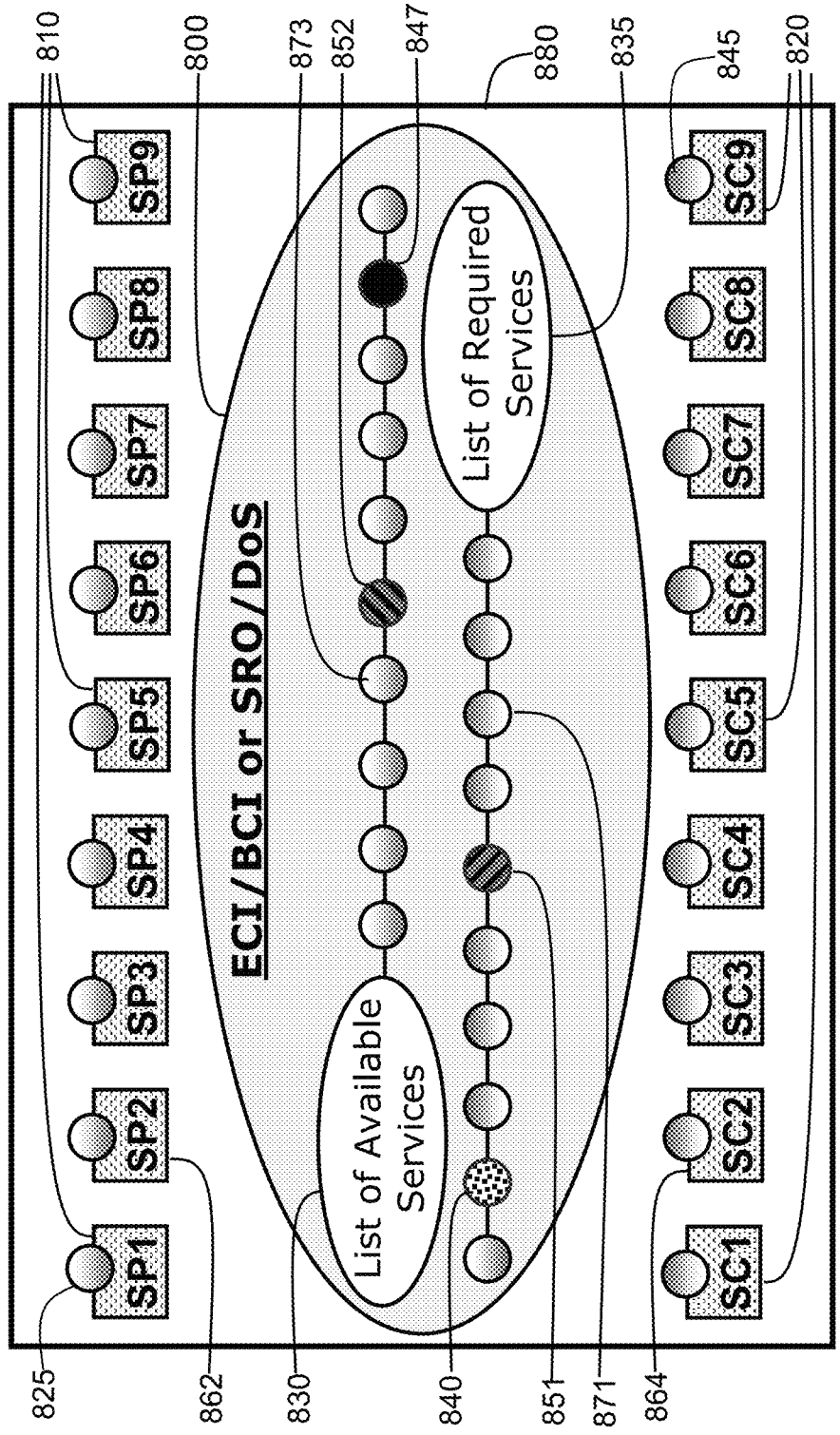
FIG. 8 shows a first set of modules that provide services and a second set of modules that require services, (a kind of SRO/DoS) comprising two lists, where (i) a list comprising necessary information for all the required services for all the modules and/or parts, and (ii) another list comprising necessary information for all the services provided by all the modules and/or parts, wherein the ECI/BCI uses the information in the lists for creating, managing dependencies, and validating communication interfaces of modules, according to one embodiment.

Section-G: A Mechanism for Managing and Validating Dependencies Between the Modules An application can be created by plugging in many modules as shown in FIG. 8, according to an embodiment. Plural Modules 810 (SP1, SP2, SP3, SP4, SP5, SP6, SP7, SP8, and SP9) offer one or more services for other modules, components, or parts. Likewise, plural modules 820 (SC1, SC2, SC3, SC4, SC5, SC6, SC7, SC8, and SC9) depend on one or more services offered by other modules (e.g. 810). Each of the modules in the application uses mechanism comprising SRO/DoS 800 for collaborating with the other. For example, if one of the modules is removed (or replaced), it is desirable to detect what kind of impact it would have. It is thus desirable to have a tool for automatically detecting broken dependencies (or incompatible interfaces, when a module is replaced) between any two modules. During the initialization of the application, each of the modules registers each of its services with the Service Registration Object ("SRO") 800. Likewise, each of the modules registers each of the required services that the modules require (or depends on) with the SRO. That is, if a module SC3 requires a service provided by another module (e.g. SP5 or SP7), then SC3 registers the required service by using a unique lookup key associated with said service.

In an embodiment in OOP, each pluggable module in an application registers itself with SRO (e.g. 800) when the module is being constructed or instantiated. The SRO builds a list of all the registered pluggable modules. The SRO 800 goes through the list of registered pluggable-modules and calls its abstract function 'register_all_services_provided' 912 in code listing 910 and builds a list 830 of all the available services. Every module in the list of registered pluggable modules that provides one or more services registers each of its services with the SRO. Then the SRO 800 goes through the list of registered pluggable modules again and calls its abstract function 'lookup_all_services_required' 921 in code listing 920 and builds a list 840 of all required services. Every module in the list of registered pluggable modules that requires one or more services registers each of the required services with the SRO. Each pluggable module saves the reference for each external service function in a local variable as shown at line 3 and 4 in code listing 920 of function 921, and calls the service function (by using the variable, which has the reference for the service function, whenever it needs to request the service).

The SRO 800 builds a list 830 for set of all available services and a list 840 for set of all required services, according to an embodiment. After the initialization of the application, the SRO 800 compares the two lists, matches each of the required services in the list 840 with the available services in the list 830, and creates a diagnostic report showing all mismatches. The SRO 800 also detects errors and/or possible errors or warnings such as (i) a service 835 required by a module 864 is not available, (ii) an available service 847 provided by a module 862 is not used, and (iii) an interface for available service 852 and the interface used for requesting the service 851 are not compatible (e.g. a mismatch in number of parameters or mismatch in the type of one or more parameters). Missing services and incompatible services are considered dependency or interface problems. Those problems may arise after one of the service-provider interfaces in a service-providing module 862/SP2 is updated while service-consumer interfaces in one of the dependent modules is not updated accordingly. The unused services are removed during the cleanup (e.g. refactoring) of the application code, according to one embodiment. In general, unused services is not an error, because a module (e.g. from a component vendor) may provide multiple services but only a subset of the services provided are needed in an application. In such cases, only warning or information messages are created.

The SRO 800 is used to facilitate communication between two components (or pluggable modules). For example a service-providing module 862/SP2 provides a service and a service-consuming component 864/SC2 requires the service. Service-providing component (862/SP2) registers a service function using a predefined service lookup key (e.g. such as name "Shopping Cart Type3") with the SRO 800. Service-consuming component 864/SC2 calls the SRO's lookup method for finding the service function by using the predefined service lookup name (i.e. "Shopping Cart Type3"). The name of the service and service provider interface of the service function must be defined in advance of designing the two components (862/SP2 and 864/SC2) so that the service-consumer components are implemented to communicate with each other properly (by passing the right number of parameters and the right type of parameters). Similarly, the service providing module 825/SP1 provides a service and the service consuming component SC1 requires the service. The service-providing module 825/SP1 registers a service function using a predefined service lookup key (e.g. such as name "shopping cart type3") with the SRO 800. Service-consuming component SC1 calls the SRO's lookup method for finding the service function by using the predefined service lookup name (i.e. "Shopping Cart Type3").

According to an embodiment, the interface of a service function comprises of service version, type of the object returned by the service function, number of parameters, and content type of each parameter of the service function. The service-providing component 862/SP2 is designed to include additional information about the interface 852 and a unique ID for the component (e.g. its Class name) when registering service function with SRO 800. The service-consuming component 864/SC2 is designed to include additional information about the interface 851 and a unique ID for the component when it calls SRO's method for lookup or at the time of initialization. The SRO 800 is designed to store all this information for each of the required or available services in a node and use the additional information in nodes 851 and 852 to detect incompatible communication interface (e.g. if one of the two modules is redesigned and the other component is not updated accordingly). According to an embodiment, the additional information describing each service-provider interface and each service-consumer interface includes the number of parameters and the type of each of the parameters etc.

Each module may offer one or more services and also consume one or more services of other components. The sets of services in the two lists of SRO 800, a set of available services in list 830, and a set of required services in list 840, can be used for building tools or utilities such as (a) an utility for finding all the other components that depend on a given service of a component; or (b) a utility for graphically displaying (e.g. for documentation) each component as a node in a network map and connection lines between the components as dependencies (the image is referred to as a component dependency map). Each of the components or nodes on the map may be a hot-link (i.e. like an Hyper-text link) for opening a new window that displays services that the component provides or consumes or a list of components that consume or provide each of the services. The SRO 800 may create a file containing the lists 830 and 840 upon exiting the application or on a given event such as clicking on a designated button. A tool is built to read the lists from the file to display the component dependency map (e.g. creating visual representation or documentation), according to an embodiment. According to another embodiment, a tool is built to read the lists from the file to generate communication code for the modules, where the communication code can allow communication between the modules. This is an effective tool for creating documentation for interfaces and/or dependencies between the modules and for each of the modules.

An application may implement two service registration objects, DoS1 and SRO2. Here, DoS1 (FIG. 4, FIG. 5) is for facilitating communication between each of the service-consuming components and each of the service-providing components in the application like the method discussed above. The second SRO2 is for managing dependencies between service-consuming components and service-providing components by building the lists. To allow for managing dependencies, each of the pluggable modules in the application also separately registers (i) each of the services it offers along with information about the communication interface and (ii) each of the services it needs along with information about the communication interface with the SRO2 (FIG. 8).

The SRO2 uses the information about the communication interfaces for managing dependencies by (i) detecting incompatible communication interface between any two components or (ii) finding all the communication interfaces of a component. This second SRO/SRO2 is different in that it has storage space for accepting information about communication interfaces for each service entry and a method for adding service with interface information. In addition, this second SRO also has the code necessary for finding all communication interfaces for a component, the code for comparing whether a required service is missing from the available services list, and the code for comparing whether the communication interface of a requested service is same as the communication interface of an available service.

If it is required to increase performance by eliminating overhead costs of service registrations and service lookups needed for using SRO 800, it is possible to design the lists 830 and 840 for getting information for the service interfaces from service-providing modules and service-consuming modules in an application. Then it is possible to design the SRO 800 to create dependency maps or communication code, according to one embodiment. The dependency maps are used for generating necessary communication code for some of the modules, where the communication code is included in the source code of the application to allow collaboration between the components, according to an embodiment. In one exemplary embodiment the communication code comprises of instructions for getting reference for service function from service-providing modules and inputting the reference of the service function into service-consuming modules (Ref to 603 of FIG. 6*a*).

FIG. 8 illustrates a sample generic tool (i.e. SRO 800) for creating and managing the coupling for each of the modules and between the modules in an application. It is also possible to use domain specific methods and tools for creating and/or managing couplings between the modules in an application belonging to a given domain. Such domain-specific tools can be more efficient, for example, by leveraging the knowledge of each domain. For example, if it is possible to enumerate multiple essential services of a given domain at the time of design, a fixed or pre-defined location can be assigned to each of the services in a global array of services for storing respective service objects (and other information) for each of the services. For example, a domain-specific tool for compilers can directly index each of the services to process each kind of expression (e.g. while-loop-block, for-loop-block or if-block).
10. #define WHILE EXPRESSION 7
20. #define FOR EXPRESSION 8
30. #define IF EXPRESSION 9

According to an embodiment, for example, it is possible to pre-define a fixed location to save a service object (or service function) for each of the essential services of the applications in the domain as above. Then, service objects for each of the services can be stored at pre-defined locations in a global array (or a shared object) to store services. In this case, the global array or list for storing available services acts as SRO/DoS (where each available service is stored at a location using a predefined index as a lookup-key) and the index acts as lookup-key to find a required service by another module that requires the service. For example:
10.      Global_Service_Array[WHILE_EXPRESSION] .Service_Version=X.21;
20.      Global_Service_Array[WHILE_EXPRESSION] .Service_Object=Service_Object_To_Compile_WhileLoop;

This service can be accessed from anywhere in the application by using the pre-defined location (i.e. index) and the global array (or object passed through shared object instance of AC_info). The application can use SRO 800 or other kinds of global/shared objects for registering other miscellaneous services to facilitate communications between modules and parts in the application. Any application can use multiple global/shared tools (e.g. objects or arrays) and/or methods to facilitate and/or manage couplings between various modules and parts in the application. In another embodiment, the reference functions are stored in a Global_Service_Array dynamically by either the compiler or the code generated by SRO/DoS. Each data node in the sets or lists 830 and 840 comprises of necessary information for generating communication code. According to an embodiment, the SRO/DoS 800 traverses the list 840 and generates communication code between each module that requires a service and the module that provides the service. For example, if module SP2/862 registers 873 a service required 871 by SC2/864 and module SP2/862 can provide and registers the service 873, which is required by SC2/864. The SRO/DoS uses the information in nodes 871 and 873 for generating necessary communication code to allow collaboration between the modules SC2/864 and SP2/862.

FIG. 8 illustrates a sample generic tool 800 ECI (Exchange for Communication Interfaces) or BCI (Broker for Communication Interfaces) to create and manage coupling for and between each module in an application. According to an embodiment, ECI/BCI implements a variation of SOA (Service Oriented Architecture) that has either a DoS (Directory of Service) or an SRO (Service Registration Object). SOA allows communication between applications (referred to as components), where DoS allows (i) applications that provide services to register these services and (ii) applications that require services to look for services. SOA is used to allow collaboration between components, where each component is an independent executable (e.g. application) and these executables may be running on different computing devices and communicating over Internet or Network. Present invention uses ECI/BCI to facilitate communication between coupling interfaces 810 and 820 implemented within modules or objects that are part of an application (i.e. single executable). Interfaces are implemented as service provider interfaces 810 and service consumer interfaces 820, according to an embodiment. Interfaces are implemented as listener interfaces 810 and caller interfaces 820, according to another embodiment.

The ECI/BCI creates lists 830 and 835 for multiple interfaces and finds each pair of interfaces having a "Symbiotic Relationship" with each other by using a look-up key, according to an embodiment. For example, if interface 845 requires connecting to 825 to exchange data or to communicate, then there is said to exist a "Symbiotic Relationship" between interface 825 and interface 845. According to an embodiment, a unique look-up key is given to a first interface that is in the "Symbiotic Relationship" with a second interface, and the second interface uses the look-up key to find the first interface using ECI/BCI. In other words, ECI/BCI uses the look-up key to match each pair of interfaces that are in a "Symbiotic Relationship", to facilitate communication between the two interfaces, for example.

According to another embodiment, a mechanism comprising pre-processor (e.g. refer to as Arjun that is described below), is used to create communication code that constructs the array of services by storing or registering each of the services at a index-location determined using an algorithm and pre-defined rules (e.g. for finding each required service at an index-location that can be determined using the algorithm and pre-defined rules). That is, each service is stored at an index-location determined by employing combination of set of pre-defined rules and set of algorithms. The service can be accessed by another module that requires the service using an index that is calculated by using same combination of set of pre-defined rules and set of algorithms. Certain information or knowledge about each service is used as seed/key for applying the set of pre-defined rules and set of algorithms for calculating the index (i) to store the service and (ii) to find the service. The communication code is created on or before compile time of the application. The Array of services acts as the SRO (an Object for Registering Services) and the indexes are used as lookup-keys at run-time for accessing services.

FIG. 9 shows pseudo-code for an example embodiment of a pluggable module which comprises of implementation of two functions: (1) code section 910 comprises implementation of a function 912 'register_all_services_provided' and (2) code section 920 comprises implementation of another function 921 'lookup_all_services_required'. These two functions are implemented in the construction code of class definition for each pluggable module, according to an embodiment in OOP. Here, function 912 'register_all_services_provided' registers each of the services provided by the module with SRO/DoS 800. And function 921 'lookup_all_services_required' looks up all the services required by the module. If this module offers three services, then this function 912 registers each of the services by making a call to register each service. For example, line-5 in 910 registers a service provided by this module with the SRO/DoS. If this module requires two services offered by other modules, then this function 921 looks up each of the services (e.g. making a call to get the reference to the function that can be called to get the service). For example, line-3 in 920 looks up for a service required by this module from the SRO/DoS and stores the reference of the service function in a local variable "Reference1".

Figure 12:
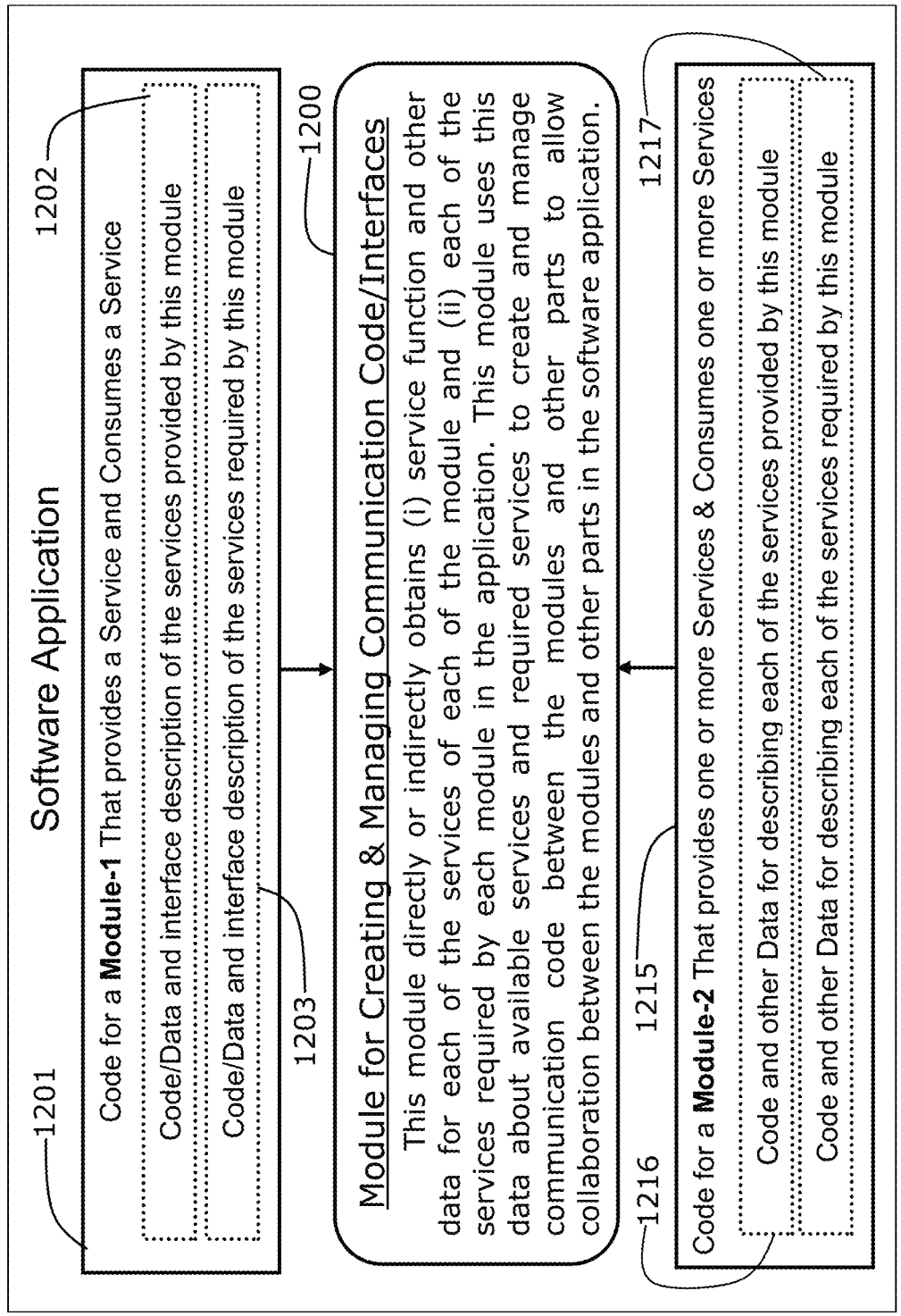
FIG. 12 shows modules, where each module comprises of necessary information about services required and services provided, where the information is used for creating necessary communication code and managing the communication code (e.g. by detecting broken communication code), according to one embodiment.

FIG. 12 shows two modules (i.e. 1201/Module-1 and 1215/Module-2), where Module-1/1201 provides a service and consumes a service. So, (i) it comprises of code and/or information 1202 for the service provided by Module-1/1201, and (ii) it comprises code/or and information 1203 for the service required by Module-1/1201. Furthermore, 1215/

Module-2 provides one or more services and consumes one or more services. So (a) it comprises of code and information 1216 for each of the services provided by Module-2/1215, and (b) it comprises of code and information 1217 for one or more services required by Module-2/1215. According to an embodiment, a mechanism 1200 is designed for (1) getting the data or information for each of the required services for building a list of required services (e.g. 840) and (2) getting the data or information for each of the available services for building a list of available services (e.g. 830). The mechanism 1200 is also designed to generate communication code to allow communication or collaboration between a module that requires a service and another module that provides the service by using the lists (e.g. 840 and 830), according to an embodiment.

Figure 10:
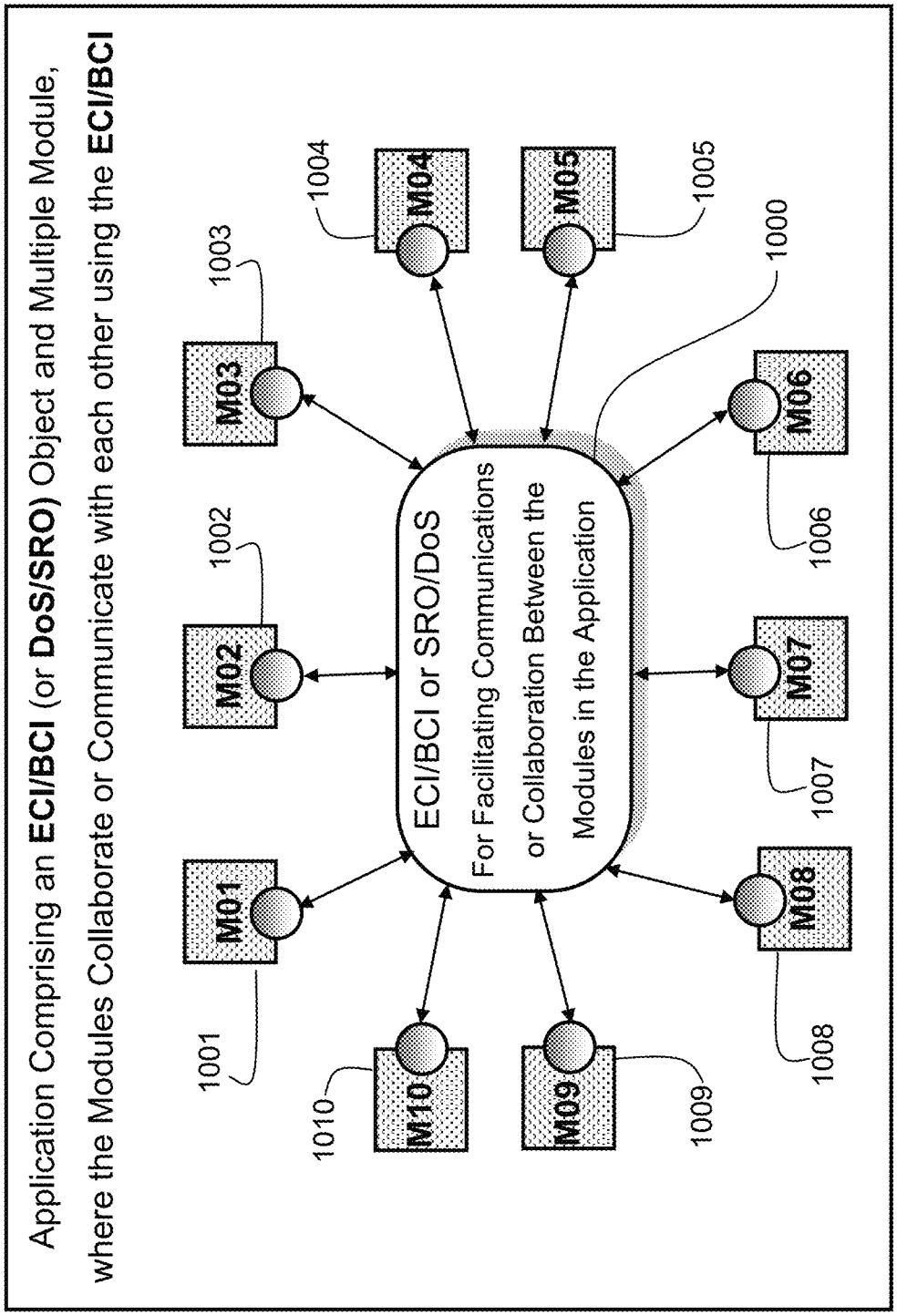
FIG. 10 illustrates a sample application comprising multiple modules, where the multiple modules are collaborating or communicating with each other by using DoS/SRO, according to one embodiment.

FIG. 10 shows 10 pluggable modules (e.g. 1001, 1002, 1003, 1004, 1005, 1006, 1007, 1008, 1009 and 1010) in an application collaborating with each other by using SRO/DoS 1000, according to an embodiment. For example, a module (e.g. M09/1009) in an application may provide one or more services for other modules (e.g. M07/1007, M05/1005 and M03/1003) in the application and consume one or more service provided by other modules (e.g. M04/1004 and M01/1001). According to an embodiment, the module (e.g. M09/1009) registers each of the services (provided by the module M09/1009) with SRO/DoS 1000 along with necessary information for generating communication code. If module M07/1007 uses the service, then M07/1007 registers the required service with SRO/DoS 1000 along with necessary information for generating communication code. The SRO/DoS 1000 uses this information provided by the modules M09/1009 and M07/1007 to generate few lines of communication code or instructions to allow collaboration between the modules M07/1007 and M09/1009, according to an embodiment. That is, SRO/DoS 1000 is designed to generate few lines of communication code for creating each coupling link between a module that provides a service and another module that requires said service. For example, a module (e.g. M02/1002) in an application may provide one or more services for other modules (e.g. M06/1006, M08/1008, and M10/1010) in the application and consume one or more service provided by other modules (e.g. M04/1004 and M01/1001). According to an embodiment, the module (e.g. M02/1002) registers each of the services (provided by the module M02/1002) with SRO/DoS 1000 along with necessary information for generating communication code.

Figure 11:
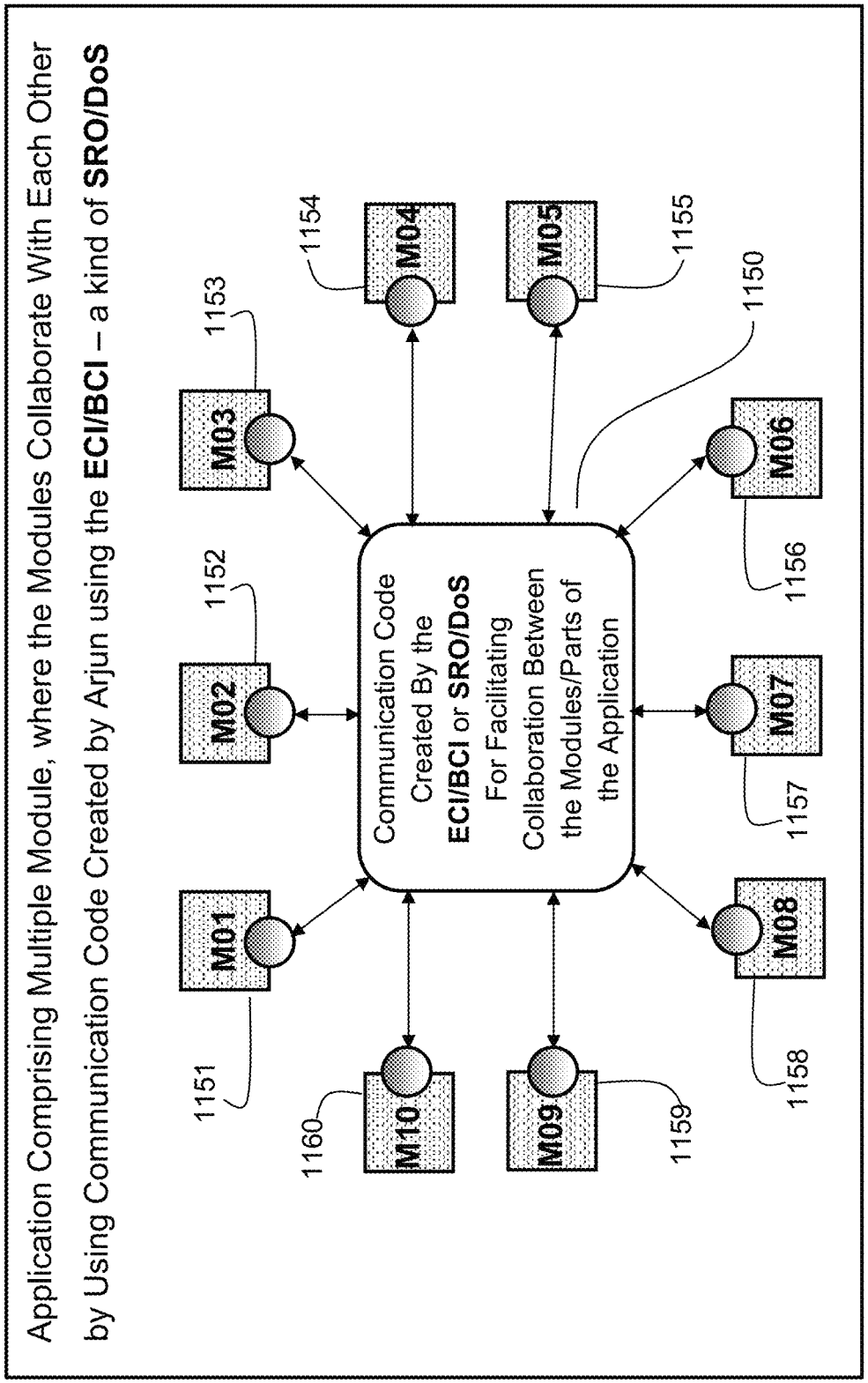
FIG. 11 illustrates a sample application comprising multiple modules, where the multiple modules are collaborating or communicating with each other by using communication code created by the DoS/SRO (not shown here but shown in FIG. 9), according to one embodiment.

FIG. 11 shows 10 modules (e.g. 1151, 1152, 1153, 1154, 1155, 1156, 1157, 1158, 1159, and 1160) in an application collaborating with each other by using communication code generated by SRO/DoS 1150, according to an embodiment. For example, a module (e.g. M09/1159) in an application may provide one or more services for other modules (e.g. M07/1157, M05/1155 and M03/1153) in the application and consume one or more service provided by other modules (e.g. M04/1154 and M01/1151). According to an embodiment, the module (e.g. M09/1159) registers each of the services (provided by the module M09/1159) with SRO/DoS 1100 along with necessary information for generating communication code. If module M07/1157 uses the service, then M07/1157 registers the required service with SRO/DoS 1100 along with necessary information for generating communication code. The SRO/DoS 1100 uses this information provided by the modules M09/1159 and M07/1157 to generate few lines of communication code or instructions to allow collaboration between the modules M07/1157 and M09/1159, according to an embodiment. That is, SRO/DoS 1100 is designed to generate few lines of communication code for creating each coupling link between a module that provides a service and another module that requires said service. For example, a module (e.g. M02/1152) in an application may provide one or more services for other modules (e.g. M06/1156, M08/1158, and M10/1160) in the application and consume one or more service provided by other modules (e.g. M04/1154 and M01/1151).

According to an embodiment, the module (e.g. M02/1152) registers each of the services (provided by the module M02/1152) with SRO/DoS 1100 along with necessary information for generating communication code. According to an embodiment, the SRO/DoS (i.e. 800 in FIG. 8 or 1000 in FIG. 10) creates two lists as illustrated in FIG. 8, where one list 840 of data nodes is for all the required services and the other list 830 is of data nodes for available services. Each data node in the lists 830 and 840 comprises of necessary information for generating communication code. According to an embodiment, the SRO/DoS 800/1000 traverses the list of required service 840 and generates communication code between each module that requires a service and another module that provides the service. For example, if module SP2/862 registers 873 a service required 871 by SC2/864 and module SP2/862 can provide and registers the service 873, which is required by SC2/864. The SRO/DoS 1000 uses the information in nodes 871 and 873 for generating necessary communication code to allow collaboration between the modules SC2/864 and SP2/862. According to an embodiment, this communication code 1150 generated by SRO/DoS 800 is used for replacing SRO/DoS 1000 for allowing collaboration between the modules in the application.

One of the preferred embodiments include: If a module SP2/862 provides one or more services, then the module registers each of its services with the SRO 800 by using a unique lookup key and a reference of a function (or method), where the function (or method) may be called (e.g. by other modules) for getting/requesting the service. If another module SC2/864 requires the service, the other module uses the unique lookup key to find the function from the SRO 800 and calls the function (or method) for getting the service. For example, if module-M07/1007 provides a service, it registers a function (or method, which can be called to request the service) and a unique lookup key with the SRO 1000 (or 800) to find the service function (or method). If module-M03/1003 needs to request the service provided by the modules-M07/1007, then module-M03/1003 calls the SRO 1000 (or 800 in FIG. 8) using the lookup key to find and call the function for getting the service provided by the modules-M07/1007 (see FIG. 10).

Figure 13:
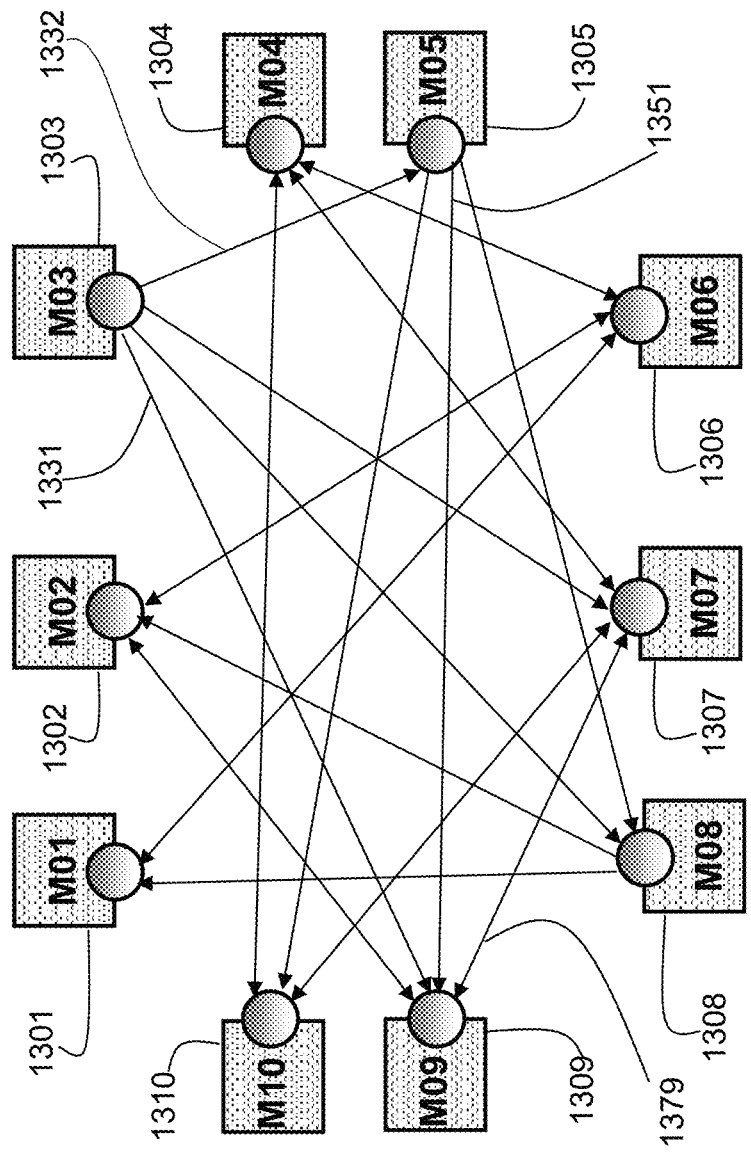
FIG. 13 shows multiple modules in an application and communication dependencies (or links) between the modules are shown using arrows between the modules, where the communication code/links (or dependencies) are created today manually, but can be created by the DoS/SRO (not shown here but shown in FIG. 9), according to an embodiment.

FIG. 13 shows communication links (or dependencies) between modules (M01/1301, M02/1302, M03/1303, M04/1304, M05/1305, M06/1306, M07/1307, M08/1308, M09/1309, and M10/1310) in an application, according to an exemplary embodiment. The arrows connecting modules in FIG. 13 represent the communication code 1150 for couplings generated by SRO/DoS 1000 in FIG. 10. If module-M03/1303 needs to request service of modules M05/1305 and M09/1309, then the SRO 1000 generates necessary communication code (i.e. link 1332) to allow collaboration between module-M03/1303 and module-M05/1305, and generates necessary communication code (i.e. link 1331) to allow collaboration between module-M03/1303 and module-M09/1309. If module-M05/1305 needs to request services of modules-M09/1309, then the SRO generates necessary communication code for coupling 1351 to allow collaboration between module-M05/1305 and module-M09/1309. If module-M08/1308 needs to request service of modules M01/1301 and M02/1302, then the SRO 1000 generates necessary communication code to allow collaboration between module module-M08/1308 and module-M01/1301, and generates necessary communication code to allow collaboration between modules-M8/1308 and M02/1302.

With reference to FIG. 13, if module-M05/1305 needs to call modules M10/1310 and M08/1308, then the SRO 1000 generates the necessary communication code to allow collaboration between module-M05/1305 and module-M08/1308, and also the necessary communication code to allow collaboration between module-M05/1305 and module-M10/1310. If module-M07/1307 needs to call module-M09/1309 and also registers a callback for module-M09/1309 to call back module module-M07/1307, then the SRO 1000 generates necessary communication code 1379 to allow two-way collaboration (shown by two-sided arrow) between module-M07/1307 and module-M09/1309. If module-M07/1307 needs to call modules-M09/1309, M10/1310, M04/1304 and also registers a callback for modules M09/1309, M10/1310, M04/1304 to call back module module-M07/1307, then the SRO 1000 generates necessary communication codes to allow two-way collaborations (shown by two-sided arrows) between module-M07/1307 and module-M09/1309, module-M07/1307 and module-M10/1310, M07/1307 and module-M04/1304. If module-M06/1306 needs to call modules-M01/1301, M02/1302, M04/1304 and also registers a callback for modules-M01/1301, M02/1302, M04/1304 to call back module module-M06/1306, then the SRO 1000 generates necessary communication codes to allow two-way collaborations (shown by two-sided arrows) between module-M06/1306 and module-M01/1301, module-M06/1306 and module-M02/1302, module-M06/1306 and module-M04/1304. If module-M05/1305 needs to request services of modules-M03/1303, then the SRO 1000 generates necessary communication or coupling code to allow collaboration between module-M05/1305 and module-M03/1303. If module-M05/1305 needs to call modules M03/1303 and M08/1308, then the SRO 1000 generates necessary communication to allow collaboration between module-M05/1305 and module-M03/1303, and generates necessary communication code to allow collaboration between module-M05/1305 and module-M08/1308.

If module-M03/1303 needs to request services of modules-M07/1307 and the DoS/SRO 1000 type mechanism is not used, then it is required to manually implement necessary communication code in the code of the application to allow collaboration between module-M03/1303 and module-M07/1307. If module-M03/1303 needs to request services of modules-M05/1305 and module-M09/1309 (and the SRO type mechanism is not used), then it is required to manually implement necessary communication code to allow collaboration between module-M03/1303 and module-M05/1305 (today, according to prior art), and it is also required to manually implement necessary communication code to allow collaboration between module-M03/1303 and module-M09/1309 (today, according to prior art). However, it is possible to eliminate the requirement of manually implementing the communication code in the application to allow collaboration between any two modules either (i) by using the SRO type mechanism or (ii) communication code generated by the SRO/Arjun type mechanism.

Today, in prior art, the communication code for each module (e.g. module-M03/1303) is manually included in the code of the applications. If it is required to remove module-M03/1303, then it is required to manually remove the communication code associated with module-M03/1303. An ideal pluggable module is defined as a module that doesn't require manually implementing communication code. The mechanism comprising SRO/DoS or Arjun aids and helps in managing or maintaining the dependencies of each pluggable module by reducing the effort required for redesigning or changing the module, according to an embodiment. For example, such tools (e.g. SRO/DoS or Arjun) provide better insights into each of the dependencies between any two modules and the dependencies between the pluggable modules in an application, according to an embodiment. In the context of the claims of this invention, a module that relies on mechanism comprising SRO/Arjun for communication code is considered a pluggable module, because it is virtually plugged into SRO/Arjun for coupling with other modules or parts in the application.

Figure 14:
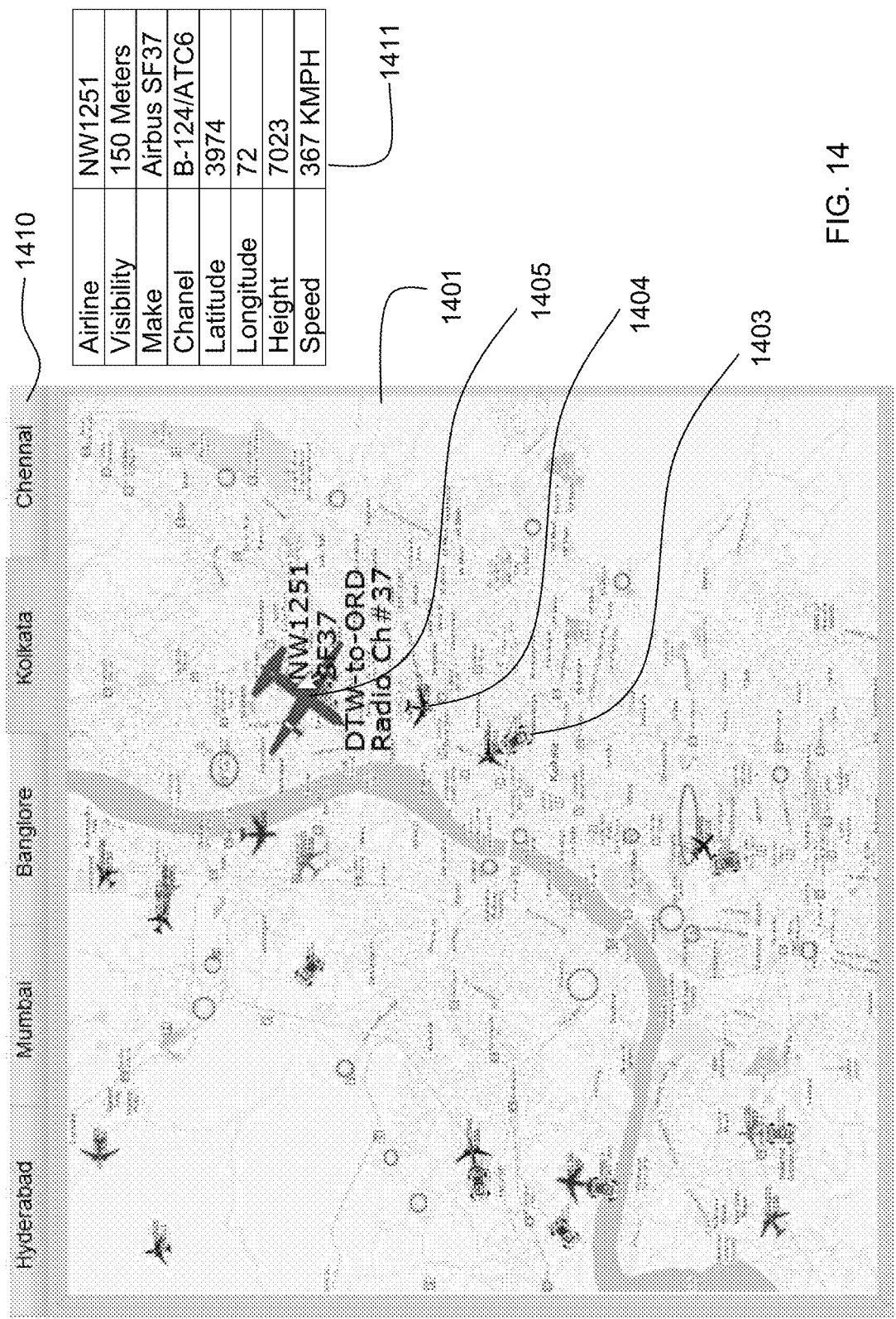
FIG. 14 shows an image of City GIS (Geographical Information Systems) application for multiple cities, where each city has sub-components (or sub-modules) such as ATC (Air Traffic Control System) and monitoring of Ambulances of ER (Emergency Response), according to one embodiment.

Section-H: Example for Building CityGIS Application by Using Pluggable Modules/Components FIG. 14 shows a Geographical Information System ('GIS') application 1410 for multiple cities in a TAB GUI-component, according to an exemplary embodiment. In the FIG. 14, tab for Kolkata is selected, so City-GIS for Kolkata 1401 (street map) is shown (while the City_GIS for other cities are being hidden). The GIS for each city (i.e. City-GIS) is built by using three pluggable components/modules (as illustrated in pseudo-code FIG. 15): (i) city map for streets 1401 comprising vector drawings such as streets and canals, (ii) emergency services that shows current locations and movement of Ambulances 1403, and (iii) Air Traffic Monitoring system that shows current locations and movement of Airplanes 1404. When mouse is moved over an Airplane, the image is enlarged as shown 1405. If mouse is clicked on an Airplane (or Ambulance), latest information for the Airplane 1405 is displayed in a table 1411.

FIG. 15 shows a sample pseudo-code 1510 for including three pluggable components (or modules) in an OOP, according to an embodiment. The lines 5 and 6 in dotted box 1511 includes a pluggable component for presenting a street map for a city 1401, whose zip-code is passed as a parameter. The lines 13 and 14 in dotted box 1513 include a pluggable GUI component for presenting emergency response system (i.e. location of Ambulances 1403) on the street map (which is included already), whose zip-code is passed as a parameter. The lines 17 and 18 in dotted box 1514 include a pluggable GUI component for presenting Air Traffic Monitoring system on the street map 1404 (which is included already), whose zip-code is passed as a parameter. This code also includes another pluggable module for City-Landmarks at line 9 and 10, but disabled by commenting out the code in lines 9 and 10 in dotted box 1512.

All three GUI components (i.e. Street Map, Ambulances, and Air Traffic) overlap each other so each component (and its subcomponents, if any) must be drawn on a canvas with a transparent background except the component CityMap 1401. If there is a need for adding new overlaying features, additional pluggable components are created and added to the application. For example, if later it is required to add landmarks (e.g. Hotels, Theaters, and Tourist Spots) to CityGIS, it is possible to create a class (e.g. CityLandmarks_Module) as a pluggable module to include at line 9 and 10 in 1512. If this module is placed at line 19, then the landmarks would be shown on top of the Airplanes (in most GUI-platforms).

Figure 27:
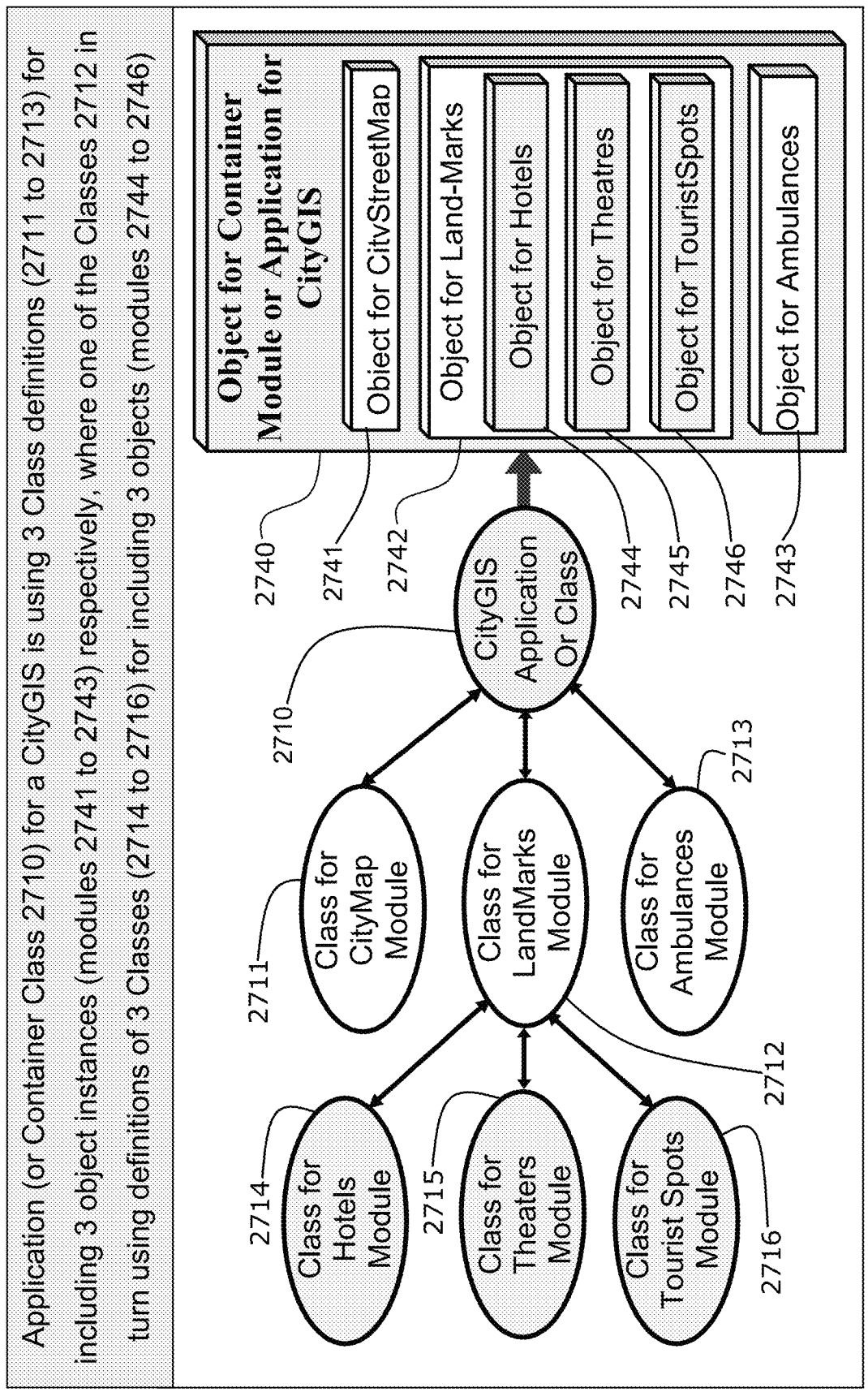
FIG. 27 shows an application (or Container Class 2710) for a CityGIS, which is using 3 Class definitions (2711 to 2713) for including 3 object instances (modules 2741 to 2743) respectively, where one of the Classes 2712 in turn uses the definitions of 3 Classes (2714 to 2716) for including 3 objects (modules 2744 to 2746), according to an embodiment.

FIG. 27 shows an application (or Container Class 2710) for a CityGIS, which is using 3 Class definitions (2711, 2712, and 2713) for including 3 object instances 2740 (modules 2741, 2742, and 2743) respectively. The module 2711 comprises class for Citymap module. The module 2712 comprises class for landmarks module. the module 2713 comprises class for ambulances module. The module 2741 comprises object for citystreet map. The module 2742 comprises object for land-marks. The module 2743 comprises object for ambulances. FIG. 15 shows code for including each of the modules (i.e. object instances) by using respective class definitions. If a component or module is too big, it is further subdivided into sub-modules, each of which can also be designed and built as a pluggable module/object (or pluggable component). For example, if the code for module 2712 is too big, the class implementation for such a large module can in turn be partitioned into 3 sub-modules by implementing definitions of 3 Classes (2714, 2715, and 2716) for including 3 objects (modules 2744, 2745, and 2746). For example, the component for city landmarks 1412 is divided into three pluggable modules for, (1) hotels and hospitals 2744 (2) theaters and auditorium 2745, and (3) tourist spots 2746. In one example embodiment, assuming pluggable modules for the subcomponents are designed, developed, and tested individually by three different developers nearly autonomously, it is assembled to build CityLandmarks_Module as follows:

1. Void PluginSubModules(ACi) {
2. // Include object instance for Hotel module by using class for Hotels
3. PluggableModule Hotels=new CityHotels (aci, ZipCode);
4. this.canvas.AddChild (Hotels, 0, 0, null);
5. // Include object for Theatres module by using class for Theatres
6. PluggableModule Theatres=new CityTheatres (aci, ZipCode);
7. this.canvas.AddChild (Theatres, 0, 0, null);
8. // Include object for Tourist Spots module by using its class
9. PluggableModule TouristSpots=new CityTouristSpots (aci, ZipCode);
10. this.canvas.AddChild (TouristSpotsO, 0, 0, null);
11. this.canvas.Display( );
12. }

The code statements in lines 3 and 4 instantiate and initialize an object instance for Hotels module by using class definition implemented for hotels. The code statements in lines 6 and 7 instantiate and initialize an object instance for Theatres module by using class definition implemented for Theatres. The code statements in lines 9 and 10 instantiate and initialize an object instance for TouristSpots module by using class definition implemented for TouristSpots.

If a module needs to communicate or exchange data with other modules, the module must be coupled by employing communication code. Each pluggable module comprises of necessary communication code for finding required services for collaborating with other modules/parts using a mechanism comprising things or tools such as SRO/DoS. The pluggable components (or modules) Theaters, Hotels, or LandMarks are easily removed or disassembled from the application. Each pluggable components (or modules) is disassembled and replaced by a newer or better component. It may also be reassembled after it is redesigned, updated, and tested (individually outside of the application) to satisfy evolving business needs. Each of the pluggable components (or modules) such as LandMarks or TouristSpots is custom-designed to satisfy the unique needs of an intended single-application. The design objective is to achieve a high degree of autonomy (or modularization) as much as possible in order to minimize the effort required to remove, update, and test the component during future maintenance periods, according to an embodiment.

A module (e.g. component, object, or other kind of part form library/APIs) said to be plugged-in for an application implies adding the module to the application without any need for implementing communication code in the code for the application. For example, by including an object instance by implementing 1 to 3 lines of code. An example is illustrated FIG. 14 comprising three GUI components and FIG. 15 code for plugging in three pluggable components, according to an embodiment. For example, lines 12 to 14 in FIG. 15 includes a pluggable module for displaying Air Traffic Controls/Monitoring (ATC) Systems, where each Airplane requests the service of info-table 1411 using SRO/DoS to display latest information (upon clicking on the Airplane). This illustrates a sample mechanism for allowing collaboration with each other without implementing any communication code in the code for the application.

A partially pluggable module implies the module uses SRO/DoS or Arjun for a few couplings to allow collaboration with other parts in the application, while communication code is manually implemented in the code of the application to allow collaboration with a few other parts in the application. That is, a partially pluggable module uses both methods to collaborate with other parts in the application (i) communication code implemented in the application and (ii) communicates with other parts by using a mechanism such as illustrated in FIG. 10 or FIG. 11. In the context of the claims of this invention, any partially pluggable module that uses SRO/DoS or Arjun for facilitating collaboration between the partially pluggable module and other parts (including other modules) of the application is a pluggable module (even in case if communication code is implemented manually for creating few couplings for each module, for example, as a work around to defeat the claims).

For example, such an ideal pluggable module can be easily replaced by a new part. If the ideal pluggable module implements about 2500 lines of custom application code, then the 2500 lines of custom application code can be refined and tested individually (e.g. outside of the application, free from spaghetti code). If an application requires implementing 100,000 lines of custom application code and if over 75% of the 100,000 lines of code is in 25 pluggable parts of average size of 1800 to 3000 lines of custom application code, then over 75% of the custom application code (in the ideal pluggable modules) out of a total of 100,000 custom application code can be evolved by redesigning and testing each of the pluggable modules individually outside of the application, according to an embodiment. For example, each component that can be easily disassembled (and reassembled) can be redesigned and tested individually outside of the product (free from spaghetti code), hence providing a higher degree of service access.

Figure 16:
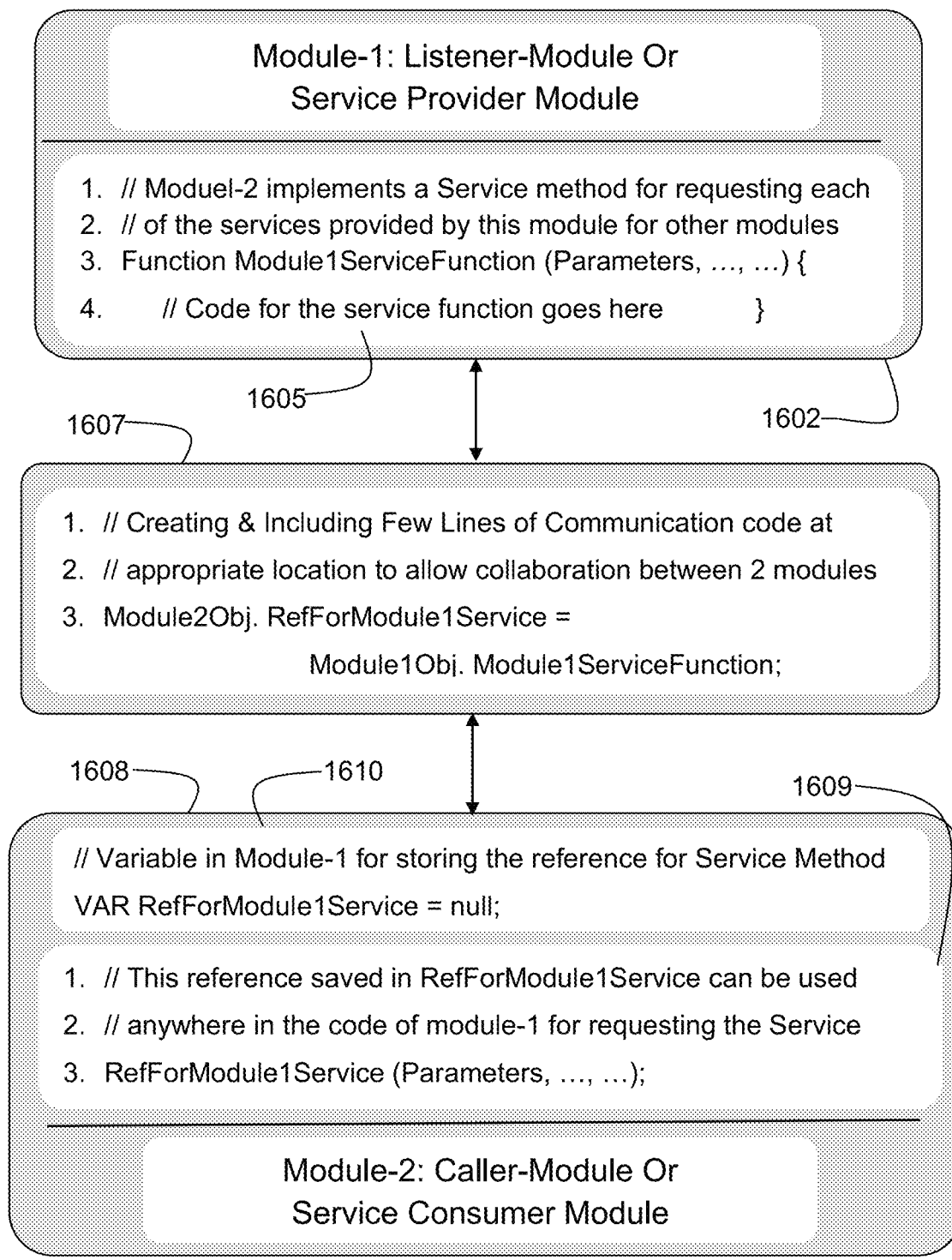
FIG. 16 shows pseudo-code for facilitating communication or collaboration between two modules in an application, according to one embodiment.

Section-I: Examples for Basic Communication Code (or Coupling Dependencies) Between Modules FIG. 16 illustrates a typical communication link between two typical modules, according to an embodiment. In general, a module (e.g. Module-2/1608) initiates communication (when required) by calling a function (or using an object) implemented in another module (e.g. Module-1/1602). The code-block 1609 calls service function implemented in code-block 1605 in module-1. To facilitate such communication between two modules, it is required to implement or include communication code 1607 to provide necessary information (e.g. reference to service function 1605) for module-1/1602 to call the right function of the first module 1602 when it requires a service of module-1/1602 (e.g. as shown at 1609 in module-2/1608) by initializing a reference variable 1610 to store reference of the service function 1605 in the communication code 1607. This kind of communication code (e.g. 1607) is manually implemented for connecting (or linking) any 2 modules that need to collaborate with each other, according to an embodiment.

Module-1/1602 of FIG. 16 comprises of implementation 1605 of service function, for example, Module1ServiceFunction. Module-2/1608 comprises of code 1609 or implements features that require calling the function 1605 Module1ServiceFunction. A variable 1610 RefForModule1Service is defined for saving the reference of function and uses the variable for calling the function 1605 Module1ServiceFunction, according to an embodiment. The communication code 1607 initializes the variable 1610 RefForModule1Service to store reference of function 1605 Module1ServiceFunction, according to an embodiment. The line 3 in 1609 calls the function 1605 Module1ServiceFunction, since variable 1610 RefForModule1Service has reference to function 1605 Module1ServiceFunction, according to an embodiment.

A communication interface between a first service-provider module (e.g. module-1 710 in FIG. 7, or 1602 in FIG. 16, or 2310 in FIG. 23) and a second service-consumer module (e.g. module-2 720 in FIG. 7, or 1608 in FIG. 16, or 2320 in FIG. 23) has two parts. For example, when a service-provider module-1 implements a service function Module1ServiceFunction (e.g. 1605 of FIG. 16), which requires 3 parameters of types String, Integer, and Integer respectively, where this part of the interface is referred to as a "service-provider interface" (i.e. a part of the interface implemented in the service provider). Any module (e.g. module-2) that requires this service must call this function Mod1ServiceFunction by passing the 3 parameters. According to an embodiment, this service function is called in module-2 (that requires the service) by using a reference stored in a variable RefForModule1Service and by passing three parameters of types String, Integer, and Integer respectively, where this part of interface is referred to as a "service-consumer interface", which is a complimentary part of the interface employed (e.g. at line-3 of code-block 1609) by the code service-consumer module for getting the service by calling the service function Mod1ServiceFunction.

The codes (or interfaces) in code blocks 1605 and 1609 are designed to complement each other to have proper communication for collaborating with each other. This kind of interfaces is further designed to effectively generate communication code block 1607. For example, by a software tool such as SRO/DoS from the data in the lists 830 and 840, according to an embodiment. The code blocks (i.e. 1605, 1607, and 1609) shown are just sample pseudo-code. Different programming languages provide different kinds of features for generating the equivalent communication code or instructions (i.e. for achieving pluggable modules) to allow communication between two modules for collaborating with each other properly. For example, it is not very hard for certain programming languages, but it requires improvisation for other languages. The compiler for a programming language (e.g. Java 8) is updated or redesigned (e.g. implement necessary features) for achieving pluggable modules more effectively, according to an embodiment. Tools, framework, and/or mechanisms are created and used for a programming language for achieving pluggable modules more effectively, according to an embodiment.

FIG. 17 shows a shopping-cart/Invoice application for a pet store comprising of shopping items 1701, 1702, and 1703 (where more items available can be seen by scrolling the scroll bar 1700) and a shopping-cart/Invoice 1710. Any shopping item (e.g. 1701/1702/1703) can be purchased by double-clicking on the item. When an item 1701/1702/1703 is selected by double-clicking, the item 1701/1702/1703 is added to the Invoice 1710. According to an embodiment, the software module or component for Invoice 1710 implements a service function "add_item_to_invoice (Parameters, . . . , . . . )". When a shopping item is selected (by double-clicking), the shopping item calls the service function "add_item_to_invoice (Parameters, . . . , . . . )" by passing necessary information as per the pre-defined interface. It is necessary to implement communication code to allow such communications between any two modules in an application. Alternatively, SRO/DoS is used for allowing such collaboration between any two modules, according to an embodiment. Alternative embodiments involve generating the communication code by using the information in the lists 830 and 840 and including the communication code in the code of the applications.

FIG. 18 shows a pseudo-code of a wrapper module 1800 for transforming a legacy module (that is not a pluggable module) implemented as a "LegacyClass" into a pluggable module, according to an embodiment. For example, if a legacy module "Module-X" provides one or more services for other modules and Module-X depends on one or more services of other modules, today it is required to manually implement communication code when module-X is included in an application. The communication code allows module-X to access services required by module-X, and other modules/parts in the application to access services provided by module-X. According to an embodiment, the requirement to manually implement communication is eliminated by implementing a wrapper-module, where (1) the wrapper module registers each of the services provided by module-X with the SRO/DoS as illustrated in code block 1802, and the wrapper module looks up each of the services required by module-X with the SRO/DoS as illustrated in code block 1803. The code block 1801 comprises of necessary variables and code for constructor, according to an implementation in OOP. The line-3 in block 1802 registers a service provided by module-X with SRO/DoS object. The line-3 in block 1803 looks up a service required by module from SRO/DoS object.

Figure 19:
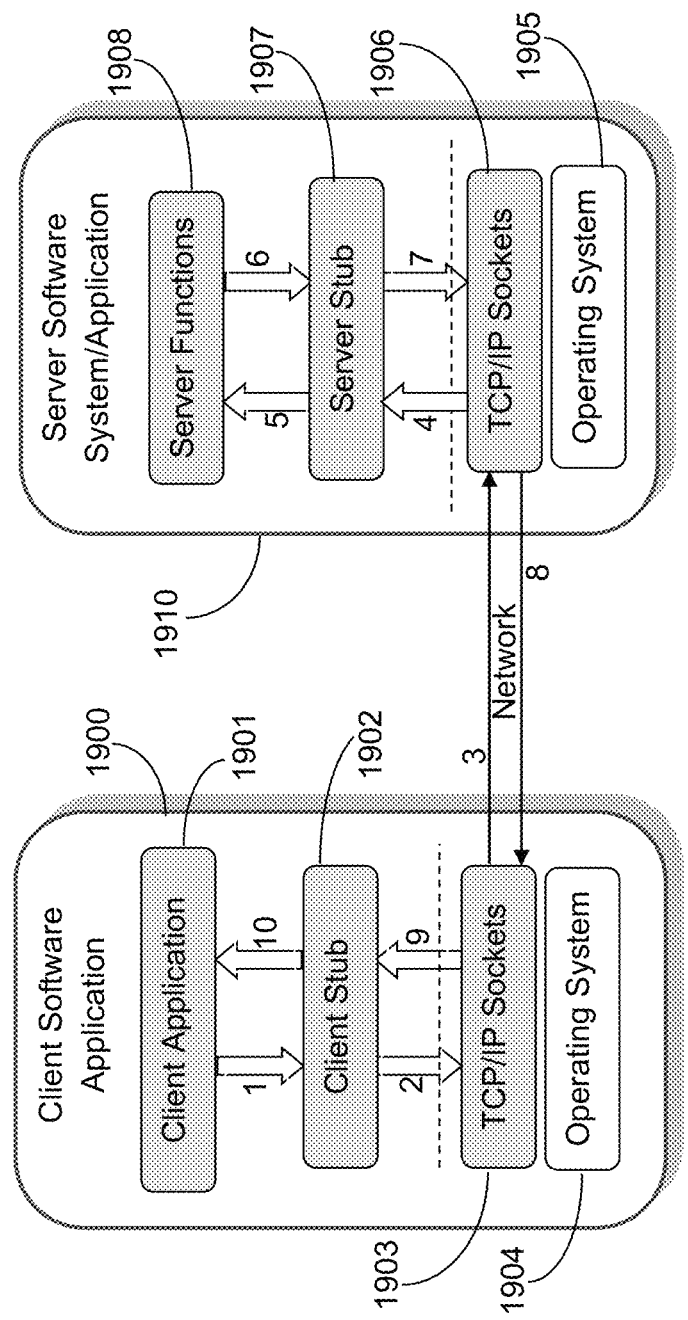
FIG. 19 shows communication stack including TCP/IP network communications between an application running on a client application and another application (e.g. providing one or more services) on a server application, according to one embodiment.

FIG. 19 shows method for an application 1900 communicating with a service module 1910 being executed on a remote computer (or server). If the server-module (or application) 1910 provides one or more services, the server-module 1910 implements server functions 1908 and server-stub 1907, where each function in server-stub provides access to a server-function 1908 implemented in server-module (or application) 1910. The server-module 1910 also provides a client-stub 1902, where each function in the client-stub 1902 communicates with corresponding function in server-stub 1907 over internet 1903 and 1904. If a client-module 1901 in client application 1900 requires a remote service, it calls the appropriate service function in client-stub 1902, and client-stub 1902 connects to corresponding function in server-stub 1907 over web/cloud or internet 1903/1906. The server-stub 1907 gets required service (e.g. data or data-exchange) from server functions 1908 and sends response over internet 1906/1903 to the client-stub 1902, which in turn passes on the result/data to client-module 1901.

The client-stub 1902 acts like an RPC (Remote Procedure Call), according to an embodiment, where RPC is well known in the art. According to an embodiment, the client-stub 1902 is implemented as a module (for example, as a class definition) comprising of service functions to provide a service, where each service function in the class for client-stub 1902 connects to the corresponding function in the server-stub 1907 for providing a service. It is required to implement communication code manually between the modules for client-stub 1902 and other modules in the application 1900 for allowing communication between modules for client-stub 1902 and other modules in the application 1910. The application 1900 comprises an operating system 1904 to allow communication between client-stub 1902 and other modules in the application 1910. The application 1910 comprises an operating system 1905 to allow communication between server-stub 1907 and other modules in the application 1900.

Figure 20A:
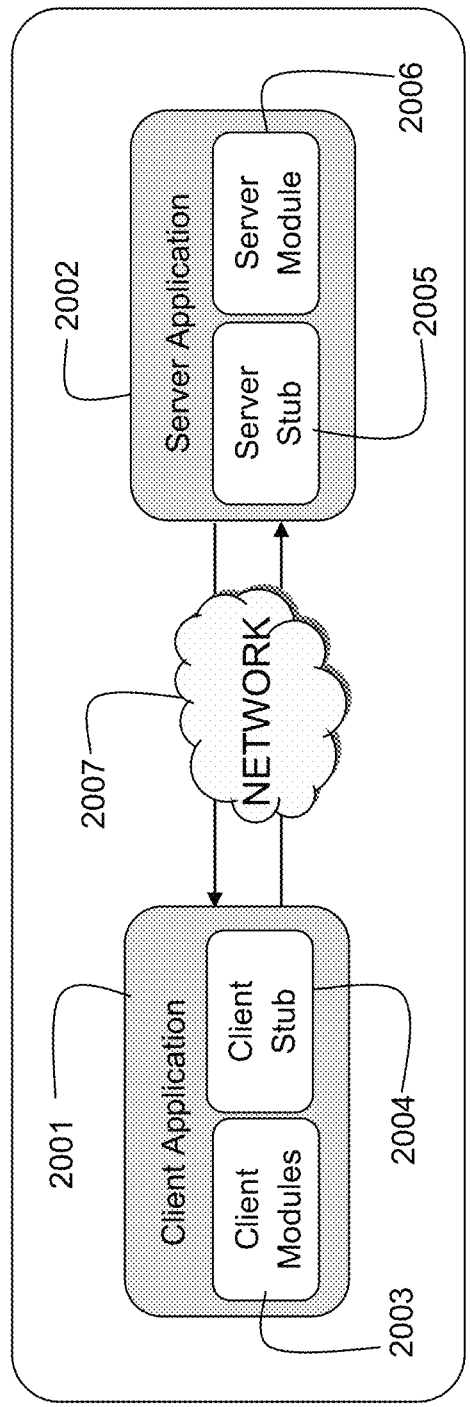
FIG. 20 shows wrapper for client stub for making client-stub pluggable, where pseudo-code is illustrated in FIG. 18, according to one embodiment.
Figure 20B:
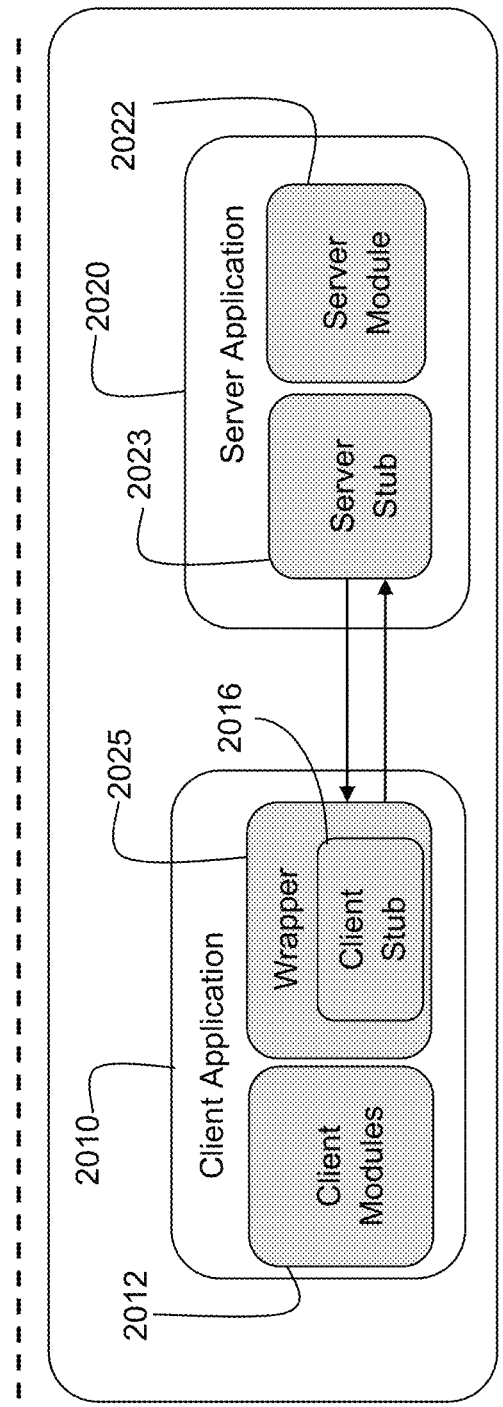

FIG. 20a shows an application 2001 comprising of client modules 2003 and a module for client-stub 2004, where the client-stub 2004 implementing one or more functions communicates over network (internet) 2007 with respective service-functions in server-stub 2005 for getting services from server module 2006 in server application 2002 (e.g. client-stub 2004 comprises a function for calling each of the service functions in server-stub 2005, where each function in server-stub 2005 accesses a service provided by server module 2006), according to an embodiment. If module for client-stub 2004 is not pluggable, it is required to manually implement communication code 2009 to allow collaboration between client-modules 2003 and module for client-stub 2004. That is, client-stub 2004 is a proxy module for server module 2006. The proxy module 2004 (or service functions) in client-stub 2004 can be transformed into a pluggable module by implementing a wrapper module as illustrated in FIG. 18, according to an embodiment. FIG. 20b shows an application 2010 comprising client modules 2012 and a wrapper module 2025 for client-stub 2016(as illustrated if FIG. 18), where module for client-stub 2016 is proxy module for server module 2022 (through server stub 2023), where the client-stub 2016 implementing one or more functions communicates over internet with respective functions in server-stub 2023 (having a function corresponding to each of the functions in the client-stub 2016) for getting services from server modules 2022 in server application 2020, according to an embodiment.

According to an embodiment, certain interfaces can be classified to be handled differently by ECI/BCI or by Arjun. For example, in FIG. 20a & FIG. 20b, client stubs 2004 and 2016 act as the gateway or port of entry for external data entering into the application 2010 and as the port of departure for data exiting from the application 2010, so the wrapper module 2025 that includes such client stubs can be marked as a gateway module, and the interfaces implemented in this gateway module can be classified as gateway interfaces and be handled differently, such as to test for malicious data passing through the gateway interfaces or for logging to monitor security breaches, according to an embodiment.

According to an embodiment, Arjun creates additional code (as part of the communication code) to detect malicious or suspicious data passing through gateway interfaces. According to an embodiment, the communication code generated by Arjun for the gateway interfaces implemented in the gateway module 2025 also comprises of code to monitor the profiles and privileges of the server application 2020 that is sending or requesting data to enforce rule-based security. According to an embodiment, the communication code (created by Arjun) routes the data passing through gateway interfaces through appropriate security filters (e.g. 3407, 3408, or 3409), based on possible threat perceptions. According to an embodiment, a filter 3407 is included between the gateway interface that fetches data from remote server and another interface in the application that gets the data from the gateway interface.

Section-J: Other Methods for Generating Communication Code for Pluggable Modules The application 880 comprises of multiple modules 810 and 820. The SRO/DoS 800 is included in the code of the application 880 and the lists 840 and 830 are built at run time (i.e. when the application is being executed), when each of the modules registers or looks up for services, according to an embodiment. The information in each of the nodes in the lists is used for generating communication code to be included at proper locations in the code of the application 880, according to an embodiment. The communication code generated by the SRO/DoS 800 replaces the SRO/DoS 800 for allowing collaboration between the modules, according to an embodiment. There are other mechanisms and systems that can be employed for generating communication code or instructions for coupling modules. The following illustrates another method that comprises of systems and/or mechanisms that are implemented in the pre-pressor (e.g. of a compiler) for reading and processing the source code for the modules in the application, according to an embodiment. Communication between any two modules in an application can be facilitated at run-time using mechanism comprising DoS/SRO and lookup keys for registering and/or finding services. Alternatively, communication between any two modules in an application can be facilitated using communication code, where the communication code is created during or before compile/link time of the application by employing a mechanism comprising Arjun/SRO, and properly including the communication code in the code of the application.

Figure 21:
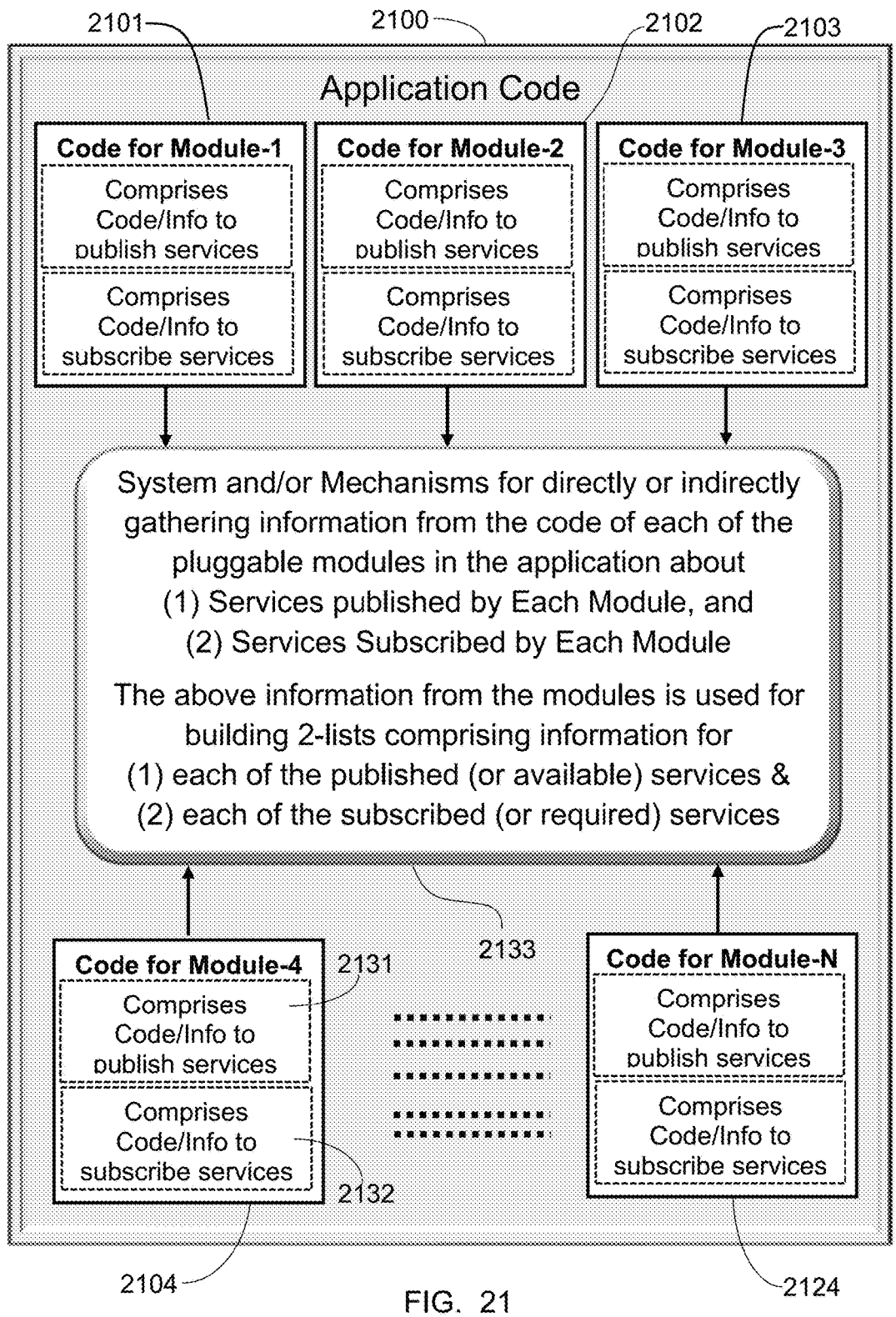
FIG. 21 shows multiple modules in an application, where each module comprises of information for each of the services published by the module and of information for each of the service subscribed by the module, and a mechanism for using the information from the modules for automating many tasks for creating communication code or for facilitating collaboration between the modules, according to one embodiment.

FIG. 21 shows an application 2100 comprising of multiple modules 2101, 2102, 2103, 2104 and 2124, where code of each of the modules comprises of (1) code and/or information for publishing each of the services provided (e.g. 2131) for other modules by the module (e.g. 2104) and (2) code and/or information for each of the services required or subscribed (e.g. 2132) by the module (e.g. 2104), where each required service is provided or published by another module, according to an embodiment. Some systems and/or mechanisms 2133 are used to directly or indirectly gather information from each of the modules 2101, 2102, 2103, 2104 and 2124 about (a) services published by the module 2101/2102/2103/2104/2124 and (b) services subscribed to by the module 2101/2102/2103/2104/2124. If a 2101 module provides one or more services for other modules 2102, and 2124, it employs a method to provide information for each of the services (e.g. publishing its service). For example, in order for an external system (e.g. 2133 referred to by given name Arjun) to access the information for each service provided. If a module 2101 requires one or more services from other modules (e.g. 2103 and 2104), it employs a method to provide information for each of the services required (e.g. subscribing the required service). For example, in order for an external system (e.g. 2133) to access the information for each service required.

Figure 22:
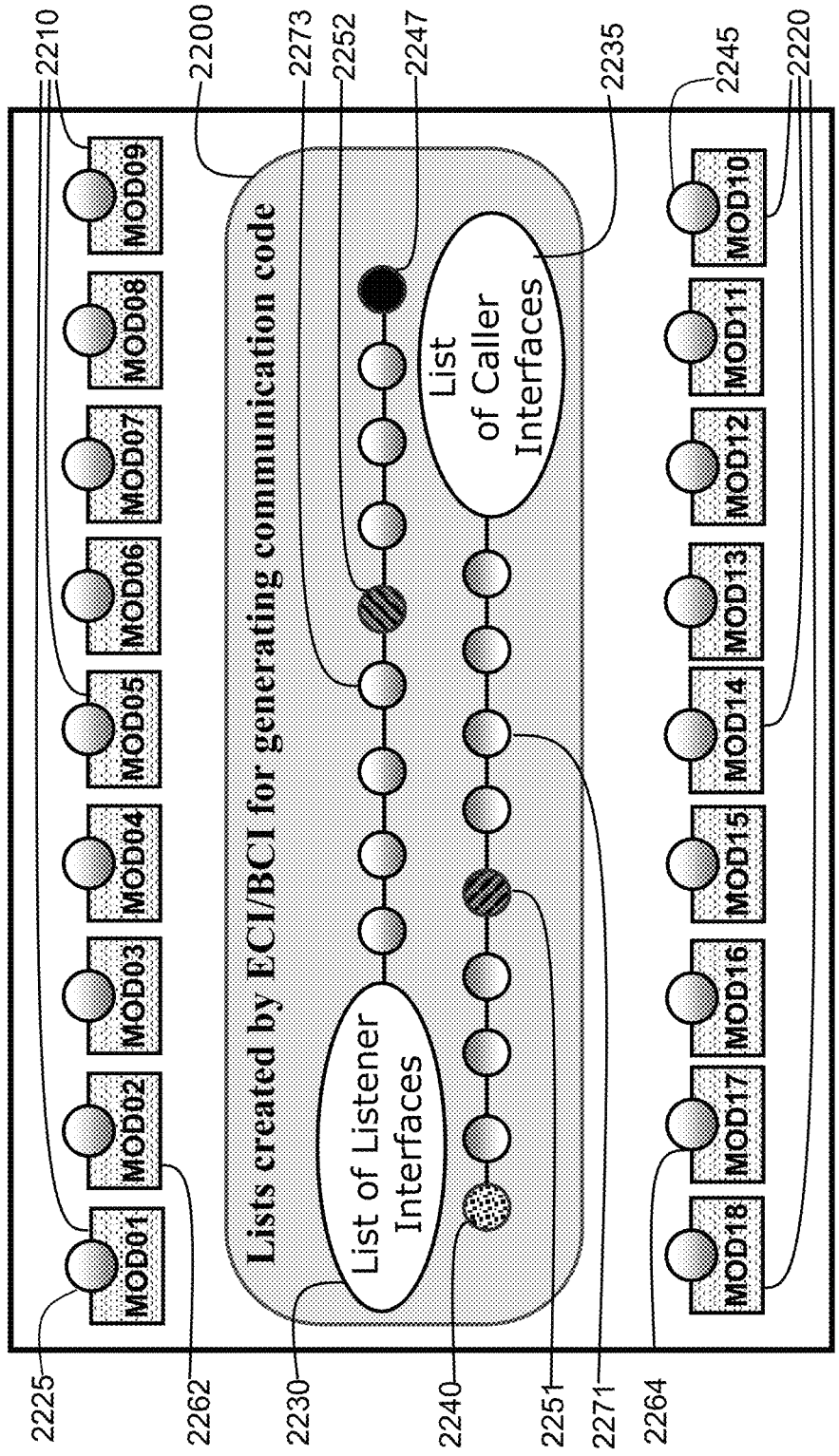
FIG. 22 shows multiple modules in an application, where each module comprises of information for each of the services published by the module and of information for each of the service subscribed by the module, and a mechanism for using the information for building two lists (1) information for available services, and (2) information for required services, according to one embodiment.

FIG. 22 shows two lists for two sets, one list 2230 for set of available services and another list 2240 for set of subscribed or required services, created by the systems and/or mechanisms 2133 (that is referred to by given name Arjun) of FIG. 21, according to an embodiment. The FIG. 22 is equivalent (e.g. by serving equivalent function) to FIG. 8, according to an embodiment. Plural Modules 2210 (MOD01, MOD02, MOD03, MOD04, MOD05, MOD06, MOD07, MOD08, and MOD09) offer one or more services for other modules, components, or parts. Likewise, plural modules 2220 (MOD10, MOD11, MOD12, MOD13, MOD14, MOD15, MOD16, MOD17, and MOD18) depend on one or more services offered by other modules (e.g. 2210). Each of the modules in the application uses lists created for generating communication code for collaborating with the other. The lists in FIG. 8 are created by the SRO/DoS included in an application at runtime of the application. But the lists in FIG. 22 are created by a pre-processor (e.g. part of compiler) and related tools or mechanisms (collectively referred to by given name Arjun), where Arjun builds the lists or sets by reading the information about published services and subscribed services in the source code of each of the modules in an application, according to an embodiment. Each node in the list 2230 comprises of information for an available service of a module, and each node in the list 2240 comprises of information for a service required by a module. The information in the nodes is used for managing and validating communication code and interfaces between the modules, according to an embodiment. The node comprises of many kinds of information such as a lookup-key, information for module, about service, service interface and version etc. The information in the nodes is used for generating communication code for each of the modules, according to an embodiment. The communication code can be included at appropriate locations in the code for the application. The information in the nodes is also useful for creating documentation (e.g. comprising of visual representation) for dependencies for each of the modules, according to an embodiment.

After constructing the lists by reading information from each of the modules, the Arjun compares the two lists, matches each of the subscribed services in the list 2240 with the available services in the list 2230, and creates a diagnostic report showing all mismatches. The Arjun also detects errors and/or possible errors or warnings such as (i) a service 2235 required by a module 2264 is not available, (ii) an available service 2245 provided by a module 2245 is not used, and (iii) an interface for available service 2252 and the interface used for requesting the service 2251 are not compatible (e.g. a mismatch in number of parameters or mismatch in the type of one or more parameters). Missing services and incompatible services are considered dependency or interface problems. Those problems may arise after one of the service-provider interfaces in a service-providing module 2262 is updated while service-consumer interfaces in one of the dependent modules is not updated accordingly. The unused services are removed during the cleanup (e.g. refactoring) of the application code, according to one embodiment. In general, unused services is not an error (so, may generate informational or warning messages), because a module (e.g. from a component vendor) may provide multiple services but only a subset of the services provided are needed in an application.

According to another embodiment, FIG. 22 illustrates a sample generic tool 2200 ECI (Exchange for Communication Interfaces) or BCI (Broker for Communication Interfaces) to create and manage coupling for and between each module in an application. According to an embodiment, ECI/BCI implements a variation of SOA (Service Oriented Architecture) that has either a DoS (Directory of Service) or an SRO (Service Registration Object). SOA allows communication between applications (referred to as components), where DoS allows (i) applications that provide services to register these services and (ii) applications that require services to look for services. SOA is used to allow collaboration between components, where each component is an independent executable (e.g. application) and these executables may be running on different computing devices and communicating over Internet or Network. Present invention uses ECI/BCI to facilitate communication between coupling interfaces 2210 and 2220 implemented within modules or objects that are part of an application (i.e. single executable). Interfaces are implemented as service provider interfaces 2210 and service consumer interfaces 2220, according to an embodiment. Interfaces are implemented as listener interfaces 2210 and caller interfaces 2220, according to another embodiment.

ECI/BCI creates lists 2230 and 2235 for multiple interfaces and finds each pair of interfaces having a "Symbiotic Relationship" with each other by using a look-up key, according to an embodiment. For example, if interface 2245 requires connecting to interface 2225 to exchange data or to communicate, then there is said to exist a "Symbiotic Relationship" between interface 2225 and interface 2245. According to an embodiment, a look-up key is used to match any two interfaces having a symbiotic relationship with each other. According to another embodiment, each interface is given a unique ID (or look-up key) and a table is created to define two IDs for each pair of interfaces that require to be coupled, where each ID is associated with an interface. Any such means may be used to identify two interfaces that are required to connect with each other to facilitate communication or data exchange between them.

Any large software application comprises of multiple modules or parts, and each module implements one or more interfaces, where each interface can connect with an interface of another module to allow communication and collaboration between the modules. It is desirable to invent tools and mechanisms to automate various tasks and activities necessary to create and manage communication code (or links) that can allow collaboration between the modules in an application, where each communication link creates coupling between a first interface implemented in a module with a second interface implemented in another module. According to an embodiment, ECI/BCI creates lists for interfaces and uses the information provided for the interfaces to find each pair of interfaces (i.e. set of two interfaces) that have a symbiotic relationship and aids a mechanism (referred to as Arjun) to create code that allows communication between the two interfaces having a symbiotic relationship.

According to an embodiment, Arjun (i.e. a mechanism included in pre-processor or compiler) is designed to be intelligent enough to handle many special kinds of interfaces. For example, a listener interface for a module can be an interface that provides a service for other modules. In that case, multiple modules might implement interfaces to request or access the service. This is an instance of N-to-1 coupling. That is, "N" (i.e. multiple) caller interfaces connect to one listener interface. Another kind of interface is a notification-type caller interface to notify other modules of a given event (e.g. change of data or state) by calling listener functions in their respective modules. Each interface can have a symbiotic relationship with one or more interfaces.

In such cases, multiple modules might implement listener interfaces to request notifications. ECI/BCI uses a look-up means such as a look-up key to find each pair of interfaces (i.e. set of two interfaces) having a symbiotic relationship. In this case, Arjun generates communication code for a caller interface to be able to call each listener interface, according to an embodiment. This is an instance of 1-to-N coupling. That is, one caller interface connects to "N" (i.e. multiple) listener interfaces. This kind of information (i.e. notification-type caller interface) is also included in the information for each such caller interface, according to an embodiment.

In any application comprising of multiple pluggable modules (or pluggable components), Inter module (or component) communications (or collaboration) imply communications (or collaboration) between the modules (or components) within the application. According to an embodiment, tools and mechanisms such as Arjun/SRO/BCI are employed for creating communication code and/or facilitating Inter module (or component) communication (or collaboration) between modules (or components) that are included into an application for building the application. For example, Inter module communications imply communication between pluggable modules such as 1514 CityATC or 1513 CityER (e.g. Ambulances for Emergency Response) and other such pluggable modules in the application. Each of the module (e.g. 1514 CityATC or 1513 CityER such as Ambulances for Emergency Response) can be designed and developed and tested as an independent application by using all the available shared objects and/or reusable libraries/API.

According to an embodiment, each pluggable module for an application is created by implementing many lines of custom code, where the custom code uses many global shared objects created for the application and also uses many reusable libraries/API. This custom code also implements communication code to allow collaboration between various parts within the module. This kind of intra-module communications between (i) various parts or objects used within the custom code implemented for building each module and/or (ii) communications between the parts implemented within the module and global shared objects or reusable libraries/API is not facilitated by using tools and mechanisms such as Arjun/SRO/BCI, according to an embodiment. The kind of communications between various parts or objects within the module and communications between the parts within the module and shared global objects or reusable libraries is not considered Inter module communications (or collaboration).

Figure 29:
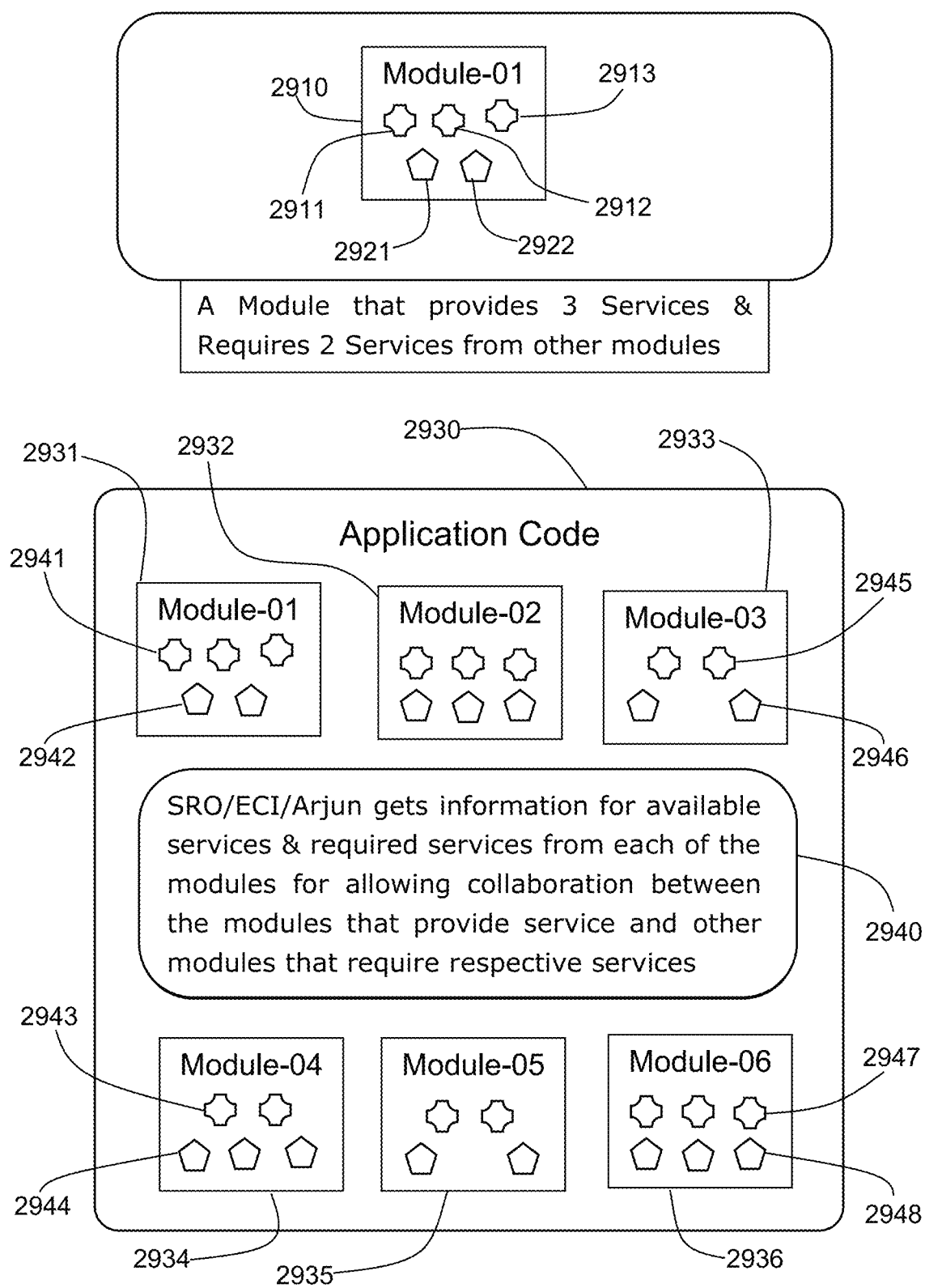
FIG. 29 shows a module that offers 3 services and requires 2 service, and an application comprising multiple modules and a mechanism such as SRO/Arjun for facilitating communications between the modules, according to an embodiment.

FIG. 29 shows a module 2910 that provides 3 services and requires 2 services from other modules, where module 2910 (i) comprises code sections (or instruction) 2911, 2912 and 2913 for registering (or publishing) each of the services that are provided by the module 2910, and (ii) comprises code sections (or instruction) 2921 and 2922 for finding (or publishing) each of the services required by the module 2910, where the pentagon shaped icons 2921, 2922 represents code (or instruction/information for) required services. If any application 2930 comprises of multiple modules (e.g. 2931, 2932, 2933, 2934, 2935, and 2936), a tool such as SRO (or Arjun) 2940 may be used for getting the information for available services and required services from each of the modules (e.g. 2931, 2932, 2933, 2934, 2935, and 2936) for facilitating collaboration between the modules (e.g. 2931, 2932, 2933, 2934, 2935, and 2936), according to an embodiment. Each of the modules (e.g. 2931, 2932, 2933, 2934, 2935, to and 2936) comprises code sections (or instruction) 2911, 2912 and 2913 for registering (or publishing) each of the services and code sections (or instruction) 2921 and 2922 for finding (or publishing) each of the services.

Any module in an application that offers one or more services for other modules in the application comprises of a code section (or instructions) to register (or publish information for) each of its services. Likewise, any module requires one or more services that are offered by other modules comprises of a code section (or instructions) to subscribe each of the required services, according to an embodiment. Any necessary communication and/or collaboration between the modules in the application may be facilitated by employing a tool (or mechanism), where the tool gets from each of the module information for each of the services provided by the module and information for each of the services required by the module for creating communication code that can be used for facilitating necessary communication and/or collaboration between the modules.

According to an embodiment that uses a Service Registration Object (or SRO) type mechanism for facilitating necessary collaboration between multiple modules (e.g. 2931, 2932, 2933, 2934, 2935, and 2936) in an application, if a module in the application provides one or more services, the module registers each of the services with the SRO 2940. If a module in an application requires one or more services, the module looks up for each of the services from the SRO 2940. The SRO (e.g. 2940) creates a list of available services of all the available services and creates a list of all the required services from all the modules (e.g. 2931, 2932, 2933, 2934, 2935, and 2936) and uses the two lists for facilitating necessary collaboration between the modules, according to an embodiment.

According to an embodiment that uses a Pre-processor (referred to as Arjun) type mechanism for facilitating necessary collaboration between multiple modules in an application, if a module in the application provides one or more services, the module publishes necessary information for each of the available services. If a module in the application requires one or more services, the module publishes necessary information for each of the required services. The pre-processor (e.g. that may be part of a compiler) 2940 gets the information for all the available services and required services from all the modules (e.g. 2931, 2932, 2933, 2934, 2935, and 2936) for facilitating necessary collaboration between the modules, for example by creating necessary communication code.

Any kind of module in a software application (or system) can be made pluggable, if it is practical to automate tasks for creating necessary communication couplings for the module to allow necessary collaboration between the module and the other parts of the application by implementing necessary parts of the communication code within the module (e.g. by publishing or subscribing each of the services for the module), for example, by leveraging external mechanisms such as Arjun or SRO. If the codebase for a pluggable module is implemented in a set of exclusive files, the exclusive codebase for each of the pluggable modules can be redesigned individually and the features, functionality and coupling interfaces of the module can be tested individually, for example, in a small test application after building the module by compiling the codebase and the test application, according to an embodiment.

Section-K: Allowing Communication Between Interfaces Using the BCI/ECI

Figure 30:
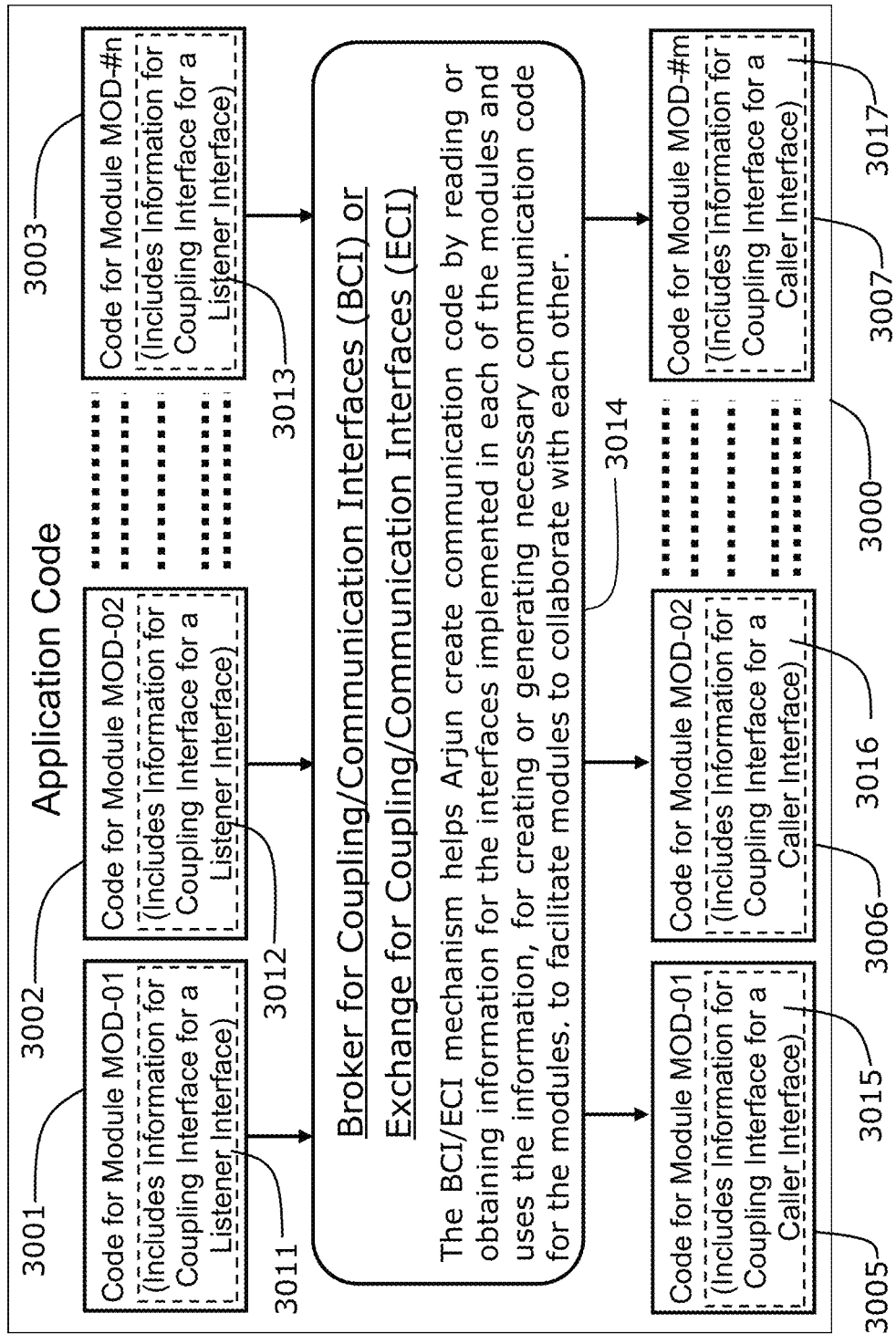
FIG. 30 shows a depiction of a sample application that comprises of multiple modules, where each module implements one or more coupling or communication interfaces and includes code (or instructions) to publish the information for each coupling interface. "Exchange for Communication Interfaces" (ECI) or "Broker for Communication Interfaces" (BCI) uses this coupling interface information to either (i) allow collaboration between the modules or (ii) create communication code to facilitate collaboration between any two modules by coupling or connecting their respective communication interfaces, according to one embodiment.

FIG. 30 illustrates a global "Exchange for Communication Interfaces" (ECI) or "Broker for Communication Interfaces" (BCI) object that is used to allow collaboration between any two modules in an application that comprises of multiple modules (e.g. modules that implement code for listener interfaces 3001, 3002, 3003, and modules that implement code for caller interfaces 3005, 3006, 3007), according to an embodiment that uses Object Oriented Programming (or OOP). ECI/BCI 3014 is a modified implementation of SRO/DoS 414 employed by SOA (Service Oriented Architecture), where SOA allows communication between multiple executables often running on different computing devices and connected over Internet or Network. In the current embodiment, an object instance of ECI/BCI is included in the code of the application, and ECI/BCI facilitates communication between modules at run-time of the application (i.e. a single executable comprising of multiple modules).

The application includes an ECI/BCI 3014 as a global and/or shared object, where the names of the object and service functions to (i) register listener functions and (ii) look up listener functions from caller interfaces are defined and published in advance for use in the code of the modules (e.g. 3001 to 3007). If a module implements a listener interface, the module registers a listener function (or object) and the necessary information of the listener interface with BCI/ECI using the service method (for registering an interface) of the BCI/ECI. If a module is required to communicate with other modules that implement listener interfaces, the module implements caller interface code to find the necessary listener function from BCI/ECI using the service method provided by ECI/BCI to find listener functions.

The minimum function of ECI/BCI is to provide a method to register each interface by providing a look-up key (by associating the look-up key with the interface) to search for and find the interface. Also, ECI/BCI provides another method to find an interface by using a look-up key associated with the interface. For example, if an application comprises of multiple listener interfaces, the code implemented for each listener interface includes code to register (see line 20) each listener interface with the ECI/BCI. The following sample pseudo-code registers a listener function and information such as the look-up key and version of the listener function.

10. //Code to register a listener interface
20. ECI_BCI_Obj.RegisterInterface (ListenerFunction1, LookUpKey, Ver1);

The third parameter ("Ver1") for version number is optional (not essential but useful) if it is desirable to detect incompatible versions between caller interface and listener interface. For example, if an application comprises of multiple caller interfaces which need to connect and communicate with listener interfaces, the code implemented for each caller interface comprises of code to look up a listener interface (see line 40 below) by calling the look-up method of the ECI/BCI and passing the look-up key associated with the required listener interface as a parameter. The look-up using a look-up key obviously fails to find any listener interface, if no listener interface is registered with the ECI/BCI by using the look-up key.

10. //Code to look up a listener interface
20. Var RefToListenerFunc=null;
30. if (RefToListenerFunc==null)
40. RefToListenerFunc=ECI_BCI_Obj.LookUpInterface (LookUpKey, Ver1);
50. //Code to call the Listener Function by passing parameters
60. if (RefToListenerFunc !=null)
70. RefToListenerFunc (Part1, Par2, . . . );

The variable for "Ver1" can be a number, string, or an object comprising of major and minor version numbers. The variable for "LookUpKey" can be a number, string, or an object comprising of a combination of one or more look-up keys, according to an embodiment. ECI/BCI can store the information for each listener interface in a node (e.g. Object or Structure) and creates a list of sorted nodes to look up and search, according to an embodiment. According to another embodiment, these nodes are organised in a hash-table for efficient searching, to find each listener interface whenever looked up by a caller interface for example. The ECI/BCI may employ any such method for efficient organization and searching of the interfaces.

The code in each module (e.g. a first module that implements a listener function and a second module that implements code to call the listener function) is designed and implemented to use the respective service functions of ECI/BCI in order to facilitate communication between any two modules (e.g. the first module and the second module). Any part or module that implements a listener interface in the application may access ECI/BCI to register the listener function/object along with a look-up key assigned to (or pre-defined to associate with) the listener service. Likewise, any part or module that implements a caller interface in the application may access ECI/BCI to look up a listener function/object using the look-up key assigned to (or pre-defined to associate with) the listener service, according to an embodiment. That is, ECI/BCI facilitates communication and collaboration between any two modules or parts by matching each caller interface with the respective listener interface using a pre-defined protocol such as look-up keys.

According to another embodiment, FIG. 30 illustrate how a global "Exchange for Communication Interfaces" (ECI) or "Broker for Communication Interfaces" (BCI) object is used to create or generate communication code that allows collaboration between any two modules in an application, where Application 3000 comprises of multiple modules (e.g. modules that implement code for listener interfaces 3001, 3002, 3003, and modules that implement code for caller interfaces 3005, 3006, 3007).

In this embodiment, the code for modules includes information and instructions for each coupling interface. That is, each module that implements a listener interface includes information and instructions to describe the interface along with means for the listener interface (or listener service) to be looked up. Likewise, each module that implements a caller interface includes information and instructions to describe the caller interface along with means for the caller interface to look up the appropriate listener interface (or listener service). Communication between any two modules can be facilitated by including communication code to connect the caller interface of one module with the appropriate listener interface of another module by using the means to look up and find the appropriate listener interface.

ECI/BCI 2200 is implemented as part of a pre-processor or compiler (referred to as Arjun) 3014, where Arjun (e.g. pre-processor or compiler) reads the information of each listener interface to register listener functions and also reads information and instructions of caller interfaces to build lists of available listener interfaces and caller interfaces, and uses this information to create or generate coupling or communication code that is necessary to allow communication and collaboration between each caller interface and the appropriate listener interface by using the means to look up and find interfaces having a symbiotic relationship. If a module implements a listener interface, the module incudes information of the listener function (or object) in the code of the module for Arjun to extract this information and register the interface with ECI/BCI (where ECI/BCI is also a part of Arjun). If a module is required to communicate with other models that implement listener interfaces, the module implements code for a caller interface and the module also includes the interface information in the code of the module for Arjun to extract this information and register the interface with ECI/BCI. Arjun uses the information of the interfaces to create and generate communication code for the pair of interfaces (that are determined, through look-up keys or other means, to have a symbiotic relationship with each other), where the communication code can allow communication between the modules in the application.

According to an embodiment, ECI/BCI 2200 is part of the Arjun 3014 module, and Arjun can be part of a pre-processer that can extract the information of the interfaces. Arjun 3014 uses the information of each interface to register them with ECI/BCI 2200. ECI/BCI builds lists of available listener interfaces 2230 and caller interfaces 2235 that require listener interfaces. Arjun uses the interface information to generate communication code between modules by using means of look-up to match each caller interface with the appropriate listener interface. Means of look-up involves utilizing a look-up key, according to an embodiment. According to another embodiment, each interface is given a unique ID and a table is provided that defines each pair of IDs that have a symbiotic relationship with each other. That is, if ID-A is the unique ID for Interface-A, and it has a symbiotic relationship with each of Interface-B, Interface-C, and Interface-D, then the table of symbiotic relationships contains three entries, [(ID-A, ID-B), (ID-A, ID-C), (ID-A, ID-D)], where ID-B, ID-C, and ID-D are the unique IDs for Interface-B, Interface-C, and Interface-D respectively.

According to another embodiment, ECI/CBI is part of the Arjun module, and Arjun can be part of a compiler (or interpreter) that can extract the information of the interfaces. Arjun uses the information of each interface to register them with ECI/BCI. ECI/BCI build lists of available listener services and caller interfaces that require listener interfaces. Arjun uses the interface information to create and include communication code that allows collaboration between modules by using means of look-up to match each caller interface with the appropriate listener interface. The means of look-up to find a symbiotic relationship for each interface involves utilizing a look-up key, according to an embodiment.

According to another embodiment, ECI/BCI object is designed to create two lists, including (i) one list for listener interfaces (e.g. 2230) and (ii) another list for caller interfaces (e.g. 2235), and uses this information to validate communication interfaces to be able to detect software bugs such as incompatible interfaces or mismatch of interface versions.

Figure 31:
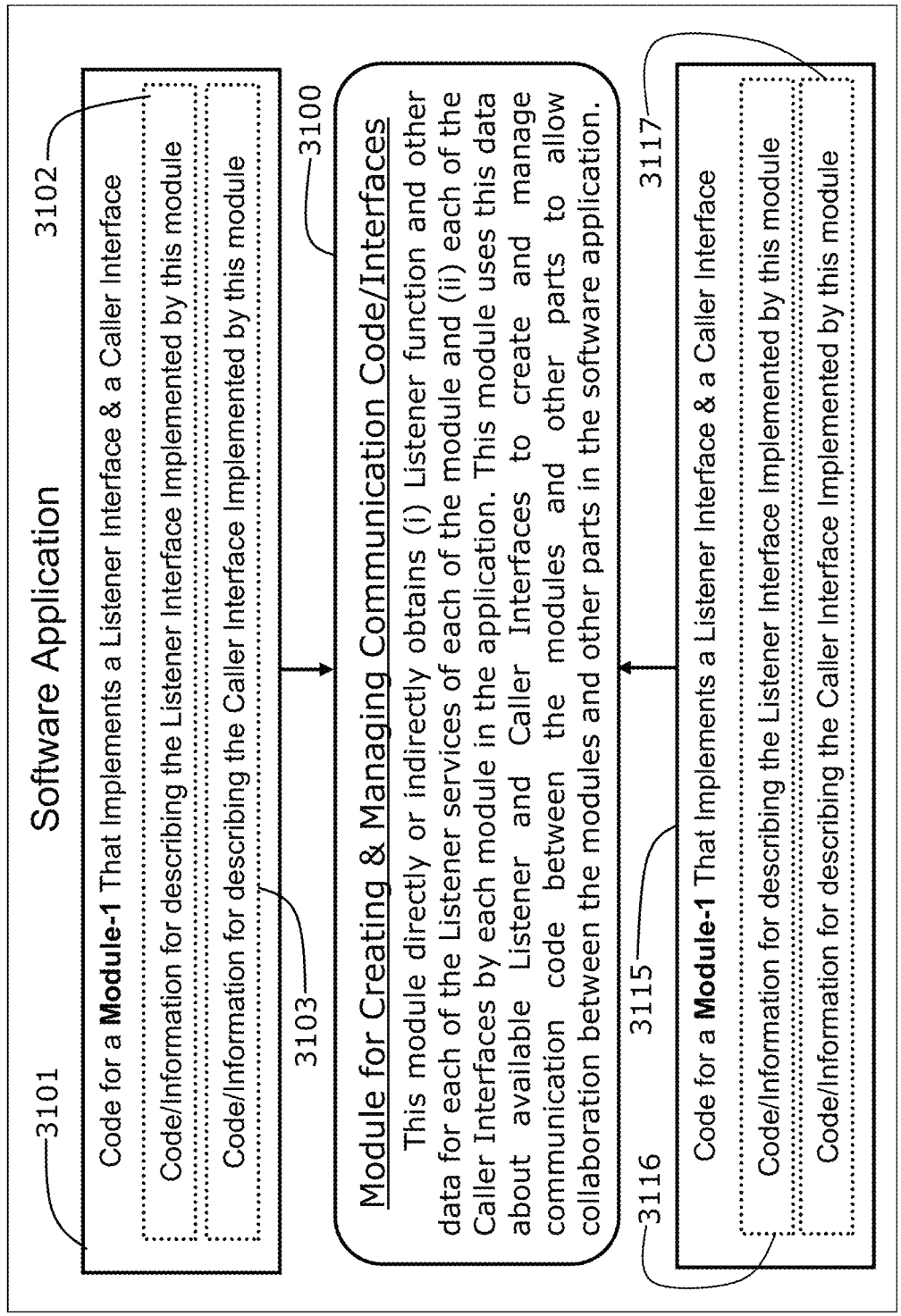
FIG. 31 shows multiple modules, where each module comprises of necessary information about listener interfaces and caller interfaces. This information is used to create necessary communication code and manage the communication code (e.g. by detecting broken communication code), according to one embodiment.

FIG. 31 shows two modules (Module-1/3101 and Module-2/3115). Module-1/3101 implements a listener interface (or listener service) and caller interface (or caller service), where Module-1/3101 comprises of (i) code and information 3102 for the listener interface or service provided, and (ii) code and information 3103 for the caller interface to be connected to a listener interface (such as 3116) implemented by another module (such as 3115). Likewise, Module-2/3115 provides one or more listener interfaces and one or more caller interfaces and is comprised of (i) code and information 3116 for each listener interface implemented, and (ii) code and information 3117 for one or more caller interfaces to communicate with other modules. According to an embodiment, a mechanism 3100 is designed to (1) get the data or information for each listener interface to build a list of listener services (e.g. 2230) and (2) get the data or information for each caller interface to build a list of caller services (e.g. 2235). The mechanism 3100 is also designed to generate communication code to allow communication and collaboration between modules by connecting each caller interface of a module with the appropriate listener interface of another module by using information in the lists (2230 and 2235) and by using look-up means to match the caller interface with the appropriate listener interface, according to an embodiment.

According to an embodiment, pre-processor or compiler 3100 comprises of ECI/BCI object and the pre-processor or compiler accesses (i) instructions and information for each listener interface (e.g. 3102 and 3116), and (ii) instructions and information for each caller interface (e.g. 3103 and 3117) to register listener services and caller services with ECI/BCI. In case 3100 is a pre-processor, the pre-processor in collaboration with ECI/BCI generates communication code, where the communication code can allow collaboration between modules in an application (when the communication code is properly included in the code for the application), according to an embodiment. According to another embodiment, in case of compiler, the compiler in collaboration with ECI/BCI creates communication code (e.g. to be included in the compiled byte code of the applications) to allow collaboration between modules in an application. The application code does not use ECI/BCI at run-time, but pre-processor or compiler uses ECI/BCI at compile-time to create or generate communication code to facilitate collaboration between modules or parts in the application.

According to yet another embodiment, ECI/BCI object is included in the code of an application that comprises of multiple modules, where each module (i) might implement one or more listener interfaces and include code to register each listener interfaces (e.g. 3102 and 3116), and (ii) might implement one or more caller interfaces and include code (e.g. 3103 and 3117) to look up required listener interfaces. According to an embodiment, ECI/BCI only creates a list of listener interfaces and returns the reference for a listener function when the code implemented for caller interface requests for a listener interface by using a look-up key to find the listener function. According to another embodiment, ECI/BCI object builds two lists (e.g. 830 and 840) to perform additional testing and validation of the interface. In this kind of embodiment, ECI/BCI object is included in the code of the application and ECI/BCI facilitates communication between modules at run-time of the application.

Section-L: Communication Code and Dependencies Between Modules in an Application A large software application might comprise of many modules (e.g. components, objects, or parts), where each of the modules in the software application likely collaborates with one or more parts in the application. In other words, when developing the application, each of the modules is added to the application, and if this module requires collaborating with one or more other parts (e.g. modules or objects) of the application, necessary communication code is also implemented for allowing collaboration between this module and other parts in the application. This kind of communication code is harder to maintain (e.g. when redesigning the module or the other parts) and is often error-prone, so it is desirable to invent mechanisms and tools for reducing such error-prone tasks and complexity. This kind of communication code creates dependencies between each module and other modules or parts, where such dependencies are hard to track or comprehend, particularly to the newly-recruited software programmers. It is desirable to device mechanisms and tools for reducing the complexity of tracking and/or comprehending dependencies between the modules.

The widely used method for creating communication code for each module, when the module is added to an application and if the module needs to communicate or collaborate with one or more other parts or modules in the application is: Manually implementing few lines of communication code to allow the module to collaborate with each of the other parts. For example, if the module provides a useful function or a service which is needed by several dozens of parts in the application, it requires implementing few lines of error-prone communication code to allow necessary collaboration between the module and each of the other dozens of the parts.

To replace this module by another module (or an improved version having updated interfaces), it requires error-prone efforts for finding this communication code implemented for each of the parts and fixing the communication code. This kind of changes must be made in dozens of places, if dozens of parts are using the service. It is desirable to minimize this kind of error-prone activities or tasks by using tools or mechanisms for assisting effectively in automating as many error-prone tasks as possible for maintaining the communication code, for example. It is desirable to invent better ways for creating and managing the communication code.

For example, in a shopping-cart application (e.g. FIG. 17) that is displaying hundreds of shopping items and a shopping cart (e.g. an Invoice Table), each of the shopping item calls a method of the shopping cart when the user selects the item by passing information about the item as parameters. Hence, today it is required to explicitly implement communication code for each of the shopping items, so that the shopping item can call the method of the shopping cart whenever the shopping item is added to the shopping cart (e.g. by double-clicking on the shopping item). Also, it is required to implement necessary communication code when a new shopping item is added to this shopping application to allow communication between the new shopping item and the shopping-cart (e.g. an Invoice-Table). If the module for Invoice-table is replaced by another new Invoice-table module for another source, it is required to find the communication code for each shopping-item and update the communication code to properly use the interfaces of the new Invoice-table.

Many software experts agree that about 80% of the software engineering is changing existing code (e.g. for creating upgraded versions and maintenance). Substantial portion of this effort goes into manually performing various tasks for changing and maintaining the communication code in each of the software applications, where many of the tasks are hard and often error-prone. Today, most of these tasks are being done manually. It is desirable to automate as many of these tasks as possible by inventing and using tools and mechanisms, according to an embodiment.

Most large software applications (or products) are created by a team of software engineers. Each of the large software applications (or software projects) not only comprises of multiple custom modules (e.g. objects, components, or other kind of parts) but also use many reusable modules (e.g. objects, components or other kind of parts such as APIs or Libraries etc.) from open source or third-party vendors. Each of the engineers in the team create one or more modules and each module created by an engineer likely communicates with other modules created by other engineers in the team. Hence, it requires careful collaboration between the members of the team for creating and, particularly, redesigning the modules during future maintenance release cycles.

For example, the communication code between any two modules (that interact with each other) must be tested whenever one of the two modules is redesigned. For example, when creating an upgraded version or maintenance release of a software application (or product), each of the modules is being redesigned in parallel by different member in the team. If an upgrade release requires changing one or more communication interfaces of a module, such changes to each of the communication interfaces requires corresponding changes in other modules that are using the communication interface.

The pluggable modules in an application can employ alternative mechanisms to avoid manually implementing communication code for allowing collaboration between each module and other modules or parts in the application. For example, one of the methods is including a global object SRO/DoS in the code of the application, wherein (i) each module comprises of part of the communication code to register with the SRO/DoS each of the services provided for other modules, and (ii) each module comprises of part of the communication code to lookup from the SRO/DoS each of the required services. The goal for using SRO/DoS is to eliminate the need for manually implementing (or adding) communication code (in the code of the application) when each module is included (or plugged in) into the application.

Alternative methods or mechanisms may be employed to eliminate the need for manually implementing (or adding) communication code (in the code of the application) when each module is included (or plugged in) into the application. Each of the modules in an application employs methods (or protocol) and/or mechanisms for these two kinds of tasks, such as, (i) if a module provides one or more services (e.g. for other modules), the module publishes each of the services by including information necessary for creating communication code for other modules to request the service, and (ii) if a module requires one or more services (e.g. provided by other modules), the module subscribes to each of the required services by including information necessary for creating communication code to access the service provided by other modules.

In an alternative embodiment for SRO/DoS (that operates at runtime of the application), a pre-processor or compiler (referred to by a given name Arjun) reads source code of the modules in the application for available services in each of the modules and services required by each for the modules for building two lists (1) information for each of the published services, and (2) information for each of the subscribed services; and uses the information in the lists for generating communication code, which can be used for allowing collaboration between modules.

Section-M: A Pseudo-Code Example for Publishing a Service and Subscribing to a Service for Compiler or Pre-Processor In an embodiment, an intelligent Compiler or Pre-processor (referred to by a given name Arjun that also uses a mechanism comprising SRO/DoS) is created that reads the exported interfaces and imported interfaces for creating coupling instruction for allowing communication between a first module that exports an interface (for a service provided by the first module) and a second module that uses the interface (for a service required by the second module), for example, by (1) creating a list of all the exported interfaces (for available services), and (ii) creating a list of all the imported services (for required services). Today, no compiler or pre-processor is providing this kind of feature for getting information from each of the modules included in an application for creating necessary communication for the module. According to an embodiment, a pre-processor is used to read information from source code for each of the modules to build two kinds of lists, where one list is for all the available services and the other list is for all the required services.

1. // Implementation of a service function for providing a service for other modules/parts
2. Integer NameOfTheServiceFunction (Integer Int1, float flt1, String str1,
3. PS_CanvasClass PS1, CallBackClass CB1)
4. {
5. // Comprises of code for application or business logic for providing a service.
6. // This method is the entry point for requesting a service of a module.
7. // This may use other methods/function in the module and/or other modules.
8. }

The above pseudo-code listing shows a sample service function NameOfTheServiceFunction implemented in a module. FIG. 26 shows two code blocks, where the first code block 2610 comprises of pseudo-code listing for publishing a service function of a module, where the module provides the service, and the second code block 2620 comprises of pseudo-code listing for subscribing to a service by module, if the module requires or depends on the service. The information for describing interface is enclosed between delimiters "$[%" and "%]$" by using XML format, according to an embodiment. That is, the information for describing a service is clearly demarcated, for example, by including the information for each service between a unique pre-defined delimiters such as "$[%" and "%]$", where the information is sufficient for generating communication code.

The pseudo-code in listing-1 or instruction 2610 (in the module that implemented a service and is provided by publishing the service) illustrates an exemplary embodiment for publishing the above service function, according to an embodiment. A unique predefined name (e.g. ExportArjunInterface) is used for publishing each of the services provided, according to an embodiment. Likewise, the pseudo-code in listing-2 or instruction 2620 (in the module that requires a service) illustrates an exemplary embodiment for subscribing to the service function, according to an embodiment. A unique predefined name (e.g. ImportArjunInterface) is used for subscribing to each of the required services, according to an embodiment.

If a module provides one or more services for other modules, then the module comprises of necessary information for each of the services to uniquely identify the service to be able to find it. In an embodiment, each module publishes this information for each service provided by the module. In an embodiment, any other module (or part) in the application that requires the service is subscribed for the service. In an embodiment, pre-processor or compiler reads this information for each service (either required service or provided service) and uses this information for creating communication code after proper validation and testing of interfaces and versions, according to an embodiment.

For example, if a service-provider module is redesigned for a future release and a service function (e.g. Mod1ServiceFunction 1605) is updated by adding a new or 4th parameter for supporting additional capabilities, then the service-consumer interface (i.e. in each of the module that is using the service function) must be updated for using the new service-provider interface. If plural modules require the service, the service-consumer interface in each of the plural modules must be updated (e.g. to pass 4 parameters, instead of 3 parameters). If a service-consumer interface (e.g. 1609) is not updated inadvertently to match the new or updated service-provider interface, it results in an incompatible interface between the service-provider interface and service-consumer interface. It is desirable to detect this kind of inadvertent mistakes. Such mistakes likely committed when creating new version after a year from earlier release.

The incompatibility between service-provider interface (e.g. the declaration of the service function Module1ServiceFunction at line-3 of 1605) and service-consumer interface (e.g. calling the service function Module1ServiceFunction by using a reference RefForModule1Service at line-3 of 1609) is detected by comparing the number of parameters and type of each of the parameters, according to an embodiment. Just comparing the types of parameters can't detect certain kinds of errors. For example, the three parameters are of types String, Integer, and Integer respectively for Name, Weight (as integer in milligrams), and Height (as integer in millimeters), in the service-provider interface.

Calling the service-provider function by passing Name, Height (as integer in milligrams), and Weight (as integer in milligrams) passes testing by comparing types of parameters. It is an error, because the service-provider function (e.g. 1605) expects weight in the second parameter and service-consumer (e.g. 1609) is passing height in the second parameter. Additional information is provided in the descriptions (e.g. 2610 listing-1 and 2620 listing-2) for each part of the interface for this kind of errors, according to an embodiment. For example, 2610 listing-1 also provides information for data as "height" at line-6 in listing-1.

1. // Implementation of a listener function in a first module
2. Integer MyListenerFunction (String Part Object Par2)
4. {
5. // Comprises of code for application or business logic to provide a service.
6. // This method is the entry point (or port) for requesting a service of a module.
7. // This may use other methods/functions in the module and/or other modules.
8. }

The above listing shows the implementation of a listener function, after implementing the code of a function "MyListenerFunction" in a first module. To export or register the function as a listener function from the first module, the code of the first module includes the following two lines of code, according to an embodiment. The keyword "ListenerInterface" indicates to the Compiler to register the listener function and its information with the mechanism comprising of ECI/BCI.

10. Listenerinterface void MyListenerFunction (String Par1, Object Par2)
20. {Interface. LookupKey="Shopping Cart"; Interface.Version="3.1";}

A second module that is required to call the listener function implements the following code to define a variable for caller interface "MyCallerFunction", where the keyword "CallerInterface" indicates to the Compiler to look up (by using LookupKey) a listener function. According to an embodiment, the compiler is designed to store the reference for function "MyListenerFunction" in caller reference variable created for function "MyCallerFunction".
10. Callerinterface void MyCallerFunction (String Part Object Par2)
20. {Interface. LookupKey="Shopping Cart"; Interface.Version="3.1";}

The compiler can be designed to look up (by using Look-up Key) and find listener function to save the reference for listener interface function in the variable created for caller function, after validating the interface (e.g. parameter types) and version, according to an embodiment. After defining caller variable "MyCallerFunction" to store the reference of listener interface function as in the above listing, the second module can call the listener function "MyListenerFunction" by using the function reference "MyCallerFunction" anywhere in its code just like any other local function.

Section-N: Using Service-Consumer Interfaces (e.g. Functions or Objects) to Allow Certain Degree of Flexibility, Adaptability, or Interchangeability FIG. 23 shows communication between module-1 2310 and module-2 2320 using SRO/DoS mechanism, wherein module-2 2320 uses a service provided by module-1 2310, according to an embodiment. FIG. 23 is nearly equivalent to FIG. 7 but has minor differences. Module-1 2310 comprises of implementation of a service function 2311 (i.e. Module1FunctionForServiceX) and part of the communication code 2312 for registering the service function with SRO/DoS by using a lookup key (i.e. "Service-X of Module1"). Module-2 2320 comprises of part of the communication code 2321 for looking up the service by using the lookup key (i.e. "Service-X of Module1") and storing the reference of the service function in a local variable (i.e. RefForModule1ServiceX). Module-2 2320 implements a service-consumer interface function 2322 for calling the service function (i.e. Module1FunctionForServiceX) by using the reference (i.e. stored in variable RefForModule1ServiceX). Module-2 2320 uses the interface function 2323 wherever Module-2 2320 needs "Service-X of Module1 2310".

According to an embodiment, the service-consumer interface function 2322 InterfaceForExternalService1 handles any incompatible interface between service-provider module 2310 and service-consumer module 2320. This function is designed to act as an adapter for bridging differences of artificial dependencies between the two interfaces. For example, the service function Module1FunctionForServiceX is designed to accept 3 parameters, while the code in the consumer is designed to call interface-function InterfaceForExternalService1 by passing 4 parameters, according to an embodiment. If the information or data in 4 parameters can satisfy the real dependency but the issue is only in artificial dependency, it is possible to implement adapter code for bridging the gap between service-provider interface function (e.g. Module1FunctionForServiceX) and service-consumer interface function (e.g. InterfaceForExternalService1).

An exemplary embodiment for when this kind of situation arises: If module-2 2320 is designed to use service-provider module-1a created by a first vendor but is later replaced by another service-provider module-1b available from open source community. For example, both modules, module-1a and module-1b that is used for replacing module-1a need the same information and provide the same service but offer different service-provider interfaces. For example, assume module-1a requires 4 parameters while new module-1b requires 3 parameters to send or exchange essentially the same information or data. There is no problem in fulfilling real dependency but there is an incompatibility in the part of artificial dependency.

Summary for "Real Dependency" and "Artificial Dependency" using an example: When two modules require collaborating or communicating with each other for accomplishing a task, there is said to be a dependency between the two modules. Likewise, a first module depends on a second module for accomplishing its task, then first module is said to have a dependency on the second module. A dependency is divided into two parts (i) real dependency and (ii) artificial dependency. For example, household appliances such as AC, Refrigerators, PC, or Washing machine require electric power for performing each of their work. Since the power is essential to operate each of the appliances, the need for electric power is defined as real dependency.

The appliances in the USA are designed to run on 50 Hz AC 115 Volts power supply and pins in plugs are designed to be flat to fit in flat electric sockets having flat holes. On the other hand, the appliances in many Asian countries are designed to run on 50 Hz AC 230 Volts power supply and pins in plugs are designed to be round to fit in electric sockets having round holes. Hence, such appliances purchased in the USA can't be readily plugged-in in the hotel rooms in Asia or Europe, due to this incompatible coupling interfaces. This kind of dependency is defined as artificial dependency. Such artificial dependency may be overcome by designing and using appropriate adapter.

Likewise, if any two software modules must collaborate with each other, then they are said to have a dependency on each other. The data exchange is real dependency. On the other hand, the format of the data and order of parameters is artificial dependency. As long as the real dependency is met, often an adapter can be designed and used to connect incompatible interfaces to allow collaboration between them. Additional information and/or code is provided in the information for available services (e.g. pseudo-code 2610 in FIG. 26) and information for required service (e.g. pseudo-code 2620 in FIG. 26), where the information is used by SRO/DoS or Arjun for generating proper communication code comprising of adapter code to facilitate collaboration between two modules having incompatible interfaces, where the adapter code overcomes issues due to artificial dependency, according to an embodiment.

A certain function that provides utility services is called in many locations in the code of module-2. Even though such utility service function of module-1 is used at 100 locations in the code for module-2, the dependency between module-1 and module-2 is just one. An interface function (or object) is used if there is a mismatch between the parameters of service function implementation in module-1 and the way the services function is used in module-2, according to an embodiment. For example, if Module-1 is replaced by another better implementation Module-1a from another vendor, which also offers required service in better manner, the interface function can be redesigned to bridge the gaps between interfaces of service functions of module-1 and module-1a, according to an embodiment.

Figure 24:
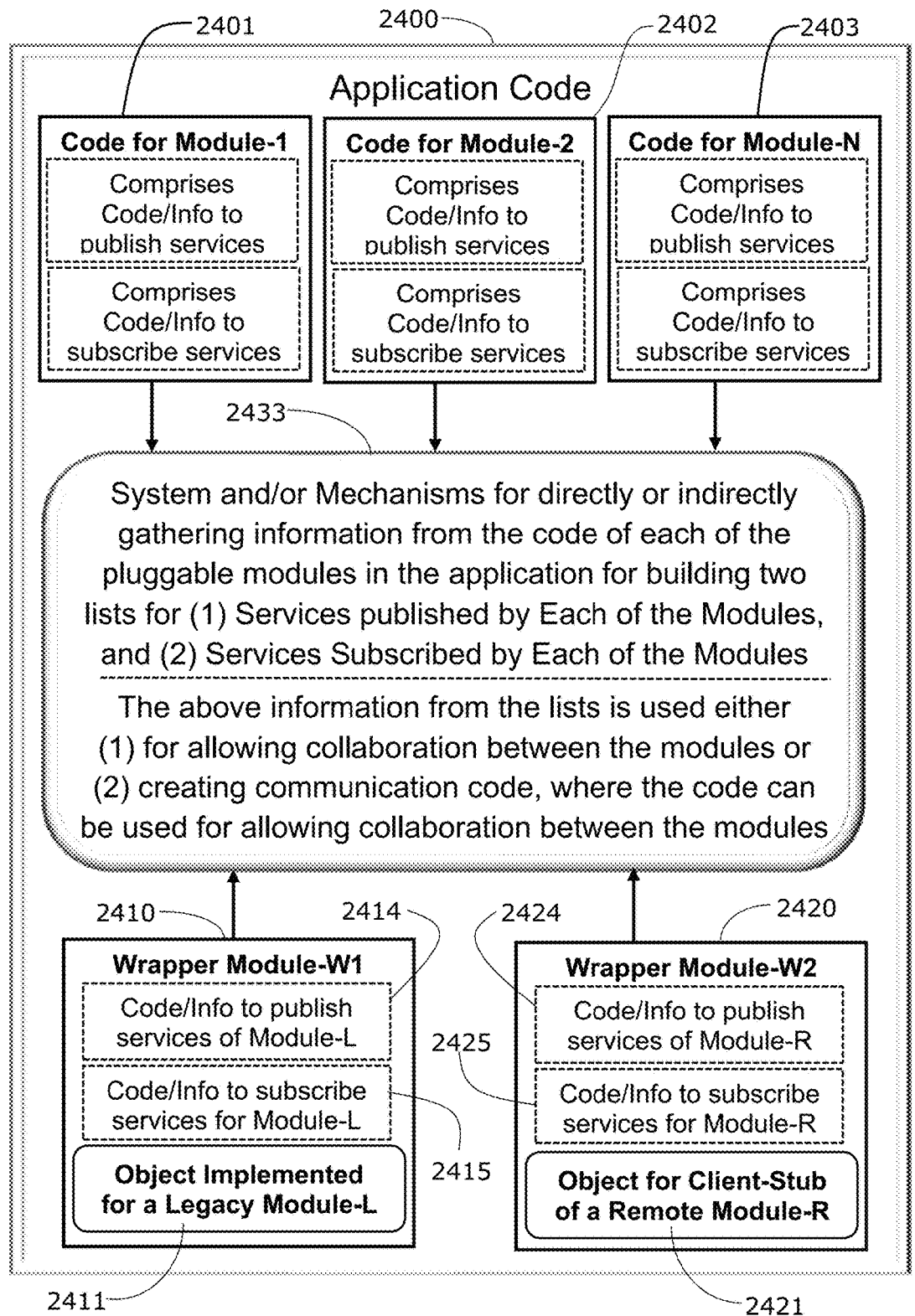
FIG. 24 shows multiple modules including two wrapper-modules (1) for a legacy module and (2) for client-stub for a remote module in an application, where each module comprises of information for each of the services published by the module and of information for each of the service subscribed by the module, and a mechanism for using the information from the modules for automating many tasks for facilitating collaboration between the modules, according to one embodiment.

Section-O: Wrapper Modules for Legacy Reusable Modules and Remote Modules Access Using Client-Stubs FIG. 24 shows an application 2400 comprising of multiple modules 2401, 2402, 2403, 2410, and 2420, according to an embodiment. The module 2410 is a wrapper module for a legacy reusable module 2411 Module-L, where module-L 2411 is not designed to be a pluggable module. The wrapper module 2410 Module-W1 is designed to implement parts of the communication code (1) publishing services 2414 offered by Module-L 2411 (if Module-L offers one or more services for other modules), and (2) subscribing to one or more services 2415 required by Module-L 2411 (if Module-L requires one or more services from other modules). FIG. 18 illustrates a sample implementation of wrapper module using pseudo-code. Some systems and/or mechanisms 2433 are used to directly or indirectly gather information from the code of each of the pluggable modules in the application 2400 for building two lists for (1) services published by each of the modules 2401, 2402, 2403, 2410, and 2420, and (2) services subscribed by each of the modules 2401, 2402, 2403, 2410, and 2420. The information from the lists is used either (1) for allowing collaboration between the modules 2401, 2402, 2403, 2410, and 2420 or (2) creating communication code, where the code can be used for allowing collaboration between the modules 2401, 2402, 2403, 2410, and 2420.

The module 2420 is a wrapper module for a client-stub module 2421 Module-R, where Module-R is not designed to be a pluggable module. As illustrated in FIG. 19, each of the service functions in the module for client-stub 1902 communicates with server stub 1907 to access services implemented in server module 1908 in server computer 1910. The wrapper module 2420 Module-W2 is designed to implement parts of the communication code (1) publishing services 2425 offered by Module-R (if Module-R offers one or more services for other modules), and (2) subscribing to one or more services 2424 required by Module-R (if Module-R requires one or more services from other modules).

Each of the large software applications often uses multiple reusable modules (e.g. Objects, components, or other kind of parts such as libraries or APIs for microservices) from $3^{rd}$ party sources such as component vendors or open source. Substantial work for using a reusable module comprises of creating or implementing communication code for allowing collaboration between the reusable module and other parts of the application. Many of the tasks involved in creating and managing the communication code can be automated by using tools, processes, and/or mechanisms disclosed in this invention, according to an embodiment.

To use tools (e.g. Arjun or SRO/DoS), processes, and/or mechanisms disclosed in this invention, each reusable module must comprise of parts of the communication code such as registering (or publishing) each of its service methods (or functions) with Arjun (or SRO/DoS). However, reusable modules existing today don't comprise of such communication code or information for using Arjun (or SRO/DoS). In a preferred embodiment, a wrapper module (e.g. a class definition) is designed and developed for such reusable modules (e.g. from legacy libraries or APIs), where the wrapper class (e.g. Module-W1) uses reusable legacy module-L and implements the necessary parts of the communication code by using the reusable legacy module (e.g. module-L).

A pseudo-code example for a wrapper class is provided in FIG. 18, according to an embodiment. For example, in a preferred embodiment, a wrapper class (e.g. class for Module-W1) is designed and implemented for each module (e.g. module-L) where the wrapper class for "module-W1" implements parts of the communication code such as code for registering each of the service functions of module-L with Arjun. When properly designed and implemented, module-L can be included into the application (e.g. for using services of module-L) by including an object instance of the wrapper class "Module-W1".

Figure 3:
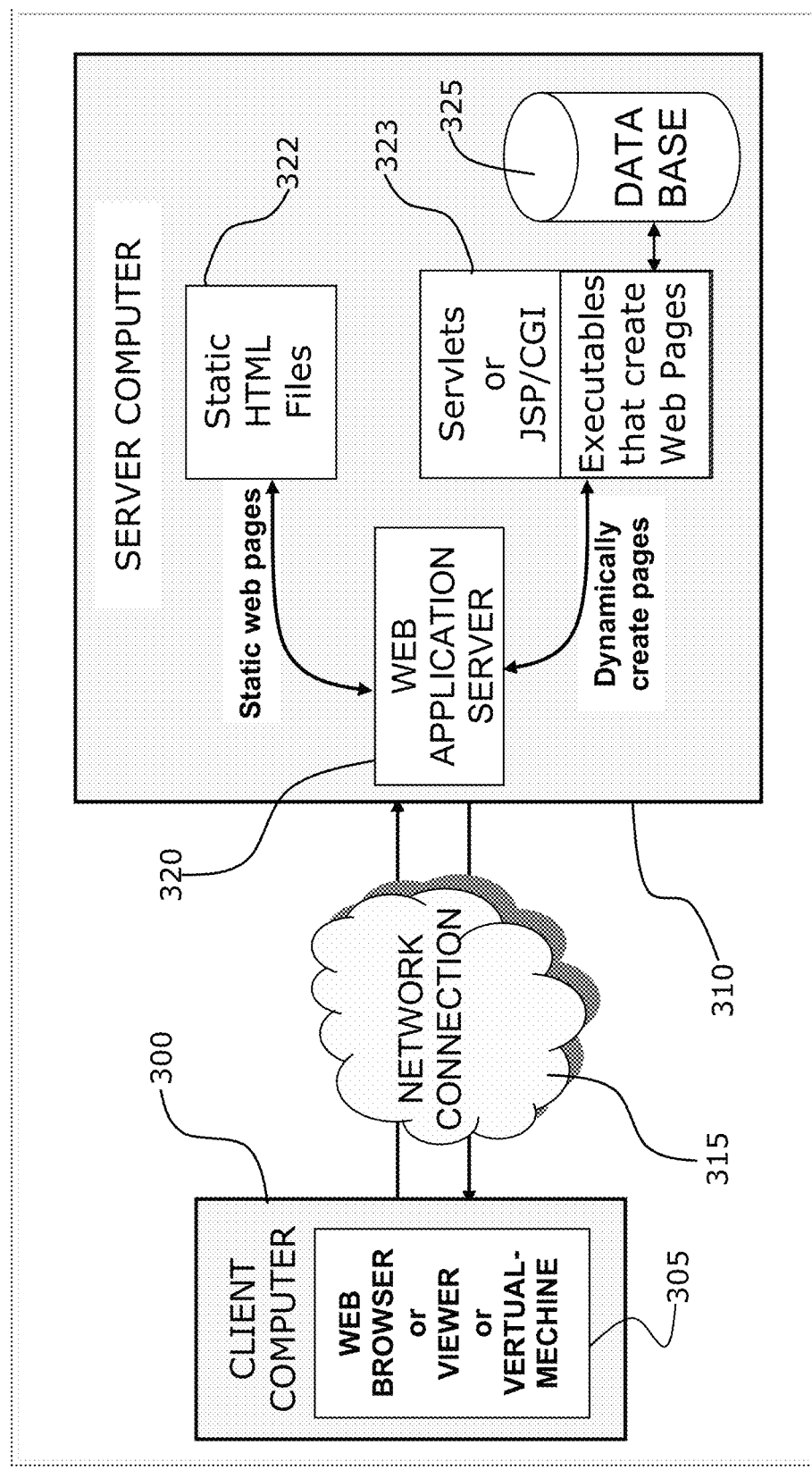
FIG. 3 shows an exemplary computing systems and devices for implementing the method of software development of web-applications according to the present invention, according to one embodiment.

Some of the software applications access services from remote modules that are being executed on different computers. FIG. 3 illustrates an example as a client and server architecture. The server provides one or more services and an application running on a client computer needs to get the services. In the above exemplary implementation, a client-stub along with server-stub is designed and implemented to allow communication between client application (i.e. an executable running on client computer) and server application (i.e. another executable running on client computer). An exemplary embodiment is illustrated in FIG. 19, FIG. 20a, and FIG. 20b. The client-stub implements various methods (of functions), where each method is designed to communicate over network (e.g. internet, intranet, LAN, or WAN) to access a given service through server-stub. Each of the methods (or functions) in client-stub is designed to access a service available on the remote server application. The methods (or functions) for all the required services in the client-stub can be implemented as a module such as a class definition in Object Oriented Programming.

To use tools (e.g. Arjun), processes and/or mechanisms disclosed in this invention, each class-stub (or wrapper module for the client-stub) can be designed to implement parts of the communication code such as registering each of its service methods (or functions) with Arjun. However, if a legacy client-stub is not designed to use Arjun, a wrapper class can be implemented. In a preferred embodiment, a wrapper module (e.g. a class definition) is designed and developed for such client-stub, where the wrapper class (i.e. module) designs and implements the necessary parts of the communication code by using the client-stub. For example, in a preferred embodiment, a wrapper class (e.g. module-W2) is designed and implemented for each client-stub (e.g. of a remote module Module-R), where the wrapper class "Module-W2" implements parts of the communication code such as code for registering each of the service functions. When properly designed and implemented, Module-R can be included into the application by including an object instance of the wrapper class "Module-W2".

The above is an exemplary implementation for employing wrapper class to make the module for each client-stub into a pluggable module. It is not necessary that both applications (i.e. executable for server-application and client-application) run on different computers. In some cases, the executable for both applications might be running on same computer and communicate with each other by employing methods such as Socket-based IPC (Inter-process communication), or other kinds of IPC such as metaphors and shared memory etc. The client-stub can employ any kind of method for IPC (Inter-process communication) to request each service from the server-application.

Figure 25:
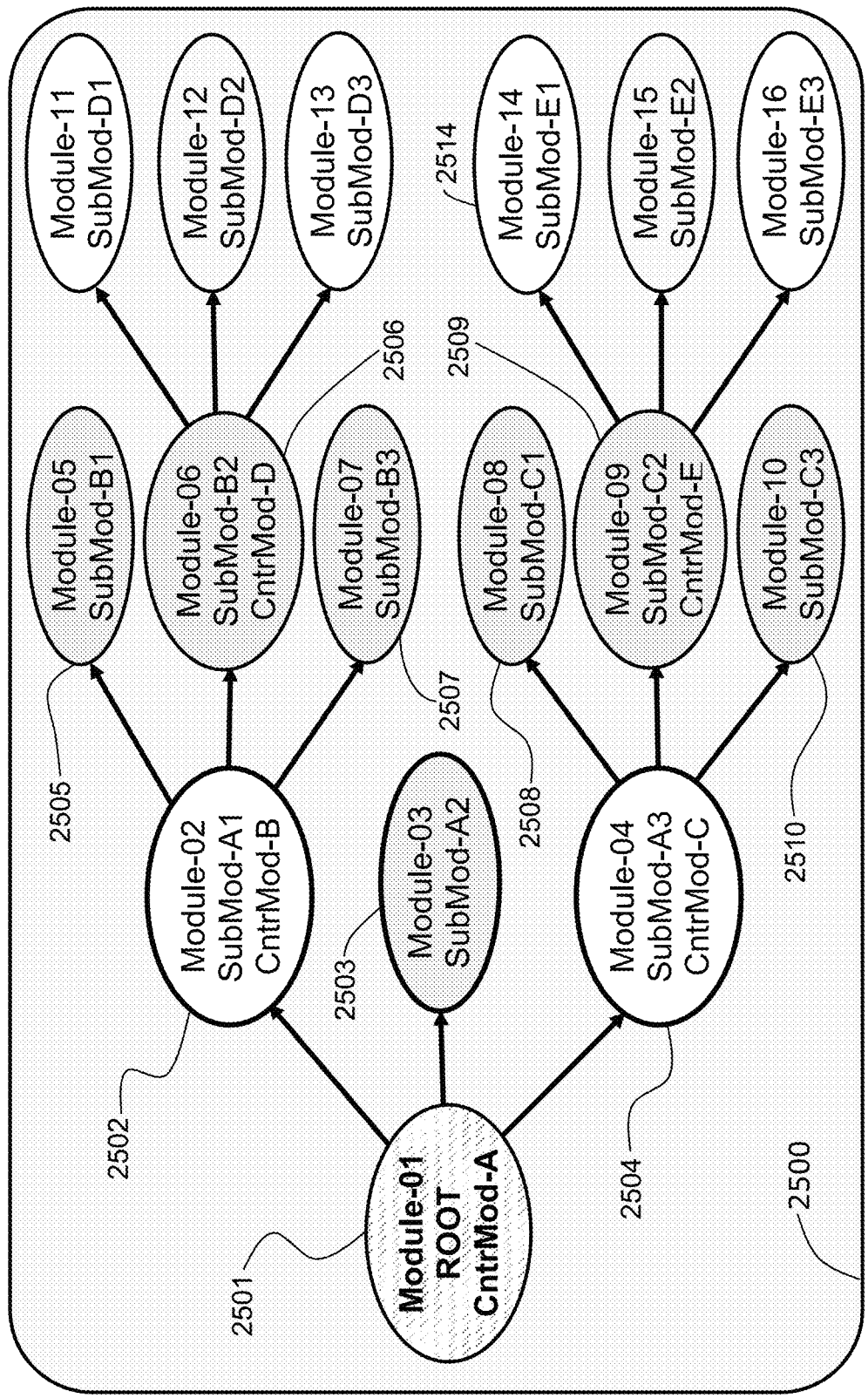
FIG. 25 shows an application built by assembling modules/object as a hierarchy of pluggable modules/objects, where two container-modules/objects are two different object instances of the same class definition, according to one embodiment of object-oriented programming.

Section-P: Applications Having Object (i.e. Module) Hierarchy and Having Multiple Instances of Objects of Same Class, in an Embodiment for OOP FIG. 25 shows an application 2500 comprising of container modules (e.g. Object instances) and sub-modules (e.g. Object instances), where each container module comprises (in short CntrMod) of sub-modules (in short SubMod), according to an embodiment that uses OOP (Object Oriented Programming). The objects instances for CntrMod-A 2501, CntrMod-B 2502, CntrMod-C 2504, CntrMod-D 2506, and CntrMod-E 2509 are container modules. The objects instances for SubMod-A1 2502, SubMod-A2 2503, and SubMod-A3 2504 are sub-modules of CntrMod-A 2501. The objects instances for SubMod-C1 2508, SubMod-C2 2509, and SubMod-C3 2510 are sub-modules of CntrMod-C 2504. The objects instances for SubMod-B1 2505, SubMod-B2 2506, and SubMod-B3 2507 are sub-modules of CntrMod-B 2502.

A module is a container module if it comprises of other modules where the other modules are referred to as sub-modules in the context of the container module. A sub-module can be a container-module (e.g. Module-6 2506) if it comprises of sub-modules (e.g. Module-11 2511, Module-12 2512 and Module-13 2513) and is referred to as a container-module in the context of its sub-modules (e.g. Module-11 2511, Module-12 2512 and Module-13 2513). Hence, a module can be both container-modules (in the context of its sub-modules) and sub-module (in the context of its container module) based on relative position. For example, Module-04 2504 is a sub-component in the context of module-01 2501, while being container-module in the context of its sub-modules 8, 9 and 10 or 2508, 2509, and 2510.

Each container-module is at the root of a branch in the hierarchical tree of modules. For example, module-2 2502 is root of a branch, where modules 5, 6, and 7 2505, 2506, and 2507 are children (i.e. sub-components) and modules 11, 12, and 13 2511, 2512, and 2513 are grandchildren (i.e. sub-modules of modules that are sub-modules of module-2 2502). Sub-branch for Module-2 2502 comprises of modules 5, 6, 7, 11, 12, and 13 (2505, 2506, and 2507) (where modules 11, 12, and 13 2511, 2512, and 2513 are sub-components of module-6 2506). Sub-branch for Module-4 2504 comprises of modules 8 2508, 9 2509, 10 2510, 14 SubMod-E1 2514, 15 2515, and 16 2516 (where modules 14, 15, and 16 2514, 2515, and 2516 are sub-components of module-9 2509).

For example, assume more than one object instance (e.g. CntrMod-B 2502 and CntrMod-C 2504) of a class for a container module is used in an application. Assume module-12 2512 requires a service provided by module-07 2507 and the lookup key is "SubModule3ServiceX". Hence, module-15 2515 uses lookup key "SubModule3ServiceX" to access service of module-10, since objects CntrMod-B 2502 and CntrMod-C 2504 are instances of same Class-definitions, and both contain and use same functions but operate on different data stored in local variable. Since the same lookup key "SubModule3ServiceX" is used for both modules module-12 2512 and module-15 2515, care must be taken so that module-07 2507 calls service function in module-12 2512 (by using lookup key "SubModule3ServiceX") and module-10 2510 calls service function in module-12 2512 respectively (by using lookup key "SubModule3ServiceX").

According to an embodiment, module-ID (e.g. static int instance_count=0) for container module (i.e. CntrMod-B or CntrMod-C) is also used along with lookup key for finding right service function in correct (or respective) branch Module-2 2502 or Module-4 2504. The instance count is incremented in the constructor, according to an embodiment. According to another embodiment, respective name is passed, for example, left_engine and right_engine (e.g. in case of simulation of twin engines of an Airplane). According to another embodiment, a local separate object instance of SRO/DoS is used in respective branches for modules module-2 2502 and module-4 2504, for example by having a variable for SRO/DoS instance in the class for module-2 2502 and initializes the variable in the constructor of respective object instances module-2 2502 and module-4 2504. If communication code is generated by using the SRO/DoS to allow collaboration between module-7 2507 and module-12 2512, the communication code is included in the code for the class definition (where the object instances CntrMod-B 2502 and CntrMod-C 2504 are included using the same class definition), according to an embodiment.

If module-6 2506 requires a service using lookup key "SubModuleA2ServiceY" (that is provided by module-3 2503), then module-9 2509 requires the service of module-3 2503 associated with lookup key "SubModuleA2ServiceY". According to an embodiment, module-6 2506 uses local SRO/DoS instance for finding service provided by modules in the branch of module-2 2502 and another SRO/DoS instance for finding global service provided by modules under the branch of root module-1 2501. As illustrated by this example, appropriate method is used for requesting the right service function by sub-modules if it is required to use more than one instance of container module class in an application, according to an embodiment.

It is necessary to take special care and caution for a certain kind of modules (e.g. an Object instances of a class) which are dynamically created during runtime (e.g. by using statement "new" in Java or C++). When an object instance is created by using "new" statement on a class-definition (e.g. in Java or C++), its constructor calls the function that registers its services and also calls the function that looks up required services. In an embodiment, an object instance of each of such classes is tested individually by creating a test application. After testing, the SRO/DoS can be used for creating necessary communication code. An application might include more than one Object instance of the class, where each object instance might be used by a different sub-system of the application. Each object instance is initialized by and/or comprises of data for the respective sub-system. For example, if Object-A is created for sub-system-A and Object-B is created for sub-system-B, then sub-system-A must only access service methods in Object-A while sub-system-B must only access service methods in Object-B.

In an embodiment, sub-system name (or number/index) along with unique lookup key is used for finding the reference for a service function in the right object instance. For example, a static variable (e.g. static int sub_system_count=0;) may be used to count the number of sub-systems created, where the count is incremented in the constructors. Any PHOSITA (person having ordinary skill in the art) must employ a suitable mechanism based on things such as capabilities of compiler for programming language and the way sub-modules are structured.

According to an embodiment, the code for each of the modules comprises of part of the communication code, for example, to communicate with global SRO-object (e.g. to register or lookup each service), where the global SRO-object acts as a network-switch to connect any two modules that needs to communicate with each other (e.g. a first component provides a service and a second module uses the service). For example, FIG. 10 illustrates a star-network, where each of the modules (i.e 1001, 1002, 1003, 1004, 1005, 1006, 1007, 1008, 1009 and 1010) is connected to the switch (i.e. SRO/DoS 1000). For example, a first module initiates a call to communicate or collaborate with a second module, wherein, for example, the first module uses a unique lookup-key (e.g. analogous to telephone number or URL) for finding the required function or service of the second module.

For example, consider an application having many modules where each module collaborates or communicates with one or more other modules in the application. If a module needs to communicate with one or more modules for performing its tasks (e.g. to provide functionality or features), the module must find (e.g. using lookup key) and connect with appropriate modules to request each of the necessary services (e.g. by calling each of the service functions) for fulfilling the tasks. Imagine a network analogous to a telephone network, where each service to fulfill a task is given a unique lookup key. To fulfill a task, each module calls the switch (e.g. SRO/DoS) by passing the unique lookup key of the task and the switch connects with the appropriate service function (or object) that can provide necessary service to fulfill the task.

It is an error if two mobile phones have the same telephone number, as the telephone number is a unique lookup key to connect to the right mobile phone. When a call is placed on a network, the network may connect to a wrong mobile phone if two different mobile phones have the same telephone number. Likewise, it is an error to register two different services (e.g. functions or objects) by using the same lookup key. If two service functions are registered by using the same lookup key (or have the same lookup key), the SRO/DoS detects and reports such errors, according to an embodiment. It is an error to register more than one service function (or object) for a given lookup key (or set of keys). The lookup key (or set of keys) must be unique. It is OK to have 2 phones having the same 7-digit number, provided area code or country code is different. For example, in the USA, one can dial 7 digits to make local calls, while one must use 10 digits to make long-distance calls (where the additional 3-digit number is area code).

According to an embodiment, if a module provides one or more services, then the module registers each of its services with the SRO by using a unique lookup key (and optionally adding additional sub-branches) and a reference of a function (or method), where the function (or method) may be called for getting/requesting the service. If another module requires the service, the other module uses the unique lookup key to find the function using SRO and calls the function (or method) for getting the service. For example, if module-M07/1007 provides a service, it registers a function (or method, which can be called to request the service) and a unique lookup key with the SRO to find the service function (or method). If module-M03/1003 needs to request the service provided by module-M07/1007, then module-M03/1003 calls the SRO using the lookup key to find and call the function for getting the service provided by module-M07/1007.

According to an embodiment, a linked-list or chain of SRO/DoS is created starting from root module-1 2501. In this case, module-02 2502 comprises of an object instance for SRO/DoS class, which points to another object instance of SRO/DoS in module-1 2501. When module-12 2512 looks up a service (e.g. by using a Lookup key) by calling the local or nearest SRO/DoS in module-4 2504, if SRO/DoS in module-4 2504 can't find the service, SRO/DoS in module-4 2504 calls the next nearest SRO/DoS in module-1 2501, and so on. The lookup continues by traversing the chain of SRO/DoS until it finds the lookup key (or failure), according to an embodiment. If each of the SRO/DoS is requested to generate communication code, the communication code is included in the respective module. That is, the communication code generated by the SRO/DoS in module-4 2504 is included in code for module-4 2504, according to an embodiment. Likewise, the communication code generated by the object instance of SRO/DoS in module-2 2502 is manually included in code for module-2 2502, according to an embodiment. The communication code generated by the object instance of SRO/DoS in module-1 2501 is manually included in code for module-1 2501, according to an embodiment.

Section-Q: Other Means for Creating (or Generating), Validating Communication Interfaces, and Managing Communication Code and Interfaces According to an earlier embodiment that uses SRO/DoS, (a) each of the modules registers (or publishes) each of its services (i.e. provided by the module) with the SRO/DoS object and (b) each of the modules looks up (or subscribes to) all the services (required by the module) from the SRO/DoS object. The SRO/DoS creates two sets of nodes (each node for a service) in form of two lists (e.g. 830 and 840) by using this information (provided by each of the modules) for creating each node for each of the available and required services. The information available in the nodes in the two lists is used for generating communication code to allow communication between the modules (e.g. FIG. 10 and FIG. 11), according to an embodiment. This communication code is included in the code of the application at proper locations. The SRO/DoS acts as a virtual socket (e.g. software system-board or motherboard having virtual sockets) for each of the pluggable modules in an application by allowing collaboration between the modules in the application, according to an embodiment.

The SRO/DoS can eliminate the need for adding any more communication code in the application after including the instance of a pluggable module. Removing the pluggable module effectively removes all the code implemented for including the pluggable module and there is no need for removing any communication code (since there was no need for adding the communication code, when included the module). In an alternative embodiment, SRO/DoS is designed to automatically generate necessary communication code for the pluggable modules for allowing collaboration between the pluggable modules in the application. If the communication code can be generated automatically, there is no need to manually implementing the communication code for the modules, which in effect makes the modules pluggable modules (if the communication code can be included properly in the code of the application to allow communication between the modules).

According to an embodiment, the SRO/DoS creates two lists (e.g. 830 and 840) of nodes and uses the information in the nodes not only for validating communication interfaces but also for facilitating communication between the modules in the application. Furthermore, the SRO/DoS can be designed to use the information in each of the nodes in the two lists (e.g. 830 and 840) for not only validating communication interfaces but also generating communication code for the pluggable modules, provided the nodes in the lists have necessary additional pieces of data for generating the communication code. Hence, each module (a) must provide necessary pieces of data, when publishing each of its services and (b) must provide necessary pieces of data when subscribing to each of the required services. According to an embodiment, once the two lists (e.g. 830 and 840) are created, the communication code is generated by using the information in the two lists (e.g. 830 and 840).

The SRO/DoS is just one way for creating the two lists (e.g. 830 and 840). The two lists can be created in alternative ways. For example, according to an embodiment, there is necessary information for publishing each service in 2610 listing-1 of FIG. 26 and the necessary information for subscribing to each service in 2620 listing-2 of FIG. 26. Such information for each service is included in the code for each module and this information can be extracted from the source code and used for building the nodes for the 2 lists (e.g. 830 and 840), for example, at the time of compiling the source code by a preprocessor. The communication code for the modules can be generated by using the data and/or information in the 2 lists (by finding coupling dependencies between the modules), according to an embodiment.

Hence, the code to allow communication between modules in an application is created (or generated) by other means (or ways). For example, according to an embodiment, the source code for each of the modules comprises of (i) detailed information (including description of coupling interface) about each of the services it requires (e.g. from other modules) and (ii) detailed information (including description for coupling interface) about each of the services it provides (e.g. for other modules). If this information is sufficient, this information can be extracted and used for generating necessary communication code for each of the modules, according to an embodiment.

According to an embodiment, either a compiler or pre-processor for the compiler reads this kind of information for each of the modules (e.g. from the source code of each module) in the application for creating (or generating) necessary communication code for each of the modules after performing all possible error-checking and/or validation of coupling interfaces. Providing additional information, such as number of parameters and the type of each of the parameters, is useful for detecting inconsistent or incompatible interfaces in each communication link (or coupling) between any two modules. When requesting for a service, the requesting module needs to call the associated service function (implemented in a module that is providing the service) by passing the right number of parameters and the right type of the parameters. If there is a mismatch in the parameters, then there is a mismatch in the communication interface (or coupling) between the service-requesting module and the service-providing module.

Each communication link, coupling or interface to allow collaboration between any two parts or modules comprises of two parts (i) a first module provides a listener or service-provider interface to allow other modules to request a service or for accessing a service, and (ii) a second module that requires the service must use the interface defined by the listener or service-provider module. It is an incompatible communication interface or coupling between the first module and second module if the second module calls the service function of the first module by passing a wrong number of parameters or if there is a mismatch in the types of one or more parameters.

The pre-processor mechanism (referred to by a given name Arjun) or SRO/DoS needs certain information for generating communication code. For example, according to an embodiment, if a service-consumer Module-2/1215 requires calling a service function of a service-provider module-1/1201, then SRO/Arjun requires information such as reference to the service method (or reference to an object) of Module-1/1201 and name of a variable of Module-2/1205 to store the reference for creating communication code. Module-2/1205 calls the service function using the reference stored in the variable by passing appropriate parameters whenever Module-2 requires the service. FIG. 16 illustrates this by using pseudo-code. The 1607 code block comprises of sample communication code, according to an embodiment. The reference to service function of module-1/1602 is stored in a variable of module-2/1608 at line number of 1607 code block. Module-2/1608 uses the variable to call service function of module-1/1602 by using the variable as illustrated in 1609 code block at line number 3.

Likewise, the SRO (or pre-processor, referred to by a given name Arjun) needs additional information for making each kind of validation, for example, such as to detect broken communication link (e.g. due to incompatible coupling interfaces). For example, if Module-1/1201 provides the number of parameters and types of parameters required for service function of this communication link, and Module-2 1215 also provides the number of parameters and types of parameters being passed to call service function for requesting the service by using the reference stored in local variable, then SRO/Arjun can detect if the number of parameters are changed by Module-1 during the course of maintenance or for a release of a new upgraded version and if Module-2 is inadvertently not updated to use the new, changed communication interface of the service function in Module-1.

In an embodiment, each of the modules in the application comprises of information for each of the services required by the module. According to an embodiment, a mechanism is employed to extract the information for each of the required services of each module and use the information for creating necessary communication code for getting the service (by the module) if the service is provided by any other module or part in the application. According to an embodiment, the communication code is included at appropriate location in the code of the application (or code of the module). In another embodiment, the communication code is included in a file and the code is manually included at appropriate locations in the application code. The objective is to automate as many tasks as possible in creating and properly including in the code of the application. In maintaining the communication code, it is not necessary that the process is completely automated. Few tasks, such as including communication code for each module, may be performed manually. It is necessary to replace or update parts of the communication code, for example, in case when a communication interface of a module that provides a service is changed or a module that requires a service needs to use another version of the service.

The SRO/Arjun is designed to detect various kinds or errors, such as incompatible interfaces or missing services. However, not all kinds of things may be errors. For example, a reusable module used in an application may provide multiple services, but it is not necessary for other parts in the application to use all the services. So, it is not an error to have unused services. But it is likely an error if one or more services required by a custom component is not available. Alternatively, a reusable module can provide a means to input unique lookup key for only the services required by other parts in the application (so the reusable module only registers a subset of its services based on the number of lookup keys).

Figure 32:
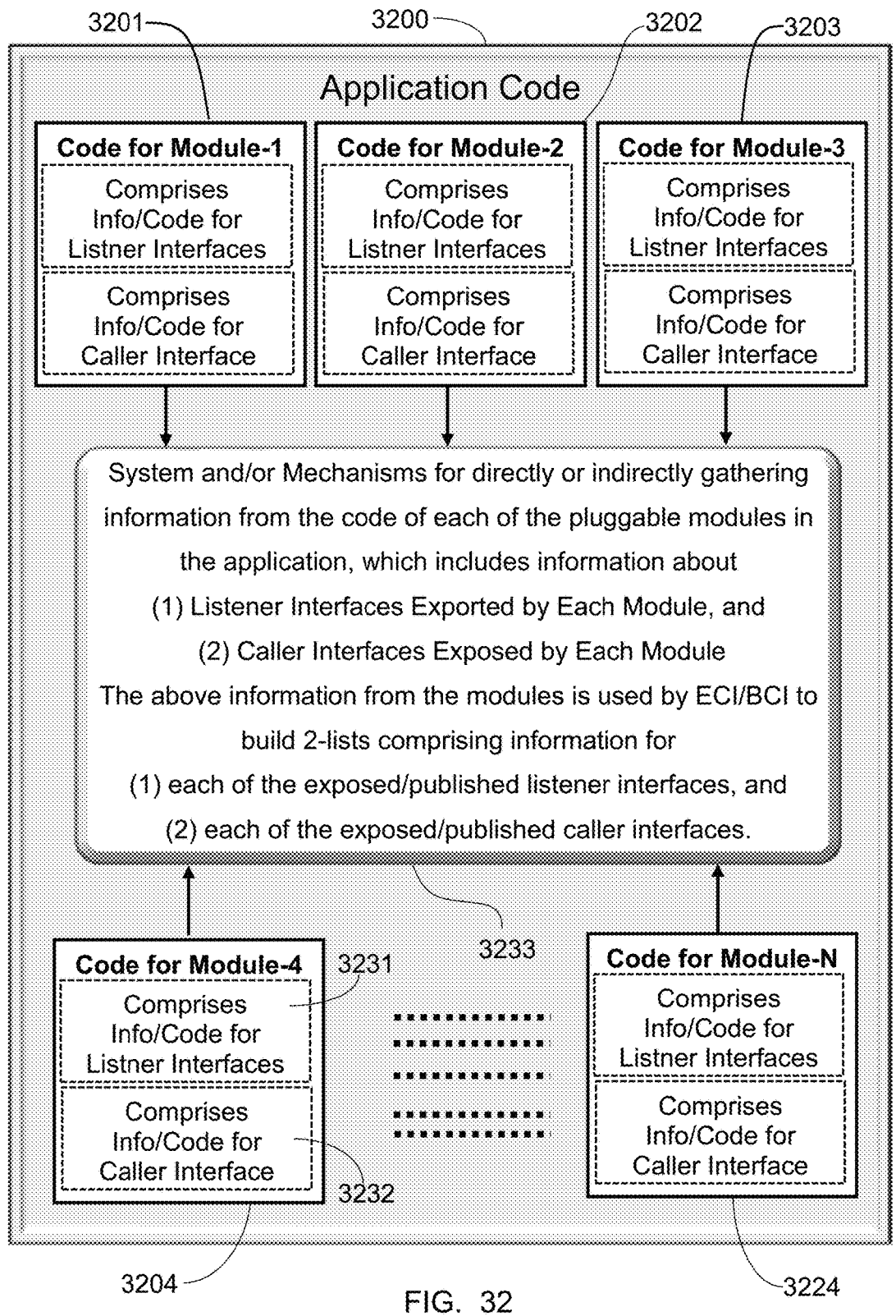
FIG. 32 shows multiple modules in an application, where each module comprises of information for each listener interface (or service) published by the module, information for each caller interface (or service) subscribed by the module, and a mechanism to use the information from the modules to automate the tasks to create or generate communication code that can facilitate collaboration between the modules, according to one embodiment.

Section-R: Creating or Generating Communication Code for Interfaces by Arjun that Comprising of BCI/ECI FIG. 32 shows an application 3200 comprising of multiple modules 3201, 3202, 3203, 3204, and 3224, where the code for each module comprises of (i) code and information (e.g. 3231) to publish each listener interface (or service) implemented in the module (e.g. 3204) and (ii) code and information (e.g. 2132) of each caller interface (or service) in the module (e.g. 3204), according to an embodiment. Another system 3233, referred to as Arjun (and comprising of ECI/BCI), directly or indirectly accesses interface information from the modules 3201, 3202, 3203, 3204, and 3224 about (a) listener interfaces (or services) published by the modules 3201,3202, 3203, 3204, and 3224 and (b) caller interfaces (or services) published by the modules 3201, 3202, 3203, 3204, and 3224. If module 3201 provides one or more listener interfaces (or services) to modules 3202 and 3224, the module employs a method to provide information for each listener interface in order for an external system (e.g. 3233, referred to by given name Arjun) to access the information for each listener service. If module 3201 requires one or more listener services implemented by modules 3203 and 3204, it employs a method to provide information for each listener service required in order for an external system (e.g. 3233) to access the information for each caller interface.

According to an embodiment, pre-processor or compiler 3233 comprises of ECI/BCI object and the pre-processor or compiler accesses (i) instructions and information for each listener interface (e.g. 3231) to register listener services with ECI/BCI, and (ii) instructions and information for each caller interface (e.g. 3232) to register caller services with ECI/BCI. In case 3233 is a pre-processor, the pre-processor in collaboration with ECI/BCI generates communication code, where the communication code can allow collaboration between modules in an application (when the communication code is properly included in the code for the application), according to an embodiment. According to another embodiment, in case of compiler, the compiler in collaboration with ECI/BCI creates communication code (e.g. to be included in the compiled byte code of the applications) to allow collaboration between modules in an application. The application code does not use ECI/BCI at run-time, but the pre-processor or compiler uses ECI/BCI at compile-time to create or generate communication code to facilitate collaboration between modules or parts in the application.

FIG. 33 shows an application 3300 comprising of multiple interfaces 3303, 3304, 3310, and 3320, where code and information implemented for each interface includes (i) code implemented for the communication interfaces (e.g. a listener function), and (ii) instructions/code and information for the interface to publish the interface, where the interface information is provided to ECI/BCI, and ECI/BCI uses the information to couple the interface with another interface to facilitate communication between the two interfaces. Usually, coupling to allow communication is created between complementary interfaces having a symbiotic relationship, such as (i) a listener interface 3303 and a caller interface 3304 (if the interfaces need to be linked to exchange data), or (ii) a service provider interface and a service consumer interface, according to an embodiment. To allow collaboration between any two interfaces (or between parts or modules that implement the interfaces), a pre-determined method or protocol is used to determine or categorize complementary interfaces (having a symbiotic relationship) that are required to be coupled or connected with each other.

The system 3305, referred to as Arjun (and comprising of ECI/BCI) directly or indirectly accesses interface information from the modules 3303, 3304, 3310, and 3320 about (a) listener interfaces (or services) and (b) caller interfaces (or services). Arjun comprises of ECI/BCI to match each pair of interfaces having a symbiotic relationship by using look-up means such as a look-up key. Arjun passes the interface information to ECI/BCI, and ECI/BCI uses the information to create communication code (in collaboration with Arjun), where the communication code can allow collaboration between the interfaces (or between parts or modules that implement the interfaces), according to an embodiment.

According to an embodiment, pre-processor or compiler 3305 comprises of Arjun, and it passes to Arjun (i) instructions and information for each listener interface (e.g. 3303) to register listener services with ECI/BCI, and (ii) instructions and information for each caller interface (e.g. 3304) to register caller services with ECI/BCI. In case 3305 is a pre-processor, Arjun (present in the pre-processor) in collaboration with ECI/BCI generates communication code, where the communication code can allow collaboration between the interfaces (when the communication code is properly included in the code for the application), according to an embodiment. The communication code is properly included either automatically or manually (at proper locations by making necessary changes to the code) in the code of the application.

According to another embodiment, in case of compiler, Arjun (present in the compiler) in collaboration with ECI/BCI creates communication code (e.g. to be included in the compiled byte code of the applications) that can allow collaboration between the interfaces in an application. The application code does not use ECI/BCI at run-time, but pre-processor or compiler uses ECI/BCI at compile-time to create or generate communication code to facilitate collaboration between modules or parts in the application, according to an embodiment.

In an alternative embodiment, application code that comprises of implementation of multiple interfaces 3303, 3304, 3310, and 3320 also includes an instance of ECI/BCI to allow communication between interfaces, where (i) each listener interface 3303 implements code to register the interface along with information such as to test the interface and to find the complementary caller interface using a look-up key, and (ii) each caller interface 3304 implements code to register the interface along with information such as to test the interface and to find the complementary listener interface using a look-up key. ECI/BCI can perform tests to validate compatibility between each pair of coupled interfaces (e.g. a caller interface and its complementary listener interface that communicate and collaborate with each other).

Figure 34:
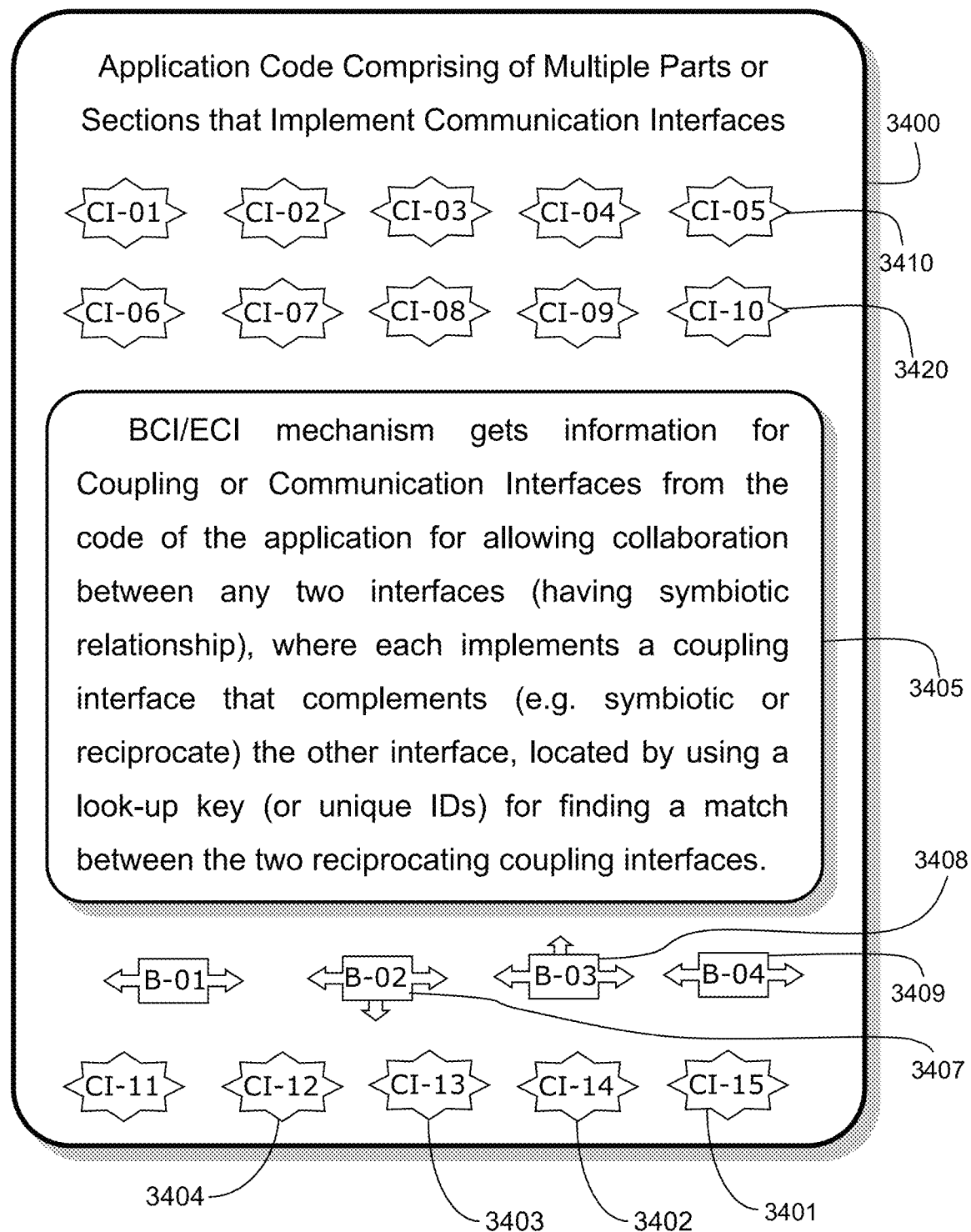
FIG. 34 shows an application comprising of multiple interfaces, code and information to publish each interface, and a mechanism of using the interface information to automate the task of creating or generating communication code that can facilitate collaboration between a pair of symbiotic or complementary interfaces, according to an embodiment.

FIG. 34 shows an application 3400 comprising of multiple interfaces 3401, 3402, 3403, 3410, and 3420, where the code and information implemented for each interface includes (i) code implemented for the communication interfaces (e.g. a listener function, or service function), and (ii) instructions/code and information for the interface to publish the interface, where the interface information is provided to ECI/BCI, and ECI/BCI uses the information to find a symbiotically related interface and facilitates communication between the two interfaces. To allow collaboration between any two interfaces (or between parts or modules that implemented the interfaces), a pre-determined method or protocol is used to determine symbiotic interfaces that need to be coupled or connected (or linked). For example, each coupling to allow communication is created between interfaces such as (i) a listener interface and a caller interface, and (ii) a service provider interface and a service consumer interface, according to an embodiment.

According to an embodiment, it is possible to implement and include a connector object or bridge module (e.g. 3408 & 3409) to couple two interfaces (e.g. 3402 & 3404). The system 3405, referred to as Arjun (and comprising of ECI/BCI), directly or indirectly accesses the information of each complementary interface, 3402 and 3204, and Arjun uses this information (i.e. in collaboration with ECI/BCI) to create communication code (e.g. by including or using an instance of an appropriate connector module or object), where the communication code can allow collaboration between the interfaces (or between parts or modules that implement the interfaces), according to an embodiment.

According to an embodiment, pre-processor or compiler 3405 comprises of Arjun, and it passes to Arjun (i) instructions and information for a first interface (e.g. 3402) to be registered with ECI/BCI, and (ii) instructions and information for a second interface (e.g. 3404) to be registered with ECI/BCI. In case 3405 is a pre-processor, Arjun (a system or mechanism that is part of the pre-processor) in collaboration with ECI/BCI generates communication code (e.g. optionally using an instance of appropriate connector object 3409 to facilitate coupling), where the communication code can allow collaboration between the interfaces (when the communication code is properly included in the code for the application), according to an embodiment. The communication code is properly included either automatically or manually (at proper locations by making necessary changes to the code) in the code of the application.

According to another embodiment, in case of compiler, Arjun (present in the compiler) in collaboration with ECI/BCI creates communication code (e.g. to be included in the compiled byte code of the applications) that can allow collaboration between the interfaces in an application. According to another embodiment, an instance of a connector (or bridge) module or object is used to connect two such interfaces. Furthermore, the connector (or bridge) object performs security test on data being exchanged between the interfaces, according to an embodiment. Various kinds of reusable connector or bridge objects 3407, 3408, and 3409 are created, where each kind of connector is designed and used to perform certain pre-defined function (e.g. security filter), according to an embodiment.

According to an embodiment, each listener interface calls an object instance of ECI/BCI to find and execute a listener function implemented in an appropriate listener interface for the caller interface by passing the right number and types of parameters for the listener function, where the ECI/BCI can test the data to detect errors such as out of range data. For example, if one of the parameters is the age of a person, then any number that is negative or over 150 years is out of range. Likewise, data such as length and weight cannot be negative numbers. Other errors include using different scales or systems for measurement such as metric system or imperial system. It is an error if the caller interface uses meters for length data and the listener interface expects data for length in yards.

10. Integer Status=ECI_Obj.callListenerFunction (LookUpID, par1, par2, par3);

Furthermore, many other such tests can be conducted on the data being exchanged between a caller interface that calls a listener function and a listener interface that implements the listener function. According to an embodiment, the caller interface uses ECI/BCI to call the listener function as illustrated in the above pseudo-code by passing parameters part, par2, and par3. The first parameter LookUpID is used to find the appropriate listener interface function. The ECI/BCI instance can validate or test the parameters (i.e. par1, par2, and par3) before calling the appropriate listener function. Various reusable modules or objects (e.g. 3407, 3408, and 3409) can be used to test each parameter to detect malicious data or to prevent unauthorized access to sensitive data.

In case of Arjun system or mechanism, the communication code created or generated includes code to test or validate the parameters for the listener function, according to an embodiment. The code generated to allow communication can use various kinds of reusable objects (e.g. 3407, 3408, and 3409) to test each kind of parameter to detect malicious data or to prevent unauthorized access to sensitive data. A flag (e.g. a set of Boolean variables) is used to turn-on or turn-off each kind of testing or validation of parameters at run-time, according to an embodiment.

According to an embodiment, a flag can be used at the time of running pre-processor or at compile-time to turn-on or turn-off the inclusion of testing or validation code in the communication code being generated or created by Arjun system or mechanism being used by pre-processor or compiler. According to an embodiment, application context comprises of user information such as authentication and privileges, and the code can use this information to detect and prevent unauthorized access to sensitive data.

In large software systems and applications, more than one instance of ECI/BCI object and/or SRO/DoS can be used. For example, a large component (or sub-system) of an application comprises of multiple modules and parts, where each module or part implements one or more interfaces to communicate with other modules or parts within the component. In this context, an object instance of ECI/BCI can be used to facilitate communication between the modules and parts within the component. If the application comprises of many such large components and each component provides one or more services, each of these components implements service interfaces using a global SRO/DoS to facilitate communication between the components. For example, A large component can use a local ECI/BCI instance to register and find local listener interfaces that are with-in the scope of the large component or sub-system. By using this method, an application can include multiple instances of the large component.

Furthermore, communication code to facilitate communication between the components (or sub-systems) for the application can be created or generated by the Arjun system or mechanism comprising of ECI/BCI, while each sub-system (or component) comprising of multiple modules or parts may use a local ECI/BCI object instance to facilitate communication between the multiple modules or parts. Furthermore, a network of ECI/BCI can be created and used. For example, if a caller interface requests a local ECI/BCI for a listener interface, the ECI/BCI looks up for a listener interface and if it is not found, it can forward the request to another ECI/BCI implemented in the container component (that uses this component as a subcomponent), and so on.

In case of large component hierarchy (e.g. FIG. 25), a tree of ECI/BCI can be created to climb up the tree to find required listener interfaces for each caller interface. Alternatively, a network of ECI/BCI can be created that employs a rule-based system to search the network of ECI/BCI to find the required listener interfaces for each caller interface. Often, complex GUI-applications are a tree comprising of a large component hierarchy (e.g. FIG. 25) created by using components, sub-components 2509 (comprising of other components as sub-components 2514), container components 2509 (that are used as sub-components by other larger container components 2504), and so on. On the other hand, applications such as simulations of complex systems create a large network of components (or nodes), and their relationship can be defined as a network of nodes. A virtual tree or network of nodes is created by using each instance of ECI/BCI as a node, according to an embodiment.

According to an embodiment, each ECIBCI is given a unique-ID (e.g. for type of container component) or lookup-key (e.g. for sub-system of the application) and the system or mechanism is designed to look-up for an appropriate ECI/BCI and requests the ECI/BCI for listener interface. In this case, each caller-interface provides two lookup keys, one to find the appropriate ECI/BCI, and the other lookup key to find the appropriate listener interface for the caller interface. The multiple ECI/BCI instances in an application can be organized in many such ways, for example, to find appropriate listener interface for each given caller interface from an appropriate ECI/BCI instance by first finding the appropriate ECI/BCI instance.

Section-S: Types (or Classes) of Interfaces and Relationship Between the Interfaces that Communicate with Each Other In general, interfaces can be broadly categorized into two types or classes (i) Caller Interface class, and (ii) Listener Interfaces class. Often, one interface initiates communication and the other interface responds. In other words a communication, such as data exchange between any two modules or parts that implement two interfaces respectively, is accomplished by a caller interface (implemented in the first module) calling a listener interface (implemented in the second module), according to an embodiment.

The code implemented for each listener interface comprises of implementation of a listener function (or listener-object), and the code implemented for each caller interface comprises of code implementation that can facilitate calling an external function (or one or more methods implemented in a listener-object), according to an embodiment. Each interface further includes information about the interface, where this information is used by ECI/BCI (e.g. 2200) to facilitate communication between this interface and other interfaces, according to an embodiment.

According to an embodiment in the current application, any interface in an application is categorised under the Listener Interface class or the Caller Interface class, with the code for the interface being implemented accordingly and the interface information being included accordingly. The interface information is used by BCI/ECI (e.g. 2200) to facilitate communication between this interface and another interface (e.g. by coupling or connecting the two interfaces), according to an embodiment.

For example, an interface for a service-provider function (e.g. method or object) is categorised as a kind of listener interface. That is, Listener Interface is a broader superclass, and service-provider interface is its subclass. An interface for a service-provider belongs to the subclass of service-provider interfaces. To give an analogy, Dogs are a superclass, and Poodles are a subclass of Dogs, Beagles are another subclass of Dogs, and so on. To give another analogy, animals are a superclass and mammals, reptiles, amphibians, and birds are subclasses for the superclass.

An interface to consume these services (provided by interfaces for service-provider) is categorised as a kind of caller interface. That is, service-consumer interface is a subclass of the Caller Interface superclass. Likewise, a type of caller interface that provides notifications (e.g. upon change of state, change or update of data or arrival of new data) to multiple listener interfaces is a special subclass of the Caller Interface superclass, (since notification-interface initiates communication with each listener interface. Usually, a caller interface can have a symbiotic relationship with just one listener interface, but interfaces from the notification-caller interface subclass is an exception to this rule. That is, each notification-caller interface needs to call and notify more than one listener interface, whenever there is a change of state that includes things such as update in data or arrival of new data, for example.

In general, an interface can have a symbiotic (or cooperative) relationship with multiple other interfaces. For example, a service-provider interface 412 can have a symbiotic relationship with one or more service-consumer interfaces (415, 416, and 417) that require the service provided by service-provider interface 412. Likewise, a listener interface 3012 (that implements a listener function) can have a symbiotic relationship with one or more caller interfaces (3015, 3016, and 3017) that are required to call the listener function.

Although an interface 3012 can be in a symbiotic (or cooperative) relationship with multiple other interfaces (3015, 3016, and 3017), each symbiotic relationship can only exist between two interfaces, such as (3012 and 3015), (3012 and 3016), and (3012 and 3017). That is, the relationship between 3012 and 3015 is a symbiotic relationship, and the relationship between 3012 and 3016 is another symbiotic relationship. Each symbiotic relationship can only have two interfaces (e.g. 3012 and 3015), and the two interfaces (such as 3012 and 3015) in each symbiotic (or cooperative) relationship are referred to as partners in the symbiotic relationship.

Furthermore, the two interfaces (such as 3012 and 3015) in each symbiotic relationship are said to be in a symbiotic relationship (or a symbiotic partnership). The symbiotic relationship (or a symbiotic partnership) is a symmetric relationship. That is, if Interface-A and Interface-B are in a symbiotic relationship (or a symbiotic partnership), then Interface-A is said to have a symbiotic relationship (or a symbiotic partnership) with Interface-B, and Interface-B is said to have a symbiotic relationship (or a symbiotic partnership) with Interface-A.

According to a preferred embodiment, interfaces are categorized into classes and subclasses to properly find all the symbiotic relationships existing between the interfaces in an application, so as to facilitate communication between the two interfaces that are in a symbiotic relationship with each other for example. In other words, it is required to find all the symbiotic relationships for each interface that is present in the application, according to an embodiment. There are two interfaces in each symbiotic relationship, and one of the tasks of ECI/BCI (e.g. 2200) is to find the symbiotic partners of each symbiotic relationship by using the provided look-up key or unique ID for each interface.

According to an embodiment, the BCI/ECI needs to facilitate communication between any two interfaces having a symbiotic relationship (or a partnership), and a symbiotic relationship (or a symbiotic partnership) can typically exists between a listener interface and a caller interface. Furthermore, except in very specific cases such as for interfaces belonging to the notification-caller interface subclass, each caller interface can only be in one symbiotic relationship. That is, each caller interface in an application communicates with only one listener interface in the application, while a listener interface may communicate with one or more caller interfaces.

According to an embodiment, Arjun mechanism (e.g. in compiler or pre-processor) that uses ECI/BCI goes through the list of caller interfaces 2235 to facilitate communication for each caller interface with just one listener interface (since each caller interface can have only one symbiotic relationship). There are rare exceptions to this rule, such as interfaces belong to the notification-caller interface subclass. In such cases, for each notification-caller interface, ECI/BCI 2200 goes through the list of listener interfaces 2230 to find all the listener interfaces that require notifications to find all the symbiotic relationships for this notification-caller interface, and to create communication code for each symbiotic relationship, according to an embodiment.

According to a preferred embodiment, each interface of an application is properly categorized into pre-defined classes of interfaces at design-time of the application, and the interface information and communication code is included and implemented for each interface according to its classification. Furthermore, ECI/BCI (e.g. 2200) and other mechanisms of Arjun are designed (by leveraging knowledge of the classifications) to find the pair of interfaces in each symbiotic relationship, validate compatibility between the two interfaces, and facilitate communication between them.

Explanation for the term "Symbiotic Relationship" or "Cooperative Relationship" using an example: Any two published interfaces (e.g. 3301 and 3302) in an application are said to have a "Symbiotic Relationship" or a "Cooperative Relationship" if it is required to enable or facilitate any kind of communication or exchange of data between the two interfaces (i.e. 3301 and 3302) by using any tool such as ECI/BCI (directly or indirectly) to fulfil any feature or functionality of the application. There is no exception to this definition of two interfaces that are in a symbiotic relationship if the interfaces and their information are published and it is required to facilitate communication between the interfaces by tools or mechanisms such as ECI/BCI (which is designed to use the interface information to find the partners in each symbiotic relationship).

For example, an object instance of ECI/BCI is included in the application to facilitate communication between the two interfaces (e.g. 3301 and 3302), according to an embodiment. According to another embodiment, ECI/BCI is used by Arjun to create or generate communication code, where the communication code can facilitate communication between the two interfaces (e.g. 3301 and 3302). One of the functions of ECI/BCI includes finding a symbiotic partner for each interface (by using a look-up key for example), according to an embodiment. That is, if interfaces 3301 and 3302 are in a Symbiotic Relationship, then interface 3301 is a symbiotic partner of interface 3302 and interface 3302 is a symbiotic partner of interface 3301. Even if the dependency or communication is one way from interface 3301 to interface 3302, the two interfaces are said to have a "Symbiotic Relationship" or a "Cooperative Relationship".

Any large application comprises of multiple modules (e.g. parts, objects, code-blocks, or components), where the modules collaborate with each other by calling each other's functions or methods. For example, a first module communicates with a second module by directly or indirectly calling a function implemented by the second module. The two modules exchange data during communication between them. The data exchange can be unidirectional (e.g. from the second module to the first module) or bidirectional (e.g. first module sends data to the second module, and second module returns other data to the first module).

Today, communication code is implemented manually to allow collaboration between the two modules. Present invention uses tools such as BCI/ECI and certain mechanisms in order to automate various tasks and activities that facilitate the collaboration between the two modules, where the two modules implement two complementary (or reciprocal) interfaces that can be coupled to allow communication between the modules by means of a mechanism. For example, the second module implements a listener interface, and the first module implements the necessary code to call the caller interface, according to an embodiment. Furthermore, each module publishes the interface and interface information to BCI/ECI, and BCI/ECI can use this information to couple the modules to allow communication between the modules.

Any application comprises of multiple modules (parts, objects, or components) and often each module needs to communicate or collaborate with one or more other modules in the application. Often, these modules (or parts) communicate with each other by calling functions (or methods) implemented in other modules. That is, a first module communicates with a second module by directly or indirectly calling a function implemented in the second module. For example, a first part calls a function implemented in a second part, to communicate and collaborate with the second part. Today, this kind of communication code is implemented manually. It is desirable to automate the tasks and activities of creating and managing such communication code to facilitate collaboration between two interfaces.

When an object instance is used in the place of the function of the listener interface (or listener function), the module comprising of the caller interface implements code to call one or more methods of the object (i.e. the methods implemented in the code of the class definition of the object instance). So, the module comprising of the caller interface directly or indirectly communicates with the module comprising of the listener interface by calling a function (or method) of the listener interface.

To facilitate this kind of communication between any two modules, each module implements a communication interface and publishes the information for its interface, according to an embodiment. Then, tools such as BCI/ECI are used to facilitate communication between the interfaces, according to the embodiment. According to another embodiment, tools such as BCI/ECI are used (e.g. by pre-processor or compiler) to create or generate communication code that can facilitate communication between the interfaces.

The function of the BCI/ECI object and mechanism is to allow communication between any two Interfaces by using means such as a look-up key (e.g. a combination of numbers, names, or IDs) to find a match between the two interfaces. It is not necessary that the interfaces must be implemented in two different modules or parts, but each interface can be implemented or included anywhere in the code of the application (e.g. at two different code sections). The BCI/ECI object and mechanism is a generic mechanism that can facilitate communication between any two interfaces, where each interface can be implemented anywhere in the code of the application.

Each interface is categorized either as a listener interface or a caller interface, but it is not essential to do so. Any such protocol for coupling can be used. For example, a listener interface can also be broadly named as a service provider interface, and a caller interface can also be broadly named as an interface for requesting or consuming a service. Any such kind of naming convention or protocol can be used to categorise interfaces (having symbiotic relationship) at the opposite ends of a communication link. To couple two interfaces of two modules (or parts) to allow collaboration between the two modules (or parts), for example. Other kinds of methods and mechanisms can also be used, for example by using a connector object 3409 to facilitate communication between two interfaces (e.g. to allow collaboration between two modules that implement the two interfaces).

Section-T: Tools Such as BCI/SRO/Arjun are Essential for Composing Pluggable Modules According to an embodiment, it is desirable to invent an engineering paradigm for software products comprising of methods: (1) Partitioning each large product into smaller self-contained modules or modules having higher degree of cohesion, where each module can be designed and developed individually and can also be tested individually at any time in the future (e.g. during the course of evolution or lifecycle of the of the software product such as maintenance or upgrade releases). If suitable reusable modules are available (e.g. for example from open source communities or from third-party vendors), the product is partitioned in order to maximize the reuse by leveraging the available reusable modules. (2) Once all of the modules are ready, it is desirable to have the simplest possible mechanisms and tools for combining or composing all the modules for building the working product (e.g. by automating most of the tasks or activities for combining or composing all the modules).

Figures 28A, 28B:
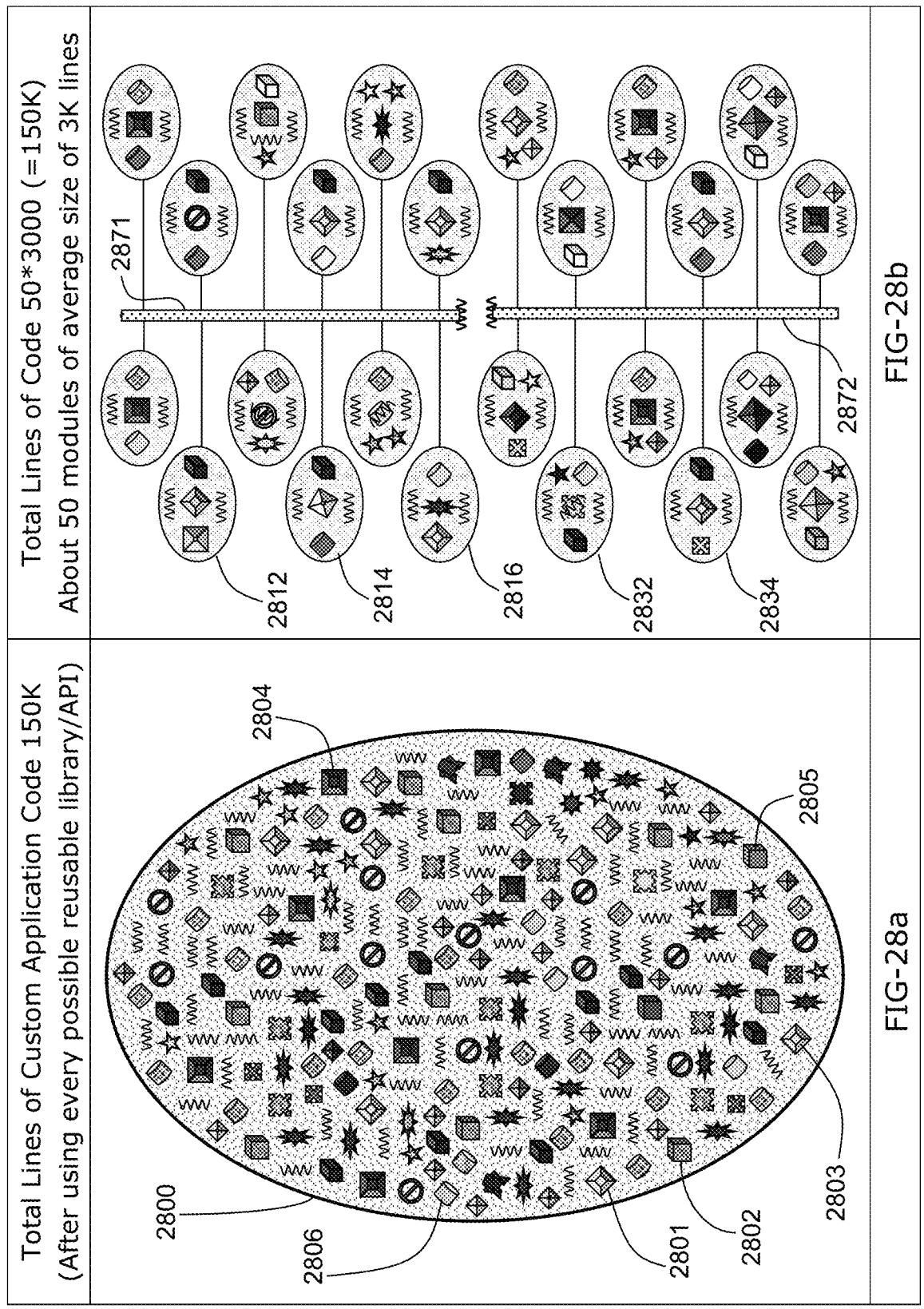
FIG. 28a & FIG. 28b shows on one side FIG. 28a a product built without partitioning into pluggable modules, and another side

These methods and mechanisms must also provide the simplest possible way for redesigning and testing each of the custom modules individually at any time in the future. The objective is to evolve each of the modules by redesigning and testing each individually, since the product is often evolved by evolving the modules, for example, to satisfy evolving needs. According to an embodiment, FIG. 28*a* depicts code base 2800 of a sample software product (or application) built without using pluggable modules. The application uses every possible reusable library and API for minimizing the size of the custom application code (i.e. size of the code base 2800), according to an embodiment. The codebase uses many reusable libraries, APIs, or parts, which are depicted by icons such as cylinders, cubes, or pyramids etc., such as icons 2801, 2802, 2803, 2804, 2805, and 2806.

In an embodiment, the product is partitioned into self-contained modules or modules that are highly cohesive. FIG. 28*b* depicts codebase (e.g. 2812, 2814, 2816, 2832, and 2834) for various self-contained modules or modules that are highly cohesive, where the codebase for each module is designed and implemented individually. Then the modules (e.g. 2812, 2814, 2816, 2832, and 2834) are composed or combined using mechanisms or methods 2871 and 2872 such as SRO or Arjun for building the product, according to an embodiment. In other words, FIG. 28*a* depicts structure of a software product while FIG. 28*b* depicts all the components required for a product, where components imply specific kind of parts that can be assembled. The product is built by employing a process (or method) called "assembly" for composing the components.

The basic steps required to compose a module into an application comprise of (i) including an instance of the module (e.g. an object instance if the module is implemented as a class-definition), and (ii) creating necessary communication code for the module (e.g. to facilitate necessary collaboration between the module and other parts of the application). In prior art, creating and managing communication code for each module (in an application having multiple modules) is done manually. For example, today it is required to manually implement communication code for each module when a module is included in the code of the application. It is desirable to automate various tasks necessary for creating and managing communication code for each module in an application.

Enabling inventions that made the invention of interchangeable components practical are things such as castings, dies, forgings, injection-molds, and jigs etc., without which it is impractical to mass-produce identical components manually (e.g. by handcrafting many components to be identical and interchangeable). Invention of such enabling things was an out-of-the-box invention when each of the components was handcrafted (e.g. before year 1810CE). An out-of-the-box idea is needed to automate various tasks for the creation and management of communication code that is being created and managed manually for each module in prior art. Likewise, enabling inventions, for transforming modules into pluggable modules, are tools such as SRO, DoS, or Arjun for automating tasks for creating and managing communication code for each of the modules. Without such tools (e.g. SRO, DoS or Arjun) it is impractical to transform modules into pluggable modules.

In prior art today, there is no such tool or CASE-tool (i.e. Tool for Computer Aided Software Engineering) or mechanisms for "automating" tedious error-prone tasks for creating and, particularly, maintaining communication code for each of the components (e.g. parts or modules) in an application (or software product) that comprises of multiple such components (or modules), where the communication code loosely couples (i.e. assembles or plugs in) each of the software components into the software product (or application) for allowing communication or collaboration between the component and other components or parts of the application.

This kind of CASE-tool for automating tasks for creating and maintaining communication code doesn't exist anywhere else in the world. Such a CASE-tool is an essential and complementary invention, where the CASE-tool allows engineers to plug in each of the components (where each component implements code for necessary mechanisms such as registering and/or looking up services). The CASE-Tool, along with the necessary mechanisms (e.g. implemented within the modules), minimizes the tasks for manually creating and maintaining communication code for each of the components in an application. Here, maintaining communication code for a module implies redesigning or changing the communication code when the modules' communication interfaces are changed. Hence, the CASE-tool makes such components pluggable by automatically loosely-coupling or assembling the component into the application.

This kind of components or modules cannot be made pluggable without such a CASE-tool, because this CASE-tool is an essential and complementary enabler for automating creation and maintenance of communication code for the components. For example, there can't be electric plugs (having pins) without sockets (having complimentary holes to fit shape and configuration of pins) to insert the pins—The plug and socket are complementary inventions, where one is useless without the other. Our CASE-tool functions as virtual sockets for the pluggable components (that implement necessary mechanisms such as registering and/or looking up services) having built-in pluggable coupling interfaces for plugging into virtual sockets.

In any large application comprising of multiple modules, it is desirable to include each of the modules in an application as illustrated in listings 1511, 1512, or 1513 of FIG. 15, where each such pluggable module doesn't require manually implementing any communication code. According to an embodiment, this is accomplished by Implementing necessary parts of the communication code in each of the modules; for example, (a) implementing code for registering or publishing each of the available services or services provided by the module and (b) implementing code for finding or subscribing to each of the services required by the module; and Implementing a CASE-tool that implements mechanisms for directly or indirectly getting the information about required and/or available services from each of the modules in the application and using the information for generating communication code or facilitating communication to allow collaboration between the modules (e.g. those that provide one or more services and those that require the services).

The general idea behind the current invention is that any large software application 2930 comprises of multiple modules (e.g. 2931 to 2936), where each module (e.g. 2934) needs to communicate and collaborate with one or more other modules (e.g. 2933 and 2936). In general, each module implements communication interfaces (e.g. 2944 and 2945), and if the modules 2933 and 2934 need to communicate in today's world, the necessary communication code is implemented manually to connect interfaces 2944 and 2945 to allow communication between the modules 2933 and 2934 (using interfaces 2944 and 2945). It is desirable to automate various manual tasks and activities to create, manage, test, and document the communication code and properly include the communication code in the application, so that the communication code can allow communication between various modules (using interfaces), by inventing novel tools (e.g. 2940), mechanisms, processes, methods, models, and protocols (e.g. for interfaces) for example.

According to an embodiment, an application comprising of multiple modules (where each module implements one or more interfaces) includes an instance of ECI/BCI (e.g. 800 or 2200) that can facilitate communication and collaboration between interfaces, provided each listener interface is redesigned to register a listener function and the necessary information with the ECI/BCI, and the code for each caller interface is redesigned to request the ECB/BCI by providing necessary information to find the right listener interface and to call the listener function. The information associated with each listener interface comprises of various data elements such as look-up keys, unique IDs, interface version numbers, and interface descriptions. The information associated with each caller interface comprises of various data elements such as look-up keys of a listener interface to find the right listener interface, and interface version numbers and interface descriptions to test and validate compatibility between each listener interface and each caller interface that connects and calls the listener interface.

According to an embodiment, an application comprises of communication code created or generated by a mechanism that includes ECI/BCI, where the communication code can facilitate communication and collaboration between interfaces implemented in the modules. In this embodiment, the source code implemented for each interface includes necessary information and instructions to publish the interface, and a pre-processor or compiler reads the source code and extracts the information associated with each interface to register each interface with ECI/BCI by using the information provided for the interface. Once all the interfaces are registered, the mechanism comprising of ECI/BCI creates or generates the communication code that can allow collaboration between the interfaces. The communication code is included in the code of the application to allow communication or exchange of data between the interfaces in the application.

It is apparent from the above embodiments that if a caller interface in a first module needs to communicate and exchange data with a listener interface in a second module, a tool like ECI/BCI and the mechanisms to register interfaces are necessary to either (i) facilitate or allow communication between such interfaces, or (ii) create communication code that can facilitate or allow communication between such interfaces. Furthermore, if a first interface (e.g. a caller interface) needs to communicate with a second interface (e.g. a listener interface), the two interfaces must provide the necessary data or information to be able to find the corresponding interface and connect the two interfaces to facilitate communication, like when the caller interface needs to call the function implemented in the caller interface for example.

In other words, ECI/BCI requires look-up information from the caller interface and the listener interface to find the right listener interface and allow communication between the caller interface and right listener interface. Hence, each interface is designed to satisfy the requirements of a tool like ECI/BCI, for example, by implementing each interface to include information that is necessary to (i) find and communicate with other interfaces, or (ii) find another interface to create or generate communication code that can allow communication with the other interface. That is, if a first interface in a module needs to collaborate with a second interface in another module, the implementation of each interface includes the necessary information for ECI/BCI to facilitate communication and collaboration between the two interfaces. Additional information can be included by the interfaces if it is required to test and validate the versions or the compatibility between two interfaces that communicate with each other.

It is desirable to evolve ECI/BCI and Arjun based on use cases and experience, for example, by making them more and more intelligent. For example, if multiple services are registered with ECI/BCI by using same lookup-key, then a right service is connected by using other rule-based criteria such as higher weightage or newer date of creation, according to an embodiment. This just an example of various kinds of features and intelligence that can be implemented in the ECI/BCI and Arjun.

Section-U: The Basic Differences Between the Two Engineering Paradigms

The engineering paradigms to design and build large or complex products can be broadly categorized into two types: The first is the non-component-based engineering paradigm (2800 of FIG. 28*a*), where each product is designed by using various kinds of reusable ingredient parts (2801 to 2806) such as cement, steel, plastic, wood, leather, chemicals, nickel, paints, silicon, metals, and alloys to name a few. For example, the design and construction of products such as houses and buildings is an example for non-component-based engineering paradigm, where it is not possible to disassemble the product. The existing paradigms for both Civil and Software engineering are examples for non-component-based paradigm.

FIG. 28*b* illustrates another kind of engineering paradigm, and that is the component-based engineering paradigm where each product is designed by building and assembling multiple components (2812, 2814, 2816, and 2832), and the product can be disassembled into components (by unplugging each component). In the case of component-based engineering paradigm, each elementary component is designed and built by using various kinds of reusable ingredient parts such as cement, steel, plastic, wood, leather, chemicals, nickel, paints, silicon, metals, and alloys.

Multiple elementary components may be used to build container components. Both paradigms may use the same reusable ingredient parts. In the case of CBE (Component-Based Engineering) paradigm, components are designed and built by using reusable ingredient parts in the preliminary phase, and the product is then assembled by plugging the components into a system board (in the case of electronic products). Here, each component can be designed, built, and tested individually. Furthermore, each component can be unplugged in case it has to be redesigned and tested individually.

The engineering paradigms of disciplines such as mechanical, aerospace, and electronic engineering are examples for component-based paradigm, since each large product such as a car, computer, airplane, and machinery are built by assembling components, and the product can also be disassembled. Each elementary component of all these products is built by using reusable ingredient parts. Hence, the paradigms of both types try to maximize the reuse, but component-based paradigm also seeks to maximize modularization.

The FIG. 28a illustrates a product built by using every possible kind of reusable part (shown as various shapes) except for a specific kind of parts that can be assembled and disassembled, where this specific kind of parts is widely known as a component (in the context of countless products we know and use). In other words, this product is not built by assembling true components. The FIG. 28b illustrates a product that is built by plugging in numerous components (or a very specific kind of parts that can be assembled and disassembled) where each pluggable (and unpluggable) component is designed and built by using every possible kind of reusable parts (shown as various shapes). Both products built by the two paradigms use the same number, amount, and kind of reusable parts, so there is no compromise to reusability in achieving the modularization associated with Component-Based Engineering Paradigm.

Any large product designed and built by employing CBE (Component Based Engineering), the product comprises of multiple components and the components are assembled properly to collaborate with each other. The coupling model to allow collaboration between components can be broadly divided into two kinds (i) mechanical model, where the components are mechanically assembled to work together and (ii) electronic model, where in case of electronic model, the components collaborate with each other by exchanging signals and/or data in the form of electronic signals. The electronic components can be designed to be pluggable, for example, by creating system board that can connect the interfaces of each of the electronic components to allow collaboration between the components.

An interesting observation is that: Software components, parts, objects, and modules are also collaborate with each other by exchanging events and/or data. To facilitate communication between the modules in software products, it is possible to implement pluggable interfaces for each module and invent necessary mechanisms and tools such as BCI/ECI that can connect the interfaces (having symbiotic relationship) of modules implemented as pluggable interfaces with each other to allow collaboration between the modules (by using the interfaces implemented in each of the modules). Hence, it is desirable to implement pluggable interfaces in each of the modules by including necessary information to find and couple each interface with other interface, and inventing tools (e.g. such as BCI/ECI or Arjun) and mechanisms that can use the information for the interfaces to facilitate collaboration between the interfaces (and the modules that implemented the interfaces).

Today, there are two engineering paradigms for designing and building large or complex products. The first proven, mature, and successful engineering paradigm that is being used for designing and building countless known products we use every day such as airplanes, computers, cars, cellphones, machinery, locomotive engines, and equipment for factory or medical etc. This engineering paradigm for such physical products uses components (that are referred in this application as real components), where the real components imply a very specific kind of parts that can be assembled and disassembled. In this engineering paradigm, no other kind of part is (or can be) referred to as a component if the part is not designed and/or conducive to be assembled as a unit and disassembled as a unit.

The basic and/or striking difference between specific kind of parts that are certainly components and the other kinds of parts that are certainly not components, in the context of engineering paradigm for designing and building of countless large products we know (e.g. cars, computers, cellphones, TVs, ACs, equipment such as printers, airplanes, machines or machinery for factory to name a few) is: Components are the only kind of parts that are composed into the product by a process (or method) known as "assembling" (or "plugging-in"). None of the other kinds of parts are either designed or conducive to be "assembled" (i.e. can be composed by using the method or mechanism known as assembling). The ideal form of assembling for a component is making the component easily pluggable. So, it is desirable to invent mechanisms for plugging in modules or components.

During the pre-science or pre-paradigmatic period of software engineering or computer science 50 to 60 years ago, software researchers made a tacit assumption that it was not possible to create such components (i.e. specific kind of parts that can be assembled as a unit) for software products (where the term "pre-paradigmatic" is described in seminal book "The Structure of Scientific Revolutions" by Dr. Thomas Kuhn). So, 50 years ago software thought leaders defined each kind of useful parts, such as parts that can be reusable or conform to a so-called component model, as a kind of components for software engineering paradigm. The term components (in software paradigm) refer to other kinds of parts (from the inception of software engineering 50 to 60 years ago and until today), where no known kind of so-called components existing today for software is designed to be assembled by any stretch of the imagination.

The engineering paradigm has been evolving for the past 45 years without having real components, where real components implies a specific kind of parts that can be assembled and disassembled as a unit. The lack of real components (i.e. specific kind of parts that can be assembled as a unit) and a process equivalent to the process of assembling the components resulted in a second very inefficient engineering paradigm for software products. This software engineering paradigm is equivalent to civil engineering paradigm for constructing buildings as per the Wikipedia page for "Software Architecture", where the civil engineering paradigm only uses reusable parts such as cement, steel, paint or wood ect., but each large building is not built by assembling components as in FIG. 28a (as products such as cars, airplanes or computers, where each product is built by assembling components as in FIG. 28b).

The engineering paradigm that builds products by assembling components (by using real components) is far better for software products, as it can build products several times more complex and having quality many times better, within less time and cost compared to the second engineering paradigm, which is equivalent to the civil engineering paradigm. It is desirable for software products, since about 80% of software engineering is changing existing code. The percentage of savings increases as the size of the product increases. That is, the present of savings would be more (or increases), if the product is more complex or larger.

The engineering paradigm for physical products comprises of two activities (i) partitioning each of the large products 2800 into self-contained modules (widely known as components or subcomponents), where each of the components and sub-components (e.g. 2812, 2814, 2816, 2832, or 2834) is designed and tested individually, and (ii) combining or composing the modules (that are known as components and subcomponents) to build the product by using a process (or method) called "assembly" of all the "components", after designing and building all the components for the product. In order to employ the process called "assembly" for composing components or modules, the components or modules must be conducive to being "assembled".

It is desirable to achieve an equivalent engineering paradigm for software products as well. The main differences (i.e. gaps) between the engineering paradigm for software products and the engineering paradigm for other kinds of product are (1) the ability to partition each product into equivalent self-contained modules or modules having higher degree of cohesion, (2) designing each of the modules as conducive to be composed (or assembled) automatically by employing minimal effort, and (3) the ability to employ ways equivalent to said "process of assembly" for composing the modules (referred to as real components, which are equivalent to the components) for building the product.

According to an embodiment for achieving such engineering paradigm for software products, the steps comprising of (1) partitioning each large software product into self-contained modules (or modules having higher degree of cohesion) so that each of the module can be designed and tested individually, (2) each of the self-contained modules is designed to be composed (or assembled) automatically by employing minimal effort and (3) employing a way (e.g. mechanisms, tools, and methods) to automatically combine or compose all the self-contained modules to build the product, once all the modules are designed, built, and tested individually. In these engineering paradigms, each of the self-contained modules may be redesigned and tested individually, for example, to satisfy evolving needs or to create upgraded versions for the product etc.

Applicant's applications for earlier patents (e.g. U.S. Pat. Nos. 8,392,877, 8,578,329, and 9,058,177) disclose methods for identifying, building, and using self-contained components. This application discloses ways (e.g. mechanisms, tools, and methods) for automatically combining or composing all the self-contained modules (or modules having higher degree of cohesion) quickly to build each product. The codebase for each self-contained module is free from spaghetti code (or design) if the module can be redesigned and tested individually. A substantial portion of the code (e.g. 66.67%) for any software product is free from spaghetti code (or design), if a substantial portion of the code (e.g. 66.67%) for the product is implemented in such self-contained modules.

Section-V: Overview and/or Summary of the Present Invention

Any large application comprises of multiple modules or parts, where each module or part includes implementation of one or more interfaces, and each interface needs to communicate with one or more interfaces implemented in other modules or parts. Usually, any two modules (or parts) communicate and exchange data with each other by calling each other's functions (directly or indirectly). That is, the code for an interface (referred to as caller interface) implemented in a first part calls (directly or indirectly) a function (referred to as listener interface) implemented in a second part.

For example, FIG. 30 illustrates an application comprising of multiple modules or parts (e.g. 3001 to 3003, and 3005 to 3007) where each module or part includes implementation of one or more interfaces (e.g. 3011 to 3013, and 3015 to 3017), and each listener interface (e.g. 3011) needs to communicate with one or more caller interfaces (e.g. 3015 and 3017) implemented in other modules or parts.

Today, in prior art communication and exchange of data between a first part that implements a listener interface (e.g. a function or method that can be called by other parts or modules), and a second part that implements a caller interface (e.g. code that can call an external function or method implemented by another part or module) is facilitated by manually implementing communication code to connect or couple the interfaces (e.g. the listener interface in the first part and the caller interface in the second part) and properly including the communication code in the code of the application that comprises of the parts that implement the interfaces.

For example, FIG. 16 illustrates the manual implementation of communication code 1607 to allow collaboration between two modules, Module-1 1602 and Module-2 1608, according to an embodiment. Module-1 1602 implements code block 1605 for service function "Module1ServiceFunction", where a service function is a subclass of listener functions. Module-2 1608 implements code block 1610 for caller interface by declaring a variable "RefForModule1Service" that can store the reference of an external listener function. Code block 1607 implements coupling code to facilitate communication, wherein the reference to the listener function in 1605 is assigned to the variable declared in 1610. Then, Module-2 1608 can call the listener function (i.e. Module1ServiceFunction) implemented in code block 1605 by using the variable RefForModule1Service in code block 1607, as illustrated by code block 1609.

Present invention employs mechanisms and a system (e.g. 3233) comprising of tools such as ECI/BCI 3014 to automate various tasks and activities of creating, documenting, testing, and maintaining such communication code to connect or couple interfaces. For example, one of the purposes of ECI/BCI 3014 is to find the appropriate listener interface having a symbiotic relationship with each caller interface in the application by employing means to look-up or find the appropriate listener interface for the caller interface. If any two interfaces (e.g. 3012 and 3016) need to communicate or exchange data with each other by searching and finding each other using ECI/BCI 3014, directly or indirectly, there is said to be a cooperative or a symbiotic relationship between the two interfaces (i.e. 3012 and 3016).

In order facilitate or aid the mechanisms and system (that comprises of ECI/BCI) to allow communication between any two interfaces, (i) the code for each caller interface also includes other caller interface information 3016 for use by BCI/ECI, which includes information (e.g. a look-up key or a unique ID) to find a listener interface 3012 that needs to communicate with the caller interface, and (ii) each listener interface 3012 also includes listener interface information for use by BCI/ECI, where parts of this information is used by each caller interface 3016 to find this listener interface, if caller interface 3016 needs to communicate with listener interface 3012.

The information for each interface also comprises of look-up keys or unique IDs, where the look-up key or unique ID of each caller interface 3016 is necessary to find the appropriate listener interface (e.g. 3012) having a symbiotic relationship with the caller interface 3016. The BCI/ECI employs look-up means such as the look-up key or the unique ID associated with each interface (i.e. included in the interface information), for example, to find the appropriate listener interface for each caller interface to facilitate communication between the listener interface and the caller interface.

According to an embodiment, an instance of ECI/BCI 800 is included in the code of the application and the information for listener interfaces and listener functions are registered with ECI/BCI 800. Each caller interface (e.g. 845) implements code to use the ECI/BCI 800 to find the appropriate listener interface (e.g. 825) through look-up means and to communicate with the listener interface. In this kind of embodiment, at least an instance of ECI/BCI is included in the code of the application to facilitate communication between interfaces (e.g. modules or parts in the application that implement the interfaces) at run-time of the application.

According to another embodiment, at least an instance of ECI/BCI (e.g. 2200 or 1000) is included in the code of compiler or pre-processor and (i) the compiler or pre-processor (e.g. 3233) comprises of code to get the information for each listener interface and listener function from the code of the module (or part) that implements the interface and registers the interface with ECI/BCI, and (ii) the compiler or pre-processor comprises of code to get the information for each caller interface from the code of the module (or part) that implements the interface and registers the interface with ECI/BCI. ECI/BCI (e.g. 2200 or 1000) builds two lists (e.g. 2230 and 2235) to find listener interface M07/1307 having a symbiotic relationship with each caller interface M09/1309 to create or generate coupling or communication code 1379 (i.e. to connect the interfaces of M07/1307 and M09/1309), according to an embodiment.

If an application comprises of multiple modules or parts, where each module or part comprises of implementation of one or more interfaces, and also comprises of communication code (e.g. 1150) that can facilitate communication between each caller interface and each listener interface (that have a symbiotic relationship with each other) in the application, where in the communication code (e.g. 1150) is created or generated (i) by a pre-processor at run-time of the pre-processor on the codebase of the application, or (ii) by a compiler at compile-time of the application's codebase, wherein the compiler or pre-processor (e.g. 3233) comprising of ECI/BCI that uses the information of interfaces implemented and/or included in the modules (or parts) to create or generate the communication code, according to an embodiment.

In this kind of embodiment, communication code is created or generated (i.e. by mechanisms or a system that comprises of ECI/BCI) to be included in the code of the application and the communication code can facilitate communication between interfaces (e.g. between modules or parts in the application that implement the interfaces). That is, communication code is (i) created during compile-time by compiler (which includes mechanisms and a system comprising of tools such as BCI/ECI) to be included in the compiled byte code of the application or (ii) generated before compile-time by pre-processor (which includes mechanisms and a system comprising of tools such as BCI/ECI) to be included in the code of the application, and the communication code can facilitate communication between interfaces at run-time of the application.

Each caller interface needs to implement code to find the right listener interface and call the listener function (directly or indirectly) by passing the right number and types of parameters. According to an embodiment, the information provided or included for each interface (and the information is made available to the BCI/ECI 2200 for example, by registering the interface) also comprises of additional information such as the number, versions, and types of parameters for the listener function, and BCI/ECI can use this information to test, document, and validate the compatibility between the caller interface and the listener interface that need to communicate or couple with each other. Each communication coupling (or link) connects two interfaces, such as a listener interface and a caller interface.

When an object instance is used in the place of the function of the listener interface (or listener function), the module comprising of the caller interface implements code to call one or more methods of the object (i.e. the methods implemented in the code of the class definition of the object instance). So, the module comprising of the caller interface directly or indirectly communicates with the module comprising of the listener interface by calling a function (e.g. one or more methods of the object) of the listener interface.

Any large application comprises of multiple components (or modules), where each of the modules (e.g. components or other kinds of parts) in the application collaborates with other parts or modules in the application. The application code comprises of code for including each of the modules in the application, where the code for including each module comprises of two parts: (Part-1) implementing application code for using the module in the application by including and initializing the module (e.g. by including and initializing or constructing an object instance for the class that implemented the application code for the module) in the code of the application and (Part-2) implementing and/or including necessary communication code in the code of the application for allowing necessary collaboration between each module and the other modules or parts in the application.

To make a module pluggable, it is desirable to minimize the code required for initializing or constructing the module (e.g. a fully initialized and configured object instance of the class definition for the module). Also, it is desirable to automate most of the tasks necessary for creating and managing communication code for the module by implementing necessary mechanisms within each of the modules, where the communication code allows the module to collaborate with other parts or modules in the application. One of the embodiments for creating and managing communication for a pluggable module comprises of two parts that complement each other:

(Part-A): One of the embodiments describes code implemented within each of the modules that implements mechanisms required for creating communication code for the module such as (i) If the module provides one or more services, the code in the module comprises of a mechanism for publishing each service along with necessary information for creating and managing the communication code, and (ii) If the module requires one or more services, the code in the module comprises of a mechanism for subscribing to each service along with necessary information for creating and managing the communication code.

(Part-B): One of the embodiments for creating and managing communication code for allowing collaboration between the modules in an application further includes: Designing and Implementing a tool (e.g. a system like Arjun or object like SRO disclosed in this application) for creating and managing the communication code for each of the modules in the application by accessing necessary information from each module using the mechanisms implemented in each of the modules for publishing and/or subscribing to services.

The code for initializing and/or constructing an instance of a module (i.e. part-1 above) for use in an application includes implementing (i) code for initialization: application code implemented for inputting necessary data for initializing the module and (ii) code for configuration: application code implemented for customizing the module to satisfy specific needs of the target application. Custom-designed application-specific module (e.g. a Class definition for the component) can be implemented to comprise necessary application code for initializing and configuring the module within the code of the module (e.g. the class definition implemented for the module) so that it requires little or no code for initialization or customization of the module in the code of the application after including an instance of the module (e.g. by including an object instance of the class for the module) in the application.

A wrapper class may be implemented for each reusable module to make the module pluggable, where the wrapper class implements the necessary code for initialization and configuration of the reusable module (in addition to publishing or subscribing to services for the module). In general, code for each of the reusable modules (e.g. components or other kinds of parts) implements construction code that implements certain features and/or functionalities. Any application that needs said features and/or functionalities may use the module by implementing code to properly initialize (e.g. by inputting application data into an instance of the class definition for the module) and configure code. For example, to customize the instance of the module to suit the unique needs of the application.

According to an embodiment, each pluggable module would have two parts or stages (i) Construction stage or part: Code implemented for construction stage or part, which includes application code for accessing and processing data and using the data for initializing and configuring the component, and (ii) Runtime Operational or Functional stage or part: The component contributes one or more features and functionalities for the application that often includes communicating with other parts in the application for collaborating with other parts or modules in the application. In most cases, but not always, construction part is executed only once in the beginning during initialization.

In some cases, it is required for certain modules or components to reconstruct themselves periodically. For example, based on change of states such as underlying application data. In this case, construction code is designed to reconstruct the features and functionalities of the component, for example, by accessing new application data whenever it is required to reconstruct itself. Ability to get necessary data for reconstructing of component is one of the in-built featured or functionalities for such modules. Usually, a class-definition for a GUI component such as a chart, map or graph are designed to re-construct it-self by using new data.

According to a preferred embodiment, the construction code for each pluggable module is implemented within the code for the class defined for the pluggable module. The objective is to minimize the code needed for implementing initialization and configuration code outside of the class definition (i.e. code of the application) when the component is included in the application by including an object instance of the application. Applicant's earlier patents U.S. Pat. Nos. 8,392,877, 8,578,329, and 9,058,177 disclosed this method for creating a very specific kind of components referred to as Replaceable Self-Contained Components (or RSCC).

It is desirable to create a GUI Studio/Editor for Arjun or SRO, where the GUI Editor or Studio would allow performing many tasks such as (i) adding each new pluggable module to an application, for example, by dragging and dropping an icon for the pluggable module, (ii) allowing manual connection (e.g. by creating communication code) between each required service for the pluggable module and an available service, and (ii) allowing manual connection between each available service for the pluggable module and one or more other parts/modules that require the service. The GUI Studio/Editor can be implemented for allowing many tasks such as creating, editing, or manipulating communication code and/or dependencies between modules.

Such a GUI Studio/Editor can provide many other features such as allowing documentation and/or visual representation for inspecting connections (i.e. communication code) or dependencies created for each of the pluggable modules in the application. For example, multiple modules may require each of the services provided by the pluggable module. Also, such a GUI Studio/Editor would allow manual editing of communication code by implementing adapter code (this kind of editing of communication code should be discouraged, except in special cases). The GUI Studio/Editor can allow many such tasks such as selecting the right service-provider manually if multiple modules are providing the required service or the same module is providing multiple flavors of services for a required service.

Section-W: Look-Up Means or Mechanism to Find a Listener Interface for Each Caller Interface from a Set of Available Listener Interfaces Any large application comprises of multiple communication interfaces and the objective of this invention is to facilitate communication between interfaces by using a system and mechanisms comprising of ECI/BCI. Usually, interfaces are implemented in modules, parts, objects or components. Hence, facilitating communication between two interfaces implemented in two different modules facilitates communication between the two different modules. One of the functions of ECI/BCI is to find each pair of interfaces using means of look-up such as look-up keys, indexes or unique-IDs, where the pair of interfaces is comprised of two interfaces having a symbiotic relationship with each other (i.e. two interfaces that need to communicate or exchange data with each other). So, in general, it makes no difference to ECI/BCI even if the two interfaces belong to the same module.

According to a preferred embodiment, finding multiple pairs of interfaces (where each pair is comprised of two interfaces having a symbiotic relationship with each other) can be accomplished by partitioning interfaces into two broad categories (i) caller interfaces, and (ii) listener interfaces. In general (except in special cases such as notification interfaces), there can only be one listener interface for each caller interface. That is, it is an error if either no listener interface is found or more than one listener interface is found for a caller interface. According to an embodiment, EC MCI tries to find a listener interface for each caller interface to facilitate communication between each caller interface and its corresponding listener interface, where the listener interface is found by employing look-up means such as look-up keys or unique IDs that are mapped by using relationship tables (e.g. that map between each caller interface and an appropriate listener interface for the caller interface).

The minimum information required to register a listener interface is a look-up key in addition to the reference of a listener function. The look-up key and the interface of a listener function (e.g. number of parameters and type of each parameter etc.) is defined at design-time. Any caller interface that is required to call the listener function uses the look-up key to find and call the listener interface function (e.g. passing the right number and types of parameters). More information can be added to the interfaces if more validation or verification is desirable. For example, if the information for an interface also includes the version number of the interface, this version information can be used to detect incompatibility between a caller interface and the listener interface called by the caller interface.

For example, let us suppose a listener interface of a module is redesigned when creating the next major release version of the application. It is required to redesign each caller interface that calls the listener interface accordingly to properly communicate with the newer redesigned listener interface. It is desirable to detect if developers of one or more caller interfaces are unaware or not informed of the changes made to the listener interface. When testing the application after redesigning the listener interface, ECI/BCI can detect all caller interfaces that call the listener function, according to an embodiment. Many more such tests can be implemented in ECI/BCI to be performed on communication interfaces by adding more necessary or relevant information to the interfaces.

For example, let us suppose a listener interface of a module is redesigned when creating the next major release version of the application. It is required to redesign each caller interface that calls the listener interface accordingly to properly communicate with the newer redesigned listener interface. It is desirable to detect if developers of one or more caller interfaces are unaware or not informed of the changes made to the listener interface. When testing the application after redesigning the listener interface, ECI/BCI can detect all caller interfaces that call the listener function, according to an embodiment. Many more such tests can be implemented in ECI/BCI to be performed on communication interfaces by adding more necessary or relevant information to the interfaces.

In case of notification interfaces, ECI/BCI tries to find one or more listener interfaces that need to be notified by the caller interface. The information provided for Interface-N classifies the interface as a notification interface to indicate to ECI/BCI that it is possible to have multiple listener interfaces for this special kind of caller interface. For example, if Interface-N needs to notify Listener-A, Listener-B, and Listener-C, then ECI/BCI need to find three pairs of interfaces (Interface-N, Listener-A), (Interface-N, Listener-B), and (Interface-N, Listener-C), where each pair of interfaces comprises of two interfaces having a cooperative or symbiotic relationship with each other, where a symbiotic relationship implies that it is required to facilitate communication between the two interfaces in each pair (i.e. between each other).

In case of pre-processor comprising of a system and mechanisms for Arjun, the BCI/ECI in Arjun finds multiple pairs of interfaces where each pair of interfaces comprises of two interfaces having a cooperative or symbiotic relationship with each other, and the pre-processor generates communication code (which can be included in the code of the application) that can facilitate communication between the two interfaces (i.e. with each other) in each pair of interfaces. In case of compiler comprising of a system and mechanisms for Arjun, the BCI/ECI in Arjun finds multiple pairs of interfaces where each pair of interfaces comprises of two interfaces having a cooperative of symbiotic relationship with each other, and the compiler creates communication code (and includes the communication code in the code of the application) that can facilitate communication between the two interfaces (i.e. with each other) in each pair of interfaces.

For example, consider that an application comprises of multiple caller interfaces and multiple listener interfaces and it is required to facilitate communication between each caller interface and the appropriate listener interface for the caller interface by finding the listener interface having a symbiotic relationship with the caller interface. It is required to create and include communication code for each caller interface in the application to communicate with an appropriate listener interface (having a symbiotic relationship with the caller interface) in the application, by employing a mechanism to create communication code and including the communication code properly in the code of the application for example. It is desirable to automate, as much as possible if not completely, the activities and tasks to create communication code and include the communication code in the code of the application.

The communication code or instructions created or generated (e.g. by Arjun) to allow communication between each pair of interfaces (comprising of two interfaces such as a service-provider interface and another interface that requires the service) may be included manually at appropriate location in the code of the application. The two tasks of (i) creating communication code for each interface and (ii) including the communication code can be separated. Including the communication code can be done manually for each pair of modules, aided for example by GUI (Graphical User Interface) tools. Such GUI tools also allow visually representing and editing the information of every interface (e.g. look-up key), and the modification of communication code, validation, testing, and dependencies etc.

If each module in an application comprises of the implementation of one or more caller interfaces and/or listener interfaces and it is required to facilitate communication between each caller interface and a listener interface, then the code for each interface comprises of instructions and information to publish or export the interface. Each interface (e.g. a first interface) must provide a means to find a match with a second interface, if the first interface and the second interface needs to communicate with each other. That is, if a first interface and a second interface need to communicate with each other (i.e. if they are symbiotic partners), then it is required to facilitate communication between the two interfaces (having a symbiotic relationship). It is required to facilitate communication between each caller interface in list 2235 and a listener interface in list 2230, by finding the right listener interface. It is required to employ a means or mechanism to find the right listener interface in 2230 for each caller interface in list 2235. According to an embodiment, a unique look-up key (e.g. that can be a combination of one or more keys or IDs) is given at design-time to each listener interface and the look-up key is included at development-time in the code and information of each caller interface that requires to communicate with a listener interface.

Each service-provider interface (a subclass of listener interface superclass) of a module implements code to publish information (e.g. 2610) for the services provided by the module (e.g. using a look-up key). If a module (e.g. Module-A) requires a service, it implements code for caller interface to publish information (e.g. 2620) for the required service (e.g. using a look-up key). If another module (e.g. Module-B) provides the service (i.e. required by Module-A), a mechanism such as Arjun creates the necessary communication code for Module-A to request the required service provided by Module-B, by matching the look-up keys associated with the service required by Module-A and the service provided by Module-B for example. According to an embodiment, Arjun finds a required service for a module by comparing and matching (i) the look-up key associated with the required service and (ii) the look-up key associated with each of the available services provided by other modules in the application.

The look-up key to find a listener interface can be of many forms. According to an embodiment, a combination of one or more keys (e.g. string, name, numbers etc.) can be used to publish each listener or caller interface. According to another embodiment, the names of the service functions (or objects that can provide service) are formed using a combination of one or more look-up keys and unique IDs. It is required to employ the appropriate method to find a required service (e.g. by Module-A) from a list or array of available services (e.g. 830 or 2230) to create the necessary communication code to facilitate communication between Module-A, to access the required service, and another module (e.g. Module-B), that provides the service. According to an embodiment, a mechanism such as Arjun creates communication code for each required service by traversing the list or array of required services (e.g. 835 or 2235).

An application may comprise of multiple modules, where each module implements (i) one or more listener interfaces for caller interfaces implemented in other modules and/or (ii) one or more caller interfaces to call listener interfaces implemented in other modules. According to an embodiment, a mechanism such as BCI/ECI in an application (or Arjun comprising of BCI/ECI) creates a set (e.g. Set-A) of all the available listener interfaces. The available listener interfaces in the set (i.e. Set-A) may be organized as a sorted list (e.g. 830 or 2230) or a hash table to quickly search and find each required listener interface using means such as a look-up key, according to an embodiment.

If a module in an application implements one or more caller interfaces, a mechanism such as Arjun creates necessary communication code or instructions for the module to access each listener interface by looking up the required listener interface in the set (i.e. Set-A). The code or information implemented for each caller interface must use a look-up key that is associated with the right listener interface, and the look-up key is used to match (i.e. by comparing to the look-up key associated with each available listener interface) and find the required listener interface from the set (i.e. Set-A) of available listener interfaces, according to an embodiment.

According to another embodiment, a system or mechanism such as Arjun/SRO creates two sets: (i) a set (e.g. Set-C) for all the caller interfaces 835 by all the modules in the application, and (ii) another set (e.g. Set-L) for all the available listener interfaces 830 that are provided by all the modules in the application. Each set (i.e. Set-C or Set-L) may be a sorted list (e.g. 835 or 830) or a hash table. Each node in each list comprises of necessary information for an interface such as a look-up key, a reference for the listener function, and a reference to the module that requires or provides the service, according to an embodiment. This information in each of these nodes is used to create the necessary communication code or instructions to facilitate communication between a module that implements the caller interface and another module that implements the listener interface, according to an embodiment. This communication code for each such communication link (between two modules comprising of a module that implements the caller interface and another module that implements the listener interface) may be included at proper location in the code of the application.

The information for interfaces available in the nodes of sets Set-L (e.g. nodes in list 830) and Set-C (e.g. nodes in list 835) is useful in creating documentation about dependencies between modules. This includes many kinds of information such as kinds of communication dependencies and interfaces between modules (or a given module and other modules) in the application. A GUI (Graphical User Interface) application or a GUI tool can be implemented to visually represent or show this information about dependencies for each module or dependencies between a given module and other modules. Furthermore, a GUI application or tool can be implemented to graphically create, edit, and manage each dependency and the interfaces between a given module and other modules in the application.

The pre-processor or compiler comprising of ECI/BCI can create files that include information for interfaces that use the ECI/BCI to communicate with each other (e.g. using the information available in lists 2230 and 2235), where the files can be used to create documentation for communication dependencies or symbiotic relationships for every interface. Furthermore, a GUI-tool can be created to visually display the communication dependencies between interfaces or the symbiotic relationships between each interface and all other interfaces that are connected and communicate with the interface.

According to another embodiment, many major services are included in an array of objects, where each object comprises of information for a service. The index of each service is determined at design-time. Then, each caller code that requires a service can use the index of the service to request it. This eliminates the overhead of having to search for the required service. Other such means can be employed to publish all the available services. According to another embodiment, each interface is given a unique ID (or index) and a table is created to define the symbiotic relationships for each caller interface at design-time or on or before compile-time.

The core idea for look-up is that the information included in each caller interface and the code implemented for each caller interface must be able to find and communicate with the right listener interface by employing means of look-up. For example, if a caller interface is required to access a service and if the service (a subclass of listener interface) is registered and available in a global array of major services, then the caller interface needs to implement code to use the proper index of the service to find and request the service. Many such mechanisms can be invented to match two interfaces that need to connect and create communication code that allows collaboration between the interfaces.

According to another embodiment, each interface is given a unique ID and a CASE-tool is provided to define symbiotic relationships between interfaces. The CASE-tool provides a GUI-interface to inspect and visually define the symbiotic relationships between interfaces. For example, if an application has caller interfaces CI-1, CI-2, CI-3, CI-4 and listener interfaces LI-1, LI-2, LI-3, then the symbiotic relationships can be defined and stored in an array such as [(CI-1, LI-3), (CI-2, LI-3), (CI-3, LI-1), (CI-4, LI-2)]. Each pair such as (CI-2, LI-3) implies that CI-2 needs to communicate with LI-3, where CI-2 is the unique ID given to the caller interface and LI-3 is the unique ID given to the listener interface.

The main function of tools such as ECI/BCI (e.g. 2200 or 800) is to identify symbiotic relationships that exist between interfaces in a software application, and it can employ one or more methods to find if a symbiotic relationship exists between two interfaces. For example, one method is to use SRO/DoS, where every service-provider interface (e.g. belonging to a subclass of listener interfaces) registers its service function (e.g. belonging to a subclass of listener functions) with the SRO/DoS by using a unique look-up key, and any module that requires the service implements a caller interface to access the service by using the unique look-up key.

Another method is to use an array where every major service is stored at a pre-defined index (or port), with the index for each major service being defined at design-time. In this method, the module that requires a service implements a caller interface that uses the index associated with the service to access the required service. In this method, the array of major services is a kind of ECI/BCI.

10. // Caller interface variable to save index of a global service
20. Var ServiceIndex_N=9;

According to an embodiment, the code for caller interface declares a variable (e.g. ServiceIndex_N at line 20 above) to store the Index number of required global service. The ECI_BCI_Obj stores the reference of listener function for the service at an Index, where the Index can be either pre-defined (e.g. 9) at design time, or determined at compile time and stored in the variable (e.g. ServiceIndex_N) by the compiler. Then the module that implemented the caller interface can request the service by including code as shown in the line 60 below (e.g. by using global object ECI_BCI_Obj).

50. // Code to call the service-function to request the service.
60. (ECI_BCI_Obj.SeviceArray[ServiceIndex_N]) (Version, Parameters, . . . );

Another method is to register every listener interface with ECI/BCI using a unique ID, and also register every caller interface with ECI/BCI by using a unique ID. Then, a mapping table or mapping list is created to map between each listener interface with each caller interface that calls the listener interface to define a symbiotic relationship, according to an embodiment. Many such methods can be employed by ECI/BCI to find the right listener interface for each caller interface. The purpose of ECI/BCI is to function as an Exchange for Communication Interfaces to facilitate connections between communication interfaces, like a rule-based expert system, according to an embodiment.

To facilitate communication between any two modules in an application using a mechanism comprising of BCI/ECI, a first module implements a listener interface and a second module implements a caller interface, where the implementation of the listener interface includes code to register the listener interface with BCI/ECI and information (e.g. look-up key, unique ID, or index etc) to look up the listener interface using BCI/ECI, and the implementation of the caller interface also includes information (e.g. look-up key, unique ID, or index etc) to look up the listener interface using BCI/ECI.

The primary function of ECI/BCI is to find a listener interface for each caller interface by employing a look-up means. In other words, to facilitate communication for each caller interface, BCI/ECI employs a look-up means to find the corresponding listener interface for the caller interface. Disclosures of the current invention include a few methods employed by ECI/BCI to find the right listener interface in an application for any caller interface in the application and facilitate communication between the caller interface and the listener interface.

The phrase "look up for interface" or "search for interface" implies that ECI/BCI attempts to find an interface registered with ECI/BCI, by using for example a combination of one or more look-up keys such as unique IDs, index, and others. It is required to provide a unique look-up key to register each listener interface with ECI/BCI, and the listener interface can be looked up or searched by using the unique look-up key by any caller interface, where the term look-up key is used broadly to cover all kinds of keys such as a combination of one or more Unique IDs, Index, or by employing a map-table to define symbiotic relationships between interfaces by using the unique ID associated with each interface. For example, the unique ID of a caller interface is used to find from the map-table by mapping the unique ID of the appropriate listener interface having a symbiotic relationship with the caller interface.

Look-up means for finding an interface (e.g. listener interface) using ECI/BCI implies finding the interface that satisfies pre-defined search criteria, by using one or more look-up mechanisms that employ things such as look-up keys, unique IDs, indexes, and mapping-tables to search, for example. According to an embodiment, the code implemented for each caller interface comprises of code and information (e.g. look-up keys, unique IDs, or indexes) to look up and find a listener interface using ECI/BCI to connect and communicate with the listener interface.

For example, one method registers every listener interface using unique look-up keys assigned to listener interfaces, and the code for each caller interface that needs to communicate with a particular listener interface uses the unique look-up key to find and connect to the appropriate listener interface using ECI/BCI. The look-up means employed by ECI/BCI to find a particular listener interface (for a caller interface) includes searching lists of available listener services by using a look-up key to find the right listener interface, according to an embodiment. The objective of look-up means (i.e. a feature or function implemented in ECI/BCI) is to connect or couple each caller interface with the right listener interface by employing a pre-defined method or mechanism to find the right listener interface.

Furthermore, one method is used during development and testing (e.g. to validate compatibility between interfaces) and another method that is more efficient (which does not validate compatibility between interfaces) is used for deployment to customers, according to an embodiment. According to another embodiment, an additional method includes a security filter between interfaces for deployment that can check malicious data and validate profiles of users to grant secure access to certain data only to authorized users. So, BCI/ECI/Arjun can be designed to perform such intelligent functions (or provide such intelligent features) in addition to facilitating communication between interfaces in an application and managing the communication interfaces.

Section-X: Use of the Method and System of the Present Invention

Most large software applications comprise of multiple modules (e.g. objects, components, or parts) that collaborate with each other or with other parts of the application. It is desirable to use pluggable modules instead of manually implementing and maintaining communication code in each large software application. According to an embodiment, one or more modules in an application are redesigned into a pluggable module by including the necessary information (i) to publish (or register) each listener interface implemented by the module, and (ii) to subscribe (i.e. by finding and connecting to a listener interface) from each caller interface implemented by the module. One or more mechanisms, methods, or tools are employed to access this information directly or indirectly in the modules and this information is used to create or generate communication code. This communication code is included in the code for the application to facilitate collaboration between the modules in the application.

An overview of the main methods disclosed in this invention includes (1) using pluggable modules in an application and (2) mechanisms to automate tasks to allow collaboration between the modules (e.g. by avoiding the need to manually implement communication code). Today, any large existing software application comprises of many modules. But the modules are not designed to be pluggable modules that, for example, use mechanisms and protocols such as software motherboards. Invention of physical pluggable components (or modules) requires its complementary invention of physical sockets. For example, in the context of computers, pluggable components (or modules) require the complimentary invention of a motherboard having sockets to plug in the components such as CPU, DRAM, hard-drive, CD-player, or power supply. For another example, in the context of cars, a platform such as a chassis is used to assemble components such as engine, gearbox, or wheels.

The mechanism comprising of ECI/BCI (a variant implementation of SRO/DoS) acts as the equivalent platform (e.g. software motherboard) to assemble or plug in software modules, according to an embodiment. Each module comprises of the implementation of a few lines of communication code to connect with ECI/BCI and to (i) publish (i.e. register) each listener interface implemented by this module (which are located and communicated with by other modules that need to collaborate with this module) and (ii) implement caller interfaces to locate and communicate with each listener interface (provided by other modules) that are required by this module. Although the mechanism comprising of ECI/BCI requires less manual effort in software development, it is less efficient when high performance is critical or if an application must execute optimally. For example, there is an overhead of a caller interface having to look up (using look-up key, or combination of set of keys) a listener interface to communicate and collaborate with, whenever the application is being executed.

It would add even more overhead if the interfaces are validated for each communication link between each pair of interfaces (comprising of a caller interface and a listener interface). The interface validation can be turned off once the interfaces are properly validated during testing phase. There is no need for interface validation if there is no change to the code of the modules in the application. An incompatible interface could potentially be injected only when the code for a pluggable module or any other part that communicates with the pluggable modules is changed. So the validation of coupling interfaces and communication code can be turned off after testing (i.e. in software ready for release).

This overhead of finding listener interfaces using look-up keys (or combination of set of keys) can be avoided by designing Arjun (which comprises of BCI/ECI) to generate communication code, where Arjun is a given name and broadly refers to a pre-processor (e.g. for a compiler) that is designed to get information about listener interfaces and caller interfaces in the application. The ECI/BCI in Arjun uses look-up keys (or combination of set of look-up keys or unique IDs) to match each caller interface with a listener interface that is appropriate for the caller interface (i.e. by finding a listener interface having symbiotic relationship with the caller interface). This exercise of getting information for each interface from modules can be completed at compile-time (or by a pre-processor) and once this exercise is completed, Arjun is designed to use this information and is intelligent enough to generate communication code, where the communication code can be used to allow collaboration between modules implementing respective interfaces, according to an embodiment. By including communication code (generated by mechanisms comprising of ECI/BCI in the pre-processor or compiler) in the code of the application, the run-time overhead associated with using look-up keys (or combination of set of keys) to find and connect each caller interface with the appropriate listener interfaces every time the application is being executed (or one time when the application starts running) can be eliminated.

This invention discloses a new kind of software component (or module) called pluggable module and discloses methods to create and use pluggable modules to build software applications. These disclosed methods and processes are useful to identify multiple large modules in an application and to implement each module as a pluggable module (or to transform existing modules into pluggable modules). A novel set of mechanisms, processes, and intelligent tools are employed to eliminate the need to manually implement communication code for pluggable modules in an application, when said pluggable modules are included in the application. Three different ways are listed below:

One way or mechanism is to use ECI/BCI to allow collaboration between multiple interfaces in an application, where (i) code implemented for each listener interface registers a listener function (to be called by other modules) with ECI/BCI, and (ii) each caller interface implements code to look up the appropriate listener interface from ECI/BCI and call the listener function if found. Each listener interface is designed to provide the necessary information for ECI/BCI to be able to find it when it needs to be reached by a caller interface. Each caller interface is designed to provide the necessary information for ECI/BCI to find the appropriate listener interface that needs to be communicated with.

The information for each interface comprises of details such as look-up key, type of interface, interface version, and information to validate compatibility between a caller interface and a listener interface that need to communicate or exchange data with each other. ECI/BCI is designed to collect said necessary information for each interface from the pluggable modules and use said information to facilitate communication for the pluggable modules (i.e. by allowing communication between the interfaces). This information can have additional details useful for validating communication interfaces and to detect errors, such as incompatibility between a module that implements a listener interface and another module that implements a caller interface that calls this listener interface.

Every pluggable module is designed to provide the necessary information for each listener interface and each caller interface implemented by the module. When the information for the interfaces is made available, ECI/BCI is designed to organize and use said information to create communication code that allows communication between pluggable modules. According to an embodiment, ECI/BCI creates two lists for two sets (i) a first list for a set of listener interfaces, which are registered (or published) by each module that implements one or more listener interfaces, and (ii) a second list for a set of caller interfaces which are subscribed to (or looked up), where the information is used to find a match for each caller interface with its corresponding listener interface and allow communication between them. This information in the lists is used to validate communication interfaces and to create or generate the necessary communication code that can allow communication between the modules. The communication code is included in the code of the application to facilitate communication between the pluggable modules in the application that implemented the respective interfaces.

According to yet another embodiment, each pluggable module is designed to include the necessary code and information for (i) each listener interface implemented by the module (if the module implements one or more listener interfaces) and (ii) each caller interface implemented by the module (if the module implements one or more caller interfaces). A pre-processor or compiler (comprising of a system and/or mechanisms referred to by given name Arjun) is designed to access and collect this information directly or indirectly from the modules in an application and use said information to create two lists of nodes (i) a first list of nodes for listener interfaces from all the modules in the application, which are published (or registered) by each module that implements one or more listener interfaces, and (ii) a second list of nodes for caller interfaces from all the modules in the application, which are published (or registered) by each module that implements one or more caller interfaces. Each node for every service may comprise of the information necessary to accomplish the required tasks: This information in the nodes is used to validate communication interfaces and to generate necessary communication code for the modules. The communication code is included in the code of the application to facilitate communication between every pluggable module that requires one or more services and the modules that are providing each of these required services.

This information in the nodes (for interfaces) in the lists for listener interfaces and caller interfaces is used to validate communication interfaces and to generate the necessary communication code for the modules, where this communication code can be included in the code of the application to facilitate communication between each pluggable module that implements listener interfaces and other modules that implement caller interfaces. The embodiments outlined above generate communication code to facilitate collaboration between each module and other parts (that include other modules) in the application. This code can be included in the code of the applications to facilitate communication between the modules. In prior art today, this kind of communication code is manually implemented in the code of the application and manually managed. In the embodiments outlined here, many of the tasks of creating and managing the communication code are automated.

The key to convert a module into a pluggable module is (i) if the module implements one or more caller interfaces to communicate with other modules, the implementation includes information (or code) to directly or indirectly publish (or register) each caller interface, and (ii) if the module implements one or more listener interfaces, the implementation includes information (or code) to directly or indirectly publish (or register) each listener interface. Then, a mechanism and process such as a pre-processor like Arjun (comprising of ECI/BCI) is employed to directly and indirectly collect information about interfaces from all the modules that implement them and use this information to generate the necessary communication code that can facilitate collaboration between the modules (when the communication code is properly included in the code for the application).

In an embodiment of the present invention for building non-web applications, any object-oriented programming language such as C++, Java, and C# may be used to implement definitions of classes for modules in an application. Also, object-based languages such as Basic, Adobe's ActionScript, and JavaScript can also be used where the applications can also run on a viewer or virtual machine on local computers for non-web applications. While many examples for pluggable interfaces for pluggable modules are presented in object-oriented language, they are not limited to any one language. In case of a non-web GUI application, pluggable modules for an application can be created using non-object-oriented or object-based programming languages. Understanding the specifications of programming languages/technologies used on a platform, any person skilled in the art of programming may design modules to achieve equivalent results for the platform according to the teachings of this disclosure.

Any person skilled in the art of programming may practice the invention by using any object-oriented, object-based, or structured programming language, and on any platform (e.g. Computers, VM/Viewers, Cell-phones, PDAs, Tablets, and platforms/devices embedded in systems such as airplanes and network-routers etc.). Many of these examples and embodiments are intended to teach our invention and so must be taken in the spirit of learning and with the given context. Each embodiment must be taken in the context and spirit in which it is intended but must not be interpreted as limiting the scope or as intended to impose any unnecessary restrictions on the modules, ECI/BCI, SRO/DoS, or Arjun (e.g. preprocessors or compilers). Anyone skilled in the art, for example, may always make other obvious educated choices to implement alternative embodiments that choose other options, based on cost-benefit analysis, preferences, or experience and knowledge.

Section-Y: An Example System to Run Applications Comprising of Modules and Code/Systems to Allow Communication Between the Modules FIG. 2 is a diagrammatic system view 200 of a computing system in which any of the embodiments disclosed herein may be performed, according to one embodiment. Particularly, the diagrammatic system view of FIG. 2 illustrates a processor 202, a main memory 204, a static memory 206, a bus 208, an output such as a video display 210, an alpha-numeric input device 212, a cursor control device 214, a drive unit 216, a signal generation device 218, a network interface device 220, a machine-readable medium 222, instructions 224, and a network 226. The diagrammatic system view 200 may indicate a personal computer, a computing device (e.g. smartphone, tablet, or server), or a data processing system in which one or more operations disclosed herein are performed. Also, it is not necessary for server devices in server farms, for example, to be connected to a monitor or input devices such as a keyboard or mouse. The processor 202 may be a microprocessor, a state machine, an application-specific integrated circuit, a field-programmable gate array, etc.

The main memory 204 may be a dynamic random-access memory or primary memory of a computer system. Further, the main memory 204 also includes software application code 228 including multiple large pluggable modules. The static memory 206 may be non-volatile memory such as a hard drive, a flash drive, or other memory information associated with the data processing system. Also, an application comprising of pluggable modules can be stored on a non-transitory computer-readable medium connected to a computer using appropriate protocols such as NFS (Network File Server) or SAN (Storage Area Networks). The bus 208 may be an interconnection between various circuits and structures of the data processing system. The video display 210 may provide graphical representation of information on the data processing system. The alphanumeric input device 212 may be a keypad, touchscreen, keyboard, or any other input device of text (e.g. a special device to aid the physically handicapped). The cursor control device 214 may be a pointing device such as a mouse or touchpad. The drive unit 216 may be a hard drive, a storage system, or another longer-term storage subsystem.

The signal generation device 218 may be a BIOS or a functional operating system of the data processing system. The network interface device 220 may perform interface functions (e.g., code conversion, protocol conversion, and buffering) required for communications to and from the network 226 between a number of independent devices (of varying protocols). The machine-readable medium 222 may provide instructions on which any of the methods disclosed herein may be stored and loaded into main memory. The instructions 224 may provide source code and data code to the processor 202 to enable one or more of the operations disclosed herein.

In accordance with the above described embodiments with respect to FIG. 2, the system includes a processor 202 and a memory 204 operatively coupled to the processor 202, wherein the memory includes software application code 228 comprising of at least one ECI/BCI and multiple pluggable modules, where (i) Each module comprises of instructions to register each of its listener interfaces with ECI/BCI, if said module implements one or more listener interfaces, and (ii) Each module comprises of caller interface code to look up each required listener interface and to call the listener interface function (directly or indirectly), if said module is required to communicate with one or more listener interfaces, supported by a mechanism comprising of ECI/BCI that facilitates communication between each module that implements caller interfaces and the modules that implement the corresponding listener interfaces for these caller interfaces.

In accordance with the above embodiments described with respect to FIG. 2, the system includes a processor 202 and memory 204 operatively coupled to the processor 202, wherein the memory includes software application code 228 comprising of multiple pluggable modules and communication code generated by the Arjun system or mechanism (which comprises of ECI/BCI) using interface information in the code of the modules. Here, (i) Each module code for each caller interface uses generated communication code to call each listener interface function, if said module implements one or more caller interfaces, and (ii) Each module uses the generated communication code to provide connection with each of its listener interfaces, if said module comprises of one or more listener interfaces, wherein the generated communication code facilitates communication between each module that has caller interfaces and the modules that have the corresponding listener interfaces for these caller interfaces. The communication code that allows this communication between modules is generated by mechanisms and tools that access and use the information for each interface implemented in the source code (or code) of each of these modules.

An article comprising of a computer-readable storage medium having instructions thereon, which when executed by a computing platform (e.g. FIG. 1, FIG. 2, or FIG. 3), result in the execution of the method described above. The foregoing method may be in the form of a machine-readable medium embodying a set of instructions that, when executed by a machine (e.g. FIG. 1, FIG. 2, or FIG. 3), causes the machine to perform any method disclosed herein. The non-transitory computer-readable medium includes any kind of computer hardware used to store data such as hard-drive, memory, processor cache, and RAM, while excluding transitory mediums such as propagating signal. It will be appreciated that the various embodiments discussed herein may not be the same embodiment and may be grouped into various other embodiments not explicitly disclosed herein. Few examples include:

An article comprising of a computer-readable storage medium having instructions thereon, which when executed by a computing platform (e.g. FIG. 1, FIG. 2, or FIG. 3) result in the execution of an application comprising of multiple modules and communication code created to allow the modules to interact and collaborate with each other, wherein (a) each module in a first set of modules comprises of code to implement listener interfaces and the code for each listener interface includes information about the listener interface, (b) each module in a second set of modules implements one or more caller interfaces to call listener functions provided by the first set of modules, and the code for each caller interface includes information about the caller interface, and (c) the communication code is generated by a computer-implemented mechanism that uses the information of the available listener interfaces implemented by the first set of modules, and the information of the caller interfaces implemented by the second set of modules.

An article comprising of a computer-readable storage medium having instructions thereon, which when executed by a computing platform (e.g. FIG. 1, FIG. 2, or FIG. 3) results in the execution of a mechanism to create or generate communication code that can allow interaction and collaboration between modules in an application, wherein the mechanism reads code for the modules and the application to get information about the interfaces implemented in each of these modules, and (i) the code for a first set of modules in said application implements one or more listener interfaces and each module comprises of information for each of these listener interfaces, and (ii) the code for a second set of modules in said application implements one or more caller interfaces and each module comprises of information for each of these caller interfaces.

Here, said mechanism directly or indirectly gets the information for said available listener interfaces and said caller interfaces to create or generate said communication code, wherein execution of the application by a computing platform results in collaboration between the first set of modules that implement said multiple listener interfaces and the second set of modules that implement said multiple caller interfaces by using the communication code created or generated by the computer-implemented mechanism at or before compile-time.

A "Computer Readable Medium" or "Computer Readable Storage Medium" stands for non-transitory computer readable storage and medium, including both volatile memory such as DRAM, SRAM, and cache-memory of processor/ CPU, and "non-volatile" memory such as Flash memory, CD-ROM, ROM, and Hard-drive. Furthermore, computer readable storage medium includes such non-volatile physical storage and medium connected to the computer over the web, Internet, or wireless networks, to access or read from such non-volatile physical storage and medium with computing devices. For instance, the software code for an application or software product is usually stored on non-volatile memory such as Flash memory, CD-ROM, or Hard-drive.

To execute an application on a computer, the computer accesses the software code (e.g. comprising of instructions) for the application from non-volatile memory and loads it into a volatile memory to execute all the instructions in the software code with a CPU or processor. Accessing software code (or "code" in short) or instructions for an application from non-volatile storage medium or memory includes getting the software code (or code comprising of instructions) over Internet, Web, or wireless networks. The code or instructions (accessed from non-volatile storage medium) is loaded into a volatile memory of a computing device to execute all the instructions in the code, according to an embodiment.

Using any such variations is obvious and within the scope of the basic invention and inventive steps: The basic invention requires: (1) each of the modules to (a) comprise of information to publish each of its listener interfaces (if the module implements one or more listener interfaces), and (b) comprise of information to publish each of its caller interfaces (if the module implements one or more caller interfaces). (2) a mechanism to generate communication code for the interfaces, where the mechanism comprises of means to obtain the information from the modules and use the information to generate necessary communication code, where the communication code allows collaboration between the interfaces in the application when the communication code is properly included in the code of the application and the application is executed, according to an embodiment.

A few languages such as JavaScript or VB are interpreted, so no compilation step is required to execute applications that are implemented in such languages. But usually, the source code for an application is implemented in high-level programming languages (e.g. C, C++, Cobol, C#, or Java). The source code is compiled into byte code, assembly, or machine instructions to create an executable for the application. The code for the executable of the application is stored in machine-readable medium. The code is loaded into volatile memory (e.g. DRAM or SRAM) for the application to be runnable (or executable) on a computer and the CPU of the computer reads the code to execute the instructions in the code of the application.

The application code that comprises of the modules that implement interfaces and the communication code for the interfaces is compiled (e.g. into assembly or byte code) to create an executable to run (or execute) the application on a computer if the code of the application is implemented in programming languages such as C++, C#, C, or Java. This disclosure uses pseudo-code to illustrate general steps such as (i) registering each service with SRO/DoS, (ii) finding or requesting each service with SRO/DoS, and (iii) communication code or instructions created (e.g. by the SRO/DoS) to allow communication between any two modules, and so the precise implementation will vary from one language to the other such as Java, C#, VB, JavaScript, Python, C/C++ etc. For example, the generation of communication code happens on or before compile-time of an application on a computing system, and the communication code is executed at run-time of the application on a different computing device.

In accordance with the above described embodiments with respect to FIG. 2, the system includes a processor 202 and a memory 204 operatively coupled to the processor 202, wherein the memory includes software application code 228 comprising of at least one ECI/BCI and multiple interfaces, where (i) Each listener interface comprises of code or instructions to registering itself with BCI/ECI along with means to find the listener interface such as a look-up key or a unique ID, and (ii) Each caller interface comprises code to look up a listener interface using look-up means such as a look-up key or a unique ID. Here, a mechanism comprising of ECI/BCI facilitates communication between each listener interface and one or more caller interfaces. If an application comprising of, say, 20 pairs of interfaces having symbiotic relationships, the ECI/BCI facilitates communication between the 20 pairs. That is, for each pair comprising of two interfaces (e.g. a listener interface and a caller interface), the ECI/BCI facilitates communication between the two interfaces (e.g. listener interface & caller interface) in the pair.

In accordance with the above-described embodiments with respect to FIG. 2, the system includes a processor 202 and a memory 204 operatively coupled to the processor 202, wherein the memory includes software application code 228 comprising of multiple interfaces, and communication code created or generated by a mechanism comprising of at least one ECI/BCI. Here, the communication code allows communication between the interfaces. The code is generated by a mechanism comprising of ECI/BCI and is capable of accessing information about (i) Each listener interface comprising of code or information to register itself with BCI/ECI along with means to find this listener interface such as a look-up key or a unique ID, and (ii) Each caller interface comprising of code or information to register itself with BCI/ECI along with means to look up a listener interface such as a look-up key or a unique ID, where the system or mechanism (referred to as Arjun) accesses the information of each interface from the code of the modules that implement the interfaces and registers each interface with ECI/BCI and Arjun (which comprises of ECI/BCI) creates or generates communication code that can allow communication between each listener interface and one or more caller interfaces. That is, the communication code can facilitate communication between any two interfaces that are having a symbiotic relationship. ECI/BCI finds each pair of interfaces that have a symbiotic relationship with each other.

Present invention for one of the enabling tools and mechanisms for making interfaces pluggable by inventing new software Tools (e.g. ECI/BCI) that can facilitate communication between interfaces and by including additional information necessary for the software Tools, according to an embodiment. According to another embodiment, the application code comprising of the interfaces and the communication code (where the communication code is generated by the system or mechanism of Arjun which comprises of ECI/BCI) for the interfaces is compiled (e.g. into assembly or byte code) to create an executable to run (or execute) the application on a computer if the code of the application is implemented in programming languages such as C++, C#, C, or Java. However, the precise implementation will vary from one language to the other such as Java, C#, VB, JavaScript, Python, or C/C++ etc.

In these exemplary embodiments of the present invention, specific components, hardware parts, arrangements, and processes are used to describe the invention. Obvious changes, modifications, and substitutions may be made by those skilled in the art to achieve the same purpose of the invention. The exemplary embodiments are, of course, merely examples and are not intended to limit the scope of the invention. Accordingly, it should be understood that the methods, examples, and references described herein are illustrative only and are not limiting upon the scope.

Thus, modifications and variations may be made in the techniques, processes, and structures described and illustrated herein without departing from the spirit and scope of the new invention of tools, methods and mechanisms to facilitate communication between interfaces and discoveries about physical components for CBD (Component-Based Design) and CBE (Component-Based engineering) for other engineering disciplines (e.g. mechanical, electronics and aerospace), which are the theoretical foundation for the present invention. It is intended that the present invention includes all other embodiments that are within the scope of the claims and their equivalents.

What is claimed is:

1. A computer-implemented method running or executing on a computing device comprising of at least one processor, at least one memory, and having access to a non-transitory computer-readable storage medium comprising of code or instructions for executing or running a software product or application, comprising:

accessing from the non-transitory computer-readable storage medium the code or instructions for the application comprising of a plurality of modules or parts, wherein each module or part comprises of code or instructions that implement one or more interfaces to connect and facilitate communication or exchange of data directly or indirectly with one or more other interfaces implemented in other modules or parts, and executing on the computing device the code or instructions of the application comprising of (a) code or instructions to include or use the plurality of modules or parts in the application, and (b) a system or mechanism that uses an ECI (Exchange for Communication Interfaces) or a BCI (Broker for Communication Interfaces) to facilitate communication or exchange of data between the plurality of modules or parts that comprise of a plurality of interfaces;

wherein the plurality of interfaces comprise of a first set of a plurality of caller interfaces and a second set of a plurality of listener interfaces, and the mechanism that uses the ECI/BCI facilitates communication or exchange of data between each caller interface in the first set of the plurality of caller interfaces and an appropriate listener interface in the second set of the plurality of listener interfaces during the course of execution of the application; and wherein each of the listener interfaces in the second set of the plurality of listener interfaces executes code or instructions to register the listener interface with the ECI/BCI, and the module or part comprising of the caller interface executes code or instructions to look up using the ECI/BCI to find the appropriate listener interface for the caller interface to facilitate communication or exchange of data between the caller interface and the appropriate listener interface.

2. The computer-implemented method of claim 1, wherein the system or mechanism that uses or comprises of the ECI/BCI to facilitate communication between each caller interface in the first set of the plurality of caller interfaces and an appropriate listener interface in the second set of the plurality of listener interfaces by using one or more look-up keys, unique IDs, or unique indexes to look up, match, or compare directly or indirectly by using a mapping to find the appropriate listener interface for the caller interface.

3. The computer-implemented method of claim 2, wherein a first set of modules or parts and a second set of modules or parts are mutually exclusive sets, and the first set of modules or parts comprises of at least five modules or parts, the second set of modules or parts comprises of at least five modules or parts, each module or part in the second set of modules or parts implements one or more listener interface functions and at least one module or part in the first set of modules or parts comprises of code to call at least one of the listener interface functions implemented by the module or part in the second set of modules or parts.

4. The computer-implemented method of claim 1, wherein the first set of the plurality of caller interfaces comprises of at least nine caller interfaces and the second set of the plurality of listener interfaces comprises of at least nine listener interfaces, and the code or instructions implemented for each caller interface in the first set of the plurality of caller interfaces communicates with a listener interface in the second set of the plurality of listener interfaces, wherein communication between each listener interface in the second set of the plurality of listener interfaces and a caller interface in the first set of the plurality of caller interfaces is facilitated by the system or mechanism.

5. The computer-implemented method of claim 1, wherein the system or mechanism facilitates communication between each caller interface in the first set of the plurality of caller interfaces and an appropriate listener interface from the second set of the plurality of listener interfaces by creating a coupling or a connection to facilitate communication between the listener interface that implements a listener function and the caller interface that implements code to directly or indirectly call the listener function, wherein the system or mechanism further finds one or more software bugs and errors, or raises warnings from the following list comprising: (a) the caller interface in the first set of the plurality of caller interfaces being unable to find an appropriate listener interface to allow communication, or (b) an incompatible coupling between the caller interface and the appropriate listener interface for the caller interface such as (i) mismatch of interface versions of the caller interface and the appropriate listener interface for the caller interface, (ii) mismatch between type of object returned by the listener function that is implemented for the listener interface and type of object expected by the code implemented in the caller interface to call the listener function, or (iii) mismatch in number of parameters or types of parameters between the listener function that is implemented for the listener interface and the code implemented in the caller interface to call the listener function.

6. The computer-implemented method of claim 2, creating visual representation or documentation for communication interface couplings or dependencies such as (i) between a caller interface and each of one or more listener interfaces having a symbiotic relationship with the caller interface, (ii) between a listener interface and each of one or more caller interfaces having a symbiotic relationship with the listener interface, (iii) between each caller interface in the first set of the plurality of caller interfaces having at least three caller interfaces and each of one or more listener interfaces having a symbiotic relationship with the caller interface, and (iv) between each listener interface in the second set of the plurality of listener interfaces having at least three listener interfaces and each of one or more caller interfaces having a symbiotic relationship with the listener interface, wherein the one or more other interfaces having a symbiotic relationship with any given interface are searched and found by using the system or mechanism comprising of the ECI/BCI.

7. The computer-implemented method of claim 1, wherein the system or mechanism uses a plurality of ECI/BCI instances in the application to register each listener interface from a third set of a plurality of listener interfaces with an appropriate ECI/BCI instance, and looks up to find an appropriate listener interface for each caller interface in a fourth set of a plurality of caller interfaces comprising of at least seven caller interfaces (i) using or searching more than one ECI/BCI instance to find the appropriate listener interface for the caller interface, (ii) using an appropriate ECI/BCI of a component or a container component to find the appropriate listener interface for the caller interface or (iii) using a first look-up key or unique ID to find an appropriate ECI/BCI and using a second look-up key or unique ID to find the appropriate listener interface from the appropriate ECI/BCI for the caller interface, to facilitate communication between the caller interface and the appropriate listener interface for the caller interface.

8. The computer-implemented method of claim 1, wherein the system or mechanism comprises of the ECI/BCI to facilitate communication or exchange of data between each caller interface in the first set of the plurality of caller interfaces and an appropriate listener interface from the second set of the plurality of listener interfaces by facilitating exchange of data that comprises of one or more pieces of information, between the listener interface that implements a listener function and the caller interface that implements code to directly or indirectly call the listener function, wherein the system or mechanism further uses or executes necessary validation instructions along with the caller interface that calls the listener function and the listener interface that executes the listener function, where the validation instructions detect or prevent errors in the data being exchanged or security breaches like (i) a piece of information in the data is out of permissible range or uses the wrong measurement system, (ii) malicious or corrupt data, or (iii) unauthorized access or use of sensitive data or information by using profile or privileges of each user.

9. A computer-implemented method running or executing on a first computing device comprising of at least one processor, at least one memory, and having access to a non-transitory computer-readable storage medium comprising of code or instructions for executing or running a software product or application, comprising:
  accessing from the non-transitory computer-readable storage medium the code or instructions for the application comprising of a plurality of modules or parts, wherein each module or part comprises of code, instructions, or information to implement one or more interfaces to allow communication or exchange of data directly or indirectly with one or more other interfaces that are implemented in other modules or parts, and a plurality of interfaces implemented in the plurality of modules comprising of a first set of a plurality of caller interfaces and a second set of a plurality of listener interfaces;
  executing or running on the first computing device the code or instructions for the application comprising of (a) code or instructions that includes or uses the plurality of modules or parts in the application, and (b) communication code that allows communication or exchange of data between each caller interface in the first set of the plurality of caller interfaces and an appropriate listener interface in the second set of the plurality of listener interfaces;
  wherein (i) the communication code is created or generated by running or executing a pre-processor or compiler on a second computing device comprising of at least one processor and at least one memory that accesses from a non-transitory computer-readable storage medium code or source code of the application comprising of information or instructions for the plurality of interfaces, wherein the pre-processor or compiler comprising of a system or mechanism that uses an ECI (Exchange for Communication Interfaces) or BCI (Broker for Communication interfaces) to generate or create communication code, and (ii) the communication code is included in the code of the application;
  wherein the system or mechanism directly or indirectly accesses from the code or source code of the application (a) information or instructions that are part of the code implemented for each listener interface in the second set of the plurality of listener interfaces and uses the information or instructions to register each listener interface with the ECI/BCI and (b) information or instructions that are part of the code implemented for each caller interface in the first set of the plurality of caller interfaces and uses the information or instructions to look up and find an appropriate listener interface for the caller interface using the ECI/BCI; and
  the system or mechanism generates or creates communication code to allow communication or exchange of data between each caller interface in the first set of the plurality of caller interfaces and an appropriate listener interface in the second set of the plurality of listener interfaces by using the ECI/BCI to look up the appropriate listener interface for the caller interface.

10. The computer-implemented method of claim 9, wherein the system or mechanism that uses or comprises of the ECI/BCI to create or generate communication code to allow communication of exchange of data between each caller interface in the first set of the plurality of caller interfaces and an appropriate listener interface in the second set of the plurality of listener interfaces uses one or more look-up keys, unique IDs, or unique indexes to look up, match, or compare directly or indirectly by using a mapping to find the appropriate listener interface for the caller interface.

11. The computer-implemented method of claim 10, wherein the application comprises of a first set of modules or parts comprising of at least five modules or parts and a second set of modules or parts comprising of at least five modules or parts, where the first set of modules or parts and the second set of modules or parts are mutually exclusive sets, and each module or part in the second set of modules implements one or more listener interface functions and at least one module or part in the first set of modules or parts comprises of code to call at least one of the listener interface functions directly or indirectly using communication code or instructions created or generated by the system or mechanism and included in the code of the application.

12. The computer-implemented method of claim 9, wherein the first set of the plurality of caller interfaces comprises of at least nine caller interfaces, the second set of the plurality of listener interfaces comprises of at least nine listener interfaces, and code or instructions are implemented for each caller interface in the first set of the plurality of caller interfaces to communicate or exchange data with a listener interface in the second set of the plurality of listener interfaces using communication code or instructions, wherein the communication code or instructions that allows the communication or exchange of data between the listener interface in the second set of the plurality of listener interfaces and the caller interface in the first set of the plurality of caller interfaces is created or generated by using the system or mechanism.

13. The computer-implemented method of claim 10, creating or providing visual representation or documentation for communication interface couplings or dependencies by using information for interfaces available or obtained from the second computing device such as (i) between a caller interface and each of one or more listener interfaces having a symbiotic relationship with the caller interface, (ii) between a listener interface and each of one or more caller interfaces having a symbiotic relationship with the listener interface, (iii) between each caller interface in the first set of the plurality of caller interfaces having at least three caller interfaces and each of one or more listener interfaces having a symbiotic relationship with the caller interface, and (iv) between each listener interface in the second set of the plurality of listener interfaces having at least three listener interfaces and each of one or more caller interfaces having a symbiotic relationship with the listener interface, wherein the one or more other interfaces having a symbiotic relationship with any interface is searched and found by using the system or mechanism comprising of the ECI/BCI.

14. The computer-implemented method of claim 9, wherein the system or mechanism that creates or generates communication code to facilitate communication or exchange of data between each caller interface in the first set of the plurality of caller interfaces and an appropriate listener interface from the second set of the plurality of listener interfaces by creating or generating communication code to facilitate exchange of data that comprises of one or more pieces of information, between the listener interface that implements a listener function and the caller interface that implements code to directly or indirectly call the listener function, wherein the system or mechanism further includes necessary validation instructions in the communication code to run or execute the validation instructions along with the caller interface to call the listener function and the listener interface to execute the listener function, where the validation instructions detect or prevent errors in the data being exchanged or security breaches like (i) a piece of information in the data is out of permissible range or uses the wrong measurement system, (ii) malicious or corrupt data, or (iii) unauthorized access or use of sensitive data or information by using profile or privileges of each user.

15. A computing system or device comprising of at least one processor, at least one memory, and connected to a non-transitory computer-readable storage medium comprising of code or instructions to execute or run a software product or application, capable of performing the following steps comprising:
   accessing from the non-transitory computer-readable storage medium the code or instructions for the application comprising of a plurality of modules or parts, wherein each module or part comprises of code or instructions that implement one or more interfaces to connect and facilitate communication or exchange of data directly or indirectly with one or more other interfaces implemented in other modules or parts, and
   executing on the computing device the code or instructions of the application comprising of (a) code or instructions to include or use the plurality of modules or parts in the application, and (b) a system or mechanism that uses an ECI (Exchange for Communication Interfaces) or a BCI (Broker for Communication Interfaces) to facilitate communication or exchange of data between the plurality of modules or parts that comprise of a plurality of interfaces;
   wherein the plurality of interfaces comprise of a first set of a plurality of caller interfaces and a second set of a plurality of listener interfaces, and the mechanism that uses the ECI/BCI facilitates communication or exchange of data between each caller interface in the first set of the plurality of caller interfaces and an appropriate listener interface in the second set of the plurality of listener interfaces during the course of execution of the application; and
   wherein each of the listener interfaces in the second set of the plurality of listener interfaces executes code or instructions to register the listener interface with the ECI/BCI, and the module or part comprising of the caller interface executes code or instructions to look up using the ECI/BCI to find the appropriate listener interface for the caller interface to facilitate communication or exchange of data between the caller interface and the appropriate listener interface.

16. The computing system or device of claim 15, wherein the system or mechanism that uses or comprises of the ECI/BCI to facilitate communication between each caller interface in the first set of the plurality of caller interfaces and an appropriate listener interface in the second set of the plurality of listener interfaces by using one or more look-up keys, unique IDs, or unique indexes to look up, match, or compare directly or indirectly by using a mapping to find the appropriate listener interface for the caller interface.

17. The computing system or device of claim 16, wherein a first set of modules or parts and a second set of modules or parts are mutually exclusive sets, and the first set of modules or parts comprises of at least five modules or parts, the second set of modules or parts comprises of at least five modules or parts, each module or part in the second set of modules or parts implements one of more listener interface functions and at least one module or part in the first set of modules or parts comprises of code to call at least one of the listener interface functions implemented by the module or part in the second set of modules or parts.

18. The computing system or device of claim 15, wherein the first set of the plurality of caller interfaces comprises of at least nine caller interfaces and the second set of the plurality of listener interfaces comprises of at least nine listener interfaces, and the code or instructions implemented for each caller interface in the first set of the plurality of caller interfaces communicates with a listener interface in the second set of the plurality of listener interfaces, wherein communication between each listener interface in the second set of the plurality of listener interfaces and a caller interface in the first set of the plurality of caller interfaces is facilitated by the system or mechanism.

19. The computing system or device of claim 15, wherein the system or mechanism facilitates communication between each caller interface in the first set of the plurality of caller interfaces and an appropriate listener interface from the second set of the plurality of listener interfaces by creating a coupling or a connection to facilitate communication between the listener interface that implements a listener function and the caller interface that implements code to directly or indirectly call the listener function, wherein the system or mechanism further finds one or more software bugs and errors, or raises warnings from the following list comprising: (a) the caller interface in the first set of the plurality of caller interfaces being unable to find an appropriate listener interface to allow communication, or (b) an incompatible coupling between the caller interface and the appropriate listener interface for the caller interface such as (i) mismatch of interface versions of the caller interface and the appropriate listener interface for the caller interface, (ii) mismatch between type of object returned by the listener function that is implemented for the listener interface and type of object expected by the code implemented in the caller interface to call the listener function, or (iii) mismatch in number of parameters or types of parameters between the listener function that is implemented for the listener interface and the code implemented in the caller interface to call the listener function.

20. The computing system or device of claim 16, creating visual representation or documentation for communication interface couplings or dependencies such as (i) between a caller interface and each of one or more listener interfaces having a symbiotic relationship with the caller interface, (ii) between a listener interface and each of one or more caller interfaces having a symbiotic relationship with the listener interface, (iii) between each caller interface in the first set of the plurality of caller interfaces having at least three caller interfaces and each of one or more listener interfaces having a symbiotic relationship with the caller interface, and (iv) between each listener interface in the second set of the plurality of listener interfaces having at least three listener interfaces and each of one or more caller interfaces having a symbiotic relationship with the listener interface, wherein the one or more other interfaces having a symbiotic relationship with any given interface are searched and found by using the system or mechanism comprising of the ECI/BCI.

21. The computing system or device of claim 15, wherein the system or mechanism uses a plurality of ECI/BCI instances in the application to register each listener interface from a third set of a plurality of listener interfaces with an appropriate ECI/BCI instance, and looks up to find an appropriate listener interface for each caller interface in a fourth set of a plurality of caller interfaces comprising of at least seven caller interfaces (i) using or searching more than one ECI/BCI instance to find the appropriate listener interface for the caller interface, (ii) using an appropriate ECI/BCI of a component or a container component to find the appropriate listener interface for the caller interface, or (iii) using a first look-up key or unique ID to find an appropriate ECI/BCI and using a second look-up key or unique ID to find the appropriate listener interface from the appropriate ECI/BCI for the caller interface, to facilitate communication between the caller interface and the appropriate listener interface for the caller interface.

22. The computing system or device of claim 15, wherein the system or mechanism comprises of the ECI/BCI to facilitate communication or exchange of data between each caller interface in the first set of the plurality of caller interfaces and an appropriate listener interface from the second set of the plurality of listener interfaces by facilitating exchange of data that comprises of one or more pieces of information between the listener interface that implements a listener function and the caller interface that implements code to directly or indirectly call the listener function, wherein the system or mechanism further uses or executes necessary validation instructions along with the caller interface that calls the listener function and the listener interface that executes the listener function, where the validation instructions detect or prevent errors in the data being exchanged or security breaches like (i) a piece of information in the data is out of permissible range or uses the wrong measurement system, (ii) malicious or corrupt data, or (iii) unauthorized access or use of sensitive data or information by using profile or privileges of each user.

23. A first computing system or device comprising of at least one processor, at least one memory, and connected to a non-transitory computer-readable storage medium comprising of code or instructions to execute or run a software product or application, capable of performing the following steps comprising:

accessing from the non-transitory computer-readable storage medium the code or instructions for the application comprising of a plurality of modules or parts, wherein each module or part comprises of code, instructions, or information to implement one or more interfaces to allow communication or exchange of data directly or indirectly with one or more other interfaces that are implemented in other modules or parts, and a plurality of interfaces implemented in the plurality of modules comprising of a first set of a plurality of caller interfaces and a second set of a plurality of listener interfaces;

executing or running on the first computing device the code or instructions for the application comprising of (a) code or instructions that includes or uses the plurality of modules or parts in the application, and (b) communication code that allows communication or exchange of data between each caller interface in the first set of the plurality of caller interfaces and an appropriate listener interface in the second set of the plurality of listener interfaces;

wherein (i) the communication code is created or generated by running or executing a pre-processor or compiler on a second computing device comprising of at least one processor and at least one memory that accesses from a non-transitory computer-readable storage medium code or source code of the application comprising of information or instructions for the plurality of interfaces, wherein the pre-processor or compiler comprising of a system or mechanism that uses an ECI (Exchange for Communication Interfaces) or BCI (Broker for Communication interfaces) to generate or create communication code, and (ii) the communication code is included in the code of the application;

wherein the system or mechanism directly or indirectly accesses from the code or source code of the application (a) information or instructions that are part of the code implemented for each listener interface in the second set of the plurality of listener interfaces and uses the information or instructions to register each listener interface with the ECI/BCI and (b) information or instructions that are part of the code implemented for each caller interface in the first set of the plurality of caller interfaces and uses the information or instructions to look up and find an appropriate listener interface for the caller interface using the ECI/BCI; and the system or mechanism generates or creates communication code to allow communication or exchange of data between each caller interface in the first set of the plurality of caller interfaces and an appropriate listener interface in the second set of the plurality of listener interfaces by using the ECI/BCI to look up the appropriate listener interface for the caller interface.

24. The first computing system or device of claim 23, wherein the system or mechanism that uses or comprises of the ECI/BCI to create or generate communication code to allow communication of exchange of data between each caller interface in the first set of the plurality of caller interfaces and an appropriate listener interface in the second set of the plurality of listener interfaces uses one or more look-up keys, unique IDs, or unique indexes to look up, match, or compare directly or indirectly by using a mapping to find the appropriate listener interface for the caller interface.

25. The first computing system or device of claim of claim 24, wherein the application comprises of a first set of modules or parts comprising of at least five modules or parts and a second set of modules or parts comprising of at least five modules or parts, where the first set of modules or parts and the second set of modules or parts are mutually exclusive sets, and each module or part in the second set of modules implements one or more listener interface functions and at least one module or part in the first set of modules or parts comprises of code to call at least one of the listener interface functions directly or indirectly using communication code or instructions created or generated by the system or mechanism and included in the code of the application.

26. The first computing system or device of claim of claim 23, wherein the first set of the plurality of caller interfaces comprises of at least nine caller interfaces, the second set of the plurality of listener interfaces comprises of at least nine listener interfaces, and code or instructions are implemented for each caller interface in the first set of the plurality of caller interfaces to communicate or exchange data with a listener interface in the second set of the plurality of listener interfaces using communication code or instructions, wherein the communication code or instructions that allows the communication or exchange of data between the listener interface in the second set of the plurality of listener interfaces and the caller interface in the first set of the plurality of caller interfaces is created or generated by using the system or mechanism.

27. The first computing system or device of claim 24, creating or providing visual representation or documentation for communication interface couplings or dependencies by using information for interfaces available or obtained from the second computing device such as (i) between a caller interface and each of one or more listener interfaces having a symbiotic relationship with the caller interface, (ii) between a listener interface and each of one or more caller interfaces having a symbiotic relationship with the listener interface, (iii) between each caller interface in the first set of the plurality of caller interfaces having at least three caller interfaces and each of one or more listener interfaces having a symbiotic relationship with the caller interface, and (iv) between each listener interface in the second set of the plurality of listener interfaces having at least three listener interfaces and each of one or more caller interfaces having a symbiotic relationship with the listener interface, wherein the one or more other interfaces having a symbiotic relationship with any given interface is searched and found by using the system or mechanism comprising of the ECI/BCI.

28. The first computing system or device of claim 23, wherein the system or mechanism that creates or generates communication code to facilitate communication or exchange of data between each caller interface in the first set of the plurality of caller interfaces and an appropriate listener interface from the second set of the plurality of listener interfaces by creating or generating communication code to facilitate exchange of data that comprises of one or more pieces of information between the listener interface that implements a listener function and the caller interface that implements code to directly or indirectly call the listener function, wherein the system or mechanism further includes necessary validation instructions in the communication code to run or execute the validation instructions along with the caller interface to call the listener function and the listener interface to execute the listener function, where the validation instructions detect or prevent errors in the data being exchanged or security breaches like (i) a piece of information in the data is out of permissible range or uses the wrong measurement system, (ii) malicious or corrupt data, or (iii) unauthorized access or use of sensitive data or information by using profile or privileges of each user.

29. A computer-implemented method running or executing on a first computing device comprising of at least one processor, at least one memory that executes a pre-processor or compiler comprising of a system or mechanism that uses or comprises of an ECI (Exchange for Communication Interfaces) or BCI (Broker for Communication interfaces) to generate communication code, and having access to a non-transitory computer-readable storage medium comprising of source code, code, or instructions for a software product or application, comprising:

accessing from the non-transitory computer-readable storage medium the source code, code, or instructions for the application comprising of a plurality of modules or parts, wherein each module or part comprises of code, instructions, or information to implement one or more interfaces to allow communication or exchange of data directly or indirectly with one or more other interfaces that are implemented in other modules or parts, and a plurality of interfaces implemented in the plurality of modules or parts that include a first set of a plurality of caller interfaces and a second set of a plurality of listener interfaces;

creating or generating communication code that can facilitate communication or exchange of data between each caller interface in the first set of the plurality of caller interfaces and an appropriate listener interface in the second set of the plurality of listener interfaces by using the ECI/BCI to look up for finding the appropriate listener interface for the caller interface;

wherein the communication code is created or generated by the pre-processor or compiler comprising of the system or mechanism that uses the ECI/BCI, where the system or mechanism directly or indirectly obtains from the source code or code of the application (a) information or instructions that are part of the code implemented for each listener interface in the second set of the plurality of listener interfaces and uses the information or instructions to register each listener interface with the ECI/BCI, and (b) information or instructions that are part of the code implemented for each caller interface in the first set of the plurality of caller interfaces and uses the information or instructions to look up for finding an appropriate listener interface for the caller interface using the ECI/BCI; and wherein the communication code can facilitate communication or exchange of data between each caller interface in the first set of the plurality of caller interfaces and an appropriate listener interface in the second set of the plurality of listener interfaces, when (i) the communication code is included properly in the code of the application, (ii) an executable code of the application is created, and (iii) the executable code of the application is executed on a second computing device comprising of at least one processor and at least one memory by accessing the executable code of the application comprising of the communication code from a non-transitory computer-readable storage medium.

30. The computer-implemented method of claim 29, wherein the system or mechanism that uses or comprises of the ECI/BCI to create or generate communication code to allow communication or exchange of data between each caller interface in the first set of the plurality of caller interfaces and an appropriate listener interface in the second set of the plurality of listener interfaces uses one or more look-up keys, unique IDs, or unique indexes to look up, match, or compare directly or indirectly by using a mapping to find the appropriate listener interface for the caller interface.

31. The computer-implemented method of claim 30, wherein the application comprises of a first set of modules or parts comprising of at least five modules or parts and a second set of modules or parts comprising of at least five modules or parts, where the first set of modules or parts and the second set of modules or parts are mutually exclusive sets, and each of the modules or parts in the second set of modules implements at least one listener interface function and at least one module or part in the first set of modules or parts comprises of code to call the listener interface function directly or indirectly using the communication code created or generated by the system or mechanism and included in the code of the application.

32. The computer-implemented method of claim 30, wherein the system or mechanism that creates or generates communication code or instructions to facilitate communication or exchange of data between each caller interface in the first set of the plurality of caller interfaces and an appropriate listener interface from the second set of the plurality of listener interfaces by creating or generating communication code or instructions to create a coupling to facilitate communication between the listener interface that implements a listener function and the caller interface that implements code to directly or indirectly call the listener function, wherein the system or mechanism further finds one or more software bugs, errors or raises warnings from the following list comprising: (a) the caller interface in the first set of the plurality of caller interfaces being unable to find an appropriate listener interface to allow communication, or (b) an incompatible coupling between the caller interface and the appropriate listener interfaces for the caller interface such as (i) mismatch of interface versions of the caller interface and the appropriate listener interface for the caller interface, (ii) mismatch between type of object returned by the listener function and type of object expected by the code implemented in the caller interface to call the listener function, or (iii) mismatch in number of parameters or types of parameters between the listener function that is implemented for the listener interface and the code implemented in the caller interface to call the listener function.

33. The computer implemented method of claim 30, creating visual representation or providing documentation for communication interface couplings or dependencies such as (i) between a caller interface and each of one or more listener interfaces having a symbiotic relationship with the caller interface, (ii) between a listener interface and each of one or more caller interfaces having a symbiotic relationship with the listener interface, (iii) between each caller interface in the first set of the plurality of caller interfaces having at least five caller interfaces and each of one or more listener interfaces having a symbiotic relationship with the caller interface, and (iv) between each listener interface in the second set of the plurality of listener interfaces having at least five listener interfaces and each of one or more caller interfaces having a symbiotic relationship with the listener interface, wherein the one or more other interfaces having a symbiotic relationship with any given interface is searched and found by using the system or mechanism comprising of the ECI/BCI.

\* \* \* \* \*